United States Patent [19]

Kanamori et al.

[11] Patent Number: 5,504,821
[45] Date of Patent: Apr. 2, 1996

[54] COLOR CONVERTING APPARATUS FOR PERFORMING A THREE-DIMENSIONAL COLOR CONVERSION OF A COLORED PICTURE IN A COLOR SPACE WITH A SMALL CAPACITY OF MEMORY

[75] Inventors: Katsuhiro Kanamori; Osamu Yamada, both of Kawasaki; Hideto Motomura, Sagamihara; Rika Hashimoto, Sapporo; Teruo Fumoto, Tokyo; Hiroaki Kotera, Kawasaki, all of Japan

[73] Assignee: Matsushita Electric Industrial Co., Ltd., Osaka, Japan

[21] Appl. No.: 220,556

[22] Filed: Mar. 31, 1994

[30] Foreign Application Priority Data

| | | | |
|---|---|---|---|
| Mar. 31, 1993 | [JP] | Japan | 5-073207 |
| Jul. 9, 1993 | [JP] | Japan | 5-170079 |
| Jul. 28, 1993 | [JP] | Japan | 5-186040 |
| Sep. 16, 1993 | [JP] | Japan | 5-230064 |
| Sep. 22, 1993 | [JP] | Japan | 5-236205 |

[51] Int. Cl.⁶ ........................ G06V 9/46
[52] U.S. Cl. .......... 382/167; 382/274; 358/518; 348/708; 348/650
[58] Field of Search .............. 382/17, 41, 61, 382/57, 58, 162, 167, 274; 358/518, 520, 525; 348/117, 708, 650

[56] References Cited

U.S. PATENT DOCUMENTS

| | | | |
|---|---|---|---|
| 4,275,413 | 6/1981 | Sakamoto et al. | 358/525 |
| 4,334,240 | 6/1982 | Franklin | 358/525 |
| 4,477,833 | 10/1984 | Clark et al. | 358/525 |
| 5,241,373 | 8/1993 | Kanamori et al. | 358/518 |
| 5,268,754 | 12/1993 | Van de Capelle et al. | 382/17 |
| 5,311,332 | 5/1994 | Imao et al. | 358/520 |
| 5,317,426 | 5/1994 | Hoshino | 358/520 |
| 5,337,166 | 8/1994 | Ikegami | 358/520 |

FOREIGN PATENT DOCUMENTS

| | | | |
|---|---|---|---|
| 56-14237 | 2/1981 | Japan | G03F 3/08 |
| 58-16180 | 3/1983 | Japan | G03F 3/08 |
| 287192 | 3/1990 | Japan | G09G 5/00 |
| 2226866 | 9/1990 | Japan | H04N 1/46 |
| 2226867 | 9/1990 | Japan | H04N 1/46 |
| 2226868 | 9/1990 | Japan | H04N 1/46 |
| 546750 | 2/1993 | Japan | G06F 15/66 |
| 575848 | 3/1993 | Japan | H04N 1/40 |
| 5120416 | 5/1993 | Japan | G06F 15/66 |

*Primary Examiner*—Leo Boudreau
*Assistant Examiner*—D. R. Anderson
*Attorney, Agent, or Firm*—Lowe, Price, LeBlanc & Becker

[57] ABSTRACT

A color converting apparatus is provided with a table memory for storing pieces of color converting data defined in an output color space at color converting addresses, and a signal receiving section for receiving three signals designating an input color in a lightness-color difference space. The color converting addresses are placed at lattice points of cubic blocks formed by partitioning the lightness-color difference space in a lightness direction and first and second color difference directions. Each of the cubic blocks has the lattice points Pa, Pb, Pc and Pd at its lower plane and the lattice points Pe, Pf, Pg and Ph at its upper plane. Each of the cubic blocks is partitioned into a first triangular prism having the lattice points Pa, Pb, Pc, Pe, Pf and Pg and a second triangular prism having the lattice points Pa, Pd, Pc, Pe, Ph and Pg. A particular triangular prism in which the input color is included is specified, and six pieces of color converting data Da, Db (or Dd), Dc, De, Df (or Dh) and Dg addressed at the lattice points Pa, Pb (or Pd), Pc, Pe (or Ph), Pf of the particular triangular prism are read out from the table memory, and an output color which corresponds to the input color and is defined in the output space is interpolated with the color converting data read out.

55 Claims, 59 Drawing Sheets

FIG. 7A

| | |
|---|---|
| (0) | Da |
| (1) | Dc |
| (2) | De |
| (3) | Dg |
| (4) | Db |
| (5) | Dd |
| (6) | Df |
| (7) | Dh |

512 WORDS #0

| | |
|---|---|
| (8) | Da' |
| (9) | Dc' |
| (10) | De' |
| (11) | Dg' |
| (12) | Db' |
| (13) | Dd' |
| (14) | Df' |
| (15) | Dh' |

| | |
|---|---|
| (0) | Da |
| (1) | Dc |
| (2) | De |
| (3) | Dg |
| (4) | Db |
| (5) | Dd |
| (6) | Df |
| (7) | Dh |

0

| | |
|---|---|
| (8) | Da |
| (9) | Dc |
| (10) | De |
| (11) | Dg |
| (12) | Db |
| (13) | Dd |
| (14) | Df |
| (15) | Dh |

EXTERNAL ADDRESS

EVEN NUMBER OF ADDRESS | B7 B6 B5 B4 B3 B2 B1 B0

ODD NUMBER OF ADDRESS | 0 | B9 B8

S

B9 B8 B7 B6 B5 B4 B3 B2 B1 B0

EXTERNAL ADDRESS

EVEN NUMBER OF ADDRESS | B7 B6 B5 B4 B3 B2 B1 B0

ODD NUMBER OF ADDRESS | 0 | 0 0

| TYPE | BIT LENGTH OF INPUT/ OUTPUT COLOR SIGNALS | BIT LENGTH OF COLOR CONVERTING DATA |
|---|---|---|
| 1 | 8 | 8 |
| 2 | 8 | 10 |
| 3 | 10 | 8 |
| 4 | 10 | 10 |

FIG. 9D

| TYPE | TRANSFERRING CAPACITY OF COLOR CONVERTING DATA | RANGE OF COLOR CONVERTING DATA |
|---|---|---|
| 1 | 8 KBYTE (1 BYTE=8 BITS) | EVEN NUMBERS FROM −256 TO 254 |
| 2 | 8 KWORD (1 WORD=16 BITS) | INTEGRAL NUMBERS FROM −256 TO 255 |
| 3 | 8 KBYTE (1 BYTE=8 BITS) | MULTIPLE OF 4 FROM −1024 TO 1020 |
| 4 | 8 KWORD (1 WORD=16 BITS) | EVEN NUMBERS FROM −1024 TO 1022 |

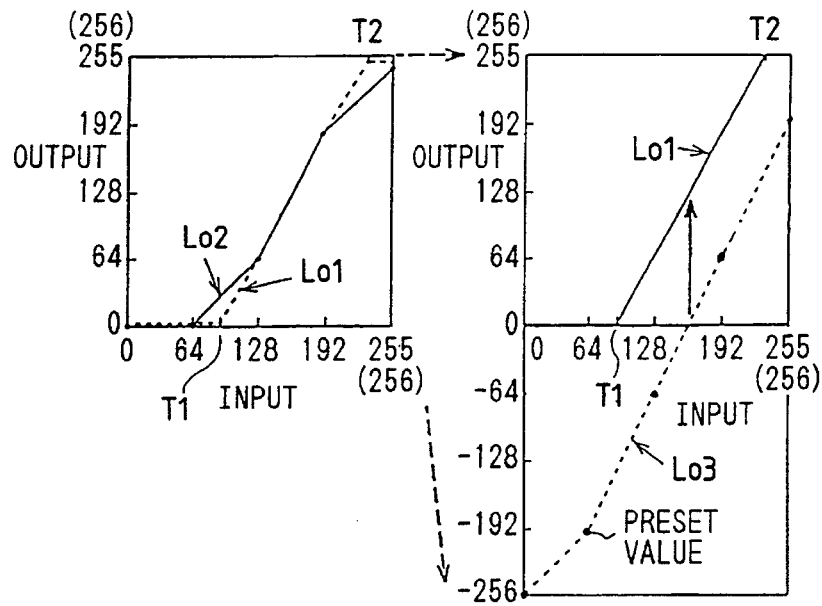
FIG. 10A PRIOR ART
FIG. 10B
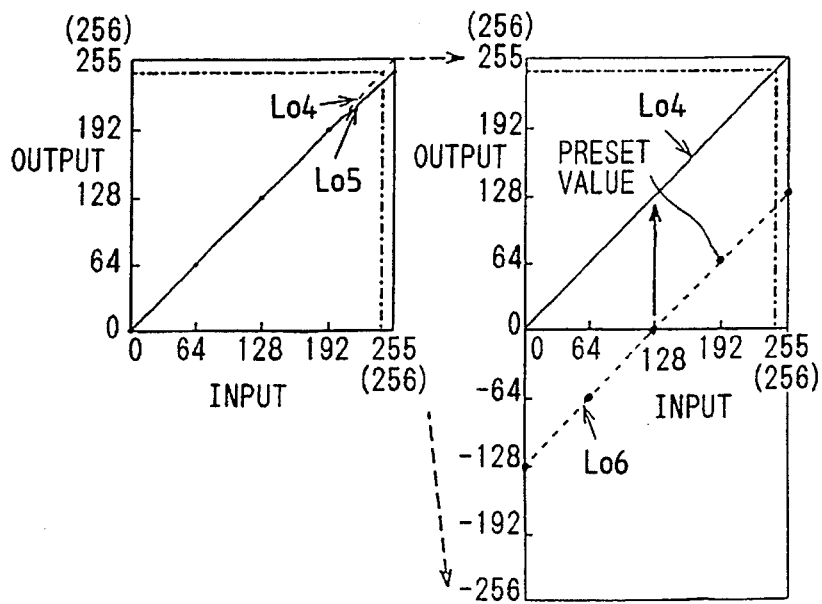
FIG. 11A PRIOR ART
FIG. 11B

| TYPE | RANGE OF SIGNED COLOR CHANGING DATA | |
|---|---|---|
| | OFFSET=EVEN NUMBERS | OFFSET=ODD NUMBERS |
| 1 | EVEN NUMBERS FROM OFFSET-256 TO OFFSET+254 | ODD NUMBERS FROM OFFSET-256 TO OFFSET+254 |
| 2 | INTEGRAL NUMBERS FROM (OFFSET-1024)/4 TO (OFFSET+1022)/4 | NONE |
| 3 | INTEGRAL NUMBERS FROM (OFFSET-256)*4 TO (OFFSET+254)*4 | INTEGRAL NUMBERS FROM (OFFSET-256)*4 TO (OFFSET+254)*4 |
| 4 | EVEN NUMBERS FROM (OFFSET-1024) TO (OFFSET+1022) | ODD NUMBERS FROM (OFFSET-1024) TO (OFFSET+1022) |

FIG. 17B

| SUBTRACTER NO. | TRIANGULAR PRISM SELECTING SIGNAL | |
|---|---|---|
| | Se="0" | Se="1" |
| 32A | Db-Da | Dd-Da |
| 32B | Dc-Db | Dc-Dd |
| 32C | De-Da | De-Da |
| 32D | Df-De | Dh-De |
| 32E | Dg-Df | Dg-Dh |

FIG. 17C

| DIFFERENCE SELECTOR NO. | TRIANGULAR PRISM SELECTING SIGNAL | |
|---|---|---|
| | Se="0" | Se="1" |
| 33A | Db-Da | Dc-Dd |
| 33B | Dc-Db | Dd-Da |
| 33C | Df-De | Dg-Dh |
| 33D | Dg-Df | Dh-De |

FIG. 17D

| PRODUCTS | TRIANGULAR PRISM SELECTING SIGNAL | |
|---|---|---|
| | Se="0" | Se="1" |
| PR1 | DCr1*(Db-Da) | DCr1*(Dc-Dd) |
| PR2 | DCb1*(Dc-Db) | DCb1*(Dd-Da) |
| PR3 | DCr1*(Df-De) | DCr1*(Dg-Dh) |
| PR4 | DCb1*(Dg-Df) | DCb1*(Dh-De) |

FIG. 17E

| ADDED PRODUCTS | TRIANGULAR PRISM SELECTING SIGNAL | |
|---|---|---|
| | Se="0" | Se="1" |
| PA1 | DCr1*(Db-Da)+ DCb1*(Dc-Db) | DCr1*(Dc-Dd)+ DCb1*(Dd-Da) |
| PA2 | DCr1*(Df-De)+ DCb1*(Dg-Df) | DCr1*(Dg-Dh)+ DCb1*(Dh-De) |

FIG. 17F

| FIRST TERM PRODUCT | TRIANGULAR PRISM SELECTING SIGNAL | |
|---|---|---|
| | Se="0" | Se="1" |
| PT1 | Da+ DCr1*(Db-Da)+ DCb1*(Dc-Db) | Da+ DCr1*(Dc-Dd)+ DCb1*(Dd-Da) |

FIG. 17G

| SUBTRACTED PRODUCT | TRIANGULAR PRISM SELECTING SIGNAL | |
|---|---|---|
| | Se="0" | Se="1" |
| PS1 | DCr1*(Df-De)+ DCb1*(Dg-Df)- DCr1*(Db-Da)- DCb1*(Dc-Db) | DCr1*(Dg-Dh)+ DCb1*(Dh-De)- DCr1*(Dc-Dd)- DCb1*(Dd-Da) |

FIG. 17H

| THIRD ADDED PRODUCT | TRIANGULAR PRISM SELECTING SIGNAL | |
|---|---|---|
| | Se="0" | Se="1" |
| PA3 | De-Da+ DCr1*(Df-De)+ DCb1*(Dg-Df)- DCr1*(Db-Da)- DCb1*(Dc-Db) | De-Da+ DCr1*(Dg-Dh)+ DCb1*(Dh-De)- DCr1*(Dc-Dd)- DCb1*(Dd-Da) |

FIG. 17I

| SECOND TERM PRODUCT | TRIANGULAR PRISM SELECTING SIGNAL | |
| --- | --- | --- |
| | Se="0" | Se="1" |
| PT2 | DY1*{De-Da+<br>DCr1*(Df-De)+<br>DCb1*(Dg-Df)-<br>DCr1*(Db-Da)-<br>DCb1*(Dc-Db)} | DY1*{De-Da+<br>DCr1*(Dg-Dh)+<br>DCb1*(Dh-De)-<br>DCr1*(Dc-Dd)-<br>DCb1*(Dd-Da)} |

FIG. 17J

| COLOR CONVERTING DATA | TRIANGULAR PRISM SELECTING SIGNAL | |
| --- | --- | --- |
| | Se="0" | Se="1" |
| Do | Da+<br>DCr1*(Db-Da)+<br>DCb1*(Dc-Db)+<br>DY1*{De-Da+<br>DCr1*(Df-De)+<br>DCb1*(Dg-Df)-<br>DCr1*(Db-Da)-<br>DCb1*(Dc-Db)} | Da+<br>DCr1*(Dc-Dd)+<br>DCb1*(Dd-Da)+<br>DY1*{De-Da+<br>DCr1*(Dg-Dh)+<br>DCb1*(Dh-De)-<br>DCr1*(Dc-Dd)-<br>DCb1*(Dd-Da)} |

| AREA NUMBERS | STARTING OR ENDING PIXEL ADDRESSES | TYPE OF COLOR CHANGES |
|---|---|---|
| 0 | S1 | #0 |
| 1 | E1 | #1 |
| E | S8 | #0 |
| F | E8 | #1 |

FIG. 40A
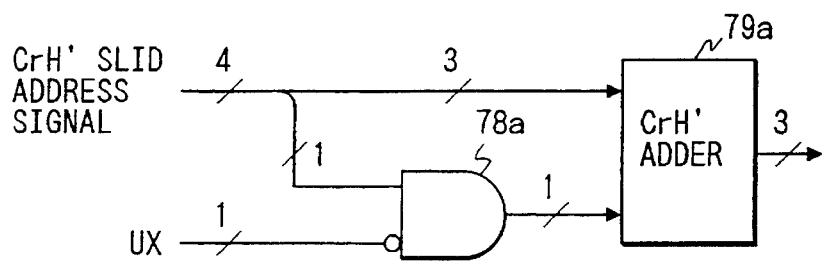
FIG. 40B
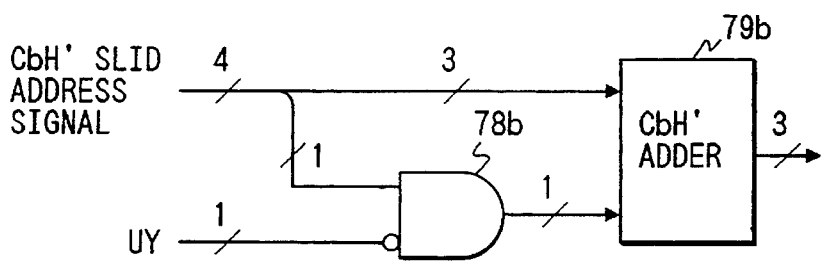
FIG. 40C
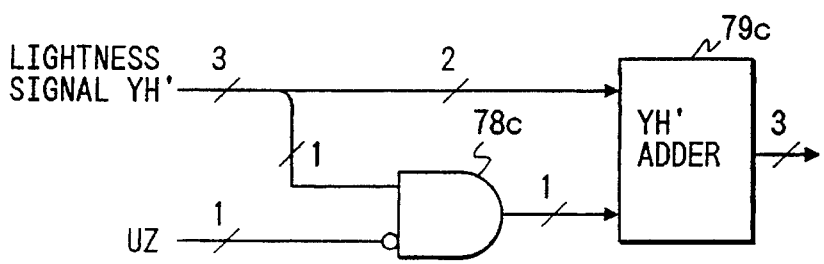
FIG. 40D
| COLOR CONVERTING DATA | 1-BIT ADJUSTING SIGNALS | | |
|---|---|---|---|
| | UX | UY | UZ |
| M0 | 0 | 0 | 0 |
| M1 | 1 | 0 | 0 |
| M2 | 1 | 1 | 0 |
| M3 | 0 | 1 | 0 |
| M4 | 0 | 0 | 1 |
| M5 | 1 | 0 | 1 |
| M6 | 1 | 1 | 1 |
| M7 | 0 | 1 | 1 |

FIG. 41A

| SELECTED BLOCK ADDRESS (YH1', CrH1', CbH1') | SLID ADDRESS | REDUCED ADDRESS | COLOR CONVERTING ADDRESSES (ACTUALLY USED IN TABLE MEMORY 15) OF COLOR CONVERTING DATA M0 TO M7 | | | |
|---|---|---|---|---|---|---|
| | | | M0 | M1 | M2 | M3 |
| (2i, 2j, 2k) | (2i, 2j, 2k) | (i, j, k) | (i, j, k) | (i, j, k) | (i, j, k) | (i, j, k) |
| (2i, 2j+1, 2k) | (2i, 2j+1, 2k) | (i, j, k) | (i, j+1, k) | (i, j, k) | (i, j, k) | (i, j+1, k) |
| (2i, 2j, 2k+1) | (2i, 2j, 2k+1) | (i, j, k) | (i, j, k+1) | (i, j, k+1) | (i, j, k) | (i, j, k) |
| (2i, 2j+1, 2k+1) | (2i, 2j+1, 2k+1) | (i, j, k) | (i, j+1, k+1) | (i, j, k+1) | (i, j+1, k) | (i, j+1, k) |
| (2i+1, 2j, 2k) | (2i+1, 2j+1, 2k+1) | (i, j, k) | (i+1, j+1, k+1) | (i+1, j, k+1) | (i+1, j+1, k) | (i+1, j+1, k) |
| (2i+1, 2j+1, 2k) | (2i+1, 2j+2, 2k+1) | (i, j+1, k) | (i+1, j+1, k+1) | (i+1, j+1, k+1) | (i+1, j+1, k) | (i+1, j+1, k) |
| (2i+1, 2j, 2k+1) | (2i+1, 2j+1, 2k+2) | (i, j, k+1) | (i+1, j+1, k+1) | (i+1, j, k+1) | (i+1, j+1, k+1) | (i+1, j+1, k) |
| (2i+1, 2j+1, 2k+1) | (2i+1, 2j+2, 2k+2) | (i, j+1, k+1) | (i+1, j+1, k+1) | (i+1, j+1, k+1) | (i+1, j+1, k+1) | (i+1, j+1, k) |

| | | | M4 | M5 | M6 | M7 |
|---|---|---|---|---|---|---|
| (2i, 2j, 2k) | (2i, 2j+1, 2k+1) | (i, j, k) | (i, j+1, k+1) | (i, j, k+1) | (i, j+1, k) | (i, j+1, k) |
| (2i, 2j+1, 2k) | (2i, 2j+2, 2k+1) | (i, j+1, k) | (i, j+1, k+1) | (i, j+1, k) | (i, j+1, k) | (i, j+1, k) |
| (2i, 2j, 2k+1) | (2i, 2j+1, 2k+2) | (i, j, k+1) | (i, j+1, k+1) | (i, j, k+1) | (i, j+1, k+1) | (i, j+1, k) |
| (2i, 2j+1, 2k+1) | (2i, 2j+2, 2k+2) | (i, j+1, k+1) | (i, j+1, k+1) | (i, j+1, k+1) | (i, j+1, k+1) | (i, j+1, k) |
| (2i+1, 2j, 2k) | (2i+1, 2j, 2k) | (i, j, k) | (i, j, k) | (i, j, k) | (i, j, k) | (i, j, k) |
| (2i+1, 2j+1, 2k) | (2i+1, 2j+1, 2k) | (i, j, k) | (i, j, k) | (i, j+1, k) | (i, j, k) | (i, j+1, k) |
| (2i+1, 2j, 2k+1) | (2i+1, 2j, 2k+1) | (i, j, k) | (i, j, k+1) | (i, j, k+1) | (i, j, k) | (i, j, k) |
| (2i+1, 2j+1, 2k+1) | (2i+1, 2j+1, 2k+1) | (i, j, k) | (i, j+1, k+1) | (i, j, k+1) | (i, j+1, k) | (i, j+1, k) |

| ADDRESSES (YH1', CrH1', CbH1') | COLOR CONVERTING DATA OUTPUT FROM FIRST SELECTOR 65 | | | | COLOR CONVERTING DATA OUTPUT FROM SECOND SELECTOR 66 | | | |
|---|---|---|---|---|---|---|---|---|
| | Pa (Da) | Pb (Db) | Pc (Dc) | Pd (Dd) | Pe (De) | Pf (Df) | Pg (Dg) | Ph (Dh) |
| (2i, 2j, 2k) | M0 | M1 | M2 | M3 | M6 | M7 | M4 | M5 |
| (2i, 2j+1, 2k) | M1 | M0 | M3 | M2 | M7 | M6 | M5 | M4 |
| (2i, 2j+1, 2k+1) | M2 | M3 | M0 | M1 | M4 | M5 | M6 | M7 |
| (2i, 2j, 2k+1) | M3 | M2 | M1 | M0 | M5 | M4 | M7 | M6 |
| (2i+1, 2j, 2k) | M2 | M3 | M0 | M1 | M4 | M5 | M6 | M7 |
| (2i+1, 2j+1, 2k) | M3 | M2 | M1 | M0 | M5 | M4 | M7 | M6 |
| (2i+1, 2j+1, 2k+1) | M0 | M1 | M2 | M3 | M6 | M7 | M4 | M5 |
| (2i+1, 2j, 2k+1) | M1 | M0 | M3 | M2 | M7 | M6 | M5 | M4 |

LOWER PLANE

● M0
■ M1
▲ M2

UPPER PLANE

| Tx | Ty | SIGNAL Se | CrH" M0 M3 | CrH" M1 M4 | CrH" M2 M5 | CbH" M0 M3 | CbH" M1 M4 | CbH" M2 M5 |
|---|---|---|---|---|---|---|---|---|
| 0 | 0 | 0 |   |   |   |   |   | 1 |
| 1 | 0 | 0 |   |   |   | 1 |   |   |
| 2 | 0 | 0 | 1 | 1 |   |   | 1 |   |
| 0 | 1 | 0 |   |   |   | 1 |   |   |
| 1 | 1 | 0 |   |   |   |   | 1 |   |
| 2 | 1 | 0 |   | 1 | 1 |   |   | 1 |
| 0 | 2 | 0 |   |   |   |   | 1 |   |
| 1 | 2 | 0 |   |   |   |   |   | 1 |
| 2 | 2 | 0 | 1 |   | 1 | 1 |   |   |
| 0 | 0 | 1 |   |   |   |   | 1 | 1 |
| 1 | 0 | 1 |   |   |   | 1 |   | 1 |
| 2 | 0 | 1 |   | 1 |   | 1 | 1 |   |
| 0 | 1 | 1 |   |   |   | 1 |   | 1 |
| 1 | 1 | 1 |   |   |   | 1 | 1 |   |
| 2 | 1 | 1 |   |   | 1 |   | 1 | 1 |
| 0 | 2 | 1 |   |   |   | 1 | 1 |   |
| 1 | 2 | 1 |   |   |   |   | 1 | 1 |
| 2 | 2 | 1 | 1 |   |   | 1 |   | 1 |

FIG. 49C

|  | UZ |
|---|---|
| M0, M1, M2 | 0 |
| M3, M4, M5 | 1 |

| Tx Ty | FIRST SELECTOR | | | SECOND SELECTOR | | |
|---|---|---|---|---|---|---|
| | Pa | Pb | Pc | Pe | Pf | Pg |
| 0 0<br>2 1<br>1 2 | M0 | M1 | M2 | M3 | M4 | M5 |
| 0 1<br>1 0<br>2 2 | M1 | M2 | M0 | M4 | M5 | M6 |
| 2 0<br>1 1<br>0 2 | M2 | M0 | M1 | M5 | M3 | M4 |

| Tx Ty | FIRST SELECTOR | | | SECOND SELECTOR | | |
|---|---|---|---|---|---|---|
| | Pa | Pd | Pc | Pe | Ph | Pg |
| 0 0<br>2 1<br>1 2 | M0 | M1 | M2 | M3 | M4 | M5 |
| 0 1<br>1 0<br>2 2 | M1 | M2 | M0 | M4 | M5 | M6 |
| 2 0<br>1 1<br>0 2 | M2 | M0 | M1 | M5 | M3 | M4 |

LS1  LS2  LS3

(FIRST TYPE)

(SECOND TYPE)

(FIRST TYPE)

(SECOND TYPE)

|  | BL1≧GL1 | BL1<GL1 |
|---|---|---|
| RL1≧GL1 | C1=1<br>C2=1 | C1=1<br>C2=0 |
| RL1<GL1 | C1=0<br>C2=1 | C1=0<br>C2=0 |

FIG. 64A
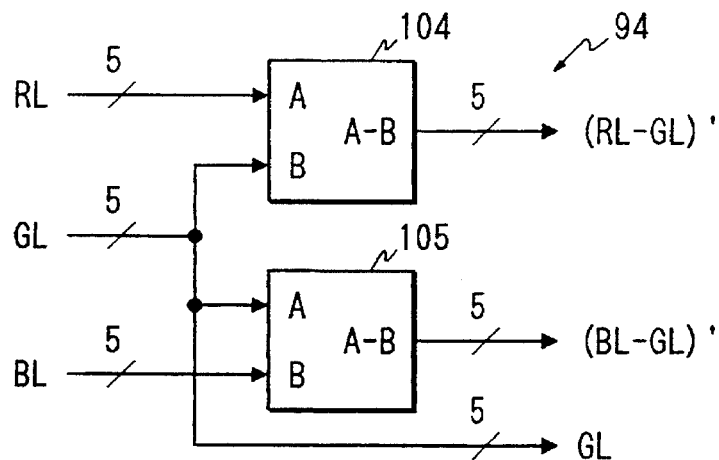
FIG. 64B
| | BL1≧GL1 | BL1<GL1 |
|---|---|---|
| RL1≧GL1 | (RL1-GL1)'=RL1-GL1<br>(BL1-GL1)'=BL1-GL1 | (RL1-GL1)'=RL1-GL1<br>(BL1-GL1)'=BL1+32-GL1 |
| RL1<GL1 | (RL1-GL1)'=RL1-GL1+32<br>(BL1-GL1)'=BL1-GL1 | (RL1-GL1)'=RL1+32-GL1<br>(BL1-GL1)'=BL1+32-GL1 |
FIG. 65A
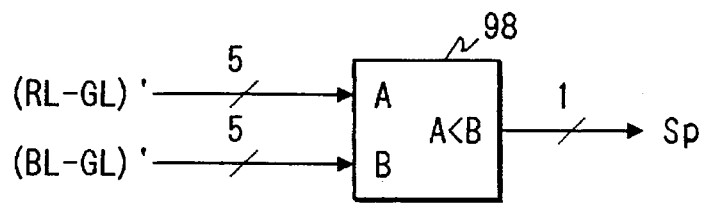

| (RH1', BH1', GH1') | COLOR CONVERTING DATA OUTPUT FROM SELECTOR 100 |||||||| 
|---|---|---|---|---|---|---|---|---|
| | Pa (Da) | Pb (Db) | Pc (Dc) | Pd (Dd) | Pe (De) | Pf (Df) | Pg (Dg) | Ph (Dh) |
| (2i, 2j, 2k) | M0 | M1 | M2 | M3 | M6 | M7 | M4 | M5 |
| (2i+1, 2j, 2k) | M1 | M0 | M3 | M2 | M7 | M6 | M5 | M4 |
| (2i+1, 2j+1, 2k) | M2 | M3 | M0 | M1 | M4 | M5 | M6 | M7 |
| (2i, 2j+1, 2k) | M3 | M2 | M1 | M0 | M5 | M4 | M7 | M6 |
| (2i, 2j, 2k+1) | M4 | M5 | M6 | M7 | M2 | M3 | M0 | M1 |
| (2i+1, 2j, 2k+1) | M5 | M4 | M7 | M6 | M3 | M2 | M1 | M0 |
| (2i+1, 2j+1, 2k+1) | M6 | M7 | M4 | M5 | M0 | M1 | M2 | M3 |
| (2i, 2j+1, 2k+1) | M7 | M6 | M5 | M4 | M1 | M0 | M3 | M2 |

FIG. 72

| ADDRESSES (RH1', GH1', BH1') | COLOR CONVERTING DATA OUTPUT FROM FIRST SELECTOR 65 |||| COLOR CONVERTING DATA OUTPUT FROM SECOND SELECTOR 66 ||||
|---|---|---|---|---|---|---|---|---|
| | Pa (Da) | Pb (Db) | Pc (Dc) | Pd (Dd) | Pe (De) | Pf (Df) | Pg (Dg) | Ph (Dh) |
| (2i, 2j, 2k) | M0 | M1 | M2 | M3 | M6 | M7 | M4 | M5 |
| (2i+1, 2j, 2k) | M1 | M0 | M3 | M2 | M7 | M6 | M5 | M4 |
| (2i+1, 2j+1, 2k) | M2 | M3 | M0 | M1 | M4 | M5 | M6 | M7 |
| (2i, 2j+1, 2k) | M3 | M2 | M1 | M0 | M5 | M4 | M7 | M6 |
| (2i, 2j, 2k+1) | M2 | M3 | M0 | M1 | M4 | M5 | M6 | M7 |
| (2i+1, 2j, 2k+1) | M3 | M2 | M1 | M0 | M5 | M4 | M7 | M6 |
| (2i+1, 2j+1, 2k+1) | M0 | M1 | M2 | M3 | M6 | M7 | M4 | M5 |
| (2i, 2j+1, 2k+1) | M1 | M0 | M3 | M2 | M7 | M6 | M5 | M4 |

COLOR CONVERTING APPARATUS FOR PERFORMING A THREE-DIMENSIONAL COLOR CONVERSION OF A COLORED PICTURE IN A COLOR SPACE WITH A SMALL CAPACITY OF MEMORY

BACKGROUND OF THE INVENTION

1. Field of the Invention

The present invention relates to a color converting method in which a color is arbitrarily converted to another within a real time by inputting color image signals or color picture signals in a color scanner requiring color correction at high speed, a color camera, a color hard copy equipment, a color displaying equipment requiring an accurate color correction, a color corrector for converting colors of a video picture within a real time, a video editing equipment, and a color recognition equipment for recognizing picture images by distinguishing colors of the images.

2. Description of the Related Art

In a conventional monochromatic picture processing, a piece of information of a monochromatic picture displayed in a pixel is a piece of one-dimensional information of lightness, and a lightness conversion is performed as a gamma curve conversion. Therefore, in cases where various non-linear curves are stored in a look-up table to perform the gamma curve conversion, a color conversion in the pixel can be performed within a real time by converting the lightness of the pixel according to the gamma curve conversion. In addition, in cases where a full color image (or a colored picture) is displayed in a pixel, the full color image has been conventionally treated as a combination of three monochromatic pictures such as a red (R) plane, a green (G) plane and a blue (B) plane, and a look-up table is prepared for each of the monochromatic pictures. Therefore, even though a color conversion of the colored picture is required, the color conversion can be performed within a real time by independently referring the three look-up tables. In this case, the above conventional color conversion is originally a one-dimensional processing, and the transformation of $$R'=f_R(R), G'=f_G(G), \text{ and } B'=f_B(B)$$

can be merely performed to convert the full color image.

However, a piece of information of a full color image displayed in the pixel is a three-dimensional information expressed by (R,G,B) in a real picture image. Therefore, the color conversion to be performed in the full color image is formulated according to an equation (1).

$$R'=f_R(R,G,B), G'=f_G(R,G,B), \text{ and } B'=f_B(R,G,B) \quad (1)$$

In the equation (1), the symbols R, G and B denote a red, a green and a blue in a color scanner, and the symbols R', G' and B' denote another red, another green and another blue in a printer or a display. Or, the symbols R. G and B denote a red, a green and a blue in a RGB color space, and the symbols R', G' and B' denote a cyan (C), a magenta (M) and a yellow (Y) in a CMY color space, a lightness, a first chromaticity and a second chromaticity in a lightness-chromaticity color space, or the like.

For example, a complicated color conversion, in which chromaticness of a color belonging to a particular hue is heightened, is required in a full color image processing of a hard copy equipment. Also, a request of a complicated color conversion of a particular color, in which a color of a background is selectively converted to an achromatic color, is required in a full color image editing processing such as a video picture. These color conversions belongs to a three-dimensional color conversion, and three input signals are required to obtain an output signal.

In cases where a color correction (or, a color conversion) of a full color image displayed on an image plane or printed on a paper is performed by inputting a combination of the colors R, G and B, the colors R', G' and B' determined by a composition of the colors R, G and B are respectively stored in a look-up table of a table memory in advance over the entire color space. Thereafter, when a combination of input colors R, G and B is input to correct the color picture, correcting colors R', G' and B' determined by a composition of the input colors R, G and B are respectively read out from the look-up tables. For example, in cases where a full color image read by a color scanner is converted and displayed on an image plane, intensities of three primary colors such as red (R), green (G) and blue (B) are detected by the color scanner in a RGB color space to obtain three color signals. Thereafter, a color conversion is performed according to the equation (1) in a conventional color converting apparatus to convert the color signals to desired color signals in the same RGB color space. Thereafter, a color converted picture formed with the desired color signals is displayed on the image plane. Also, in cases where a full color image read by a color scanner is converted and printed by a printer, three color signals are obtained with the color scanner in the RGB color space. Thereafter, the color signals in the RGB color space are transformed to three transformed color signals of cyan (C), magenta (M) and yellow (Y) in a CMY color space. Thereafter, a color conversion is performed according to the equation (1) in a conventional color converting apparatus to convert the transformed color signals to desired color signals in the CMY color space. Thereafter, a color converted picture formed with the desired color signals is printed on a paper by the printer. The reason that the RGB color space is converted to the CMY color space is because three primary colors of toner are cyan (C), magenta (M) and yellow (Y).

In addition, a standard color space such as a CIE-LAB color space has been recently proposed to standardize various color spaces for convenience. The CIE-LAB color space is formed with an L-axis indicating a lightness of a color, an A-axis indicating a first chromaticity of the color and a B-axis indicating a second chromaticity of the color. Therefore, in cases where a full color image read by a color scanner is converted and printed by a printer, three color signals are obtained with the color scanner in the RGB color space. Thereafter, the color signals in the RGB color space are transformed to three transformed color signals of the lightness, the first chromaticity and the second chromaticity. Thereafter, a color conversion is performed in a conventional color converting apparatus to convert the transformed color signals to desired color signals in the CIE-LAB color space. Thereafter, the desired color signals in the CIE-LAB color space is transformed to desired transformed color signals in the CMY color space, and a color converted picture formed with the desired transformed color signals is printed on a paper by the printer.

However, in cases where the color conversion of the colored picture is performed with general-purpose look-up tables, a memory capacity of 16 Mbytes ($2^8 \times 2^8 \times 2^8$) is required to convertone of the three types of colors on condition that the input signals indicating the input colors R, G and B respectively have an 8-bit length to store each of the correcting colors R', G' and B' in $2^8$ types of densities in the look-up tables. Therefore, a color converting method is required to determine most of the correcting colors R', G' and B' with a small number of referential correcting colors R', G' and B' stored in the look-up tables in advance according to an interpolation process. That is, a three-dimensional color conversion of a full color image can be arbitrarily performed in general-purpose and within a real time according to the color converting method. Also, a small-sized color converting apparatus in which a hardware having a small capacity of memory is provided to perform the color converting method is required.

As an example of a conventional color converting method, a table look-up method utilizing a three-dimensional interpolation has been conventionally proposed to simply convert various complicated color signals at a high speed in a color printing field and a color hard copy field. In the three-dimensional interpolation of the table look-up method, the RGB color space is partitioned into a plurality of partitioned solid units, an input color composed of RGB components is input, a partitioned solid unit including the input color is selected from among the units in the RGB color space, an output color of cyan, magenta or yellow is determined in the CMY color space by interpolating the output color with a plurality of output values of cyan, magenta or yellow in a plurality of vertexes of the selected unit to arbitrarily perform a color conversion with the input color over the entire color space while keeping a continuous color conversion. For example, various types of interpolations such as an 8-point interpolation in which the color space is partitioned into a plurality of cubes, 6-point interpolation in which each of the cubes is moreover partitioned into two triangular prisms, a 5-point interpolation in which each of the cubes is moreover partitioned into three pyramids, and a 4-point interpolation in which each of the cubes is moreover partitioned into five or six tetrahedrons is well-known.

The reason that the various interpolations have been proposed one after another is that a plurality of drawbacks exist in the 8-point interpolation which is the most general three-dimensional interpolation. For example, it is apparent that a large amount of calculating time and a large size of hardware are required in the 8-point interpolation. Moreover, a drawback in another important performance exists in the 8-point interpolation as follows. In cases where primary colors such as a cyan (C), a magenta (M), a yellow (Y) and a black (BK) are produced by utilizing a red (R), a green (G) and a blue (B) according to the 8-point interpolation in a color hard copy field, a look-up table for the black BK is, for example, prepared according to a minimum calculation method in which the red, the green and the blue respectively having a density $MIN(Dr, DK, Db)$ equal to a minimum value of three input color density (or lightness) values $(Dr, Dg, Db)$ of a red input signal, a green input signal and a blue input signal are mixed to produce the black BK. However, because the interpolation in the minimum calculation method is most difficult among those in various non-linear translations in which the translations are generally difficult. Therefore, in cases where the 8-point interpolation is performed to prepare the look-up table for the black BK, the black is interpolated in a wave form having concave slack portions while keeping the continuity of the interpolation, and ripples are generated. As a result, false outlines are formed in a full color image which is colored by mixing the cyan (C), the magenta (M), the yellow (Y) and the black (BK). The false outlines are visually unbearable for a viewer.

In contrast, the minimum calculation method can be performed without any ripple according to the 4-point interpolation utilizing the tetrahedrons or the 5-point interpolation utilizing the pyramids. For example, the minimum calculation method according to the 4-point interpolation is described in Published Unexamined Patent Application No. 226867 of 1990 (H2-226867), and the minimum calculation method according to the 5-point interpolation is described in detail in Published Unexamined Patent Application No. 14237 of 1981 (S56-14237). In the above applications, it is insisted that the interpolation of the black BK directed in an achromatic color (or gray) direction in a color space can be preferably performed because boundary lines partitioning each of the cubes into the tetrahedrons or the pyramids are directed in diagonal axis directions of each of the cubes. This insistence is not sufficient because an interpolation error in the achromatic color direction is merely described. To be accurately described, the color conversion according to the minimum calculation method can be linearly performed without any ripple by performing the interpolation of the black BK directed not only in the achromatic color direction but also other all directions because the boundary surfaces partitioning each of the cubes into the tetrahedrons or the pyramids include all of differential discontinuous surfaces in which results of the minimum calculation in the method become constant in the color space. Therefore, the generation of the ripple in the 4-point interpolation and the 5-point interpolation is technically solved in the interpolation directed in the all directions in the color space according to the minimum calculation method.

2.1 PREVIOUSLY PROPOSED ART

For example, the 4-point interpolation utilizing six tetrahedrons has been proposed in Japanese Patent Application No. 16180 of 1983 (S58-16180) as a first conventional color converting apparatus. In this application, the color correction in the color hard copy and the color scanner is mainly aimed by applying the color scanner to a color correcting apparatus. That is, pieces of color correction information are stored at four vertexes of each of partitioned tetrahedrons in an input color space. The correction information denote pieces of color data in an output space. Thereafter, a particular partitioned tetrahedron including an input color in the input color space is selected from the partitioned tetrahedrons, and pieces of color correction information of the particular partitioned tetrahedron are read out. Thereafter, the color correction information read out are weighted according to a positional relationship between the input color and colors at the four vertexes of the particular partitioned tetrahedron in the input color space to perform tile 4-point interpolation. Therefore, an output color in the output color space corresponding to the input color is determined as a result of the 4-point interpolation. In detail, three 8-bit input color signals indicating the red, the green and the blue are respectively divided into an upper 4-bit signal and a lower 4-bit signal. The scales of the lower signals are respectively compared with a reference value in a comparator to determine a large and small relation of each of the lower signals, and each of the lower signals is sent to four types of weighting factor generators to generate four weighting factors corresponding to the large and small relation. Each of the upper signals is sent to a selector and an adder to address each of the upper signals. Therefore, the upper signal has four addresses corresponding to four vertexes of the tetrahedrons. Thereafter, four pieces of color converting data addressed to the addresses of the upper signal are read from a color converting table. The operation for reading each of the data from the table is repeated four times. Thereafter, the color converting data are weighted with the weighting factors in parallel, and the data weighted are added in a multiplier. Therefore, a piece of interpolated color converting data is obtained for each of the input color signals.

Also, the 4-point interpolation utilizing a plurality of tetrahedrons has been proposed in U.S. Pat. No. 4,477,833 as a second conventional color converting apparatus. In this application, differential values at four vertexes of a tetrahedron are stored and processed to convert three 8-bit input color signals indicating the cyan, the magenta and the yellow to three colors such as the corrected cyan, the corrected magenta and the corrected yellow. In this case, a tetrahedron including each of the input color signals in the color space is selectively partitioned, and the 4-point interpolation is performed with differential values at four vertexes of the selected tetrahedron for each of the input color signals.

Also, the 4-point interpolation utilizing a plurality of tetrahedrons has been proposed in Published Unexamined Patent Applications No. 87192 of 1990 (H2-87192), No. 226866 of 1990 (H2-226866), No. 226867 of 1990 (H2-226867) and No. 226868 of 1990 (H2-226868) as a third conventional color converting apparatus. In those color converting apparatuses, color converting data are stored in a table form, so that non-linear arbitrary color converting operation can be flexibly performed at high speed.

As is described in the first to third conventional apparatuses, because the number of accesses to the vertexes of which output color values are stored in a memory is reduced the most to perform the interpolation in a three-dimensional color space in cases where the 4-point interpolation is performed. Therefore, a hardware required to perform the 4-point interpolation can be simplified the most.

Next, the 6-point interpolation utilizing the triangle poles has been proposed in Published Unexamined Patent Application No. 75848 of 1993 (H5-75848) as a fourth conventional color converting method and apparatus. In this application, an XYZ color space representing a RGB (red, green and blue) space is partitioned into a plurality of triangle poles to perform the 6-point interpolation.

Also, the 6-point interpolation utilizing the triangle poles has been proposed in Published Unexamined Patent Applications No. 46750 of 1993 (H5-46750) and No. 120416 of 1993 (H5-120416) as a fifth conventional color converting method and apparatus. In those applications, a lightness (Y)-color difference (Cr, Cb) space is partitioned into a plurality of triangular prisms to perform the 6-point interpolation. A lateral edge of each of the triangular prisms is directed in a Y direction, and other two minor axes are positioned in a color difference (or chrominance) plane.

In the fourth and fifth apparatuses, it is apparent that a hardware of a color converting apparatus is simplified as compared with that in the 8-point interpolation. However, any prevention of ripple generation in the minimum calculation method is not considered, except that linear interpolation directed in a direction parallel to a lightness direction Y (or an achromatic color direction) can be performed without forming any unnatural bending shape in various types of color conversions in the fifth method because the lateral edge of the triangular prism is directed in the Y direction. In the fourth method, though the triangular prisms are utilized, the interpolation performance is not superior because the lateraledge of each of the triangular prisms is not limitedly directed to the Y direction, and any concrete configuration relating to an interpolation characteristic is not disclosed.

2.2. PROBLEMS TO BE SOLVED BY THE INVENTION:

Drawbacks in the first to third conventional apparatuses are described.

In cases where a color space is defined by a color mixture system consisting of the red, the green and the blue, the 4-point interpolation utilizing the tetrahedrons is convenient because three axes such as a red axis, a green axis and a blue axis are equally treated in the color space. However, in cases where a color space is defined by a lightness axis and two chromaticity axes to independently perform the 4-point interpolation in the lightness direction of that in the chromaticity direction, the analysis of results of the interpolation becomes complicated. For example, in cases where an input color signal is weighted in a chromaticity plane to convert the chromaticity of a color without converting the lightness of the color in a hard collector, it is required that the color conversion is delicately performed in the chromaticity plane. However, the 4-point interpolation is always performed in the three-dimensional color space, so that there is a drawback that the interpolation of the lightness cannot be separated from that of the chromaticity.

Secondly, an accurate interpolating curve cannot be formed in not only the 4-point interpolation but also the other interpolations. For example, in cases where a color is reproduced in a hard copy, a clipping characteristic is required to reproduce the color at high accurate. In detail, as shown in FIG. 10 A, an output color value is maintained to zero until an input color value reaches a first threshold T1, and the output color value is suddenly raised after the input color value is over the first threshold T1. Also, an output color value increases until an input color value reaches a second threshold T2, and the output color value is maintained to a constant value after the input color value is over the second threshold T2. In this case, the interpolation of the color conversion cannot be accurately performed because the clipping characteristic cannot be obtained. Also, in cases where three 8-bit input color signals and an 8-bit output color signal are treated in a conventional color converting apparatus, an input color value 256 ($=2^8$) or an output color value 256 ($=2^8$) cannot be expressed or stored. Therefore, as shown in FIG. 11A, a through characteristic in which an output color having the same value as that of an input color is output in a range of the input color value from 0 to 256 cannot be obtained. The through characteristic is a basic characteristic in a digital circuit, so that a color signal transmitting through a conventional color converting apparatus many times rapidly deteriorates.

Thirdly, in cases where a color conversion is applied to a color collector, colors of a dynamic picture and a static picture displayed on an image plane are frequently converted by reading pieces of color converting data from a color converting table. Therefore, when the color converting table is accessed by a central processing unit to rewrite the color converting data during the color conversion, the pictures displayed on the image plane are distorted, or the pictures temporarily disappear. Accordingly, because the color conversion is required in the color collector to be performed in a moment, the distortion of the pictures or the disappearance of the pictures considerably exert an adverse influence on the color conversion.

Fourth, an image plane of a display or a paper space of a hard copy is partitioned into several areas to perform a color conversion for each of the areas. Or, a color conversion is performed for each of pixels of the image plane. In this case, a color converting table is required to be replaced with another at a high speed each time an area or a pixel is changed to another. However, the replacement of the color converting table cannot be performed at a high speed in the conventional color converting apparatus.

Fifth, in cases where the black is produced by mixing the cyan, the magenta and the yellow, a minimum value of color signal is selected from among values of three input color signals indicating the cyan, the magenta and the yellow according to the minimum calculation method. However, when the minimum calculation is performed in the 8-point interpolation or the 6-point interpolation by inputting the input color signals indicating the cyan, the magenta and the yellow, interpolation errors formed in a ripple shape are undesirably generated in an interpolated curve. Therefore, a viewer visually feels uncomfortable.

Next, drawbacks in the fourth conventional picture converting method and apparatus are described.

First, a three-primary color space such as an XYZ space representing a RGB (red, green and blue) space is partitioned into a plurality of triangular prisms, and the lightness of a color is not separated from the color difference of the color in the color space. A lateral edge of each of the triangles agrees with one of three axes of the three-primary color space. Therefore, many ripples are considerably generated when the minimum calculation method is performed. The ripples generated in the 6-point interpolation are considerable large when the interpolation is performed in an achromatic direction. In the specification of the fourth conventional color converting method and apparatus, "in cases where this color converting method and apparatus is applied to perform a color correction, three input signals X, Y and Z correspond to an input color signal R (red), an input color signal G (green) and an input color signal B (blue), and an output color signal P corresponds to an output color signal Y (yellow), an output color signal M (magenta), an output color signal C (cyan) or an output color signal K (black)" is described. Therefore, though it is apparent that an inventor intends to use the conventional color converting method for a K (black) generation, any method for preventing the generation of the ripples is not disclosed.

Secondly, in the specification of the fourth conventional color converting method and apparatus, "because a memory capacity becomes lowered as compared with that in another conventional interpolation method, the entire size of hardware becomes lowered, so that the conventional color converting apparatus can be easily manufactured in a large scale integration form" is described as an effect of the apparatus. However, it is unclear why the memory capacity is lowered, and it is unclear how degrees the memory capacity is lowered. On the contrary, because the color converting data of the color converting table is stored in a read only memory (ROM) and because pieces of color converting data are transferred from the ROM to a random access memory (RAM) to perform the color conversion, a large number of lattice points (or vertexes of the triangular prisms) are repeatedly accessed by a central processing unit when the color converting data are transferred from the ROM to the RAM. Therefore, a utilization efficiency of the RAM is decreased to about ⅛. Accordingly, there is a drawback that the RAM is not efficiently utilized.

Next, a drawback in the fifth conventional picture converting method and apparatus is described.

Because the lateral edge of the triangular prism is directed in the lightness (Y) direction in the color space, the generation of the ripples can be prevented when the interpolation is performed in the achromatic direction in the color space. However, when the interpolation is performed in a direction other than the achromatic direction, there is a drawback that ripples can be generated.

SUMMARY OF THE INVENTION

A first object of the present invention is to provide, with due consideration to the drawbacks of such a conventional color converting apparatus, a color converting apparatus in which an interpolation in a lightness direction is performed independent of that in a chromaticity direction to convert a color of a colored picture with a small capacity of memory in a three dimensional color space.

A second object of the present invention is to provide a color converting apparatus in which a through characteristic and a clipping characteristic are obtained even though an output characteristic abruptly varying or an output color signal having the same value as that of an input color signal is required to convert a color of a colored picture with a small capacity of memory in a three dimensional color space.

A third object of the present invention is to provide a color converting apparatus in which colors of moving and still colored pictures are converted in a moment with a small capacity of memory in a three dimensional color space without adversely influencing on the dynamic and static colored pictures displayed on an image plane.

A fourth object of the present invention is to provide a color converting apparatus in which a color conversion is performed for each of areas or pixels with a small capacity of memory in a three dimensional color space by replacing a color converting table with another at a high speed.

A fifth object of the present invention is to provide a color converting apparatus in which an interpolation error in a minimum calculation method is prevented when a black is produced from a cyan, a magenta and an yellow.

A sixth object of the present invention is to provide color converting method and apparatus in which the generation of ripples is prevented in the minimum calculation even though a color of a colored picture is converted by performing an interpolation in a direction with a small capacity of memory in a three dimensional color space.

The first object is achieved by the provision of a color converting apparatus;

color converting data storing means for storing pieces of color converting data defined in an output color space, each of groups of the eight color converting data Da, Db, Dc, Dd. De, Df, Dg and Dh being allocated at color converting addresses of eight lattice points Pa, Pb, Pc, Pd, Pe, Pf, Pg and Ph of one of rectangular parallelepipeds formed by partitioning a lightness-color difference space in a lightness direction, a first color difference direction and a second color difference direction, each of the rectangular parallelepipeds being partitioned into a first triangular prism and a second triangular prism of which lateral edges are directed in the lightness direction, the first rectangular parallelepiped having the lattice points Pa, Pb, Pc placed at the same lightness in the lightness direction and the lattice points Pe, Pf and Pg placed at the same lightness in the lightness direction, the second triangular prism having the lattice points Pa, Pd, Pc placed at the same lightness in the lightness direction and the lattice points Pe, Ph and Pg placed at the same lightness in the lightness direction, and a block address of each of the rectangular parallelepipeds being represented by a color converting address of the lattice point Pa;

input signal receiving means for receiving an input lightness signal Y, an input first color difference signal Cr and an input second color difference signal Cb, an input color defined in the lightness-color difference space being designated by tile input signals Y,Cr and Cb, the input lightness signal Y being composed of an upper lightness signal UY and a lower lightness signal DY, the input first color difference signal Cr being composed of an upper first color difference signal UCr and a lower first color difference signal DCr, and the input second color difference signal Cb being composed of an upper second color difference signal UCb and a lower second color difference signal DCb;

triangular prism selecting means for selecting either the first triangular prism or the second triangular prism with the lower first color difference signal DCr and the lower second color difference signal DCb received in the input signal receiving means and generating a triangular prism selecting signal indicating a triangular prism selected;

address generating means for generating a selected block address with the upper lightness signal UY, the upper first color difference signal UCr and the upper second color difference signal UCb received in the input signal receiving means, a selected rectangular parallelepiped allocated at the selected block address being selected from among the rectangular parallelepipeds in the color converting data storing means, the input color being included in the selected rectangular parallelepiped defined in lightness-color difference space, a selected triangular prism of the selected rectangular parallelepiped being specified with the triangular prism selecting signal generated in the triangular prism selecting means, the input color being included in the selected triangular prism, and six color converting data Da, Db (or Dd), Dc, De, Df (or Dh) and Dg allocated at the color converting addresses of the lattice points Pa, Pb (or Pd), Pc, Pe, Pf (or Ph) and Pg of the selected triangular prism being read out from the color converting data storing means; and interpolation calculating means for interpolating output color coordinates defined in the output color space corresponding to input color coordinates designated by the input color in the lightness-color difference space as an output color value Do with the six color converting data Da, Db (or Dd), Dc, De, Df (or Dh) and Dg read out from the color converting data storing means under control of the address generating means while weighting the six color converting data Da, Db (or Dd), Dc, De, Df (or Dh) and Dg with the lower lightness signal DY and the lower first and second color difference signals DCr, DCb received in the input signal receiving means, a value DY1 of the lower lightness signal DY denoting a lightness component in the lightness direction of an input color vector directed from the lattice point Pa to the input color coordinates, a value DCr1 of the lower first color difference signal DCr denoting a first color difference component in the first color difference direction of the input color vector, and a value DCb1 of the lower second color difference signal DCb denoting a second color difference component in the second color difference direction of the input color vector.

In the above configuration, pieces of color converting data defined in an output color space are stored in the color converting data storing means in advance. In the storing means, a lightness-color difference space is partitioned into a plurality of rectangular parallelepipeds which each have eight sides directed in a lightness direction, a first color difference direction or a second color difference direction. The color converting data are classified into a plurality of groups of eight color converting data. Each group of the eight color converting data Da, Db, Dc, De, Dr, Dg and Dh is allocated at color converting addresses of eight lattice points Pa, Pb, Pc, Pd, Pe, Pf, Pg and Ph of one of the rectangular parallelepipeds in that order. The lattice points Pa, Pb, Pc and Pd are placed at the same lightness in the lightness direction, and the lattice points Pe, Pf, Pg and Ph are placed at the same lightness in the lightness direction. A block address of each of the rectangular parallelepipeds is represented by a color converting address of the lattice point Pa. Each of the rectangular parallelepipeds is conceptually partitioned into a first triangular prism having the lattice points Pa, Pb, Pc, Pe, Pf and Pg and a second triangular prism having the lattice points Pa, Pd, Pc, Pe, Ph and Pg. Lateral edges of the first and second triangular prisms are directed in tile lightness direction.

When a lightness signal Y, a first color difference signal Cr and a second color signal Cb designating an input color defined in the lightness-color difference space are input in the color converting apparatus to interpolate an output color defined in the output color space corresponding to the input color defined in the lightness-color difference space, the input signals Y, Cr and Cb are received in the input signal receiving means. Each of the input signals Y, Cr and Cb consists of a series of bits. Therefore, the input lightness signal Y is composed of an upper lightness signal UY having a value UY1 and a lower lightness signal DY having a value DY1, the input first color difference signal Cr is composed of an upper first color difference signal UCr having a value UCr1 and a lower first color difference signal DCr having a value DCr1, and the input second color difference signal Cb is composed of an upper second color difference signal UCb having a value UCb1 and a lower second color difference signal DCb having-a value DCb1. The upper signals UY, UCr and UCb are transferred to the address generating means, and the lower signals DCr, DCb are transferred to the triangular prism selecting means.

In the triangular prism selecting means, either the first triangular prism or the second triangular prism is selected by comparing the values DCr1, DCb1 of the lower signals DCr, DCb. Here, the value DY1 of the lower lightness signal DY denotes a lightness component in the lightness direction of an input color vector having a starting point at the lattice point Pa, the value DCr1 of the lower first color difference signal DCr denotes a first color difference component in the first color difference direction of the input color vector, and the value DCb1 of the lower second color difference signal DCb denotes a second color difference component in the second color difference direction of the input color vector. Thereafter, a triangular prism selecting signal indicating a triangular prism selected in the triangular prism selecting means is transferred to the address generating means.

In the address generating means, a selected block address (UY1, UCr1, UCb1) is generated. Therefore, a selected rectangular parallelepiped allocated at the selected block address is selected from among the rectangular parallelepipeds in the color converting data storing means. Also, a selected triangular prism of the selected rectangular parallelepiped is specified with the triangular prism selecting signal. In this case, the input color is included in the selected triangular prism. Thereafter, six color converting data Da, Db (or Dd), De, De, Df (or Dh) and Dg allocated at the color converting addresses of the lattice points Pa, Pb (or Pd), Pc, Pe, Pf (or Ph) and Pg of the selected triangular prism are read out from the color converting data storing means to the interpolation calculating means.

In the interpolation calculating means, output color coordinates defined in the output color space corresponding to input color coordinates designated by the input color in the lightness-color difference space are interpolated as an output color value Do with the six color converting data Da, Db (or Dd), Dc, De, Df (or Dh) and Dg while weighting the six color converting data Da, Db (or Dd), Dc, De, Df (or Dh) and Dg with the values DY1, DCr1 and DCb1 of the lower signals DY, DCr and DCb.

Accordingly, because the first and second color difference directions are defined in a chromaticity plane, the interpolation in the lightness direction can be performed independent of that in the chromaticity direction to convert a color of a colored picture with a small capacity of memory in a three dimensional lightness-color difference space.

To achieve the second object, it is preferred that each of the color converting data stored in the color converting data storing means have a value limited to an even number or an odd number in a widened range, and the interpolation calculating means comprise:
a displacement register for registering a positive or negative displacement value;
a displacement adder for adding the displacement value registered in the displacement register to the output color value Do to set the widened range of the output color value Do interpolated with the color converting data Da, Db (or Dd), Dc, De, Df (or Dh) and Dg in a displaced range which equally occupies an area of positive numbers and another area of negative numbers; and
an output data limiter for limiting the output color value Do set in the displaced range by the displacement adder withing an area of positive numbers and zero.

In the above configuration, the color converting data having values limited to even numbers or odd numbers are stored in the color converting data storing means. Therefore, a dynamic range of the color converting data can be widened. Thereafter, the output color value Do is interpolated with the color converting data in the interpolation calculating means. In this case, a dynamic range of the output color value Do is the same as that of the color converting data. Thereafter, the output color value Do is displaced in the displacement adder by adding the displacement value and is limited to an area of positive numbers and zerooutput color value Do is reduced to ½. Thereafter, the output color value Do are output.

Also, because each of the color converting data stored in the color converting data storing means have a value limited to an even number or an odd number, a dynamic range of the color converting data is doubled. Therefore, even though a desired output line of output colors corresponding to various input colors abruptly varies, the desired output line can be accurately reproduced in the interpolation calculating means with the color converting data stored in the color converting data storing means. Accordingly, the clipping characteristic can be obtained. Also, even though desired output values Do are required to be the same as input values in the entire range of the input values, the desired output values Do can be correctly reproduced in the interpolation calculating means with the color converting data stored in the color converting data storing means. Accordingly, the through characteristic can be obtained.

To achieve the third object, it is preferred that a color converting apparatus further include:

host interface means for transferring other pieces of color converting data from a host computer to the color converting data storing means to renew the color converting data stored in the color converting data storing means during a blanking period in which the color converting data Da, Db (or Dd), Dc, De, Df (or Dh) and Dg are not read out from the color converting data storing means.

In the above configuration, the renewal of the color converting data storing means is limitedly performed in the blanking period according to the function of the host interface means. Therefore, because the color converting data Da, Db (or Dd), Dc, De, Df (or Dh) and Dg are not read out from the color converting data storing means in the blanking period, colors of dynamic and static colored pictures can be converted without adversely influencing on the dynamic and static colored pictures displayed on an image plane.

To achieve the fourth object, it is preferred that the color converting data storing means comprise a plurality of color converting tables which each correspond to one of the rectangular parallelepipeds, each of the color converting tables comprising a first color converting memory for storing the color converting data Da at a first color converting subtable and another piece of color converting data Da' at a second color converting sub-table, a first bank of second color converting memory for storing the color converting data Db at a first color converting sub-table and another piece of color converting data Db' at a second color converting sub-table, a second bank of second color converting memory for storing the color converting data Dd at a first color converting sub-table and another piece of color converting data Dd' at a second color converting sub-table, a third color converting memory for storing the color converting data Dc at a first color converting sub-table and another piece of color converting data Dc' at a second color converting sub-table, a fourth color converting memory for storing the color converting data De at a first color converting sub-table and another piece of color converting data De' at a second color converting sub-table, a first bank of fifth color converting memory for storing the color converting data Df at a first color converting sub-table and another piece of color converting data Df' at a second color converting sub-table, a second bank of fifth color converting memory for storing the color converting data Dh at a first color converting sub-table and another piece of color converting data Dh' at a second color converting sub-table, and a sixth color converting memory for storing the color converting data Dg at a first color converting sub-table and another piece of color converting data Dg' at a second color converting sub-table, either the color converting data Da, Db (or Dd), Dc, De, Df (or Dh) and Dg stored at the first color converting sub-tables or the color converting data Da', Db' (or Dd'), Dc', De', Df' (or Dh') and Dg' stored at the second color converting sub-tables being read out from the color converting data storing means as the color converting data Da, Db (or Dd), Dc, De, Df (or Dh) and Dg. Also, a color converting apparatus further includes:

area processing selecting means for selecting either a first type of area processing in which a first type of color conversion is performed for a first area of a colored picture or a second type of area processing in which a second type of color conversion is performed for a second area of the colored picture; and sub-table signal generating means for generating a first sub-table signal in cases where the first type of area processing is selected in the area processing selecting means and generating a second sub-table signal in cases where the second type of area processing is selected in the area processing selecting means, the first or second sub-table signal being transferred to the address generating means, the color converting data Da, Db (or Dd), Dc, De, Df (or Dh) and Dg stored at the first color converting sub-tables being read out from the color converting data storing means in cases where the first sub-table signal is transferred to the address generating means, and the color converting data Da', Db' (or Dd'), Dc', De', Df' (or Dh') and Dg' stored at the second color converting sub-tables being read out from the color converting data storing means as the color converting data Da, Db (or Dd), Dc, De, Df (or Dh) and Dg in cases where the second sub-table signal is transferred to the address generating means. The area processing selecting means comprises:

an area RAM table for storing a starting address of a starting pixel placed at a starting point of the first area of the colored picture and an ending address of an ending pixel placed at an ending point of the first area of the colored picture, the starting address and the ending address being numbered an area number;

a pixel counter for counting pixels along a main scanning line to specify addresses of the pixels;

a pixel address comparator for comparing the addresses of the pixels counted in the pixel counter with the starting address or the ending address stored in the area RAM table to judge whether or not each of the addresses of the pixels scanned along the main scanning line accords with the starting address or the ending address and generating an area counting signal each time an address of a pixel scanned along the main scanning line accords with the starting address or the ending address; and an area counter for counting the area counting signal generated in the pixel address comparator to increase an area number one by one and sending an increased area number to the area RAM table, a selecting signal instructing the performance of the first type of color conversion being transferred to the sub-table signal generating means in cases where the increased area number accords with the area number given to the starting address, another selecting signal instructing the performance of the second type of color conversion being transferred to the sub-table signal generating means in cases where the increased area number accords with the area number given to the ending address, and the starting address and the ending address stored in the area RAM table being rewritten with other starting and ending addresses transferred from a host computer each time all of the pixels placed in one of the main scanning line are counted in the pixel counter.

In the above configuration, a plurality of pixels placed on a main scanning line is counted one after another by the pixel counter, and addresses of the pixels counted are transferred to the pixel address comparator. In the pixel address comparator, each of the addresses is compared with the starting address or the ending address stored in the area RAM table. When one of the addresses initially accords with the starting address, an area counting signal is transferred to the area counter to increase an area number one by one. Thereafter, the increased area number is transferred to the area RAM table, and the increased area number accords with the area number given to the starting address. Therefore, a selecting signal instructing the performance of the first type of color conversion is transferred to the sub-table signal generating means. In the sub-table signal generating means, a first type of area processing is selected to perform a first type of color conversion for a first area of a colored picture, and a first sub-table signal is transferred from the sub-table signal generating means to the address generating means. Therefore, the color converting data Da, Db (or Dd), Dc, De, Df (or Dh) and Dg stored at the first color converting sub-tables are read out from the color converting data storing means to the interpolation calculating means.

Thereafter, when another address counted by the pixel counter accords with the ending address, another area counting signal is transferred to the area counter to increase an area number by one. Thereafter, the increased area number is transferred to the area RAM table, and the increased area number accords with the area number given to the ending address. Therefore, a selecting signal instructing the performance of the second type of color conversion is transferred to the sub-table signal generating means. In the sub-table signal generating means, a second type of area processing is selected to perform a second type of color conversion for a second area of the colored picture, and a second sub-table signal is transferred from the sub-table signal generating means to the address generating means. Therefore, the color converting data Da', Db' (or Dd'), Dc', De', Df' (or Dh') and Dg' stored at the second color converting sub-tables are read out from the color converting data storing means to the interpolation calculating means.

Accordingly, a color conversion can be performed for each of areas or pixels with a small capacity of memory in a three dimensional color space by replacing a color converting sub-table read out with another at a high speed.

To achieve the fifth object, it is preferred that a color converting apparatus further include:

lightness and color difference generating means for generating the input lightness signal Y, the input first color difference signal Cr and the input second color difference signal Cb from a first primary color signal, a second primary signal and a third primary signal defined in a primary color space, the lightness and color difference generating means comprising:

a first subtracting element for subtracting a second value G1 of the second primary color signal from a first value R1 of the first primary color signal to generate the input first color difference signal Cr;

a second subtracting element for subtracting the second value G1 of the second primary color signal from a third value B1 of the third primary color signal to generate the input second color difference signal Cb; and a lightness generating element for generating the input lightness signal Y by combining the first primary color signal, the second primary color signal and the third primary color signal, a value Y1 of the input lightness signal Y being expressed with the values R1, G1 and B1 according to an equation selected from three equations:

$$Y1=(R1+G1+B1)/3, Y1=(R1+2*G1+B1)/4, \text{ and } Y1=G1.$$

In the above configuration, the input first color difference signal Cr having a value Cr1=R1−G1 is generated in the first subtracting element of the lightness and color difference generating means, the input second color difference signal Cb having a value Cb1=B1−G1 is generated in the second subtracting element of the lightness and color difference generating means, and the input lightness signal Y having a value Y1=(R1+G1+B1)/3, Y1=(R1+2*G1+B1)/4, or Y1=G1 is generated in the lightness generating element.

Therefore, a Cb—Cr color difference plane is partitioned at a Cr axis equal to a (R–G) axis in a primary color space, a Cb axis equal to a (B–G) axis, and an inclined line defined as Cr1=Cb1 to form the triangular prisms. As a result, a plane in which an output value in the minimum calculation is constant is not bent in each of the triangular prisms.

Accordingly, in cases where the output color space is formed of a cyan, a magenta and an yellow, an interpolation error in the minimum calculation method can be prevented even though a black is produced from the cyan, the magenta and the yellow.

Also, the first object is achieved by the provision of a color converting apparatus;

color converting data storing means for storing pieces of color converting data defined in an output color space, a plurality of rectangular parallelepipeds being formed in a lightness-color difference space by partitioning the lightness-color difference space in a lightness direction, a first color difference direction and a second color difference direction, each of the rectangular parallelepipeds having four lattice points P1, P2, P3 and P4 placed at a first lightness in the lightness direction and other four lattice points P5, P6, P7 and P8 placed at a second lightness in the lightness direction, a block address of each of the rectangular parallelepipeds being represented by a color converting address of the lattice point P1, and the color converting data being limitedly allocated at the color converting addresses of the lattice points P1 to P8 of the rectangular parallelepipeds of which the block addresses are respectively expressed by three even numbers $(2i, 2j, 2k)$;

lightness and color difference generating means for generating a lightness signal Y, a first color difference signal Cr and a second color difference signal Cb defined in a lightness-color difference space from a first primary color signal, a second primary signal and a third primary signal defined in a primary color space, an input color defined in the primary color space being designated by the first, second and third primary color signals, the input color defined in the lightness-color difference space being designated by the signals Y, Cr and Cb, the lightness signal Y being composed of an upper lightness signal YH having a value YH1 and a lower lightness signal DY having a value DY1, the first color difference signal Cr being composed of an upper first color difference signal CrH having a value CrH1 and a lower first color difference signal DCr having a value DCr1, and the second color difference signal Cb being composed of an upper second color difference signal CbH having a value CbH1 and a lower second color difference signal DCb having a value DCb1;

first address generating means for generating a selected block address (YH1', CrH1', CbH1') of a selected rectangular parallelepiped represented by a color converting address (YH1', CrH1', CbH1') of a lattice point P1 of the selected rectangular parallelepiped with the upper lightness signal YH, the upper first color difference signal CrH and the upper second color difference signal CbH generated in the lightness and color difference generating means to specify the selected rectangular parallelepiped, the input color being included in a parallelepiped PP having a first plane placed at a lightness in the lightness direction and a second plane parallel to the first plane, the first plane of the parallelepiped PP having four lattice points Pa, Pb, Pc and Pd addressed at color converting addresses $(Y_o, Cr_o, Cb_o)$, $(Y_o, Cr_o+1, Cb_o)$, $(Y_o, Cr_o+1, Cb_o+1)$ and $(Y_o, Cr_o, Cb_o+1)$ in that order, the second plane of the parallelepiped PP having four lattice points Pe, Pf, Pg and Ph addressed at color converting addresses $(Y_o+1, Cr_o+1, Cb_o+1)$, $(Y_o+1, Cr_o+2, Cb_o+1)$, $(Y_o+1, Cr_o+2, Cb_o+2)$ and $(Y_o+1, Cr_o+1, Cb_o+2)$ in that order, the color converting address (YH1', CrH1', CbH1') of the lattice point P1 of the selected rectangular parallelepiped agreeing with the color converting address $(Y_o, Cr_o, Cb_o)$ of the lattice point Pa or the color converting address $(Y_o+1, Cr_o+1, Cb_o+1)$ of the lattice point Pe in dependence on whether the value YH1' is an even number or an odd number, and the parallelepiped PP being formed of a first triangular prism with the lattice points Pa, Pb, Pc, Pe, Pf and Pg and a second triangular prism with the lattice points Pa, Pd, Pc, Pe, Ph and Pg;

triangular prism selecting means for selecting either the first triangular prism or the second triangular prism of the parallelepiped PP of which the lattice point Pa agrees with the lattice point P1 of the selected rectangular parallelepiped specified in the first address generating means with the lower first color difference signal DCr and the lower second color difference signal DCb generated in the lightness and color difference generating means and generating a triangular prism selecting signal indicating a triangular prism selected;

second address generating means for generating eight block addresses of eight particular rectangular parallelepipeds which each have one of eight selected lattice points agreeing with the lattice points Pa to Ph of the parallelepiped PP with the selected block address (YH1', CrH1', CbH1') generated in the first address generating means, four pieces of color converting data M0, M1, M2 and M3 allocated at the color converting addresses of the selected lattice points agreeing with the lattice points Pa to Pd of the parallelepiped PP and other four pieces of color converting data M4, M5, M6 and M7 allocated at the color converting addresses of the selected lattice points agreeing with the lattice points Pe to Ph of the parallelepiped PP being read out from the color converting data storing means;

first selecting means for selecting three pieces of color converting data from among the color converting data M0 to M3 as three pieces of color converting data Da, Db (or Dd) and Dc allocated at the color converting addresses of the lattice points Pa, Pb (or Pd) and Pc of the first or second triangular prism of the parallelepiped PP according to the triangular prism selecting signal generated in tile triangular prism selecting means and the selected block address (YH1', CrH1', CbH1') generated in the first address generating means;

second selecting means for selecting three pieces of color converting data from among the color converting data M4 to M7 as three pieces of color converting data De, Df (or Dh) and Dg allocated at the color converting addresses of the lattice points Pe, Pf (or Ph) and Pg of the first or second triangular prism of the parallelepiped PP according to the triangular prism selecting signal generated in the triangular prism selecting means and the selected block address (YH1', CrH1', CbH1') generated in the first address generating means; and interpolation calculating means for interpolating coordinates of an output color defined in the output color space corresponding to input color coordinates of the input color as an output color value Do in the first or second triangular prism of the parallelepiped PP with the six color converting data Da, Db (or Dd), Dc, De, Df (or Dh) and Dg selected in the first selecting means and the second selecting means while weighting the six color converting data with the values DY1, DCR1 and DCb1 of the lower signals DY, DCr and DCb generated in the lightness and color difference generating means, the value DY1 of the lower lightness signal DY denoting a lightness component in the lightness direction of an input color vector directed from the lattice point Pa to the input color coordinates, the value DCr1 of the lower first color difference signal DCr denoting a first color difference component in the first color difference direction of the input color vector, and the value DCb1 of the lower second color difference signal DCb denoting a second color difference component in the second color difference direction of the input color vector.

In the above configuration, pieces of color converting data defined in an output color space are stored in the color converting data storing means in advance. In the storing means, a lightness-color difference space is partitioned into a plurality of rectangular parallelepipeds which each have eight sides directed in a lightness direction, a first color difference direction or a second color difference direction. The color converting data are allocated at color converting addresses of eight lattice points P1, P2, P3, P4, P5, P6, P7 and P8 of each of the rectangular parallelepipeds of which a block address represented by a color converting address of the lattice point P1 is limitedly expressed by three even numbers $(2i, 2j, 2k)$. Here the symbols i, j and k are respectively an integral number. Therefore, the number of memories required to store the color converting data can be reduced to ⅛ as compared with the case that the color converting data are allocated at color converting addresses of the lattice points of all of the rectangular parallelepipeds. The lattice points P1, P2, P3 and P4 are placed at the same lightness (the first lightness) in the lightness direction, and the lattice points P5, P6, P7 and P8 are placed at the same lightness (the second lightness) in the lightness direction.

When first, second and third primary color signals defined in a primary color space are input to the lightness and color difference generating means, a lightness signal Y, a first color difference signal Cr and a second color difference signal Cb defined in the lightness-color difference space are generated. Therefore, an input color defined in the primary color space is designated by the first, second and third primary color signals or is designated by the signals Y, Cr and Cb in the lightness-color difference space. The lightness signal Y is composed of an upper lightness signal YH having a value YH1 and a lower lightness signal DY having a value DY1, the first color difference signal Cr is composed of an upper first color difference signal CrH having a value CrH1 and a lower first color difference signal DCr having a value DCr1, and the second color difference signal Cb is composed of an upper second color difference signal CbH having a value CbH1 and a lower second color difference signal DCb having a value DCb1. In this case, the upper color difference signals CrH, CbH are respectively produced with upper primary signals of the first and second primary signals, so that a dynamic range of each of the upper color difference signals CrH, CbH is doubled as compared with those of the upper primary signals. Thereafter, the upper signals YH, CrH and CbH are transferred to the first address generating means, and the lower signals DCr, DCb are transferred to the triangular prism selecting means.

In the first address generating means, the upper signals CrH and CbH are changed to upper signals CrH' and CbH' having values CrH1', CbH1' to reduce the doubled dynamic ranges of upper signals CrH and CbH to ½. Also, the upper signal YH is changed to an upper signal YH' having a value YH1' for form's sake. Thereafter, a selected block address (YH1', CrH1', CbH1') represented by a color converting address of a lattice point P1 of a selected rectangular parallelepiped is generated. In this case, the input color is included in a parallelepiped PP having a first plane placed at a lightness in the lightness direction and a second plane parallel to the first plane. The first plane of the parallelepiped PP has four lattice points Pa, Pb, Pc and Pd addressed at color converting addresses $(Y_o, Cr_o, Cb_o)$, $(Y_o, Cr_o+1, Cb_o)$, $(Y_o, Cr_o+1, Cb_o+1)$ and $(Y_o, Cr_o, Cb_o+1)$ in that order, and the second plane of the parallelepiped PP has four lattice points Pe, Pf, Pg and Ph addressed at color converting addresses $(Y_o+1, Cr_o+1, Cb_o+1)$, $(Y_o+1, Cr_o+2, Cb_o+1)$, $(Y_o+1, Cr_o+2, Cb_o+2)$ and $(Y_o+1, Cr_o+1, Cb_o+2)$ in that order. The color converting address (YH1', CrH1', CbH1') of the lattice point P1 of the selected rectangular parallelepiped agrees with the color converting address $(Y_o, Cr_o, Cb_o)$ of the lattice point Pa or tile color converting address $(Y_o+1, Cr_o+1, Cb_o+1)$ of the lattice point Pe in dependence on whether the value YH1' is an even number or an odd number. Therefore, the position of the parallelepiped PP including the input color is specified by tile selected block address (YH1', CrH1', CbH1') of the selected rectangular parallelepiped. The parallelepiped PP is conceptually partitioned into a first triangular prism with the lattice points Pa, Pb, Pc, Pe, Pf and Pg and a second triangular prism with the lattice points Pa, Pd, Pc, Pe, Ph and Pg. The selected block address (YH1', CrH1', CbH1') of the selected rectangular parallelepiped is transferred to the second address generating means.

In the triangular prism selecting means, either the first triangular prism or the second triangular prism is selected by comparing the values DCr1, DCb1 of the lower signals DCr, DCb. Here, the value DY1 of the lower lightness signal DY denotes a lightness component in the lightness direction of an input color vector having a starting point at the lattice point Pa, the value DCr1 of the lower first color difference signal DCr denotes a first color difference component in the first color difference direction of the input color vector, and the value DCb1 of the lower second color difference signal DCb denotes a second color difference component in the second color difference direction of the input color vector. Thereafter, a triangular prism selecting signal indicating a triangular prism selected in the triangular prism selecting means is transferred to the first and second selecting means.

In the second address generating means, eight color converting addresses of eight particular rectangular parallelepipeds with the selected block address (YH1', CrH1', CbH1') generated in the first address generating means. Each of the particular rectangular parallelepipeds has one of eight selected lattice points agreeing with the lattice points Pa to Ph of the parallelepiped PP. Thereafter, four pieces of color converting data M0, M1, M2 and M3 allocated at the color converting addresses of the selected lattice points agreeing with the lattice points Pa to Pd of the parallelepiped PP are read out from the color converting data storing means, and other four pieces of color converting data M4, M5, M6 and M7 allocated at the color converting addresses of the selected lattice points agreeing with the lattice points Pe to Ph of the parallelepiped PP are read out from the color converting data storing means. Therefore, the color converting data M0 to M7 allocated at the color converting addresses of the lattice points Pa to Ph of the parallelepiped PP are obtained. Thereafter, the color converting data M0, M1, M2 and M3 are transferred to the first selecting means, and the color converting data M4, M5, M6 and M7 are transferred to the second selecting means.

In the first selecting means, three pieces of color converting data are selected from among the color converting data M0 to M3 as three pieces of color converting data Da, Db (or Dd) and Dc allocated at the color converting addresses of the lattice points Pa, Pb (or Pd) and Pc of the first or second triangular prism of the parallelepiped PP according to the triangular prism selecting signal and the selected block address (YH1', CrH1', CbH1') of the selected rectangular parallelepiped. Also, in the second selecting means, other three pieces of color converting data are selected from among tile color converting data M4 to M7 as three pieces of color converting data De, Df (or Dh) and Dg allocated at the color converting addresses of the lattice points Pc, Pf (or Ph) and Pg of the first or second triangular prism of the parallelepiped PP according to the triangular prism selecting signal and the selected block address (YH1', CrH1', CbH1') of the selected rectangular parallelepiped. The six color converting data Da, Db (or Dd), Dc, De, Df (or Dh) and Dg are transferred to the interpolation calculating means.

In the interpolation calculating means, output color coordinates defined in the output color space corresponding to input color coordinates designated by the input color in the lightness-color difference space are interpolated as an output color value Do with the six color converting data Da, Db (or Dd), Dc, De, Df (or Dh) and Dg while weighting the six color converting data with the values DY1, DCr1 and DCb1 of the lower signals DY, DCr and DCb.

Accordingly, because the first and second color difference directions are defined in a chromaticity plane, the interpolation in the lightness direction can be performed independent of that in the chromaticity direction to convert a color of a colored picture with a small capacity of memory in a three dimensional lightness-color difference space.

Also, the first object is achieved by the provision of a color converting apparatus;

color converting data storing means for storing six types of pieces of color converting data M0 to M5 defined in an output color space, a plurality of rectangular parallelepipeds being formed in a lightness-color difference space by partitioning the lightness-color difference space in a lightness direction, a first color difference direction and a second color difference direction, each of the rectangular parallelepipeds having four lattice points P1, P2, P3 and P4 at a first block plane placed at a color difference plane of the lightness-color difference space and other four lattice points P5, P6, P7 and P8 at a second block plane placed at another color difference plane of the lightness-color difference space, a block address of each of the rectangular parallelepipeds being represented by a color converting address of the lattice point P1, the color converting data M0 to M2 being allocated at color converting addresses of the lattice points P1 to P4 of the rectangular parallelepipeds to repeatedly arrange the color converting data M0 to M2 in the first color difference direction and the second color difference direction in that order, and the color converting data M3 to M5 being allocated at color converting addresses of the lattice points P5 to P8 of the rectangular parallelepipeds to repeatedly arrange the color converting data M3 to M5 in the first color difference direction and the second color difference direction in that order;

lightness and color difference generating means for generating a lightness signal Y, a first color difference signal Cr and a second color difference signal Cb defined in a lightness-color difference space from a first primary color signal, a second primary signal and a third primary signal defined in a primary color space, an input color defined in the primary color space being designated by the first, second and third primary color signals, the input color defined in the lightness-color difference space being designated by the signals Y, Cr and Cb, the lightness signal Y being composed of an upper lightness signal YH having a value YH1 and a lower lightness signal DY having a value DY1, the first color difference signal Cr being composed of an upper first color difference signal CrH having a value CrH1 and a lower first color difference signal DCr having a value DCr1, and the second color difference signal Cb being composed of an upper second color difference signal CbH having a value CbH1 and a lower second color difference signal DCb having a value DCb1;

first address generating means for generating a selected block address (YH1', CrH1', CbH1') of a selected rectangular parallelepiped represented by a color converting address (YH1', CrH1', CbH1') of a lattice point P1 of the selected rectangular parallelepiped with the upper lightness signal YH, the upper first color difference signal CrH and the upper second color difference signal CbH generated in the lightness and color difference generating means to specify the selected rectangular parallelepiped, the input color being included in a parallelepiped PP having a first plane placed at a lightness in the lightness direction and a second plane parallel to the first plane, the first plane of the parallelepiped PP having four lattice points Pa, Pb, Pc and Pd addressed at color converting addresses ($Y_o$, $Cr_o$, $Cb_o$), ($Y_o$, $Cr_o+1$, $Cb_o$), ($Y_o$, $Cr_o+1$, $Cb_o+1$) and ($Y_o$, $Cr_o$, $Cb_o+1$) in that order, the second plane of the parallelepiped PP having four lattice points Pe, Pf, Pg and Ph addressed at color converting addresses ($Y_o+1$, $Cr_o+1$, $Cb_o+1$), ($Y_o+1$, $Cr_o+2$, $Cb_o+1$), ($Y_o+1$, $Cr_o+2$, $Cb_o+2$) and ($Y_o+1$, $Cr_o+1$, $Cb_o+2$) in that order, the color converting address (YH1', CrH1', CbH1') of the lattice point P1 of the selected rectangular parallelepiped agreeing with the color converting address ($Y_o$, $Cr_o$, $Cb_o$) of the lattice point Pa or the color converting address ($Y_o+1$, $Cr_o+1$, $Cb_o+1$) of the lattice point Pe in dependence on whether the value YH1' is an even number or an odd number, and the parallelepiped PP being formed of a first triangular prism with the lattice points Pa, Pb, Pc, Pc, Pf and Pg and a second triangular prism with the lattice points Pa, Pd, Pc, Pc, Ph and Pg;

second address generating means for generating a memory address CrH" in the first color difference direction, a memory address CbH" in the second color difference direction, a CrH" remainder Tx and a CbH" remainder with the selected block address (YH1', CrH1', CbH1') of the selected rectangular parallelepiped, the memory address CrH" being a quotient obtained by dividing a first slid value CrH1S' by 3, the memory address CbH" being a quotient obtained by dividing a second slid value CbH1S' by 3, the CrH" remainder Tx being a remainder obtained by dividing the first slid value CrH1S' by 3, the CbH" remainder Tx being a remainder obtained by dividing the second slid value CbH1S' by 3, the first and second slid value CrH1S', CbH1S' being obtained by incrementing the values CrH1', CbH1' to determine color converting addresses of the color converting data M0 to M2 in cases where the value YH1' is an even number, the first and second slid value CrH1S', CbH1S' being obtained by incrementing the values CrH1', CbH1' to determine color converting addresses of the color converting data M3 to M5 in cases where the value YH1' is an odd number, and the first and second slid value CrH1S', CbH1S' being equal to the values CrH1', CbH1' in other cases;

triangular prism selecting means for selecting either the first triangular prism or the second triangular prism of the parallelepiped PP of which the lattice point Pa agrees with the lattice point P1 of the selected rectangular parallelepiped specified in the first address generating means with the lower first color difference signal DCr and the lower second color difference signal DCb generated in the lightness and color difference generating means;

third address generating means for generating six color converting addresses of the lattice points Pa, Pb (or Pd), Pc, Pc, Pf (or Ph) and Pg of a particular triangular prism selected in the triangular prism selecting means with the memory address CrH''', CbH'', YH'' and the remainders Tx, Ty generated in the second address generating means, the color converting data M0 to M5 allocated at the color converting addresses of the lattice points Pa, Pb (or Pd), Pc, Pe, Pf (or Ph) and Pg of the particular triangular prism being read out from the color converting data storing means;

first selecting means for selecting three pieces of color converting data Da, Db (or Dd) and Dc allocated at the color converting addresses of the lattice points Pa, Pb (or Pd) and Pc in that order from the color converting data M0 to M2 read out from the color converting data storing means;

second selecting means for selecting three pieces of color converting data De, Df (or Dh) and Dg allocated at the color converting addresses of the lattice points Pe, Pf (or Ph) and Pg in that order from the color converting data M3 to M5 read out from the color converting data storing means; and interpolation calculating means for interpolating coordinates of an output color defined in the output color space corresponding to input color coordinates of the input color as an output color value Do in the particular triangular prism with the six color converting data Da, Db (or Dd), Dc, De, Df (or Dh) and Dg selected in the first selecting means and the second selecting means while weighting the six color converting data with the values DY1, DCr1 and DCb1 of the lower signals DY, DCr and DCb generated in the lightness and color difference generating means, the value DY1 of the lower lightness signal DY denoting a lightness component in the lightness direction of an input color vector directed from the lattice point Pa to the input color coordinates, the value DCr1 of the lower first color difference signal Dcr denoting a first color difference component in the first color difference direction of the input color vector, and the value DCb1 of the lower second color difference signal DCb denoting a second color difference component in the second color difference direction of the input color vector.

In the above configuration, a group of types of color converting data M0 to M2 is repeatedly arranged to allocate a series of groups of types of color converting data M0 to M2 at the lattice points P1 to P4 of the rectangular parallelepipeds in the first color difference direction and the second color difference direction. Also, a group of types of color converting data M3 to M5 is repeatedly arranged to allocate a series of groups of types of color converting data M3 to M5 at the lattice points P5 to P8 of the rectangular parallelepipeds in the first color difference direction and the second color difference direction. Therefore, in cases where six color converting addresses of a particular triangular prism is generated in the third address generating means, six types of color converting data M0 to M5 are necessarily allocated at the six color converting addresses.

Accordingly, the color converting data M0 to M5 required to interpolate an output color are limitedly read out from the color converting data storing means. Therefore, the calculation of the color conversion in the color converting apparatus can be performed at a high speed.

Also, because the color converting data are allocated at the color converting addresses without allocating the same color converting data at a plurality of color converting addresses, the capacity of the color converting data storing means can be minimized.

The sixth object is achieved by the provision of a color converting apparatus;

color converting data storing means for storing pieces of color converting data defined in an output color space, a plurality of rectangular parallelepipeds being formed in a primary color space by partitioning the primary color space in a first primary color direction, a second primary color direction and a third primary color direction, each of the rectangular prisms having four lattice points P1, P2, P3 and P4 placed at a first-second primary color plane of the primary color space and other four lattice points P5, P6, P7 and P8 placed at another first-second primary color plane of the primary color space, a block address of each of the rectangular parallelepipeds being represented by a color converting address of the lattice point P1, and the color converting data being limitedly allocated at the color converting addresses of the lattice points P1 to P8 of the rectangular parallelepipeds of which the block addresses are respectively expressed by three even numbers ($2i$, $2j$, $2k$);

primary color signal dividing means for dividing a first primary color signal into an upper first color signal having a value RH1 and a lower first color signal having a value RL1, a second primary color signal into an upper second color signal having a value BH1 and a lower second color signal having a value BL1, and a third primary color signal into an upper third color signal having a value Gttl and a lower third color signal having a value GL1, the first, second and third primary color signals being defined in the primary color space and designating an input color;

lower color signal comparing means for comparing the values RL1, BL1 of the lower first and third color signals divided in the primary color signal dividing means to output a first compared result in dependence on a large and small relationship between the values RL1, BL1 and comparing the values BL1, GL1 of the lower second and third color signals divided in the primary color signal dividing means to output a second compared result in dependence on a large and small relationship between the values BL1, GL1;

adding means for adding the first compared result produced in the lower color signal comparing means to the value RH1 of the upper first color signal divided in the primary color signal dividing means to produce a first component having a value RH1', adding the second compared result produced in the lower color signal comparing means to the value BH1 of the upper second color signal divided in the primary color signal dividing means to produce a second component having a value BH1', and producing a third component having a value GH1' which is the same as the value GH of the upper third color signal divided in the primary color signal dividing means, a selected block address (RH1', BH1', GH1') of a selected rectangular parallelepiped being specified, the input color being included in a parallelepiped PP having a first plane placed at a lightness in the lightness direction and a second plane parallel to the first plane, the first plane of the parallelepiped PP having four lattice points Pa, Pb, Pc and Pd addressed at color converting addresses ($R_o$, $B_o$, $G_o$), ($R_o+1$, $B_o$, $G_o$), ($R_o+1$, $B_o+1$, $G_o$) and ($R_o$, $B_o+1$, $G_o$) in that order, the second plane of the parallelepiped PP having four lattice points Pe, Pf, Pg and Ph addressed at color converting addresses ($R_o+1$, $B_o+1$, $G_o+1$), ($R_o+2$, $B_o+1$, $G_o+1$), ($R_o+2$, $B_o+2$, $G_o+1$) and ($R_o+1$, $B_o+2$, $G_o+1$) in that order, the color converting address (RH1', BH1', GH1') of the lattice point P1 of the selected rectangular parallelepiped agreeing with the color converting address ($R_o$, $B_o$, $G_o$) of the lattice point Pa or the color converting address ($R_o+1$, $B_o+1$, $G_o+1$) of the lattice point Pe in dependence on whether the value GH1' is an even number or an odd number, and the parallelepiped PP being formed of a first oblique triangular prism with the lattice points Pa, Pb, Pc, Pe, Pf and PK and a second oblique triangular prism with the lattice points Pa, Pd, Pc, Pe, Ph and Pg;

weighting factor generating means for generating a first weighting factor having a first value (RL1'–GL1) and a second weighting factor having a second value (BL1'–GL1) with the first, second and third lower color signals divided in the primary color signal dividing means, the value RL1' being equal to the value RL1 in case of RL1≧GL1, the value RL1' being formed by adding a constant to the value RL1 in case of RL1<GL1, the value BL1' being equal to the value BL1 in case of BL1≧GL1, and the value BLl' being formed by adding the constant to the value BL1 in case of BL1<GL1;

oblique triangular prism selecting means for selecting either the first oblique triangular prism or the second oblique triangular prism of tile parallelepiped PP of which the lattice point Pa agrees with the lattice point P1 of the selected rectangular parallelepiped specified in the adding means with the first weighting factor and the second weighting factor generated in the weighting factor generating means and generating an oblique triangular prism selecting signal indicating an oblique triangular prism selected;

address generating means for generating eight block addresses of eight particular rectangular parallelepipeds which each have one of eight selected lattice points agreeing with the lattice points Pa to Ph of the parallelepiped PP with the selected block address (RH1', BH1', GH1') generated in the adding means, eight pieces of color converting data M0, M1, M2, M3, M4, MS, M6 and M7 allocated at the color converting addresses of the selected lattice points equivalent to the lattice points Pa to Ph of the parallelepiped PP being read out from the color converting data storing means;

selecting means for selecting six pieces of color converting data from among the color converting data M0 to M7 as six pieces of color converting data Da, Db (or Dd), Dc, De, Df (or Dh) and Dg allocated at the color converting addresses of the lattice points Pa, Pb (or Pd), Pc, Pe, Pf (or Ph) and Pg of the first or second oblique triangular prism of the parallelepiped PP in that order according to the oblique triangular prism selecting signal generated in the oblique triangular prism selecting means and the selected block address (RH1', BH1', GH1') generated in the first address generating means; and interpolation calculating means for interpolating coordinates of an output color defined in the output color space corresponding to input color coordinates of the input color as an output color value Do in the first or second oblique triangular prism of the parallelepiped PP with the six color converting data Da, Db (or Dd), Dc, De, Df (or Dh) and Dg selected in the selecting means while weighting the six color converting data with the first and second weighting factors generated in the weighting factor generating means and the lower third color signal divided in the primary color signal dividing means, the value (RL1'–GL1) of the first weighting factor denoting a first primary color component in the first primary color direction of an input color vector directed from the lattice point Pa to the input color coordinates, the value (BL1'–GL1) of the second weighting factor denoting a second primary color component in the second primary color direction of the input color vector, and the value GL1 of the lower third color signal denoting a third color difference component in the third color difference direction of the input color vector.

In the above configuration, pieces of color converting data defined in an output color space are stored in the color converting data storing means in advance. In the storing means, a primary color space is partitioned into a plurality of rectangular parallelepipeds which each have eight sides directed in a first primary color direction, a second primary color direction or a third primary color direction. The color converting data are allocated at color converting addresses of eight lattice points P1, P2, P3, P4, P5, P6, P7 and P8 of each of the rectangular parallelepipeds of which a block address represented by a color converting address of the lattice point P1 is limitedly expressed by three even numbers ($2i$, $2j$, $2k$). Here the symbols i, j and k are respectively an integral number. Therefore, the number of memories required to store the color converting data can be reduced to ⅛ as compared with the case that the color converting data are allocated at color converting addresses of the lattice points of all of the rectangular parallelepipeds. The lattice points P1, P2, P3 and P4 are placed at a first-second primary color plane, and the lattice points PS, P6, P7 and P8 are placed at another first-second primary color plane.

When first, second and third primary color signals indicating an input color in the primary color space are input to the primary color signal dividing means, each of the signals is divided into an upper color signal and a lower color signal. The lower color signals are transferred to the lower color signal comparing means, and a first compared result is generated according to a large and small relationship between the values RL1, BL1. Also, a second compared result is generated according to a large and small relationship between the values BL1, GL1. The first and second compared results are transferred to the adding means, and the first compared result is added to the value RH1 of the upper first color signal to produce a first component of a value RH1'. Also, the second compared result is added to the value BH1 of the upper second color signal to produce a second component of a value BH1'. Also, a third component of a value GH1'=GH1 is produced. Therefore, a selected block address (RH1', BH1', GH1') represented by a color converting address of a lattice point P1 of a selected rectangular parallelepiped is generated. In this case, the input color is included in a parallelepiped PP having a first plane placed at a first-second primary plane and a second plane parallel to the first plane. The first plane of the parallelepiped PP has four lattice points Pa, Pb, Pc and Pd addressed at color converting addresses $(R_o, B_o, G_o)$, $(R_o+1, B_o, G_o)$, $(R_o+1, B_o+1, G_o)$ and $(R_o, B_o+1, G_o)$ in that order, and the second plane of the parallelepiped PP has four lattice points Pe, Pf, Pg and Ph addressed at color converting addresses $(R_o+1, B_o+1, G_o+1)$, $(R_o+2, B_o+1, G_o+1)$, $(R_o+2, B_o+2, G_o+1)$ and $(R_o+1, B_o+2, G_o+1)$ in that order. The color converting address (RH1', BH1', GH1') of the lattice point P1 of the selected rectangular parallelepiped agrees with the color converting address $(R_o, B_o, G_o)$ of the lattice point Pa or the color converting address $(R_o+1, B_o+1, G_o+1)$ of the lattice point Pe in dependence on whether the value GH1' is an even number or an odd number. Therefore, the position of the parallelepiped PP including the input color is specified by the selected block address (RH1', GH1', BH1') of the selected rectangular parallelepiped. The parallelepiped PP is conceptually partitioned into a first oblique triangular prism with the lattice points Pa, Pb, Pc, Pe, Pf and Pg and a second oblique triangular prism with the lattice points Pa, Pd, Pc, Pe, Ph and Pg. Therefore, a first dividing plane in which a first primary color component is equal to a second primary color component in the primary color space, a second dividing plane in which the second primary color component is equal to a third primary color component in the primary color space, and a third dividing plane in which the third primary color component is equal to the first primary color component in the primary color space are completely included in boundary planes of the first and second oblique triangular prisms occupying the primary color space. The selected block address (RH1', BH1', GH1') of the selected rectangular parallelepiped is transferred to the second address generating means.

In the weighting factor generating means, a first weighting factor having a first value (RL1'−GL1) and a second weighting factor having a second value (BL1'−GL1) are generated from the first, second and third lower color signals. The value RL1' is equal to the value RL1 in case of RL1≧GL1, the value RL1' is formed by adding a constant to the value RL1 in case of RL1<GL1, the value BL1' is equal to the value BL1 in case of BL1≧GL1, and the value BL1' is formed by adding the constant to the value BL1 in case of BL1<GL1. Here, the first weighting factor denotes a first primary color component of an input color vector having a starting point at the lattice point Pa, and the second weighting factor denotes a second primary color component of the input color vector.

In the oblique triangular prism selecting means, either the first oblique triangular prism or the second oblique triangular prism is selected by comparing the first value (RL1'−GL1) and the second value (BL1'−GL1). Thereafter, an oblique triangular prism selecting signal indicating an oblique triangular prism selected in the oblique triangular prism selecting means is transferred to the selecting means.

In the second address generating means, eight color converting addresses of eight particular rectangular parallelepipeds with the selected block address (RH1', BH1', GH1') generated in the adding means. Each of the particular rectangular parallelepipeds has one of eight selected lattice points agreeing with the lattice points Pa to Ph of the parallelepiped PP. Thereafter, eight pieces of color converting data M0 to M7 allocated at the color converting addresses of the selected lattice points agreeing with the lattice points Pa to Ph of the parallelepiped PP are read out from the color converting data storing means. Therefore, the color converting data M0 to M7 allocated at the color converting addresses of the lattice points Pa to Ph of the parallelepiped PP are obtained. Thereafter, the color converting data M0 to M7 are transferred to the selecting means.

In the selecting means, six pieces of color converting data are selected from among the color converting data M0 to M7 as six pieces of color converting data Da, Db (or Dd), Dc, De, Df (or Dh) and Dg allocated at the color converting addresses of the lattice points Pa, Pb (or Pd), Pc, Pe, Pf (or Ph) and Pg of the first or second oblique triangular prism of the parallelepiped PP according to the oblique triangular prism selecting signal and the selected block address (RH1', BH1', GH1') of the selected rectangular parallelepiped. The six color converting data Da, Db (or Dd), Dc, De, Df (or Dh) and Dg are transferred to the interpolation calculating means.

In the interpolation calculating means, output color coordinates defined in the output color space corresponding to input color coordinates designated by the input color in the primary color space are interpolated as an output color value Do with the six color converting data Da, Db (or Dd), Dc, De, Df (or Dh) and Dg while weighting the six color converting data with the first and second weighting factors and the value GL1.

Accordingly, because the first, second and third dividing planes in the primary color space in which differential calculation results in the minimum calculation become discontinuous are completely included in the boundary planes of the first and second oblique triangular prisms occupying the primary color space, the generation of ripples can be prevented in the minimum calculation.

Also, the sixth object is achieved by the provision of a color converting method for performing a three-dimensional color conversion of a colored picture, comprising the steps of:

forming a plurality of rectangular parallelepipeds in a primary color space by partitioning the primary color space in a first primary color direction, a second primary color direction and a third primary color direction, each of the rectangular parallelepipeds having four lattice points P1, P2, P3 and P4 placed at a first-second primary color plane of the primary color space and other four lattice points P5, P6, P7 and P8 placed at another first-second primary color plane of the primary color space, and a block address of each of the rectangular parallelepipeds being represented by a color converting address of the lattice point P1;

allocating pieces of color converting data defined in an output color space at the color converting addresses of the lattice points P1 to P8 of the rectangular parallelepipeds;

receiving a first primary color signal, a second primary color signal and a third primary color signal defined in the primary color space and designating an input color;

generating a color converting address (RH1', BH1', GH1') of a lattice point P1 of a selected rectangular parallelepiped with the first, second and third primary color signals;

conceptually forming a parallelepiped PP in which the input color is included, the parallelepiped PP having a first plane placed at a lightness in the lightness direction and a second plane parallel to the first plane, the first plane of the parallelepiped PP having four lattice points Pa, Pb, Pc and Pd addressed at color converting addresses $(R_o, B_o, G_o)$, $(R_o+1, B_o, G_o)$, $(R_o+1, B_o+1, G_o)$ and $(R_o, B_o+1, G_o)$ in that order, the second plane of the parallelepiped PP having four lattice points Pe, Pf, Pg and Ph addressed at color converting addresses $(R_o+1, B_o+1, G_o+1)$, $(R_o+2, B_o+1, G_o+1)$, $(R_o+2, B_o+2, G_o+1)$ and $(R_o+1, B_o+2, G_o+1)$ in that order, and the color converting address (RH1', BH1', GH1') of the lattice point P1 of the selected rectangular parallelepiped agreeing with the color converting address $(R_o, B_o, G_o)$ of the lattice point Pa or the color converting address $(R_o+1, B_o+1, G_o+1)$ of the lattice point Pe in dependence on whether the value GH1' is an even number or an odd number;

conceptually partitioning the parallelepiped PP into a first oblique triangular prism with the lattice points Pa, Pb, Pc, Pe, Pf and Pg and a second oblique triangular prism with the lattice points Pa, Pd, Pc, Pe, Ph and Pg;

reading out six pieces of color converting data Da, Db (or Dd), Dc, De, Df (or Dh) and Dg allocated at the color converting addresses of the lattice points Pa, Pb (or Pd), Pc, Pe, Pf (or Ph) and Pg of the first or second oblique triangular prism in which the input color is included; and interpolating an output color defined in the output color space corresponding to the input color in the selected oblique triangular prism of the parallelepiped PP with the six color converting data Da, Db (or Dd), Dc, De, Df (or Dh) and Dg.

In the above steps, the first plane of the parallelepiped PP has four lattice points Pa, Pb, Pc and Pd addressed at color converting addresses $(R_o, B_o, G_o)$, $(R_o+1, B_o, G_o)$, $(R_o+1, B_o+1, G_o)$ and $(R_o, B_o+1, G_o)$ in that order, and the second plane of the parallelepiped PP has four lattice points Pe, Pf, Pg and Ph addressed at color converting addresses $(R_o+1, B_o+1, G_o+1)$, $(R_o+2, B_o+1, G_o+1)$, $(R_o+2, B_o+2, G_o+1)$ and $(R_o+1, B_o+2, G_o+1)$ in that order. The color converting address (RH1', BH1', GH1') of the lattice point Pl of the selected rectangular parallelepiped agrees with the color converting address $(R_o, B_o, G_o)$ of the lattice point Pa or the color converting address $(R_o+1, B_o+1, G_o+1)$ of the lattice point Pe in dependence on whether the value YH1' is an even number or an odd number. Also, the parallelepiped PP is conceptually partitioned into the first oblique triangular prism with the lattice points Pa, Pb, Pc, Pe, Pf and Pg and the second oblique triangular prism with the lattice points Pa, Pd, Pc, Pe, Ph and Pg. Therefore, a first dividing plane in which a first primary color component is equal to a second primary color component in the primary color space, a second dividing plane in which the second primary color component is equal to a third primary color component in the primary color space, and a third dividing plane in which the third primary color component is equal to the first primary color component in the primary color space are completely included in boundary planes of the first and second oblique triangular prisms occupying the primary color space.

Accordingly, because the first, second and third dividing planes in the primary color space in which differential calculation results in the minimum calculation become discontinuous are completely included in the boundary planes of the first and second oblique triangular prisms occupying the primary color space, the generation of ripples can be prevented in the minimum calculation.

Also, the sixth object is achieved by the provision of a color converting method for performing a three-dimensional color conversion of a colored picture, comprising the steps of:

forming a plurality of rectangular parallelepipeds in a primary color space by partitioning the primary color space in a first primary color direction, a second primary color direction and a third primary color direction, each of the rectangular parallelepipeds having four lattice points P1, P2, P3 and P4 placed at a first-second primary color plane of the primary color space and other four lattice points P5, P6, P7 and P8 placed at another first-second primary color plane of the primary color space, and a block address of each of the rectangular parallelepipeds being represented by a color converting address of the lattice point P1;

allocating pieces of color converting data defined in an output color space at the color converting addresses of the lattice points P1 to P8 of the rectangular parallelepipeds;

receiving a first primary color signal, a second primary color signal and a third primary color signal defined in the primary color space and designating an input color;

generating a color converting address (YH1', CrH1', CbH1') of a lattice point P1 of a selected rectangular parallelepiped with the first, second and third primary color signals;

conceptually forming a first type of parallelepipeds and a second type of parallelepipeds to occupy all of the primary color space, the first type of parallelepipeds respectively having a first plane placed at a lightness in the lightness direction and a second plane parallel to the first plane, the first plane of the first type of parallelepiped having four lattice points Pa, Pb, Pc and Pd addressed at color converting addresses $(R_o, B_o, G_o)$, $(R_o+1, B_o+1, G_o)$, $(R_o+1, B_o+2, G_o)$ and $(R_o, B_o+1, G_o)$ in that order, the second plane of the second type of parallelepiped having four lattice points Pe, Pf, Pg and Ph addressed at color converting addresses $(R_o 1, B_o+1, G_o+1)$, $(R_o+2, B_o+2, G_o+1)$, $(R_o+2, B_o+3, G_o+1)$ and $(R_o+1, B_o+2, G_o+1)$ in that order, the second type of parallelepipeds respectively having a thirdplane placed at a lightness in the lightness direction and a fourth plane parallel to the third plane, the third plane of the second type of parallelepiped having four lattice points Pa', Pb', Pc' and Pd' addressed at color converting addresses $(R_o', B_o', G_o')$, $(R_o'+1, B_o', G_o')$, $(R_o'+2, B_o'+1, G_o')$ and $(R_o'+1, B_o'+1, G_o')$ in that order, the fourth plane of the second type of parallelepiped having four lattice points Pe', Pf', Pg' and Ph' addressed at color converting addresses $(R_o'+1, B_o'+1, G_o'+1)$, $(R_o'+2, B_o'+1, G_o'+1)$, $(R_o'+3, B_o'+2, G_o'+1)$ and $(R_o'+2, B_o'+2, G_o'+1)$ in that order, the color converting address (YH1', CrH1', CbH1') of the lattice point P1 of the selected rectangular parallelepiped agreeing with the color converting address $(R_o, B_o, G_o)$ of the lattice point Pa, the color converting address $(R_o+1, B_o+1, G_o+1)$ of the lattice point Pe, the color converting address $(R_o', B_o', G_o')$ of the lattice point Pa', or the color converting address $(R_o'+1, B_o'+1, G_o'+1)$ of the lattice point Pe' in a particular parallelepipe in dependence on whether the value YH1' is an even number or an odd number, and the input color designated by the three primary color signals being included in the particular parallelepipe;

reading out eight pieces of color converting data Da, Db, Dc, Dd, De, Df, Dg and Dh allocated at the color converting addresses of the lattice points Pa, Pb, Pc, Pd, Pe, Pf, Pg and Ph or Pa', Pb', Pc', Pd', Pe', Pf, Pg' and Ph' of the particular parallelepiped; and interpolating an output color defined in the output color space corresponding to the input color with the eight color converting data Da, Db, Dc, Dd, De, Dr, Dg and Dh.

In the above steps, the first plane of the first type of parallelepiped has four lattice points Pa, Pb, Pc and Pd addressed at color converting addresses $(R_o, B_o, G_o)$, $(R_o+1, B_o+1, G_o)$, $(R_o+1, B_o+2, G_o)$ and $(R_o, B_o+1, G_o)$ in that order, and the second plane of the first type of parallelepiped has four lattice points Pe, Pf, Pg and Ph addressed at color converting addresses $(R_o+1, B_o+1, G_o+1)$, $(R_o+2, B_o+2, G_o+1)$, $(R_o+2, B_o+3, G_o+1)$ and $(R_o+1, B_o+2, G_o+1)$ in that order. Also, the third plane of the second type of parallelepiped has four lattice points Pa', Pb', Pc' and Pd' addressed at color converting addresses $(R_o', B_o', G_{o1}')$, $(R_o'+1, B_o', G_o')$, $(R_o'+2, B_o'+1, G_o')$ and $(R_o'+1, B_o'+1, G_o')$ in that order, and the fourth plane of the second type of parallelepiped has four lattice points Pe', Pf', Pg' and Ph' addressed at color converting addresses $(R_o'+1, B_o'+1, G_o'+1)$, $(R_o'+2, B_o'+1, G_o'+1)$, $(R_o'+3, B_o'+2, G_o'+1)$ and $(R_o'+2, B_o'+2, G_o'+1)$ in that order.

Therefore, a first dividing plane in which a first primary color component is equal to a second primary color component in the primary color space, a second dividing plane in which the second primary color component is equal to a third primary color component in the primary color space, and a third dividing plane in which the third primary color component is equal to the first primary color component in the primary color space are completely included in boundary planes of the first and second types of parallelepipeds occupying all of the primary color space.

The color converting address (YH1', CrH1', CbH1') of the lattice point P1 of the selected rectangular parallelepiped agrees with the color converting address $(R_o, B_o, G_o)$ of the lattice point Pa, the color converting address $(R_o+1, B_o+1, G_o+1)$ of the lattice point Pe, the color converting address $(R_o', B_o', G_o')$ of the lattice point Pa', or the color converting address $(R_o'+1, B_o'+1, G_o'+1)$ of the lattice point Pe' in a particular parallelepipe in dependence on whether the value YH1' is an even number or an odd number. The input color designated by the three primary color signals is included in the particular parallelepipe. Thereafter, eight pieces of color converting data Da, Db, Dc, Dd, De, Df, Dg and Dh allocated at the color converting addresses of the lattice points Pa, Pb, Pc, Pd, Pe, Pf, Pg and Ph or Pa', Pb', Pc', Pd', Pe', Pf', Pg' and Ph' of the particular parallelepiped, and an output color is interpolated with the color converting data Da, Db, Dc, Dd, De, Dr, Dg and Dh.

Accordingly, because the first, second and third dividing planes in the primary color space in which differential calculation results in the minimum calculation become discontinuous are completely included in the boundary planes of the first and second oblique triangular prisms occupying the primary color space, the generation of ripples can be prevented in the minimum calculation.

BRIEF DESCRIPTION OF THE DRAWINGS

The objects, features and advantages of the present invention will be apparent from the following description taken in conjunction with the accompanying drawings, in which:

FIG. 7A shows an external address configuration of a color converting table stored in a host computer according to the normal mode;

FIG. 7B shows an external address configuration of a color converting table stored in the host computer according to the address extension mode;

FIG. 9C shows four types of combinations of a bit length of input/output color signals and a bit length of pieces of color converting data;

FIG. 9D shows a trade-off between a transferring capacity of pieces of color converting data and a range of the color converting data at lattice points of partitioned cubic blocks;

FIG. 10A shows an interpolation result according to a conventional interpolation process to depict that a clipping characteristic is not obtained;

FIG. 10B shows an interpolation result obtained in a calculating section shown in FIG. 1 according to an interpolation process of the first embodiment to depict that a clipping characteristic is completely obtained because of the utilization of pieces of signed color converting data;

FIG. 11A shows an interpolation result according to a conventional interpolation process to depict that a through characteristic is not obtained;

FIG. 11B shows an interpolation result obtained in a calculating section shown in FIG. 1 according to an interpolation process of the first embodiment to depict that a through characteristic is completely obtained because of the utilization of pieces of signed color converting data;

FIG. 17B shows five differences generated in difference generating section shown in FIG. 17A;

FIG. 17C shows four differences selected in a difference selecting section shown in FIG. 17A;

FIG. 17D shows a first product PR1, a second product PR2, a third product PR3 and a fourth product PR4 are output from multipliers of a multiplying section shown in FIG. 17A;

FIG. 17E shows a first added product PA1 and a second added product PA2 produced in an adding section shown in FIG. 17A;

FIG. 17F shows a first term product PT1 produced in a third adder shown in FIG. 17A;

FIG. 17G shows a subtracted product PS1 produced in a sixth subtracter shown in FIG. 17A;

FIG. 17H shows a third added product PA3 produced in a fourth adder shown in FIG. 17A;

FIG. 17I shows a second term product PT2 produced in a fifth multiplier shown in FIG. 17A;

FIG. 17J shows an interpolated output value Do produced in a fifth adder shown in FIG. 17A;

FIGS. 40A, 40B, 40C are respectively a logical circuit embodying each of color converting address component generating sections shown in FIG. 39;

FIG. 40D shows a a relationship between signals UX, UY and UZ and pieces of color converting data M0 to M7;

FIG. 41A shows a relationship among pieces of color converting data M0 to M7 of which eight color converting addresses are obtained in address generating units 71(M0) to 71(M7) shown in FIG. 39, a selected block address (YH1', CrH1', CbH1'), a slid address formed of CrH', CbH' and YH' slid components, a reduced address formed of CrH', CbH' and YH' reduced components, and color converting address formed of CrH', CbH' and YH' components;

FIG. 49B shows a logic of the increment in first and second address incrementing element shown in FIG. 49A;

FIG. 49C shows a value of the 1-bit adjusting signal UZ;

FIG. 64A is a block diagram of a weighting factor generating section shown in FIG. 62;

FIG. 64B shows weighting factors (RL1–GL1)', (BL1–GL1)' obtained in the weighting factor generating section shown in FIG. 62;

FIG. 65A is a block diagram of a triangular prism selecting section shown in FIG. 62;

Figure 62:
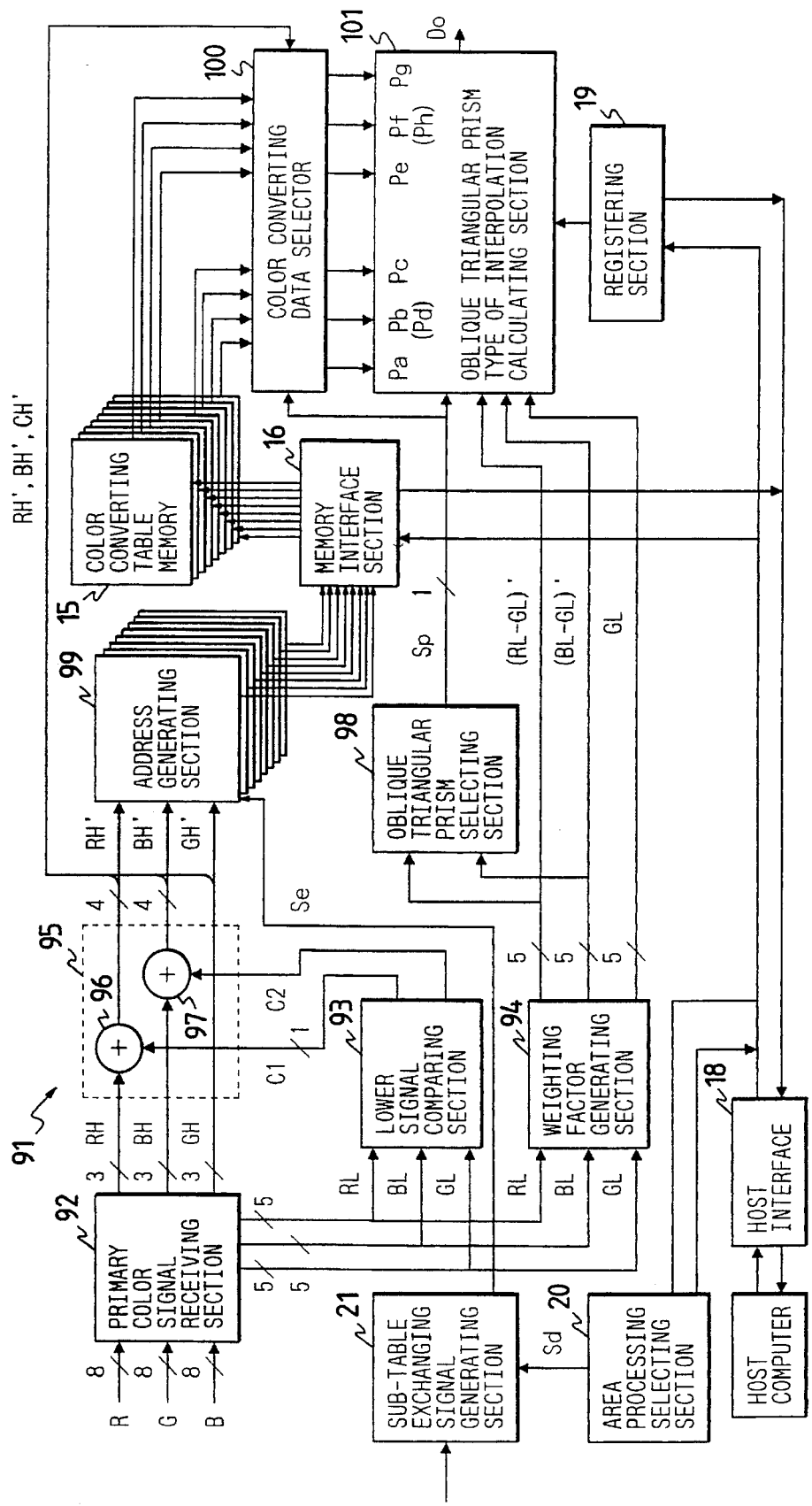
FIG. 62 is a block diagram of an output color converting apparatus according to a fifth embodiment of the present invention.
Figure 70:
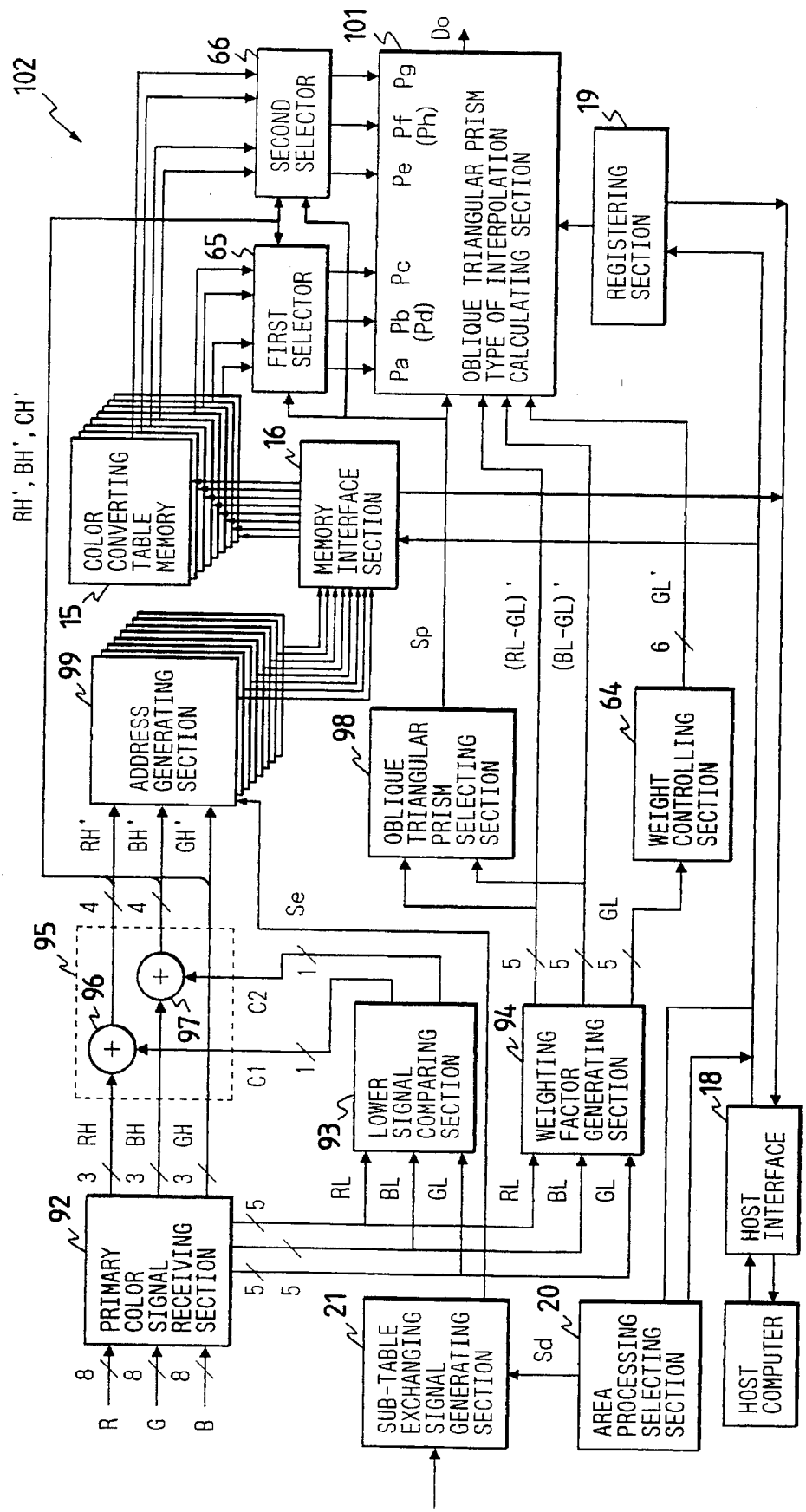
Figure 71:
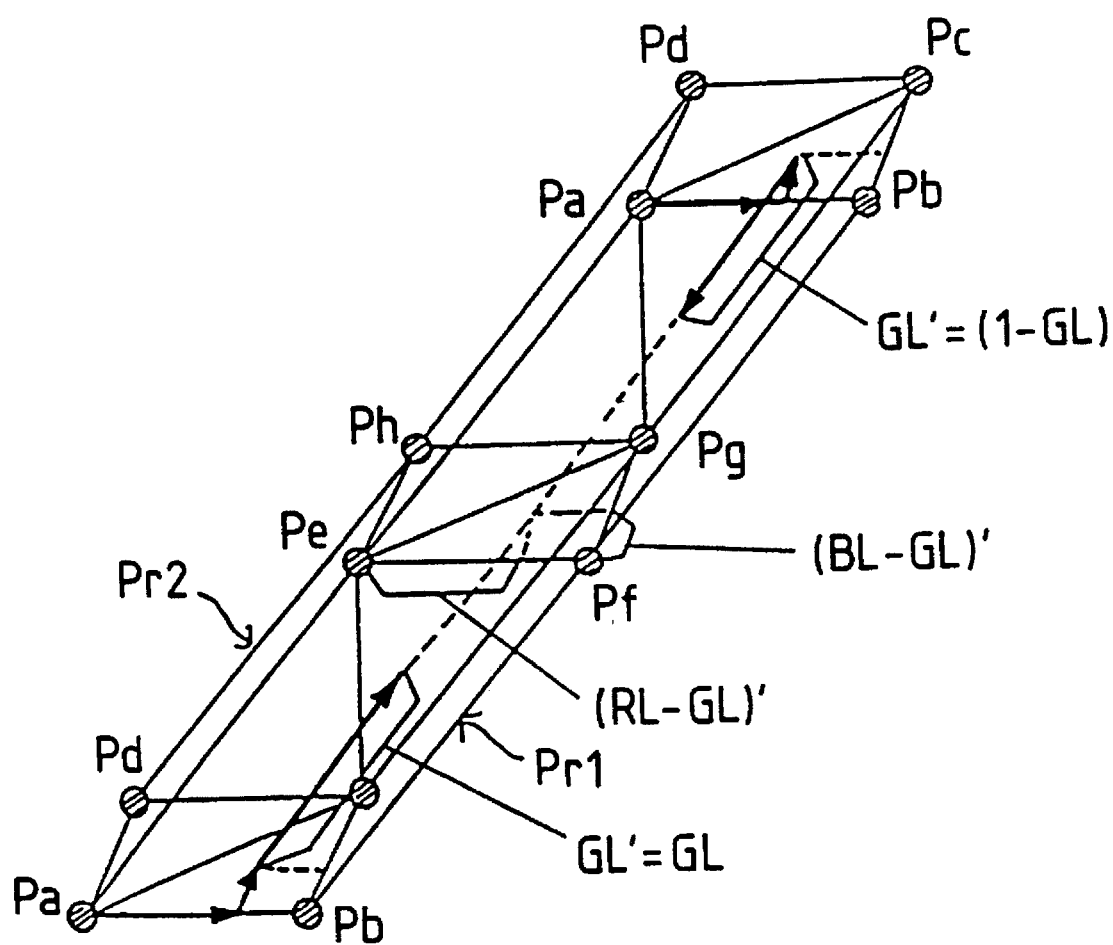

62 as pieces of color converting data Da to Dh addressed at lattice points Pa to Ph;

FIG. 69C shows a relationship between selected block address (RH1', GH1', BH1') and pieces of color converting data M0 to M7 output from a color converting data selector shown in FIG. 62 as pieces of color converting data Da to Dh addressed at the lattice points Pa to Ph;

FIG. 70 is a block diagram of a color converting apparatus according to a six embodiment of the present invention;

FIG. 71 explanatorily shows a 6-point interpolation in a GH' direction which is performed in dependent on whether a value GH1' is an even number or an odd number; and FIG. 72 shows a relationship between selected block address (RH1', GH1', BH1') and pieces of color converting data M0 to M7 output from first and second selector shown in FIG. 70 as pieces of color converting data Da to Dh addressed at the lattice points Pa to Ph.

DETAIL DESCRIPTION OF THE PREFERRED EMBODIMENTS

Preferred embodiments of color converting method and apparatus according to the present invention are described with reference to drawings.

(First embodiment)

A first embodiment of the present invention is described with reference to FIGS. 1 to 24.

In the first embodiment, because a color is represented by a lightness Y and first and second color differences Cr, Cb in a Y—Cr—Cb color space, three input color signals Y, Cr, Cb denoting the lightness and first and second color differences are utilized. The lightness Y, the color differences Cr, Cb are respectively defined by utilizing the red R, the green G and the blue B.

$$Y=0.2990*R+0.5864*G+0.1146*B \quad (2)$$

$$Cr=R-Y \quad (3)$$

$$Cb=B-Y \quad (4)$$

However, because a color is represented by a red R, a green G and a blue B in a RGB color space, three input color signals R,G, B can be also utilized in place of the input color signals Y, Cr, Cb. In addition, each of the input color signals Y, Cr, Cb has a 10-bit length in the first embodiment. However, because 8-bit input color signals Y, Cr, Cb are often utilized in the commercial world, the 8-bit input color signals Y, Cr, Cb are sometimes utilized for convenience.

Figure 1:
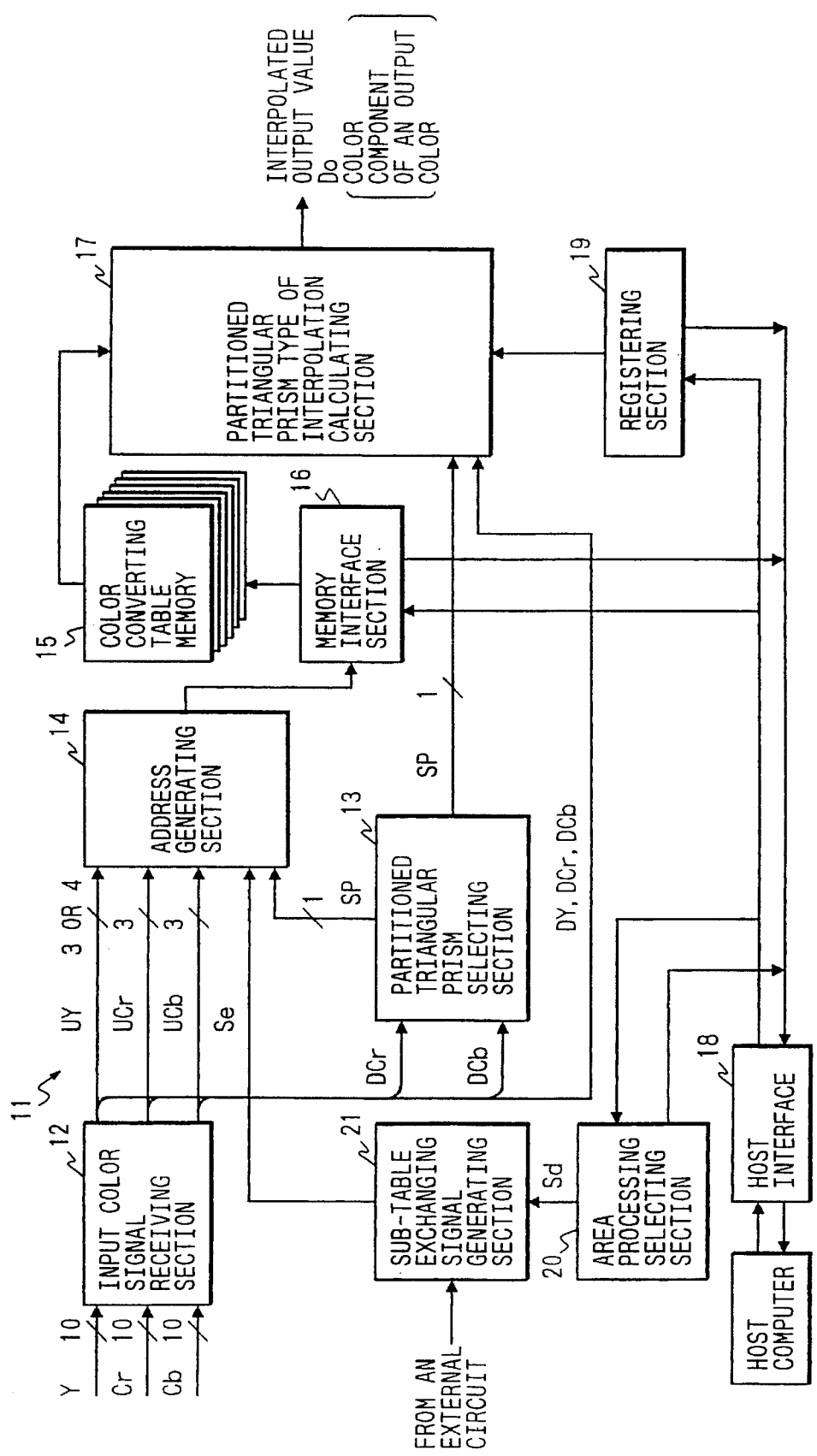
FIG. 1 is a block diagram of a color converting apparatus according to a first embodiment.

FIG. 1 is a block diagram of a color converting apparatus according to the first embodiment.

As shown in FIG. 1, a color converting apparatus 11 comprises an input color signal receiving section 12 for receiving three 10-bit (or 8-bit) input color signals Y, Cr, Cb, a partitioned triangular prism selecting section 13 for selecting a triangular prism Pt from a pair of triangular prisms produced by partitioning a cubic block Bc (or a rectangular parallelepiped Bc) with two lower 7-bit (or 5-bit) color signals DCr, DCb of the input color signals Cr, Cb, an address generating section 14 for generating an address Ad to specify a color converting table in which six pieces of color converting data at six lattice points (or vertexes) of the triangular prism Pt are stored by receiving three upper 3-bit color signals UY, UCr, UCb of the input color signals Y, Cr, Cb to specify the cubic block Bc and a triangular prism selecting signal Sp sent from the selecting section 13 to specify the triangular prism Pt, a color converting table memory 15 for storing pieces of color converting data defined in an output color space in each of a plurality of color converting tables of which one is specified according to the address Ad generated in the address generating section 13, a memory interface section 16 through which the color converting tables stored in the color converting table memory 15 are rewritten by other pieces of color converting data sent from a host computer through a host interface 18, a partitioned triangular prism type of interpolation calculating section 17 for interpolating a color component of an output color in the output color space with the six color converting data of the color converting table stored at the address Ad of the table memory 15 according to a 6-point interpolation while weighting the six color converting data with values DY1, DCr1 and DCb1 of three lower color signals DY, DCr and DCb sent from the receiving section 12. The color component is output from the calculating section 17 as one of three components of the output color to convert the output color of a colored picture which is, for example, printed on a paper or displayed on an image plane, and a registering section 19 for registering a displacement value OFFSET and a dynamic range of an interpolated output value Do transferred from the host computer through the host interface 18 to utilize the displacement value OFFSET and the dynamic range for the 6-point interpolation performed in the calculating section 17.

The 10-bit (or 8-bit) input color signals Y, Cr, Cb represent an input color of a colored picture in the Y—Cr—Cb color space, and the input color signals Cr, Cb are composed of the upper 3-bit color signals UCr, UCb and the lower 7-bit color signals DCr, DCb. Also, the input color signal Y is composed of an upper 3-bit color signal UY and a lower 7-bit signal DY in cases where the operation in the apparatus 11 is performed according to a normal mode. and the input color signal Y is composed of an upper 4-bit color signal UY and a lower 6-bit signal DY in cases where the operation in the apparatus 11 is performed according to a address extension mode.

Figure 2A:
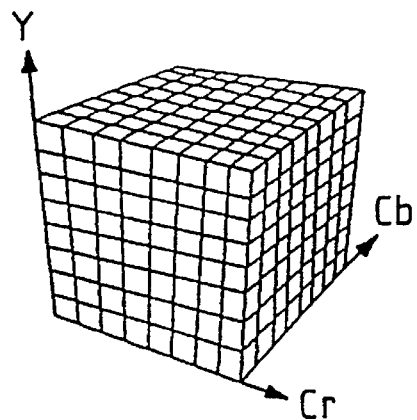
FIG. 2A shows a Y—Cr—Cb color space partitioned into a plurality of cubic blocks according to a normal mode.
Figure 2B:
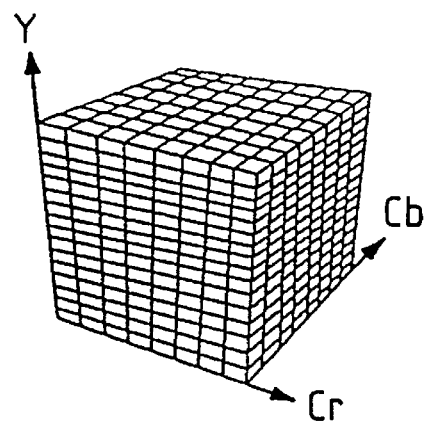
FIG. 2B shows a Y—Cr—Cb color space partitioned into a plurality of cubic blocks according to an address extension mode.

The Y—Cr—Cb color space is defined by a lightness (Y) axis, a first color difference (Cr) axis and a second color difference (Cb) axis independent of each other, and the color space is conceptually partitioned into a plurality of partitioned cubic blocks (or rectangular parallelepipeds) in advance. In detail, the Y-axis is partitioned into eight ($2^3$) regions in the normal mode or sixteen ($2^4$) regions in the address extension mode corresponding to the bit length of the upper color signal UY, the Cr-axis is partitioned into eight regions corresponding to the bit length of the upper color signal UCr, and the Cb-axis is partitioned into eight regions corresponding to the bit length of the upper color signal UCb. Therefore, as shown in FIG. 2A, the Y—Cr—Cb color space is partitioned into 512 ($2^3 \times 2^3 \times 2^3$) cubic blocks in the normal mode. Also, as shown in FIG. 2B, the Y—Cr—Cb color space is partitioned into 1024 ($2^4 \times 2^3 \times 2^3$) cubic blocks to enhance the accuracy of the 6-point interpolation directed in the Y-axis. Therefore, the number of lattice points (or vertexes) of the cubic blocks sums up to 729 (9×9×9) in the normal mode or 1377 (17×9×9) in the address extension mode.

In cases where the 10-bit input color signals Y, Cr, Cb are utilized in the apparatus 11, coordinate values at the lattice points of the cubic blocks for the Y, Cr and Cb-axes are expressed in the normal mode as follows.

Lattice points (Y, Cr and Cb axes in the normal mode)=0, 128, 256, 384, 512, 640, 768, 896, 1024

Also, coordinate values at the lattice points of the cubic blocks for the Y-axis are expressed in the address extension mode as follows.

Lattice points (Y axis in the address extension mode)=0, 64, 128, 192, 256, 320, 384, 448, 512, 576, 640, 704, 768, 832, 896, 960, 1024

Also, coordinate values at the lattice points of the cubic blocks for the Cr and Cb-axes are expressed in the address extension mode as follows.

Lattice points (Cr, Cb-axes in the address extension mode)=0, 128, 256, 384, 512, 640, 768, 896, 1024

Also, in cases where the bit lengths of the input color signals Y, Cr, Cb are respectively shortened to 8 bits by shortening the bit lengths of the lower color signals DY, DCr, DCb to 5 bits, coordinate values at the lattice points of the cubic blocks for the Y, Cr and Cb-axes are expressed in the normal mode as follows.

Lattice points (Y, Cr and Cb axes in the normal mode)=0, 32, 64, 96, 128, 160, 192, 224, 256

Also, coordinate values at the lattice points of the cubic blocks for the Y-axis are expressed in the address extension mode as follows.

Lattice points (Y axis in the address extension mode)=0, 16, 32, 48, 64, 80, 96, 112, 128, 144, 160, 176 192, 208, 224, 240, 256

Also, coordinate values at the lattice points of the cubic blocks for the Cr and Cb-axes are expressed in the address extension mode as follows.

Lattice points (Cr, Cb axes in the address extension mode)=0, 32, 64, 96, 128, 160, 192, 224, 256

An area occupied by each of the partitioned cubic blocks is defined as a range from a coordinate value of its lower lattice point to a value lower than another coordinate value of its higher lattice point by one for each of the axes. Therefore, a coordinate value 256 or 1024 of the highest lattice point imaginarily exists, and a coordinate value 255 or 1023 indicated by the input color signal Y, Cr or Cb specifying the highest partitioned cubic block is actually maximum.

Also, in cases where the operation of the apparatus 11 is performed with the 8-bit input color signals according to the normal mode, a region No. 0 ranges from the coordinate value 0 to 32 for each of the axes, and a region No. 1 ranges from the coordinate value 32 to 64 for each of the axes. Finally, a region No. 7 ranges from the coordinate value 224 to 256 for each of the axes. Because the Y—Cr—Cb color space is the three-dimension, 512 cubic blocks numbered by block addresses ranging from (0, 0, 0) to (7, 7, 7) actually exist. Also, in cases where the operation of the apparatus 11 is performed according to the address extension mode, 1024 cubic blocks numbered by block addresses ranging from (0, 0, 0) to (15, 7, 7) actually exist. Therefore, a block address selected from among 512 (or 1024) types of block addresses is generated in the section 14 to specify a color converting table. The reason that the cubic blocks are allocated to the block addresses ranging from (0, 0, 0) to (7, 7, 7) in tile normal mode or from (0, 0, 0) to (15, 7, 7) in the address extension mode is as follows.

First, in cases where an input color designated by the input color signals Y, Cr and Cb is included in a particular partitioned triangular prism, a block address generated in the generating section 14 is transferred to the table memory 15 to read out six pieces of color converting data corresponding to six lattice points (or vertexes) of the triangular prism. Thereafter, a piece of color converting data corresponding to the input color is determined as a piece of interpolated output data with the six color converting data read from the table memory 17 according to a 6-point-interpolation in the calculating section 17. In this case, because the six color converting data are utilized in parallel to each other in the calculating section 17, it is required to simultaneously read out the six color converting data from tile table memory 15. Therefore, in cases where the six color converting data is stored at the same block address, a reading operation of the six color converting data can be simplified.

Secondly, the number of lattice points in the Y—Cr—Cb space cannot be expressed by $2^N$ because the number of lattice points is equal to 9 or 17. In contrast, the number of block addresses is expressed by $2^N$ because the number of lattice points is equal to 8 or 16. Therefore, digital signal address lines connected to the table memory 15 can be efficiently utilized.

As a result, a lattice point positioned at an imaginary maximum coordinate value in the Y, Cr or Cb axis required to perform an accurate interpolation, for example the coordinate value 256 in case of the 8-bit input color signals or the coordinate value 1024 in case of the 10-bit input color signals, can be easily specified in the table memory 15 as one of six lattice points of a partitioned cubic block which is stored at a block address such as (7, 7, 7) in the normal mode or (15, 15, 15) in the address extension mode.

In contrast, in the prior art of the Published Unexamined Patent Applications No. 226866 of 1990 (H2-226866) and No. 226868 of 1990 (H2-226868), look-up tables of a color converting table memory are read out by accessing to an address of four lattice points of a tetrahedron. Therefore, because the number of lattice points in a color axis cannot be actually expressed by $2^N$, the number of lattice points in each of the color axes is specially altered to be expressed by $2^N$ because of the efficient utilization of address lines. As a result, the processing in the prior art becomes complicated because of the alternation of the number of lattice points, so that an interpolating error is undesirably generated in the prior art.

Figure 3:
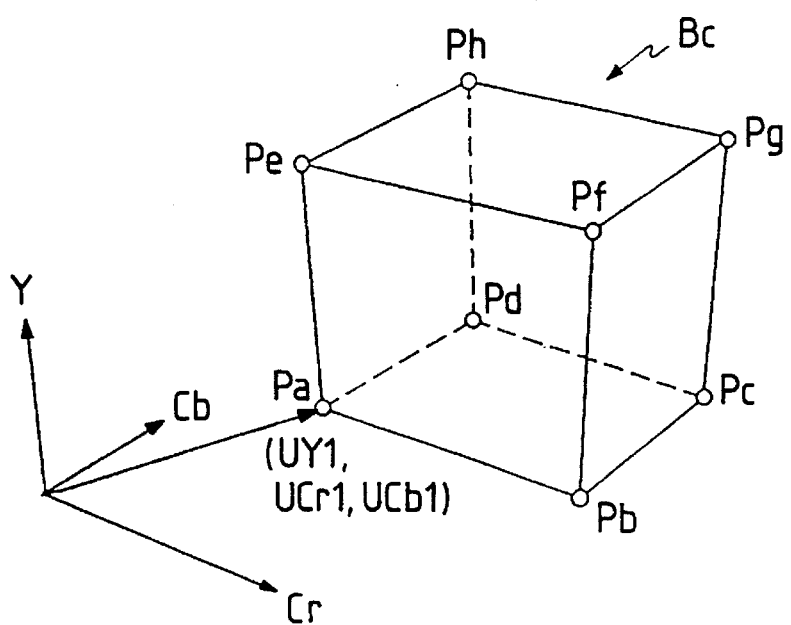
FIG. 3 shows one of the cubic blocks shown in FIGS. 2A, 2B and eight lattice points of the cubic block.

In the above configuration, the 10-bit (or 8-bit) input color signals Y, Cr, Cb are received in the input color signal receiving section 12. Thereafter, tile upper color signals UY, UCr, UCb are transmitted to the address generating section 14, the lower color signals DCr, DCb are transmitted to the partitioned triangular prism selecting section 13, and the lower color signals Y, DCr, DCb are transmitted to the partitioned triangular prism type of interpolation calculating section 17. In the generating section 14, as shown in FIG. 3, a partitioned cubic block Bc is selected from among the 512 cubic blocks in the normal mode (or the 1024 cubic blocks in the address extension mode) by detecting values UY1, UCr1, UCb1 of the upper color signals UY, UCr, UCb. That is, a partitioned cubic block numbered (UY1, UCr1, UCb1) is selected as the partitioned cubic block Bc. The partitioned cubic blocks respectively have eight lattice points (or vertexes) Pa, Pb, Pc, Pd, Pe, Pf, Pg and Ph.

Figure 4:
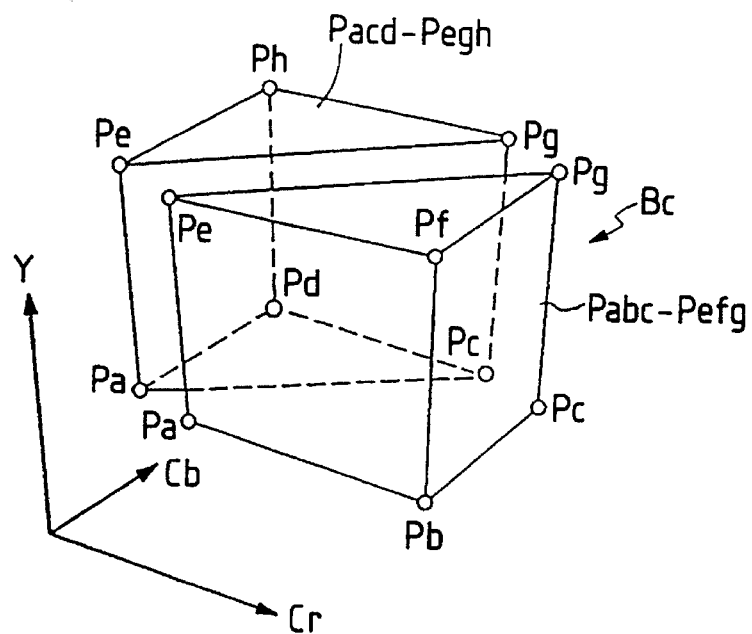
FIG. 4 shows a pair of triangular prisms obtained by partitioning the cubic block shown in FIG. 3.
Figure 5:
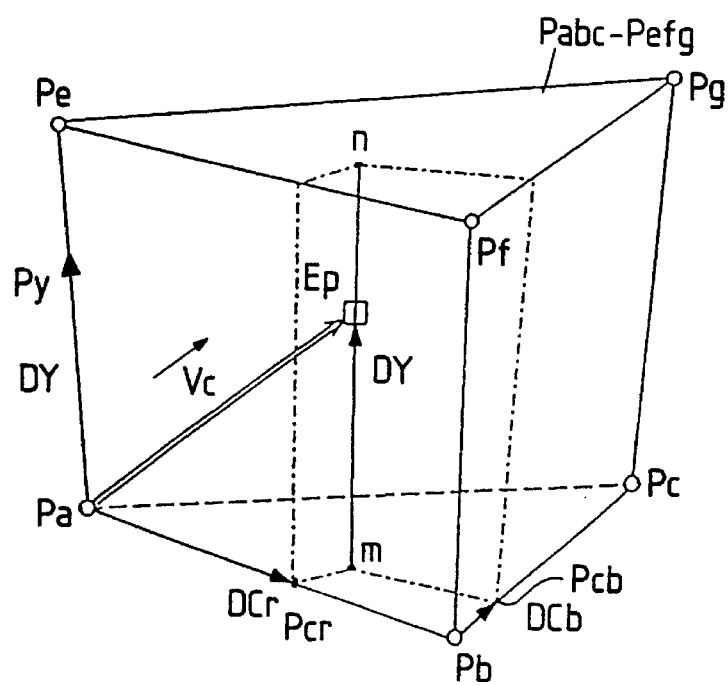
FIG. 5 shows a color vector designating an input color in one of the triangular prisms shown in FIG. 4, components of the color vector being specified by values of lower color signals DY, DCb and DCr.

Also, in the selecting section 13, a triangular prism Pt is selected from a pair of triangular prisms produced by partitioning the cubic block Bc. In detail, as shown in FIG. 4, the cubic block Bc is partitioned into a first triangular prism Pabc-Pefg and a second triangular prism Pacd-Pegh to direct major axes of the partitioned triangular prisms in a direction parallel to the Y-axis. Therefore, a color conversion including a non-linear type of color conversion is visually performed. Also, as shown in FIG. 5, values DY1, DCb1, DCr1 of the lower color signals DY, DCb, DCr denotes a color vector Vc (DY1, DCb1, DCr1) of the input color in the Y—Cb—Cr color space, and a starting point of the color vector Vc is positioned at the lattice point Pa. Therefore, which of two triangular prisms Pabc-Pefg, Pacd-Pegh is to be selected as the triangular prism Pt can be judged by checking an ending point Ep of the color vector Vc which denotes the input color of the colored picture specified by the input color signals Y, Cr and Cb. That is, in cases where the value DCr1 of the lower color signal DCr is higher than the value DCb1 of the lower color signal DCb, the triangular prism Pabc-Pefg is selected as the triangular prism Pt in the selecting section 13 because the ending point Ep of the color vector Vc is positioned in the triangular prism Pabc-Pefg. Thereafter, a triangular prism selecting signal Sp having a 1 bit length is set to "0" in the selecting section 13, and the selecting signal Sp is transmitted to the generating section 14 and the calculating section 17 to inform that the triangular prism Pabc-Pefg is selected as the triangular prism Pt. In contrast, in cases where the value DCr1 is lower than the value DCb1, the triangular prism Pacd-Pegh is selected as the triangular prism Pt in the generating section 13 because the ending point Ep of the color vector Vc is positioned in the triangular prism Pacd-Pegh. Thereafter, the selecting signal Sp set to "1" in the generating section 13 is transmitted to the generating section 14 and the calculating section 17 to inform that the triangular prism Pacd-Pegh is selected as the triangular prism Pt.

When the selecting signal Sp is received in the generating section 14, the selecting signal Sp and an address specifying signal Sa informing a block address (UY1, UCr1, UCb1) corresponding to the partitioned cubic block Bc are sent from the generating section 14 to the table memory 15 through the memory interface section 16. In the table memory 15, a color converting table is prepared at each of the block addresses. Therefore, a particular color converting table Tc stored at the block address (UY1, UCr1, UCb1) of the table memory 15 is accessed and read out.

Figure 6A:
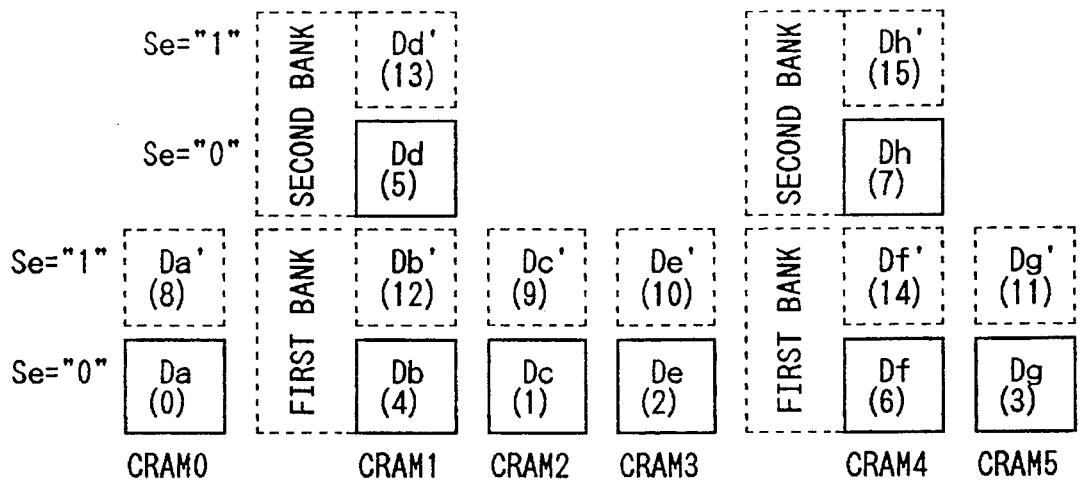
FIG. 6A shows a configuration of a color converting table prepared in a table memory shown in FIG. 1 according to the normal mode.
Figure 6B:
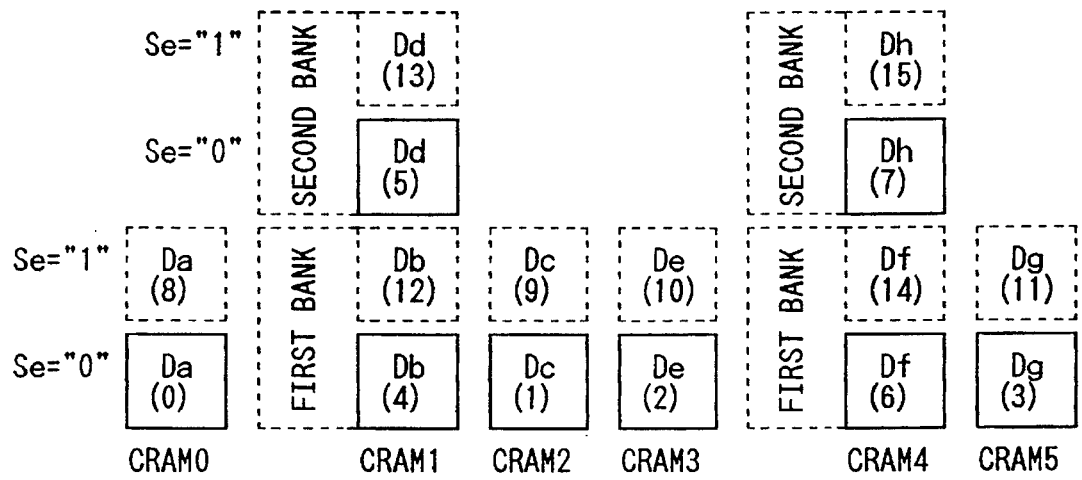
FIG. 6B shows a configuration of a color converting table prepared in a table memory shown in FIG. 1 according to the address extension mode.

FIG. 6A shows a configuration of a color converting table prepared in the table memory 15 according to the normal mode, and FIG. 6B shows a configuration of a color converting table prepared in the table memory 15 according to the address extension mode.

As shown in FIGS. 6A, 6B, each of the color converting tables prepared in the table memory 15 comprises six color converting random access memories CRAM0, CRAM1, CRAM2. CRAM3, CRAM4 and CRAM5 for storing pieces of color converting data corresponding to output values at the lattice points of a partitioned cubic block. The color converting data are defined in an output color space. In other words, the color converting data, for example, indicate a primary color having various densities in the RGB color space or the CMY color space. For example, a piece of color converting data Da at the lattice point Pa is stored in the color converting memory CRAM0, a piece of color converting data Dc at the lattice point Pc is stored in the color converting memory CRAM2, a piece of color converting data De at the lattice point Pe is stored in the color converting memory CRAM3, and a piece of color converting data Dg at the lattice point Pg is stored in the color converting memory CRAM5.

In contrast, each of the color converting memories CRAM1 and CRAM4 is composed of first and second banks. A piece of color converting data Db at the lattice point Pb is stored in the first bank of the color converting memory CRAM1, a piece of color converting data Dd at the lattice point Pd is stored in the second bank of the color converting memory CRAM1, a piece of color converting data Df at the lattice point Pf is stored in the first bank of the color converting memory CRAM4, and a piece of color converting data Dh at the lattice point Ph is stored in the second bank of the color converting memory CRAM4. The selection of the first and second banks of the color converting memories CRAM1 and CRAM4 are exchanged according to the selecting signal Sp. For example, in cases where the selecting signal Sp set to "0" is sent to the table memory 15, the color converting table Tc is specified, and the first banks of the color converting memories CRAM1 and CRAM4 in the color converting table Tc are selected, so that the color converting data Da, Db, Dc, De, Df and Dg stored in the color converting table Tc are read out from the table memory 15 as the output values at the lattice points Pa, Pb, Pc, Pe, Pf and Pg of the partitioned cubic block Pabc-Pefg selected as the triangular prism Pt. In contrast, in cases where the selecting signal Sp set to "1" is sent to the table memory 15, the color converting table Tc is specified, and the second banks of the color converting memories CRAM1 and CRAM4 in the color converting table Tc are selected, so that the color converting data Da, Dd, Dc, De, Dh and Dg stored in the color converting table Tc are read out from the table memory 15 as the output values at the lattice points Pa, Pc, Pd, Pe, Pg and Ph of the partitioned cubic block Pacd-Pegh selected as the triangular prism Pt.

Also, each of the color converting tables stored in the table memory 15 is composed of first and second color converting sub-tables. As shown in FIG. 6A, in cases where the apparatus 11 is operated according to the normal mode, the color converting data Da to Dh are stored in the first color converting sub-table, and other pieces of color converting data Da', Db', Dc', Dd', De', Df', Dg' and Dh' are stored in the second color converting sub-table to perform two types of color changes. Which of the sub-tables is selected is determined according to a sub-table exchanging signal. The detail of the exchange of the sub-tables is described later. In contrast, as shown in FIG. 6B, in cases where the apparatus 11 is operated according to the address extension mode, a piece of color converting data stored in a first color converting sub-table of a color converting memory CRAM cannot be rewritten independent of another piece of color converting data stored in a second color converting sub-table of the color converting memory CRAM because the upper color signal Y has 4-bit length. Therefore, the color converting data stored in the first and second color converting sub-tables of a color converting memory CRAM are the same.

Because the number of partitioned cubic blocks is 512, 512 color converting data are stored in each of the color converting sub-tables. Therefore, a memory capacity of each of the color converting memories CRAM0, CRAM2, CRAM3 and CRAM5 is 1024 words (512 words×2), and a memory capacity of each of the color converting memories CRAM1 and CRAM4 is 2048 words (512 words×4).

FIG. 7A shows an external address configuration of a color converting table stored in a host computer according to the normal mode, and FIG. 7B shows an external address configuration of a color converting table stored in the host computer according to the address extension mode.

As shown in FIGS. 7A and 7B, the color converting data Da to Dh (and Da' to Dh') are stored in an external memory of a host computer in an external address configuration. For example, in cases of the normal mode shown in FIG. 7A, the color converting data Da, Dc, De, Dg, Db, Df and Dh are stored at addresses (0) to (7) in that order, and the other color converting data Da', Dc', De', Dg', Db' Df' and Dh' are stored at addresses (8) to (15) in that order. In contrast, in cases of the address extension mode shown in FIG. 7B, the color converting data Da, Dc, De, Dg, Db, Df and Dh are stored at addresses (0) to (7) and addresses (8) to (15) in that order.

The color converting data Da to Dh (and Da' to Dh') stored in the external memory of the host computer are respectively transferred to the table memory 15 through the memory interface section 16 to rewrite the color converting data stored in the table memory 15 prior to the 6-point interpolation performed in the interpolation calculating section 17 with the color converting data stored in the table memory 15 and the input color signals Y, Cr, Cb received in the receiving section 12. A rewriting operation performed between the host computer and the table memory 15 is described in detail with reference to FIGS. 8A, 8B.

Figure 8A:
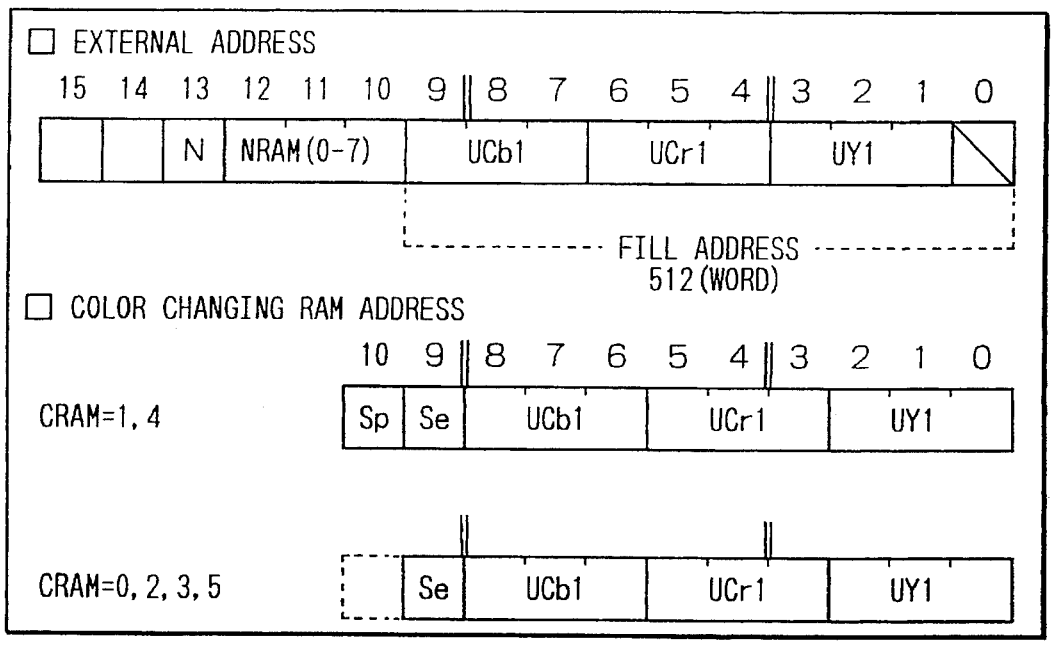
FIG. 8A shows a relationship between an external address and color converting RAM addresses in a table memory shown in FIG. 1 according to the normal mode.
Figure 8B:
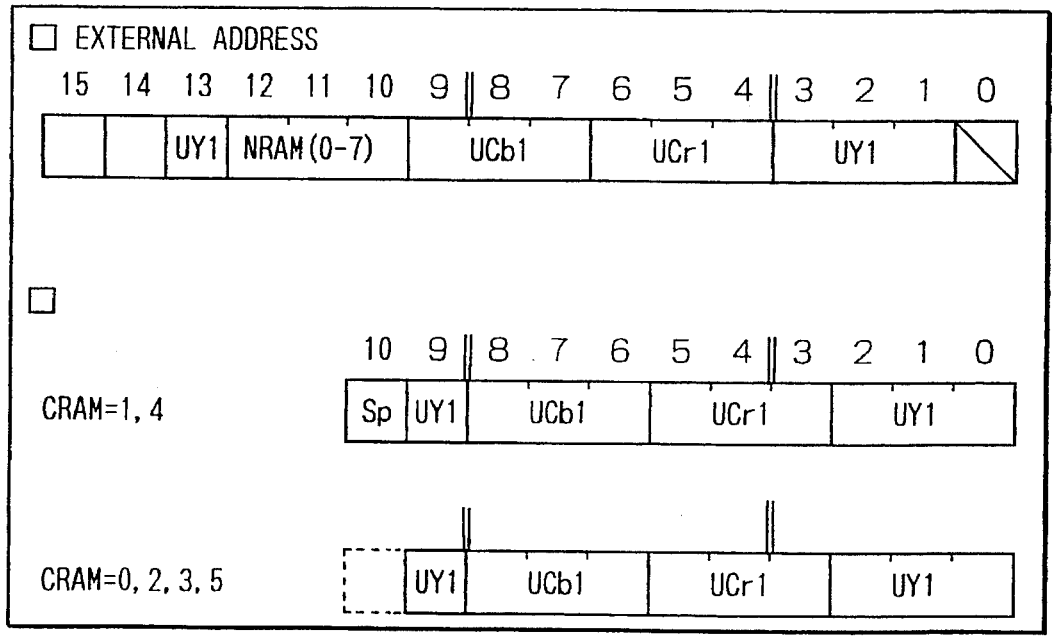
FIG. 8B shows a relationship between an external address and color converting RAM addresses in a table memory shown in FIG. 1 according to the address extension mode.

FIG. 8A shows a relationship between an external address and color converting RAM addresses in the table memory 15 according to the normal mode, and FIG. 8B shows a relationship between an external address and color converting RAM addresses in the table memory 15 according to the address extension mode.

As shown in FIGS. 8A, 8B, the table memory 15 has an external address accessed by the host computer through the memory interface section 16 and six color converting RAM addresses accessed by the address generating section 14 through the memory interface section 16.

As shown in FIG. 8A, in cases where the rewriting operation is performed according to the normal mode prior to the 6-point interpolation, a piece of 3-bit address data UY1 specifying an address in the lightness axis, a piece of 3-bit address data UCr1 specifying an address in the first color difference axis and a piece of 3-bit address data UCb1 specifying an address in the second color difference are transferred from the host computer to the external address of the table memory 15 through an address bus. The address data UY1 is allocated to bit numbers 1, 2 and 3 of the external address, the address data UCr1 is allocated to bit numbers 4, 5 and 6 of the external address, and the address data UCb1 is allocated to bit numbers 7, 8 and 9 of the external address. Therefore, a particular partitioned cubic block in the Y—Cr—Cb color space of which pieces of color converting data corresponding to output values at six lattice points are to be rewritten is specified by the address data UY1, UCr1 and UCb1. Also, a piece of 3-bit address data NRAM specifying one of the color converting memories CRAM0 to CRAM7 is allocated to bit numbers 10, 11 and 12 of the external address through the data bus. Therefore, one of the lattice points Pa to Ph of the particular partitioned cubic block is specified by the address data NRAM. In addition, a piece of 1-bit address data N specifying a type of color conversion is allocated to a bit number 13 of the external address through the data bus. A memory capacity at the bit numbers 0 to 9 of the external address is equivalent to 512 words.

Also, the values UY1, UCr1 and UCb1 of the upper 3-bit color signals UY, UCr and UCb are respectively transferred from the address generating section 14 to the color converting RAM addresses of the table memory 15 in parallel to each other. The color converting RAM addresses correspond to the color converting memories CRAM0 to CRAM5. The value UY1 is allocated to bit numbers 0 to 2 of each of the color converting RAM addresses, the value UCr1 is allocated to bit numbers 3 to 5 of each of the color converting RAM addresses, and the value UCb1 is allocated to bit numbers 6 to 8 of each of the color converting RAM addresses. Therefore, a particular partitioned cubic block Bc in the Y—Cr—Cb color space of which pieces of color converting data corresponding to output values at six lattice points are to be read out is specified by the values UY1, UCr1 and UCb1. Also, a 1-bit sub-table exchanging signal Se specifying a type of color conversion is allocated to a bit number 9 of each of the color converting RAM addresses. In addition, the triangular prism selecting signal Sp is allocated to a bit number 10 of the color converting RAM addresses corresponding to the color converting memories CRAM1 and CRAM4. Therefore, in cases where the selecting signal Sp is "0", as shown in FIG. 6A, the color converting data Db and Df (or Db' and Dr') are read out from the color converting memories CRAM1 and CRAM4 to the calculating section 17. In cases where the selecting signal Sp is "1", the color converting data Dd and Dh (or Dd' and Dh') are read out from the color converting memories CRAM1 and CRAM4 to the calculating section 17. A memory capacity at the bit numbers 0 to 8 of the color converting RAM is equivalent to 512 words. Therefore, an address space having 2048 words is formed in each of the color converting memories CRAM1 and CRAM4, and an address space having 1024 words is formed in each of the color converting memories CRAM0, CRAM2, CRAM3 and CRAM5.

In contrast, as shown in FIG. 8B, in cases where the rewriting operation is performed according to the address extension mode prior to the 6-point interpolation, a piece of 4-bit address data AY1 specifying an address in the lightness axis is allocated to bit numbers 1, 2, 3 and 13 of the external address. Therefore, any 1-bit address data N specifying a type of color conversion is not allocated to the bit number 13 of the external address, so that the color converting data stored in the first and second color converting sub-tables of each of the color converting memory CRAM are the same. Also, the allocation of values and signals to the color converting RAM addresses in the address extension mode is the same as that in the normal mode.

Next, a storing process for storing pieces of color converting data transferred from the host computer at the six lattice points of the particular partitioned cubic block specified by the address data UY1, UCr1 and UCb1 as the output values is described with reference to FIG. 9A, 9B.

Figure 9A:
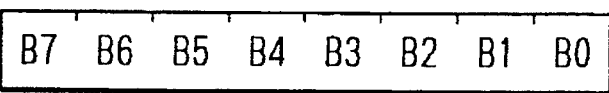
FIG. 9A shows a piece of color converting data stored in the external address of the table memory shown in FIGS. 8A, 8B in cases where a piece of color converting data has a 10bit length.
Figure 9A:
Figure 9A:
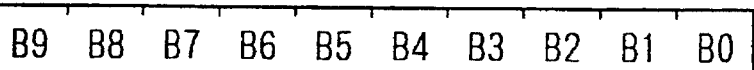
Figure 9B:
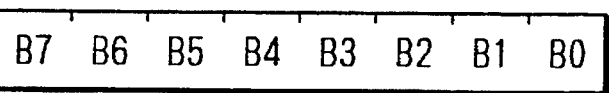
FIG. 9B shows a piece of color converting data stored in the external address of the table memory shown in FIGS. 8A, 8B in cases where a piece of color converting data has a 8-bit length.
Figure 9B:
Figure 9B:
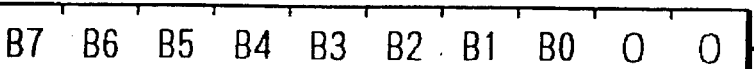

FIG. 9A shows a piece of color converting data stored in the external address of the table memory 15 shown in FIGS. 8A, 8B in cases where the color converting data has a 10-bit length, and FIG. 9B shows a piece of color converting data stored in the external address of the table memory 15 shown in FIGS. 8A, 8B in cases where the color converting data has a 8-bit length.

As shown in FIGS. 9A and 9B, pieces of color converting data respectively having a 10-bit length can be stored in the table memory 15. However, a type of 10-bit color converting data or another type of 8-bit color converting data can be arbitrarily selected. The selection of tile type can be set regardless of whether the input color signals Y, Cr and Cb and an interpolated output color signal output from the calculating section 17 respectively have 8 bits or 10 bits. The reason is because the color converting data selected are treated as the 10-bit length to perform the 6-point interpolation in the calculating section 17. That is, even though a piece of 8-bit color converting data is selected, a piece of 10-bit color converting data having the 8-bit color converting data at upper 8 bits and a "00" value at lower 2 bits is imaginarily treated. Therefore, one of four types of combinations of the bit length of the input/output color signals and the color converting data can be selected as shown in FIG. 9C.

As shown in FIG. 9A, in cases where a piece of 10-bit color converting data is stored in the table memory 15, a lower byte of color converting data composed of B0 to B7 is stored in even numbers of the addresses of the external address shown in FIGS. 8A, 8B, and an upper byte of color converting data composed of B8 and B9 is stored in odd numbers of the addresses of the external address. Therefore, it is required to transfer the 10-bit color converting data from the host computer to the table memory 15 through a data bus according to a 16-bit transfer, or it is required to transfer the 10-bit color converting data twice in sequence according to an 8-bit transfer. Therefore, a data capacity transferred is increased.

In contrast, as shown in FIG. 9B, in cases where a piece of 8-bit color converting data is stored in the table memory 15, the color converting data composed of B0 to B7 is stored in only the even numbers of the addresses of the external address. Therefore, the 8-bit color converting data can be transferred at a time by performing an 8-bit transfer.

Therefore, because it is required to shorten a rewriting time of the color converting data by reducing the data capacity transferred in cases where an interactive color converting operation is performed with a color collector, the use of the 8-bit color converting data is available.

However, the color converting data utilized in the calculating section 17 are respectively stored in a signed 10-bit configuration of the table memory 15. Therefore, in cases where the color converting data have a 8-bit length, an error occurs in each of the color converting data. As a result, upper and lower values of the color converting data are limited. For example, in case of the type 1 of the table 1, when the 8-bit input/output color signals are utilized in the apparatus 11, pieces of signed 8-bit data are utilized as the color converting data as is described later in detail. That is, because 1 bit is utilized for a sign in each of the color converting data, an absolute value of each of the color converting data is substantially stored in a piece of 7-bit data. Therefore, in cases where an even value is given to each of the color converting data as is described later, the values of the color converting data only range from 0 to 254. Therefore, an interpolation accuracy in the calculating section 17 deteriorates. A trade-off between a transferring capacity of the color converting data and the range of the color converting data at the lattice points of the partitioned cubic blocks is shown in FIG. 9D.

Next, an idea utilizing pieces of signed color converting data in the apparatus 11 is described with reference to FIGS. 10A, 10B prior to the description of the calculating section 17 to explain the necessity of the signed color converting data for the purpose of obtaining a clipping characteristic.

FIG. 10A shows an interpolation result according to a conventional interpolation process to depict that a clipping characteristic is not obtained, and FIG. 10B shows an interpolation result obtained in the calculating section 17 according to an interpolation process of the first embodiment to depict that a clipping characteristic is completely obtained because of the utilization of the signed color converting data.

An idea for obtaining a clipping characteristic is described. In cases where a desired output to be ideally obtained in the calculating section 17 is maintained to zero until an input equivalent to one of the values of the input color signals Y, Cr and Cb reaches a first threshold T1 and the desired output is suddenly raised after the input is over the first threshold T1, the clipping characteristic is required to accord an output calculated in the calculating section 17 according to a 6-point interpolation with the desired output. Also, in cases where the desired output increases until the input reaches a second threshold T2 and the desired output is maintained to a constant value after the input is over the second threshold T2, the clipping characteristic is also required to accord the output with the desired output.

As shown in FIGS. 10A, 10B, in cases where the input and the output are respectively indicated by a piece of 8-bit color data, the input and output respectively range from 0 to 255. Also, a desired output line Lo1 (a dotted line) is raised at the first threshold T1 (64<T1<128) of the input and reaches a value 255 at the second threshold T2 (192<T2<255) of the input, and values of the output are specified in advance at lattice points 0, 64, 128,192 and 256 of the input in an input axis. In case of a conventional interpolation shown in FIG. 10A, the value of the output at the lattice point 64 of the input is undesirably preset to zero because the nearest lattice point to the first threshold T1 is "64", and the value of the output at the lattice point 256 of the input is undesirably preset to 255 because the nearest lattice point to the second threshold T2 is "256". Therefore, in cases where the output is interpolated with the preset values of the output according to a conventional interpolation, an interpolated output line Lo2 (a solid line) shown in FIG. 10A is undesirably obtained. That is, the interpolated output line Lo2 considerably differs from the desired output line Lo1 in the neighborhood of the first and second thresholds T1, T2 of the input. Accordingly, an output color of a colored picture displayed on an image plane or printed on a paper cannot be converted according to the input color signals Y, Cr and Cb at a high accuracy.

In contrast, in case of the first embodiment of the present invention shown in FIG. 10B, pieces of signed color converting data having 8-bit length are utilized to store the signed color converting data in the table memory 15. Also, values of the output indicated by the signed 8-bit color converting data are limited to even numbers (or odd numbers). Therefore, even though a bit length in the signed 8-bit color converting data utilized to indicate absolute values of the output is 7 bits, the output ranging from −256 to 255 can be expressed with the signed 8-bit color converting data. Therefore, a wide-ranged output is formed in the range from −256 to 255 by presetting values of the output at lattice points 0, 64, 128,192 and 256 of the input. Thereafter, a wide-ranged output line Lo3 is calculated with the wide-ranged preset output according to the 6-point interpolation in the calculating section 17. Thereafter, the wide-ranged output line Lo3 is shifted in a positive direction to overlap the wide-ranged output line Lo3 to the desired output line LO1, so that the desired output line Lo1 can be reproduced at high accuracy by the wide-ranged output line Lo3 shifted. In other words, even though the signed color converting data having 8-bit length in the same manner as that in the conventional interpolation shown in FIG. 10A are utilized, the clipping characteristics can be obtained. Accordingly, an output color of a colored picture displayed on an image plane or printed on a paper can be converted according to the input color signals Y, Cr and Cb at a high accuracy.

Next, an idea utilizing pieces of signed color converting data is described with reference to FIGS. 11A, 11B prior to the description of the calculating section 17 to explain the necessity of the signed color converting data for the purpose of obtaining a through characteristic.

FIG. 11A shows an interpolation result according to a conventional interpolation process to depict that a through characteristic is not obtained, and FIG. 11B shows an interpolation result obtained in the calculating section 17 according to an interpolation process of the first embodiment to depict that a through characteristic is completely obtained because of the utilization of the signed color converting data.

The through characteristic is defined as a characteristic that an output having the same value as that of an input is output in the entire range of the values of the input.

As shown in FIGS. 11A, 11B, the input and the output are respectively indicated by a piece of 8-bit color data in the same manner as those shown in FIGS. 10A, 10B, and the input and the output respectively range from 0 to 255. A desired relationship between the input X and output Y is X=Y to obtain the through characteristic. Therefore, in cases where values of the output are preset to 0, 64, 128, 192 and 256 in advance corresponding to lattice points 0, 64, 128, 192 and 256 of the input in an input axis, a desired output line Lo4 (a dotted line) is formed by interpolating the output in the range from 0 to 256 with the preset values of the output. That is, the through characteristic can be obtained. However, because the output is indicated by the 8-bit color data, the values of the output are limited to a range from 0 to 255 in a conventional interpolation. Therefore, as shown in FIG. 11A, the value of the output at the lattice point 256 of the input is undesirably preset to 255, and an interpolated output line Lo5 (a solid line) is formed according to a conventional interpolation. As a result, the through characteristic cannot be obtained in an input range from 192 to 256. Accordingly, an output color of a colored picture displayed on an image plane or printed on a paper cannot be converted according to the input color signals Y, Cr and Cb at a high accuracy.

In contrast, in case of the first embodiment of the present invention shown in FIG. 11B, the output ranging from −256 to 255 can be expressed with pieces of signed 8-bit color converting data in the same manner. Therefore, values of the output are preset to −128, −64, 0, 64 and 128 in advance corresponding to lattice points 0, 64, 128, 192 and 256 of the input. Thereafter, an interpolated output line Lo6 is calculated with the preset values of the output according to an interpolation process in the calculating section 17. Thereafter, the interpolated output line Lo6 is shifted in a positive direction to accord the line Lo6 with the desired output line Lo4, so that the desired output line Lo1 can be reproduced at high accuracy. Accordingly, an output color of a colored picture displayed on an image plane or printed on a paper can be converted according to the input color signals Y, Cr and Cb at a high accuracy.

Next, a method for preparing pieces of signed color converting data to obtain the clipping and through characteristics is described with reference to FIGS. 12, 13.

In this embodiment, it is required to store not only positive values but also negative values in the table memory 15 as the color converting data for the purpose of obtaining clipping and through characteristics as is described in FIGS. 10, 11. In cases where values ranging from 0 to 255 are treated as the color converting data because an 8-bit colored picture processing is performed, pieces of 9-bit data are required to store negative values ranging from −256 to −1 as those of the color converting data. In this case, the advantage of the utilization of the 8-bit color converting data described in FIG. 9B cannot be obtained. Therefore, even values or odd values ranging from −256 to 255 are limitedly utilized as the values of the color converting data in this embodiment to express the color converting data ranging from −256 to 255 in the 8-bit length.

A method for utilizing pieces of signed color converting data is initially described in detail in case of the type No. 4 shown in FIG. 9C in which each of the color converting data are stored in a 10-bit length configuration.

Figure 12:
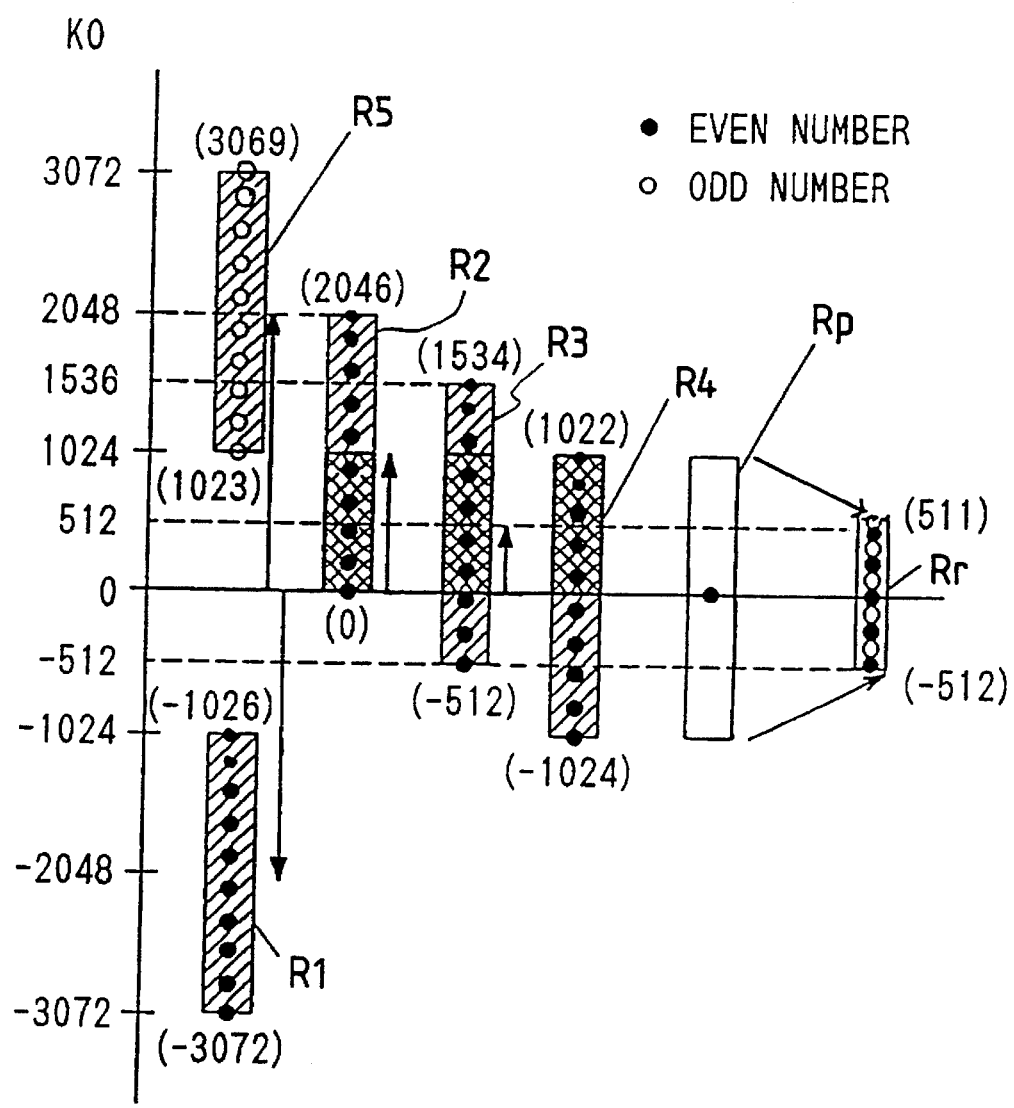
FIG. 12 shows a displacing and reducing relationship between a widened range of the singed color converting data at the lattice points of the partitioned cubic blocks and a reduced range of the signed color converting data indicating various densities of a component of an output color in cases where the signed color converting data has a 10-bit length.

FIG. 12 shows a displacing and reducing relationship between a widened range of the singed color converting data at the lattice points of the partitioned cubic blocks and a reduced range of the signed color converting data indicating various densities of a component of an output color in cases where the signed color converting data has a 10-bit length.

Because the bit length of the signed color converting data is 10 bits, a value ranging from −512 to 511 is intrinsically expressed by each of the signed color converting data. However, because an even number or an odd number is limitedly utilized as a value of each of the signed color converting data in this embodiment, the range of the value expressed by the signed 10-bit data is doubled. For example, as shown in FIG. 12, in cases where an even number is limitedly utilized as a value of each of the signed color converting data, the values of the signed color converting data can be arbitrarily expressed in a first widened range R1 from −3072 to −1026, a second widened range R2 from 0 to 2046, a third widened range R3 from −512 to 1534, a fourth widened range R4 from −1024 to 1022, or the like. Values to be set in the widened ranges are designated by black circle points in FIG. 12. Also, in cases where an odd number is limitedly utilized as a value of each of the signed color converting data, the values of the signed color converting data can be arbitrarily expressed in a doubled range such as a fifth widened range R5 from 1023 to 3069 or the like. Values to be set in the widened ranges are designated by white circle points in FIG. 12. In cases where values of the signed color converting data are stored in the table memory 15 in one of the widened ranges, six pieces of signed color converting data selected are transferred from the table memory 15 to the calculating section 17, and a piece of interpolated output data Do is obtained with the signed color converting data transferred. A value K0 of the interpolated output data Do is set in the same widened range as that in the signed color converting data. Thereafter, the value K0 of the interpolated output data Do is shifted by a displacement value OFFSET in the calculating section 17 to forcibly convert the widened range in the interpolated output data Do to a preparing widened range Rp from −1024 to 1022. Thereafter, the preparing widened range Rp is reduced to ½ according to a software operation, so that a reduced value Vr of the interpolated output data is set in a reduced range Rr from −512 to 511. In this case, because the preparing widened range Rp is reduced to the reduced range Rr, the reduced value Vr of the interpolated output data Do is an integral number regardless of whether the value K0 of the interpolated output data is limitedly set to an even number or an odd number. Also, the reduced value Vr is expressed with the values K0, OFFSET according to an equation (5).

$$Vr=(K0-\text{OFFSET})/2, -2048 \leq \text{OFFSET} \leq 2047 \quad (5)$$

For example, the value OFFSET is −2048 in case of the selection of the first widened range R1, the value OFFSET is +1024 in case of the selection of the second widened range R2, the value OFFSET is +512 in case of the selection of the third widened range R3, the value OFFSET is zero in case of the selection of the fourth widened range R4, and the value OFFSET is +2047 in case of the selection of the fifth widened range R5. Also, in cases where the value OFFSET is fixed, the value K0 is limited in a range from K0min to K0max and is expressed according to an equation (6).

$$K0\text{min}=\text{OFFSET}-1024$$

$$K0\text{max}=\text{OFFSET}+1022 \quad (6)$$

Next, a method for utilizing pieces of signed color converting data is initially described in detail in case of the type No. 1 shown in FIG. 9C in which each of the color converting data are stored in an 8-bit length configuration.

Figures 13A, 13B:
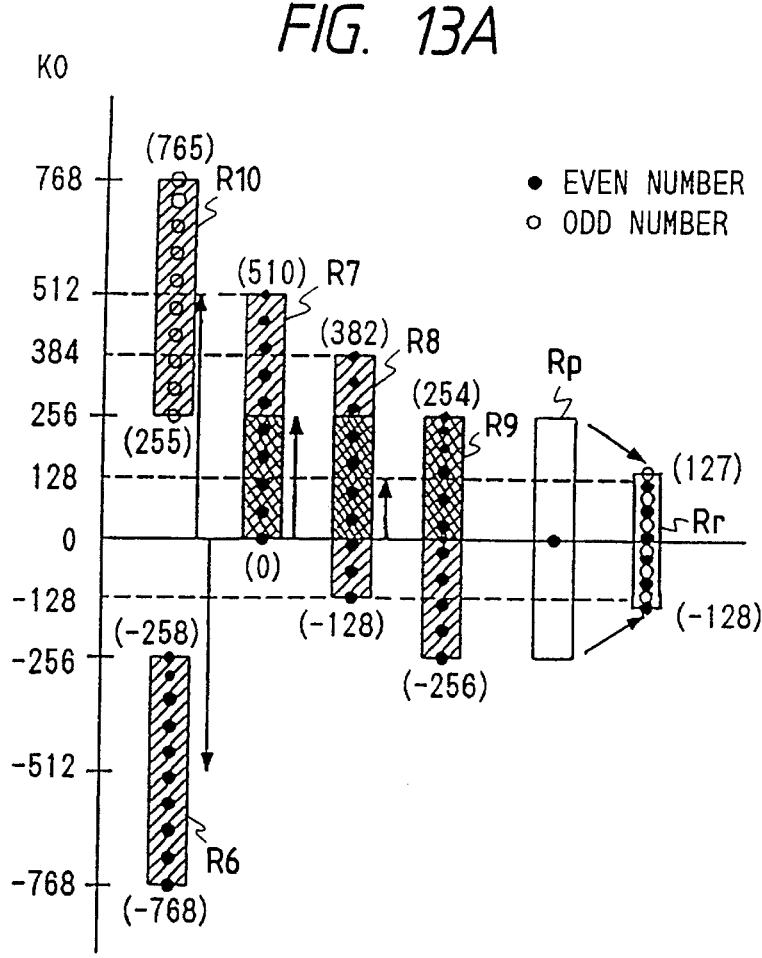
FIG. 13A shows a displacing and reducing relation ship between a widened range of the singed color converting data at the lattice points of the partitioned cubic blocks and a reduced range of the signed color converting data indicating various densities of a component of an output color in cases where the signed color converting data has an 8-bit length.
FIG. 13B shows conditions that various color changes are performed while obtaining a through characteristic under the classification of the types shown in FIG. 9C.

FIG. 13A shows a displacing and reducing relation ship between a widened range of the singed color converting data at the lattice points of the partitioned cubic blocks and a reduced range of the signed color converting data indicating various densities of a component of an output color in cases where the signed color converting data has an 8-bit length.

Because the bit length of the signed color converting data is 8 bits, a value ranging from −128 to 127 is intrinsically expressed by each of the signed color converting data. However, because an even number or an odd number is limitedly utilized as a value of each of the signed color converting data in this embodiment, the range of the values expressed by the signed 8-bit data is doubled. For example, as shown in FIG. 13A, in cases where an even number is limitedly utilized as a value of each of the signed color converting data, the values of the signed color converting data can be arbitrarily expressed in a first widened range R6 from −768 to −258, a second widened range R7 from 0 to 510, a third widened range R8 from −128 to 382, a fourth widened range R9 from −256 to 254, or the like. Values to be set in the widened ranges are designated by black circle points in FIG. 13. Also, in cases where an odd number is limitedly utilized as a value of each of the signed color converting data, the values of the signed color converting data can be arbitrarily expressed in a doubled range such as a fifth widened range R10 from 255 to 765 or the like. Values to be set in the widened ranges are designated by white circle points in FIG. 13. In cases where values of the signed color converting data are stored in the table memory 15 in one of the widened ranges, six pieces of signed color converting data selected are transferred from the table memory 15 to the calculating section 17, and a piece of interpolated output data Do is obtained with the signed color converting data transferred. A value K0 of the interpolated output data Do is set in the same widened range as that in the signed color converting data. Thereafter, the value K0 of the interpolated output data Do is shifted by a displacement value OFFSET in the calculating section 17 to forcibly convert the range in the interpolated output data Do to a preparing widened range Rp from −256 to 254. Thereafter, the preparing widened range Rp is reduced to ½, so that a reduced value Vr of the interpolated output data is set in a reduced range Rs from −128 to 127. In this case, because the preparing widened range Rp is reduced to the reduced range Rr, the reduced value Vr of the interpolated output data Do is an integral number regardless of whether the value K0 of the interpolated output data is limitedly set to an even number or an odd number. Also, the reduced value Vr is expressed with the values K0, OFFSET according to an equation (7).

$$Vr=(K0-OFFSET)/2, -512 \leq OFFSET \leq 511 \quad (7)$$

For example, the value OFFSET is −512 in case of the selection of the first widened range R6, the value OFFSET is +256 in case of the selection of the second widened range R7, the value OFFSET is +128 in ease of the selection of the third widened range R8, the value OFFSET is zero in case of the selection of the fourth widened range R9, and the value OFFSET is +511 in case of the selection of the fifth widened range R10. Also, in cases where the value OFFSET is fixed, the value K0 is limited in a range from K0min to K0max and is expressed according to an equation (8).

$$K0min=OFFSET-256$$

$$K0max=OFFSET+254 \quad (8)$$

Figure 17A:
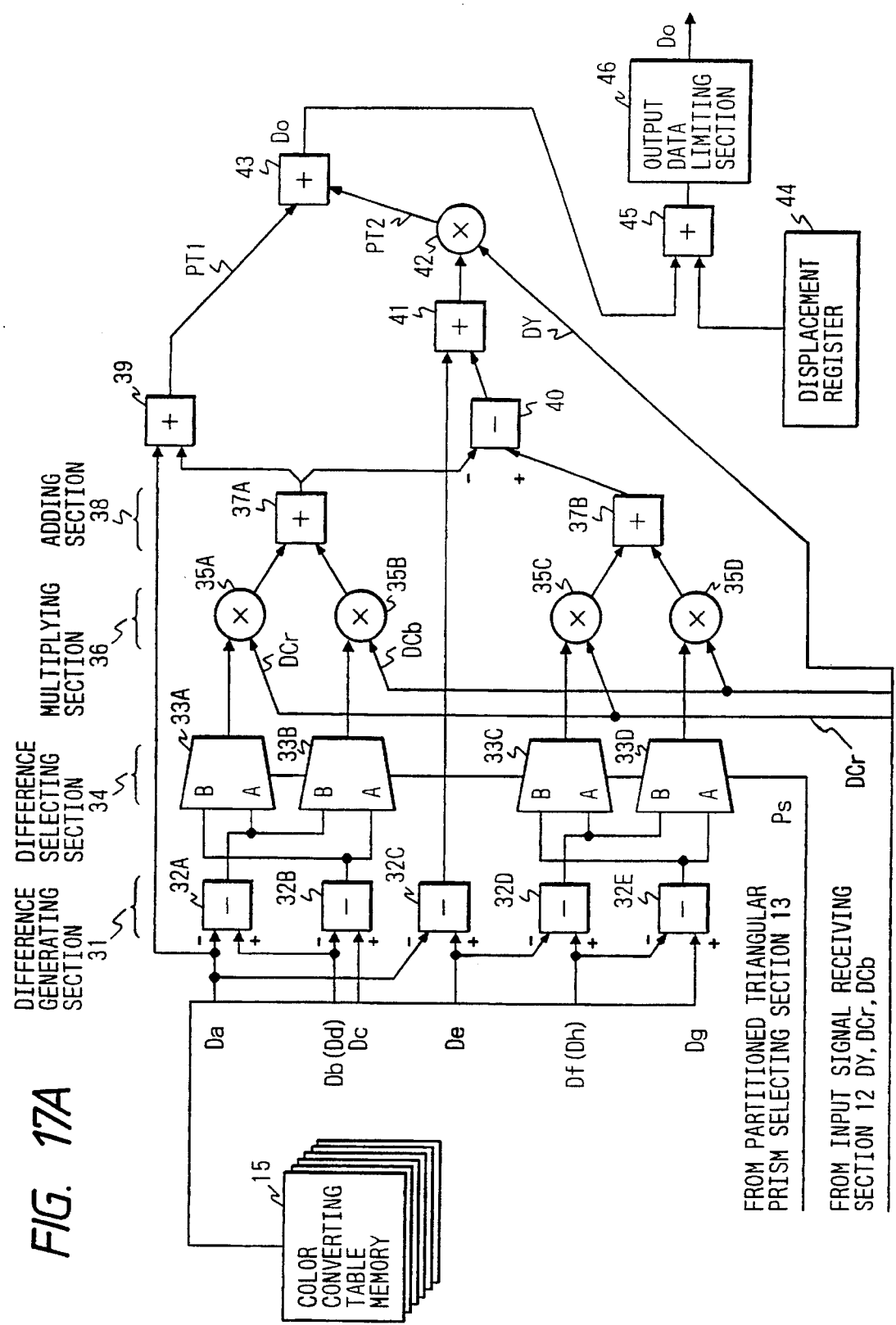
FIG. 17A is a block diagram of a calculating section shown in FIG. 1.

Next, a method of the utilization of the displacement value OFFSET is described. In cases where the type No. 1 shown in FIG. 9C is adopted in the apparatus 11, the values of the signed color converting data are expressed by even numbers ranging from −256 to 254 when the displacement value OFFSET is zero. However, the even number 256 is required to obtain the through characteristic. Therefore, a minimum value of the displacement value OFFSET is 2 to range the values of the signed color converting data from −254 to 256. In this case, the limitation that the values of tile signed color converting data are expressed by even numbers does not adversely influence on the through characteristic. The reason is as follows. In cases where the through characteristic is obtained, the values of the signed color converting data stored in the table memory 15 (expressed as the output in FIG. 11B) are limited to even numbers because the coordinate values at the lattice points of the cubic blocks (expressed as the input in FIG. 11B) are expressed by even numbers in the Y—Cr—Cb color space. To set the range of the values of the signed color converting data to a dynamic range in which various color changes can be performed on condition that the through characteristic is obtained, there is an idea that a positive margin range positioned over a maximum value of 255 at an output data limiting section is equalized with a negative margin range positioned under a minimum value of 0 at the output data limiting section. The operation of the output data limiting section numbered by a referential numeral 46 in FIG. 17A is described later. The above idea is equivalent to an idea in which the values of the signed color converting data are set in the third range R3 or R8. The conditions that various color changes are performed while obtaining the through characteristic are shown in FIG. 9C under the classification of the types shown in FIG. 9C.

Next, a 6-point interpolation performed in the calculating section 17 is described in brief.

After the color converting data transferred from the host computer are stored in the table memory 15 or the color converting data stored in the table memory 15 are rewritten, the particular color converting table Tc stored at the block address (UY1, UCr1, UCb1) of the table memory 15 is accessed and read out to the calculating section 17.

In the calculating section 17, a piece of color converting output data is interpolated and determined with six color converting data at six lattice points of the particular triangular prism Pt in an output color space according to a 6-point interpolation while weighting the six color converting data with interpolation weighting factors DY1, DCr1 and DCb1 indicated by the lower color signals DY, DCb and DCr in the Y— Cb—Cr color space. That is, one output is obtained by receiving three input signals in the apparatus 11. Therefore, in cases where three pieces of output data indicating an output color in the LAB color space are required, pieces of first color converting data corresponding to an L component in the LAB color space are initially stored in the table memory, and a piece of first output data indicating an L output component of the output color is calculated with the first color converting data in the calculating section 17. Thereafter, the first color converting data in the LAB color space are rewritten to pieces of second color converting data corresponding to an A component in the LAB color space, and a piece of second output data indicating an A output component of the output color is calculated with the second color converting data in the calculating section 17. Thereafter, the second color converting data in the LAB color space are rewritten to pieces of third color converting data corresponding to a B component in the LAB color space, and a piece of third output data indicating a B output component of the output color is calculated with the third color converting data in the calculating section 17. Therefore, the output color indicated by the first, second and third output data can be obtained in the apparatus 11.

Also, in cases where three combinations of the table memory 15 and the calculating section 17 are provided in parallel, the first, second and third output data indicating the output color can be obtained at a time by receiving the three input color signals Y, Cr and Cb. In addition, in cases where four combinations of the table memory 15 and the calculating section 17 are provided in parallel, a piece of cyan output data, a piece of magenta output data, a piece of yellow output data and a piece of black output data indicating an output color in the CMY color space can be obtained at a time by receiving a red input signal, a green input signal and a blue input signal indicating an input color in the RGB color space.

Next, a principle of the 6-point interpolation performed in the calculating section 17 is mathematically described with reference to FIGS. 5, 14, 15 and 16.

Figure 14:
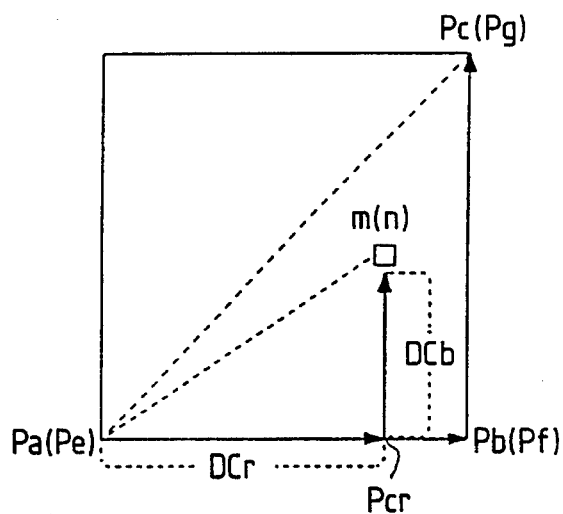
FIG. 14 shows a plan view of a Pabc-Pefg triangular prism shown in FIG. 5, the Pabc-Pefg triangular prism being observed from a positive point of a Y axis.
Figure 16:
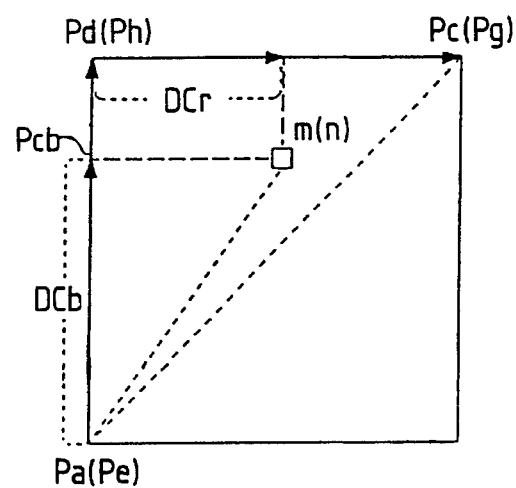
FIG. 16 shows a plan view of the Pacd-Pegh triangular prism shown in FIG. 15, the Pacd-Pegh triangular prism being observed from a positive point of the Y axis.
Figure 15:
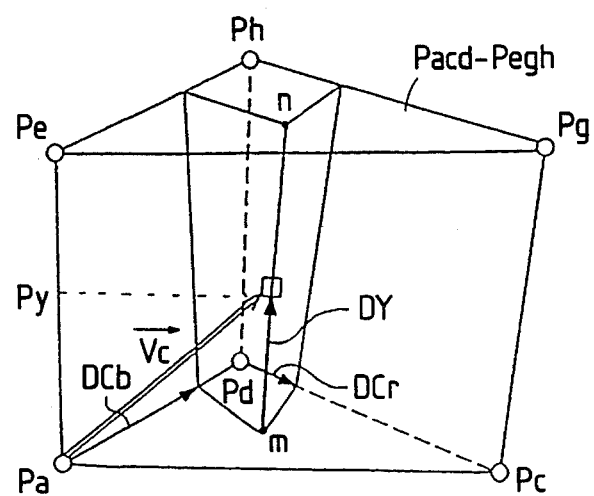
FIG. 15 shows an input color designated by a color vector Vc and interpolation weighting factors DY1, DCr1 and DCb1 in a Pacd-Pegh triangular prism shown in FIG. 4.

FIG. 14 shows a plan view of a Pabc-Pefg triangular prism shown in FIG. 5, the Pabc-Pefg triangular prism being observed from a positive point of the Y axis. FIG. 15 shows an input color designated by a color vector Vc and interpolation weighting factors DY1, DCr1 and DCb1 in a Pacd-Pegh triangular prism shown in FIG. 4. FIG. 16 shows a plan view of the Pacd-Pegh triangular prism shown in FIG. 15, the Pacd-Pegh triangular prism being observed from a positive point of the Y axis.

A partitioned cubic solid is specified by the upper color signals UY, UCb and UCr in the Y—Cb—Cr color space. That is, the lattice point Pa of the partitioned cubic solid specified are expressed by coordinates (UY1, UCb1, UCr1) which agree with the values UY1, UCb1 and UCr1 of the upper color signals Y, Cb and Cr. Thereafter, coordinates of the input color are specified by the lower color signals DY, DCb and DCr in the Y— Cb—Cr color space. That is, as shown in FIG. 5, the values DY1, DCb1, DCr1 of the lower color signals DY, DCb, DCr denotes the color vector Vc (DY1, DCb1, DCr1) of the input color in the Y—Cb—Cr color space. The value DY1 denotes a first ratio R1 ($0 \leq R1 \leq 1$) of a distance between points Py, Pa to a distance between points Pa, Pe, the value DCr1 denotes a second ratio R2 ($0 \leq R2 \leq 1$) of a distance between points Pcr, Pa to a distance between points Pa, Pb, and the value DCb1 denotes a third ratio R3 ($0 \leq R3 \leq 1$) of a distance between points Pcb, Pa to a distance between points Pa, Pd. The starting point of the color vector Vc is positioned at the lattice point Pa (UY1, UCb1, UCr1), and the ending point Ep of the color vector Vc is positioned at coordinates corresponding to the input color of the colored picture specified by the input color signals Y, Cr and Cb in the Y—Cb—Cr color space. Therefore, one component of an output color in an output color space which corresponds to the input color in the Y—Cb—Cr color space can be obtained as a piece of color converting data Do at the ending point Ep. In this embodiment, the color converting data Do is interpolated with the color converting data Da, Db (or Dd), Dc, De, Df (or Dh) and Dg in the output color space according to the 6-point interpolation while weighting the color converting data with the values DY1, DCb1 and DCr1 of the lower color signals DY, DCb and DCr.

In a first stage of the 6-point interpolation in cases of the selecting signal Se="0", a straight line through the end point Ep and parallel to the Y-axis is drawn, and a first intersection m of the straight line and a triangular plane Pabc and a second intersection n of the straight line and a triangular plane Pefg are obtained. Thereafter, a piece of color converting data Dm at the first intersection m is interpolated with the color converting data Da, Db and Dc while weighting the data Dm with the values DCb1 and DCr1. In detail, as shown in FIG. 14, in cases where the triangular prism Pabc-Pefg shown in FIG. 5 is observed from a positive point in the Y axis, the end point Ep and the intersections m, n are overlapped. Also, the lattice points Pa, Pe, the lattice points Pb, Pf and the lattice points Pc, Pg are respectively overlapped. Therefore, a first increment at the point Pcr to the lattice point Pa is equal to DCr1*(Db–Da) because the value DCr1 denotes the second ratio R2, and a second increment at the first intersection m to the point Pcr is equal to DCb1*(Dc–Db) because the value DCb1 denotes the third ratio R3. As a result, the color converting data Dm is interpolated according to an equation (9).

$$Dm = Da + DCr1*(Db-Da) + DCb1*(Dc-Db) \quad (9)$$

In a second stage of the 6-point interpolation in cases of the selecting signal Se="0", a piece of color converting data Dn at the second intersection n is interpolated in the same manner according to an equation (10).

$$Dn = De + DCr1*(Df-De) + DCb1*(Dg-Df) \quad (10)$$

In a third stage of the 6-point interpolation in cases of the selecting signal Se="0", the color converting data Do at the ending point Ep is linearly interpolated with the color converting data Dm, Dn according to an equation (11).

$$Do = (1-DY1)*Dm + DY1*Dn \quad (11)$$

Accordingly, the color converting data Do can be expressed as follows by substituting the equations (9), (10) into the equation (11).

$$\begin{aligned} Do = &\ Da + DCr1*(Db-Da) + DCb1*(Dc-Db) + \\ & DY1*\{De - Da + DCr1*(Df - De) + \\ & DCb1*(Dg - Df) - DCr1*(Db - Da) - \\ & DCb1*(Dc - Db)\} \end{aligned} \quad (12)$$

Also, in cases where the selecting signal Se is set to "1", the end point Ep is positioned in the triangular prism Pacd-Pegh as shown in FIGS. 15, 16. Therefore, in a first stage of the 6-point interpolation, a piece of color converting data Dm at a first intersection of a triangular plane Pacd is interpolated according to an equation (13).

$$Dm = Da + DCr1*(Dc-Dd) + DCb1*(Dd-Da) \quad (13)$$

In a second stage of the 6-point interpolation, a piece of color converting data Dn at a second intersection of a triangular plane Pegh is interpolated according to an equation (14).

$$Dn = De + DCr1*(Dg-Dh) + DCb1*(Dh-De) \quad (14)$$

Therefore, the color converting data Do at the ending point Ep can be expressed in a third stage of the 6-point interpolation by substituting the equations (13), (14) into the equation (11).

$$\begin{aligned} Do = &\ Da + DCr1*(Dc - Dd) + DCb1*(Dd - Da) + \\ & DY1*\{De - Da + DCr1*(Dg - Dh) + \\ & DCb1*(Dh - De) - DCr1*(Dc - Dd) - \\ & DCb1*(Dd - Da)\} \end{aligned} \quad (15)$$

Next, the 6-point interpolation performed in the calculating section 17 is described in detail according to the principle of the 6-point interpolation with reference to FIG. 17A.

FIG. 17A is a block diagram of the calculating section 17 shown in FIG. 1.

In cases where the selecting signal Se set to "0" is transferred to the generating section 14, six pieces of color converting data Da, Db, Dc, De, Df and Dg at the lattice points Pa, Pb, Pc, Pe, Pf and Pg of the partitioned cubic block Bc which is specified by the generating section 14 are read out from the particular color converting table Tc stored at the block address (UY1, UCr1, UCb1) of the table memory 15 to a difference generating section 31 of the calculating section 17 shown in FIG. 17A. Also, in cases where the selecting signal Se set to "1" is transferred to the generating section 14, six pieces of color converting data Da, Dd, Dc, De, Dh and Dg at the lattice points Pa, Pd, Pc, Pe, Ph and Pg of the partitioned cubic block Bc are read out from the particular color converting table Tc to the difference generating section 31 of the calculating section 17.

The difference generating section 31 comprises five subtracters 32A to 32E arranged in parallel for respectively generating a difference between two color converting data. In the difference generating section 31, five differences are generated as shown in FIG. 17B.

Thereafter, the four differences output from the subtracters 32A, 32B, 32D and 32E are selected in four difference selectors 33A, 33B, 33C and 33D of a difference selecting section 34 while converting the order of the four differences according to the selecting signal Se. In detail, in cases where the selecting signal Se is set to "0", the four differences accessed to first addresses A of the difference selectors 33A to 33D are selected without converting the order of the four differences. In contrast, in cases where the selecting signal Se is set to "1", the four differences accessed to second addresses B of the difference selectors 33A to 33D are selected while converting the order of the four differences. Therefore, the four differences are selected in the difference selecting section 34 as shown in FIG. 17C.

Thereafter, the four differences selected in the difference selecting section 34 are weighted with the value DCr1 or DCb1 of the lower color signal DCr or DCb in four multipliers 35A, 35B, 35C and 35D of a multiplying section 36. In detail, the differences transferred from the difference selectors 33A, 33C are multiplied by the value DCr1 in the multipliers 35A, 35C, and the other differences transferred from the difference selectors 33B, 33D are multiplied by the value DCb1 in the multipliers 35B, 35D. Therefore, a first product PR1, a second product PR2, a third product PR3 and a fourth product PR4 are output from the multipliers 35A, 35B, 5C and 35D of the multiplying section 36 as shown in FIG. 17D.

Thereafter, the first and second products PR1 and PR2 are added each other in a first adder 37A of an adding section 38, and the third and fourth products PR3 and PR4 are added each other in a second adder 37B of the adding section 38. Therefore, a first added product PA1 and a second added product PA2 are produced in the adding section 38 as shown in FIG. 17E. Thereafter, the added product PA1 and the color converting data Da are added each other in a third adder 39 to produce a first term product PT1 as shown in FIG. 17F. Also, the first added product PA1 is subtracted from the second added product PA2 in a sixth subtracter 40 to produce a subtracted product PS1 as shown in FIG. 17G. Thereafter, the subtracted product PS1 and the difference output from the subtracter 32C are added each other in a fourth adder 41 to produce a third added product PA3 as shown in FIG. 17H. Thereafter, the third added product PA3 is multiplied by the value DY1 of the lower color signal DY in a fifth multiplier 42 to produce a second term product PT2 as shown in FIG. 17I. Thereafter, the first and second term products PT1, PT2 are added each other in a fifth adder 43 to produce the color converting data (or interpolated output value) Do as shown in FIG. 17J.

Thereafter, as shown in FIG. 17A, a positive or negative displacement value OFFSET stored in a displacement register 44 is added to the color converting data Do in a sixth adder 45 to perform a displacement correction according to the equation (5) or (7). The value OFFSET stored in the displacement register 44 is transferred from the registering section 19. Thereafter, the color converting data Do performed the displacement correction is input to an output data limiting section 46 to limit the color converting data Do within a dynamic range of the color converting data Do. That is, for example, in cases where the dynamic range is determined in an 8-bit output data length, the color converting data Do ranging from 0 to 255 is selectively output from the calculating section 17 as an interpolated output value. The dynamic range of the color converting data Do is transferred from the registering section 19.

In the operation of the 6-point interpolation, the values DY1, DCr1 and DCb1 functioning as weighting factors respectively range from 0 to 1 because the values DY1, DCr1 and DCb1 denote the first, second and third ratios R1, R2 and R3. However, because the values DY1, DCr1 and DCb1 are respectively expressed by 7 bits (or 6 bits) when the 10-bit input color signals Y, Cb and Cr are input to the apparatus 11, the values DY1, DCr1 and DCb1 actually become 128 (or 64) when the values DY1, DCr1 and DCb1 denote the ratios R1, R2 and R3=1. Therefore, the values DY1, DCr1 and DCb1 are respectively reduced to 1 in a bit-shifter in this embodiment.

Also, in the multipliers 35A to 35D, and 42, the multiplication can be performed regardless of whether pieces of no-signed data or pieces of signed data are input.

Next, a comparison between the 6-point interpolation according to the first embodiment and the 4-point interpolation is described with reference to FIGS. 18 to 20.

Figure 18:
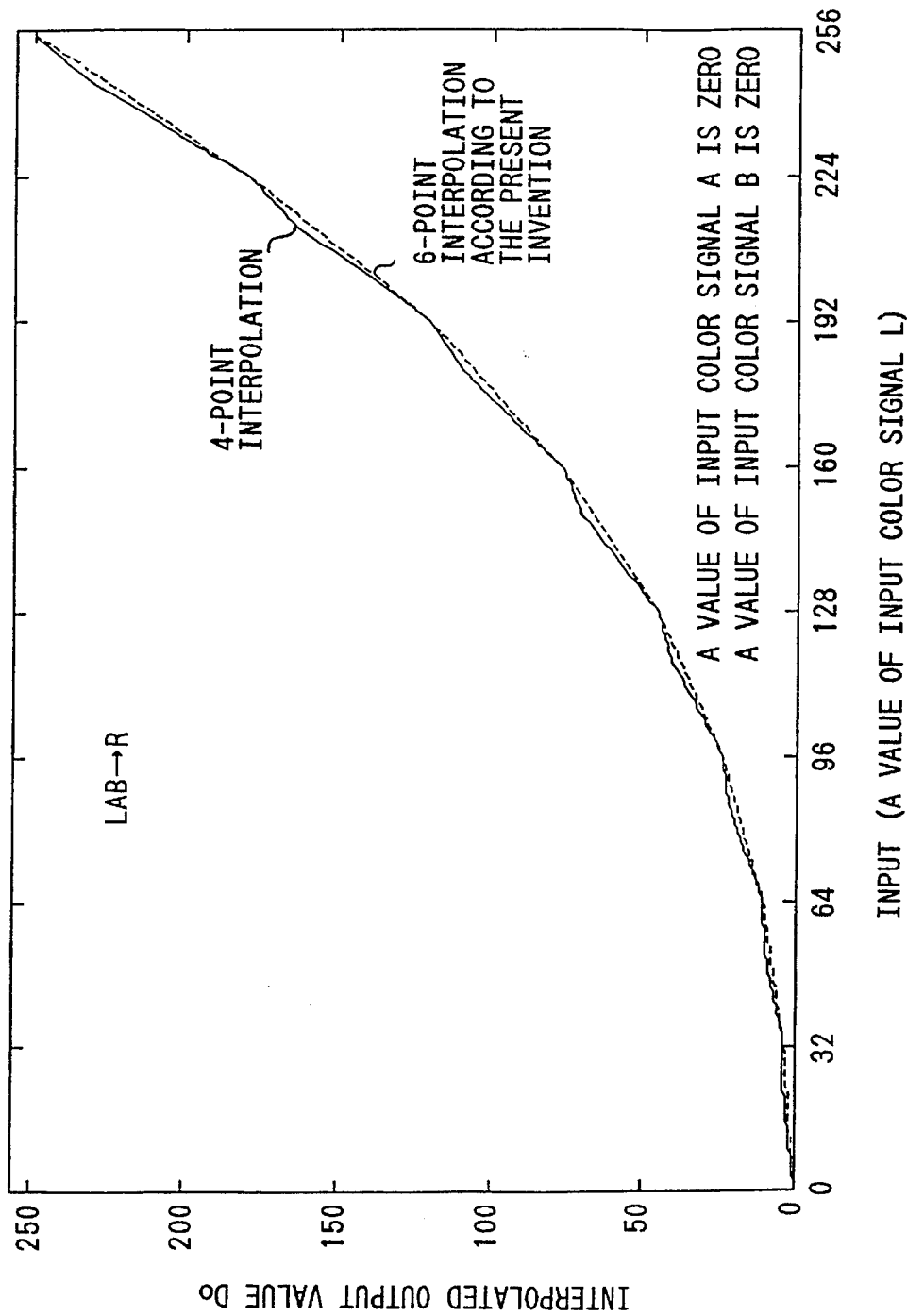
FIG. 18 is a graphic view comparatively showing interpolated results of a 6-point interpolation according to the first embodiment and a 4-point interpolation, a component R of an output color in a RGB color space being obtained as an interpolated output value Do by inputting three color signals L, A and B in a CIE-LAB equalized color space.

FIG. 18 is a graphic view comparatively showing interpolated results of the 6-point interpolation according to the first embodiment and the 4-point interpolation, a component R of an output color in the RGB color space being obtained as an interpolated output value Do by inputting three color signals L, A and B in a CIE-LAB equalized color space. FIG. 19 is a graphic view comparatively showing interpolated results of the 6-point interpolation according to the first embodiment and the 4-point interpolation, a component G of an output color in the RGB color space being obtained as an interpolated output value Do by inputting three color signals L, A and B in a CIE-LAB equalized color space. FIG. 20 is a graphic view comparatively showing interpolated results of the 6-point interpolation according to the first embodiment and the 4-point interpolation, a component B of an output color in the RGB color space being obtained as an interpolated output value Do by inputting three color signals L, A and B in a CIE-LAB equalized color space.

For example, three color signals L, A and B defined in a CIE (International Commission on Illumination)-LAB equalized color space are input to the color converting apparatus 11 and a conventional color converting apparatus to obtain a piece of interpolated output data Do defined in an NTSC (National Television System Committee)-RGB color space. The color signal L corresponds to the lightness of an input color, the color signals A, B respectively correspond to two attributes of a hue and a chromaticity of the input color. In other words, an L—axis of the LAB equalized color space corresponds to the Y—axis of the Y—Cr—Cb color space, an A—axis of the LAB equalized color space corresponds to the Cr—axis of the Y—Cr—Cb color space, and a B—axis of the LAB equalized color space corresponds to the Cb-axis of the Y—Cr—Cb color space. In detail, values of the signals L, A and B are expressed with values of primary color signals R, G and B (or Y, Cr and Cb) according to equations (16), (17), (18) and (18A).

$$X = 98.072*[(L+16)/116 + A/500]^3 \quad ;L > 8.0 \quad (16)$$
$$= 98.072*(L/116 + A/500)/7.787 \quad ;8.0 \geq L \geq 0$$

$$Y = 100.0*[(L+16)/116]^3 \quad ;L > 8.0 \quad (17)$$
$$= 100.0*[L/903.29) \quad ;8.0 \geq L \geq 0$$

$$Z = 118.225*[L+16)/116 - B/200]^3 \quad ;L > 8.0 \quad (18)$$
$$= 118.225*(L/116 - B/200)/7.787 \quad ;8.0 \geq L \geq 0$$

$$\begin{pmatrix} R \\ G \\ B \end{pmatrix} = \begin{pmatrix} 1.9106 & -0.5326 & -0.2883 \\ -0.9843 & 1.9984 & -0.0283 \\ 0.0584 & -0.1185 & 0.8985 \end{pmatrix} \begin{pmatrix} X \\ Y \\ Z \end{pmatrix} \quad (18A)$$

In this case, the color converting tables utilized in the color converting apparatus 11 is the same as those utilized in the conventional color converting apparatus. Also, values of the color signals A, B are set to zero to set the input color to a pure gray with the color signal L. A value L1 of the color signal L is repeatedly changed in a range from L1=0 to L1=255.

As shown in FIG. 18, in cases where a red component R of an output color in the RGB color space is interpolated in a conventional color converting apparatus by inputting three color signals L, A and B according to the 4-point interpolation utilizing a plurality of partitioned tetrahedrons, a conventional red interpolated result (designated by a solid line) irregularily curved is undesirably obtained as the red component R. In contrast, in cases where the red component R is interpolated in the color converting apparatus 11, a red interpolated result (designated by a dotted line) ideally curved according to the equations (16) to (18) is obtained as the red component R. Therefore, convex portions projected in an upper direction in the drawing are periodically generated in the conventional red interpolated result irregularily curved.

Figure 19:
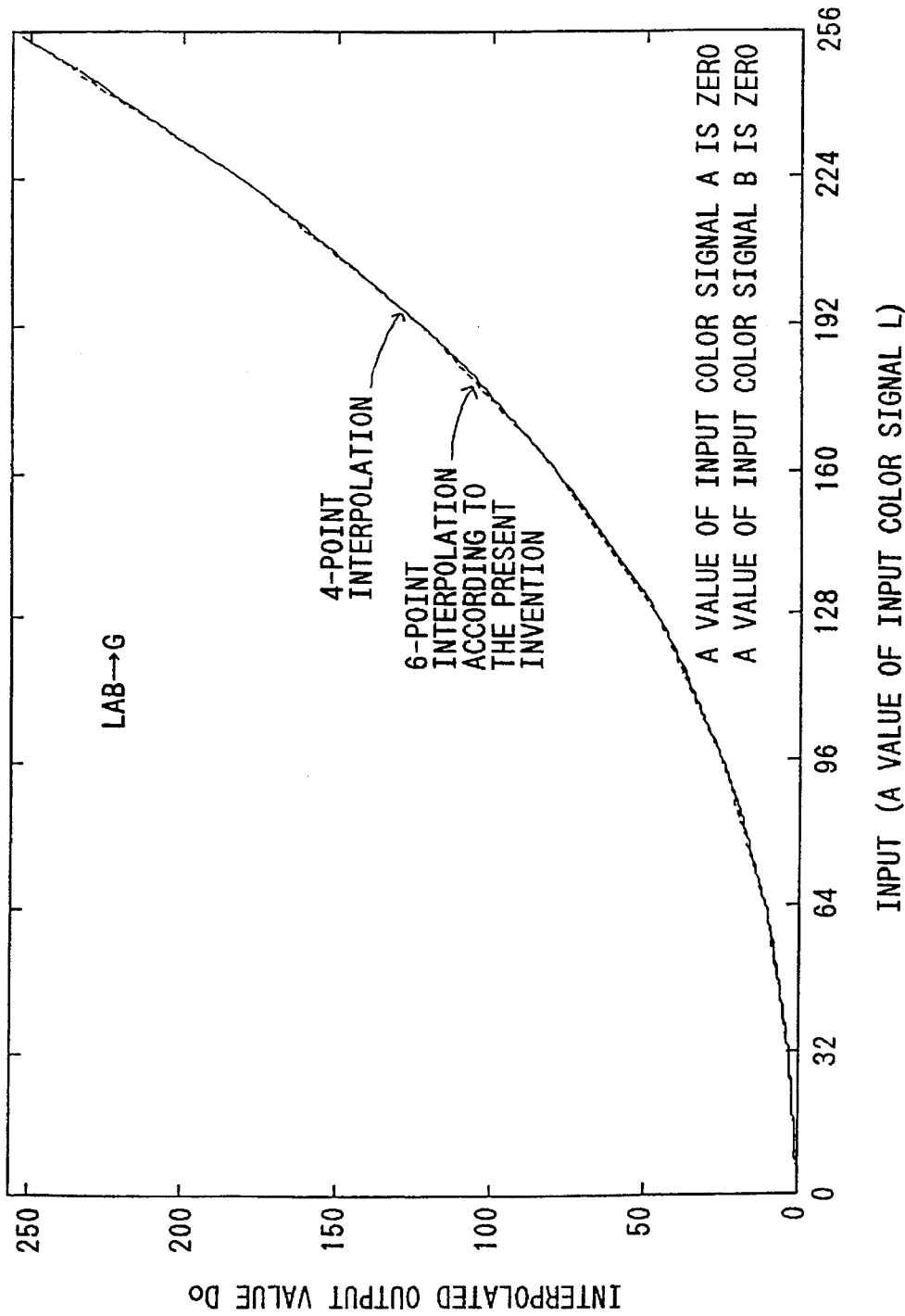
FIG. 19 is a graphic view comparatively showing interpolated results of a 6-point interpolation according to the first embodiment and a 4-point interpolation, a component G of an output color in the RGB color space being obtained as an interpolated output value Do by inputting three color signals L, A and B in a CIE-LAB equalized color space.

Also, as shown in FIG. 19, in cases where a green component G is interpolated in the conventional color converting apparatus and the color converting apparatus 11, a conventional green interpolated result (designated by a solid line) and a green interpolated result (designated by a dotted line) ideally curved together according to the equations (16) to (18) are obtained as the green component G.

Figure 20:
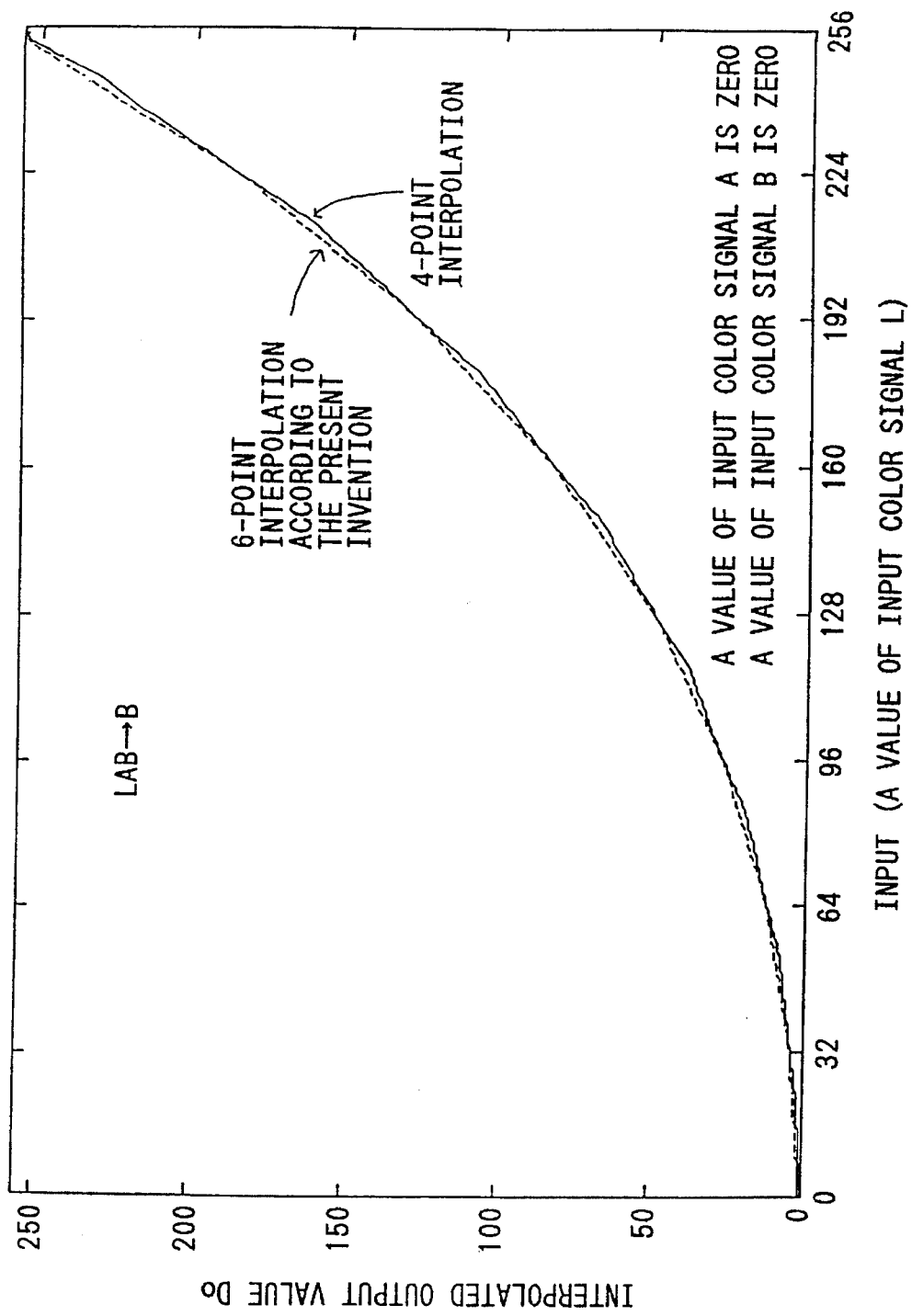
FIG. 20 is a graphic view comparatively showing interpolated results of a 6-point interpolation according to the first embodiment and a 4-point interpolation, a component B of an output color in the RGB color space being obtained as an interpolated output value Do by inputting three color signals L, A and B in a CIE-LAB equalized color space.

Also, as shown in FIG. 20, in cases where a blue component B of the output color in the RGB color space is interpolated in the conventional color converting apparatus, a conventional blue interpolated result (designated by a solid line) irregularily curved is undesirably obtained as the blue component B. In contrast, in cases where the blue component B is interpolated in the color converting apparatus 11, a blue interpolated result (designated by a dotted line) ideally curved according to the equations (16) to (18) is obtained as the blue component B. Therefore, convex portions projected in a lower direction in the drawing are periodically generated in the conventional blue interpolated result irregularily curved.

Accordingly, because the conventional red, green and blue interpolated results differ from each other in shape, there is a drawback in the conventional color converting apparatus that a gray color to be formed by overlapping the red, green and blue components R, G and B varies in dependent on the value L1 of the color signal L. However, because the red, green and blue interpolated results agree with ideal curves expressed by the equations (16) to (18), 11, a gray color is accurately formed by mixing the red, green and blue components R, G and B in the color converting apparatus 11 regardless of the value L1 of the color signal L.

Generally, color components of various colors can be accurately output in the color converting apparatus 11 by specifying color changes with the input color signals Y, Cr and Cb and the color converting data. The reason is because a direction of the lightness is directed in parallel to a major direction of each of the partitioned triangular prisms. Therefore, various color changes including non-linear color changes expressed by the equations (16) to (18) can be smoothly and visually performed in the color converting apparatus.

Also, in cases where a minimum calculation in which a minimum value is selected from among values of primary color signals S1, S2 and S3 such as a red signal R, a green signal G and a blue signal B is performed, a lightness signal Y is formed with the primary color signals S1, S2 and S3, and a pair of color difference signals Cr and Cb are formed by selecting a color signal S1 among from the primary color signals S1, S2 and S3 as a color difference reference signal and obtaining a first difference between another signal S1 and the color difference reference signal and a second difference between the remaining signal S3 and the color difference reference signal. Therefore, even though primary color signals are input to the color converting apparatus 11, a piece of interpolated output data Do can be obtained without any unnatural ripple.

As shown in FIG. 1, the color converting apparatus 11 further comprises an area processing selecting section 20 for selecting one of types of area processing in which various types of color changes are performed for a plurality of rectangular areas partitioned in an image plane in cases where the color changes are performed for the entire image plane, and a sub-table exchanging signal generating section 21 for generating the sub-table exchanging signal Se transferred to the generating section 14 according to a color converting type designating signal Sd transferred from the area processing selecting section 20.

Figure 21:
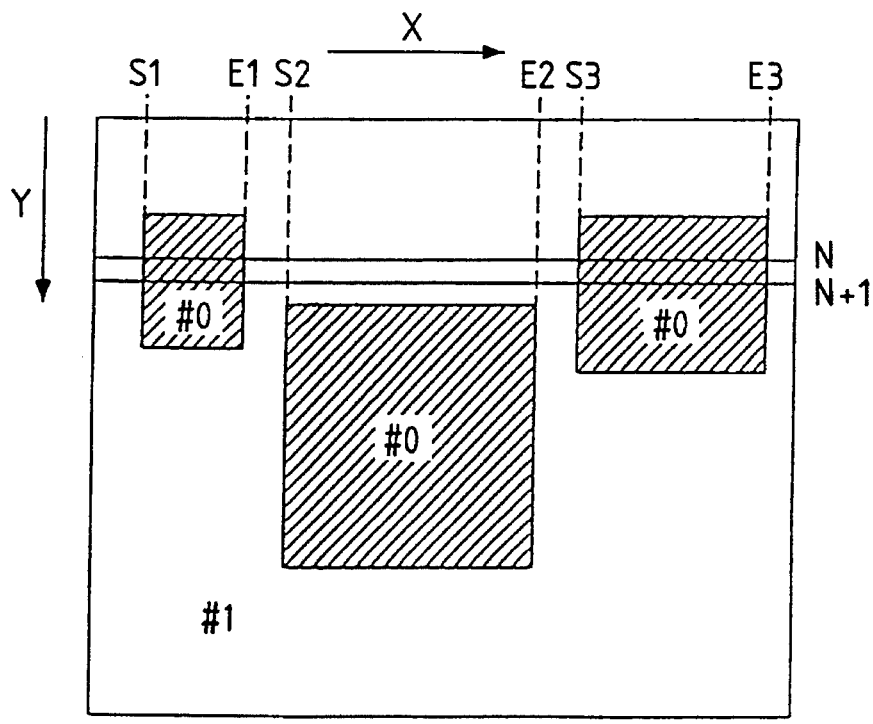
FIG. 21 shows a plurality of inside areas and an outside area in an image plane IP, a first type of color conversion being performed for the inside areas, and a second type of color conversion being performed for the outside area.

In the above configuration, as shown in FIG. 21, an image plane IP is partitioned into a plurality of inside areas Ai and an outside area Ao to perform a first type of color conversion #0 for the inside areas Ai and a second type of color conversion #1 for the outside area Ao. In cases where a colored picture of a pixel positioned in one of the inside areas Ai is intended to be converted according to the first type of color conversion #0, a 1-bit color converting type designating signal set to "0" is generated according to an address of the pixel in the image plane IP and is transferred from the area processing selecting section 20 to the generating section 21. Thereafter, the sub-table exchanging signal Se set to "0" is generated in the signal generating section 21 and is transferred to the address generating section 14. Therefore, the color converting data Da to Dh stored in the first banks of the table memory 15 are selected according to the sub-table exchanging signal Se set to "0", and the color converting data Do is interpolated as the interpolated output value with the color converting data Da to Dh in the calculating section 17. In contrast, in cases where a colored picture of a pixel positioned in the outside area Ao is intended to be converted according to the second type of color conversion #1, a 1-bit color converting type designating signal set to "1" is generated according to an address of the pixel in the image plane IP and is transferred from the area processing selecting section 20 to the generating section 21. Thereafter, the sub-table exchanging signal Se set to "1" is generated in the signal generating section 21 and is transferred to the address generating section 14. Therefore, the color converting data Da' to Dh' stored in the second banks of the table memory 15 are selected according to the sub-table exchanging signal Se set to "1" in case of the normal mode, and the color converting data Do is interpolated as the interpolated output value with the color converting data Da' to Dh' in the calculating section 17.

Figure 22:
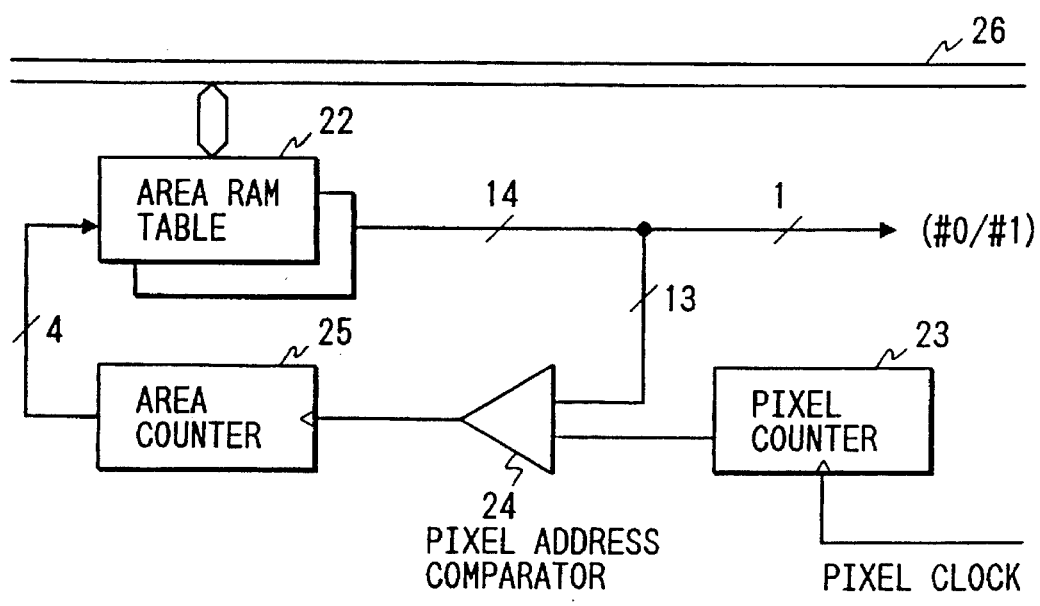
FIG. 22 is a block diagram of an area processing selecting section 20 shown in FIG. 1.

FIG. 22 is a block diagram of the area processing selecting section 20 shown in FIG. 1.

As shown in FIG. 22, the area processing selecting section 20 comprises an area RAM table 22 for storing a starting pixel address S1, S2, - - - , or S8 and an ending pixel E1, E2, - - - , or E8 address for each of partitioning lines between the inside and outside areas Ai, Ao preset in the image plane IP, a pixel counter 23 for counting pixels positioned in a direction X of a main scanning line one after another to specify an address of each of the pixels, a pixel address comparator 24 for comparing an address of each of pixels counted in the pixel counter 23 with a starting or ending pixel address stored in the area RAM table 22 to find out a particular pixel stored in the starting or ending pixel address and generating an area counting signal each time the particular pixel is found out, and an area counter 25 for counting an area number given to each of the starting or ending pixel address each time the area counting signal generated in the comparator 24 is transferred to the area counter 25 and instructing the area RAM table 22 to output a next starting or ending pixel address.

Figures 23, 24:
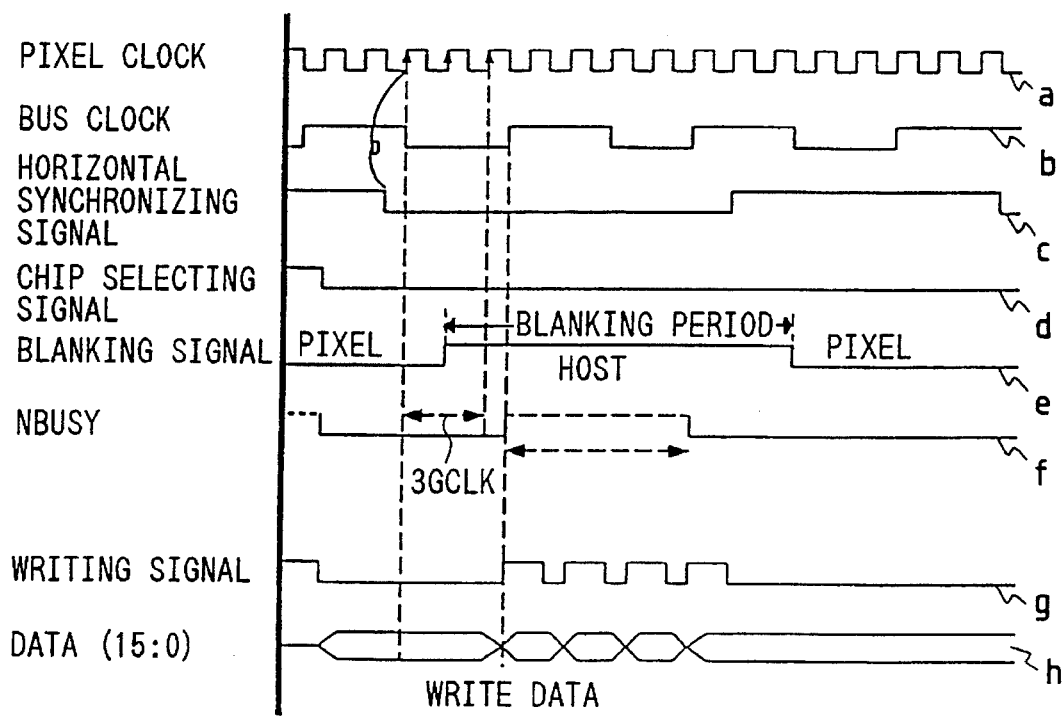
FIG. 23 shows area numbers, the starting or ending pixel addresses and color converting types #0, #1 stored in an area RAM table shown in FIG. 22.
FIG. 24 shows a timing chart of a host interface section shown in FIG. 1.

FIG. 23 shows area numbers, the starting or ending pixel addresses and color converting types #0, #1.

As shown in FIG. 23, area numbers 0 to F (F denotes the number 15 in a hexadecimal numeration) correspond to the starting or ending pixel addresses S1, E1, - - - , S8 and E8. Also, types of color changes #0, #1 are predetermined for the area numbers 1 to F.

In the above configuration, a starting pixel address S1 is initially output from the area RAM table 22 to the comparator 24. When a pixel addressed to the starting pixel address S1 is counted in the pixel counter 23, an area counting signal is transferred to the area counter 25. Therefore, the area number is set to "0" in the area RAM table 22 by the instruction of the area counter 25, and a color converting type designating signal Sd set to "0" is transferred to the generating section 21. As a result, the first type of color conversion #0 is performed for one of the inside areas Ai. Thereafter, when a pixel addressed to the ending pixel address E1 is counted in the pixel counter 23, an area counting signal is again transferred to the area counter 25. Therefore, the area number is set to "1" in the area RAM table 22 by the instruction of the area counter 25, and a color converting type designating signal Sd set to "1" is transferred to the generating section 21. As a result, the second type of color conversion #1 is performed for the outside area Ao.

Accordingly, in cases where a plurality of pixels are counted in a direction X of a main scanning line one after another, colored pictures of the pixels on the main scanning line can be converted in the color converting apparatus 11.

After the pixels addressed on a main scanning line are scanned, a scanning line is moved in a direction Y of a sub scanning line perpendicular to the direction X of the main scanning line. Also, the starting and ending pixel addresses stored in the area RAM table 22 are rewritten to other addresses transferred from the host computer through an internal bus 26. Thereafter, colored pictures of pixels addressed on another main scanning line are converted in the same manner in the color converting apparatus 11.

Accordingly, two types of color changes can be arbitrarily performed for two types of areas Ai, Ao in the image plane IP. Also, a plurality of types of color changes can be performed for various areas in the image plane IP in the same manner. In this case, even though there is no time for rewriting the color converting data, a plurality of types of color changes can be performed for various areas in the image plane IP without rewriting the color converting data.

Also, though an area processing in the direction X of the main scanning line is required to be performed at a high speed, the area processing can be performed at a high speed because the area processing is performed in a hardware technique. In contrast, because an area processing in the direction Y of the sub scanning line is performed according to a software technique, the area processing can be easily performed. As a result, the area processing in the entire image plane IP can be efficiently performed in the color area processing selecting section 20.

In the first embodiment, the color converting type designating signal Sd is generated in the area processing selecting section 20. However, it is applicable that a color converting type designating signal Sd be transferred from an external apparatus to the signal generating signal 21 for each of pixels in the entire image plane IP. In this case, types of color changes can be exchanged for each of the pixels, so that the types of color changes can be exchanged at any addresses. Next, an operation period in the host interface section 18 is described with reference to FIG. 24.

FIG. 24 shows a timing chart of the host interface section 18 shown in FIG. 1.

A writing operation in which the color converting data are transferred from the host computer to the table memory 15 is allowed to be limitedly performed in a blanking period of picture signals. In detail, as shown in FIG. 24, the upper color signals UY, UCr and UCb are transferred from the address generating section 14 to the color converting RAM addresses through an address bus during a scanning period of the picture signals, and the color converting RAM addresses connected to the address bus is replace to the external bus to transfer pieces of color converting data from the host computer to the external address of the table memory 15 during the blanking period. The scanning period is indicated by a blanking signal set to a low level, and the blanking period is indicated by the blanking signal set to a high level. In the host computer, a signal NBUSY output from the color converting apparatus 11 is always observed. When the signal NBUSY is set to a high level, the transfer of the color converting data from the host computer to the external address of the table memory 15 is started, so that a writing signal NWE is intermittently set to a high level. Also, when the signal NBUSY is set to a low level, the transfer of the color converting data from the host computer to the external address of the table memory 15 is stopped, so that the writing signal NWE is set to a low level. Accordingly, because the scanning period of the picture signals is separated from the blanking period, the picture displayed on an image plane is not adversely influenced by the writing operation from the host computer to the table memory 15. Therefore, various color changes can be performed while a still original picture is displayed on an image plane, and a subtle difference between the original picture and a color converted picture can be confirmed.

Next, a color converting apparatus according to a second embodiment of the present invention is described.

Figure 25:
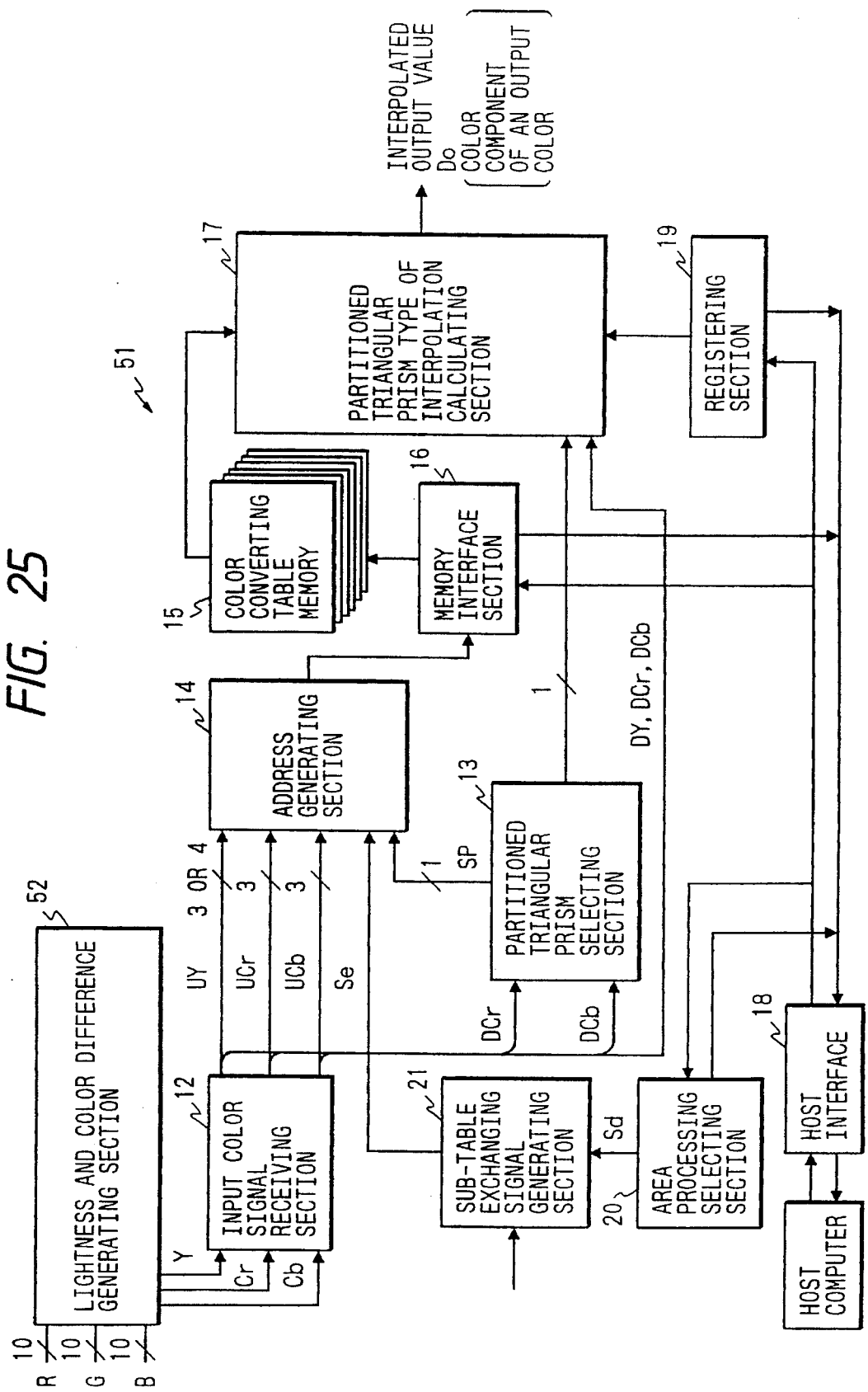
FIG. 25 is a block diagram of a color converting apparatus according to a second embodiment.

FIG. 25 is a block diagram of a color converting apparatus according to a second embodiment.

As shown in FIG. 25, a color converting apparatus 51 comprises the color converting apparatus 11 and a lightness and color difference generating section 52 for generating a lightness signal Y corresponding to the input color signal Y in the first embodiment, a first color difference signal Cr and a second color difference signal Cb corresponding to the input color signals Cr, Cb in the first embodiment from three primary color signals R, G and B. The primary color signal G denoting a density of a green is utilized as a reference color signal of the first and second color differences. However, it is applicable that the primary color signal R or B denoting a density of a red or blue be utilized as a reference color signal in place of the primary color signal G.

Figure 26:
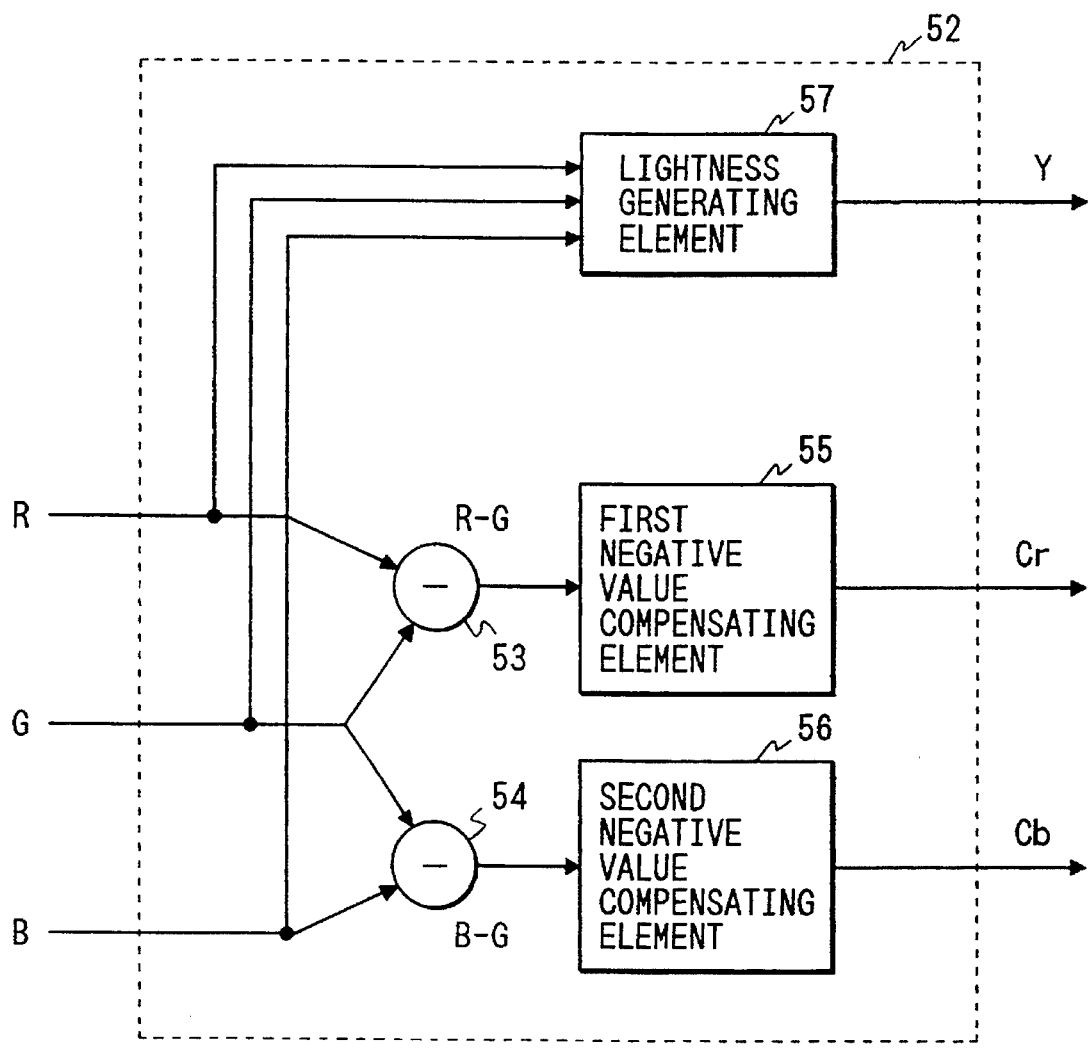
FIG. 26 is a block diagram of a lightness and color difference generating section shown in FIG. 25.

FIG. 26 is a block diagram of the lightness and color difference generating section 52 shown in FIG. 25.

As shown in FIG. 26, the lightness and color difference generating section 52 comprises a first subtracting element 53 for subtracting the reference color signal G from the primary color signal R to form a first pre-color difference signal, a second subtracting element 54 for subtracting the reference color signal G from the primary color signal B to form a second pre-color difference signal, a first negative value compensating element 55 for compensating the first pre-color difference signal for a generated negative value to form a first 10-bit (or 8-bit) color difference signal Cr denoting a density of a first color difference, a second negative value compensating element 56 for compensating the second pre-color difference signal for a generated negative value to form a second 10-bit (or 8-bit) color difference signal Cb denoting a density of a second color difference, and a lightness generating element 57 for generating a 10-bit (or 8-bit) lightness signal Y denoting a density of a lightness.

In the above configuration of the color converting apparatus 51, a first 10-bit (or 8-bit) color difference signal Cr of which a value Cr1 denotes a density of a first color difference is formed with primary color signals R, G in the first subtracting element 53 and the first negative value compensating element 55 according to an equation (19).

$$Cr1 = R1 - G1 \qquad (19)$$

Where values R1, G1 of the primary color signals R, G denote densities of a red and a green. Also, a second 10-bit (or 8-bit) color difference signal Cb of which a value Cb1 denotes a density of a second color difference is formed with primary color signals B, G in the second subtracting element 54 and the second negative value compensating element 56 according to an equation (20).

$$Cb1 = B1 - G1 \qquad (20)$$

Where a value B1 of the primary color signal B denotes a density of a blue. Also, a 10-bit (or 8-bit) lightness signal Y of which a value Y1 denotes a density of a lightness is formed with the primary color signals R, G and B in the lightness generating element 57 according to one of equations (21), (22) or (23).

$$Y1 = (R1 + G1 + B1)/3 \qquad (21)$$

$$Y1 = (R1 + 2*G1 + B1)/4 \qquad (22)$$

$$Y1 = G1 \qquad (23)$$

The lightness signal Y is linearly independent of the first and second color difference signals Cr, Cb.

Accordingly, even though the primary color signals R, G and B are input in the color converting apparatus 51, the lightness signal Y and the color difference signals Cr, Cb can be easily formed, and an interpolated output value Do can be obtained as a component of a color in an output color space in the same manner as in the first embodiment.

Next, a reason that the generation of the interpolation errors formed in a ripple shape can be prevented in the second embodiment is described.

To perform the 6-point interpolation in the calculating section 17, a large number of pieces of color converting data are stored in the table memory 15 in advance. The color converting data corresponding to the lattice points of the partitioned cubic blocks are produced in the host computer by utilizing the minimum calculation. In the host computer, the minimum calculation is performed in the primary color space such as an RGB color space, and pieces of color converting data produced in the RGB color space are transformed to those in the Y—Cr—Cb color space.

The minimum calculation in the second embodiment is expressed according to an equation (24).

$$Om = MIN (R1, G1, B1) \qquad (24)$$

Where the value Om denotes an output value having a minimum value obtained according to the minimum calculation. The minimum calculation is described in detail with reference to FIGS. 27, 28.

Figure 27A:
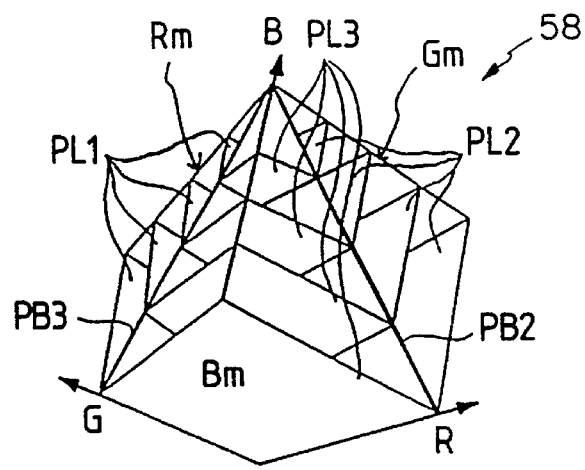
FIGS. 27A, 27B respectively show a RGB cube partitioned into three pyramid regions in a RGB color space.
Figure 27B:
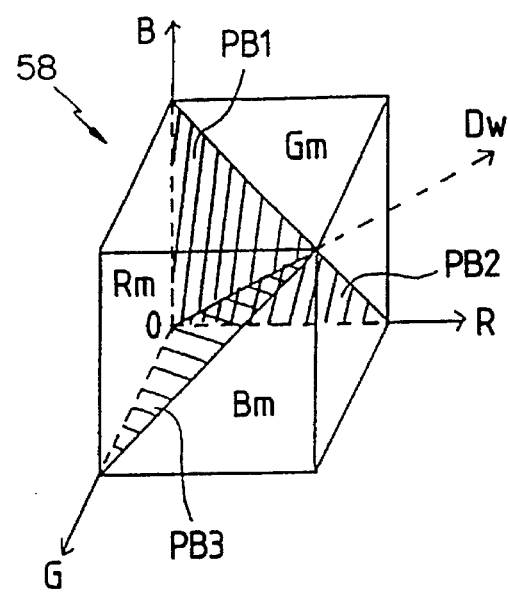

FIGS. 27A, 27B respectively show a RGB cube partitioned into three pyramid regions in the RGB color space.

As shown in FIGS. 27A, 27B, a RGB cube 58 is equally partitioned into three pyramid regions Rm, Gm and Bm. That is, the pyramid regions Rm, Gm and Bm are adjacent to each other through boundary planes Pb1, Pb2, Pb3. The pyramid region Rm denotes a region in which the value R1 is minimum as is expressed according to an equation (25).

$$R1 = MIN (R1, G1, B1) \qquad (25)$$

The pyramid region Gm denotes a region in which the value G1 is minimum as is expressed according to an equation (26).

$$G1 = MIN (R1, G1, B1) \qquad (26)$$

The pyramid region Bm denotes a region in which the value B1 is minimum as is expressed according to an equation (27).

$$B1 = MIN (R1, G1, B1) \qquad (27)$$

Therefore, an equation (28) is satisfied in the pyramid region Rm;

$$Om = R1 \qquad (28),$$

an equation (29) is satisfied in the pyramid region Gm;

$$Om = G1 \qquad (29),$$

and an equation (30) is satisfied in the pyramid region Bm;

$$Om = B1 \qquad (30).$$

Therefore, as shown in FIGS. 27A, 27B, a plane PL1 of the pyramid region Rm in which the output value Om in the minimum calculation is constant is in parallel to a G-B plane, a plane PL2 of the pyramid region Gm in which the output value Om in the minimum calculation is constant is in parallel to a B-R plane, and a plane PL3 of the pyramid region Bm in which the output value Om in the minimum calculation is constant is in parallel to a R-G plane. Accordingly, the 6-point interpolation can be easily performed. In contrast, because orientations of the planes PL1, PL2 and PL3 differ from each other, a combined plane of the planes PL1, PL2 and PL3 in which the output value Om in the minimum calculation is constant in the RGB color space is sharply bent at an intersecting line with the boundary planes Pb1, Pb2 and Pb3. Therefore, in cases where pieces of color converting data are produced according to the minimum calculation in the host computer, the color converting data have a differential dicontinuity. Therefore, in cases where the color converting data having the differential discontinuity are utilized in a conventional color converting apparatus, it is difficult to perform the 6-point interpolation. As a result, the interpolation errors formed in a ripple shape are generated in the conventional color converting apparatus.

Figure 27C:
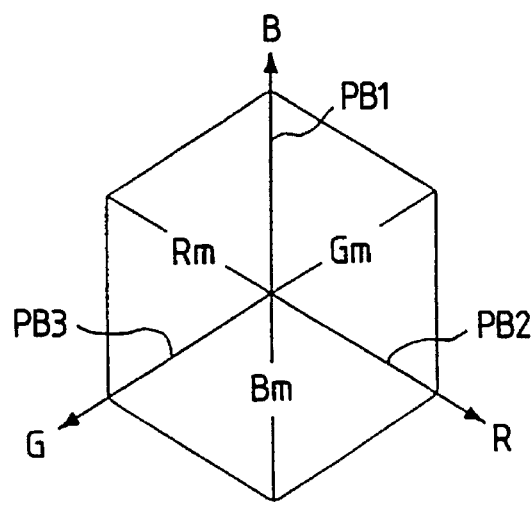
FIG. 27C shows boundary planes PB1, PB2 and PB3 of a RGB cube observed from a white direction Dw.

In cases where the boundary planes PB1, PB2 and PB3 are observed from a white direction Dw, the RGB cube 58 shown in FIG. 27C can be observed. The boundary plane PB1 is expressed according to an equation (31).

$$R1=G1 \text{ (a boundary plane between the pyramid regions Rm, Gm)} \quad (31)$$

The boundary plane PB2 is expressed according to an equation (32).

$$G1=B1 \text{ (a boundary plane between the pyramid regions Gm, Bm)} \quad (32)$$

The boundary plane PB3 is expressed according to an equation (33).

$$B1=R1 \text{ (a boundary plane between the pyramid regions Bm, Rm)} \quad (33)$$

In the 4-point interpolation utilizing the tetrahedrons, the boundary planes PB1, PB2 and PB3 accord with partitioning planes of the tetrahedrons. Therefore, because a plane in which the output value Om in the minimum calculation is constant is not bent in a unit of tetrahedron, the 4-point interpolation can be linearly performed without generating any ripple. Therefore, the problem of the ripple does not exist in the 4-point interpolation.

Figure 28A:
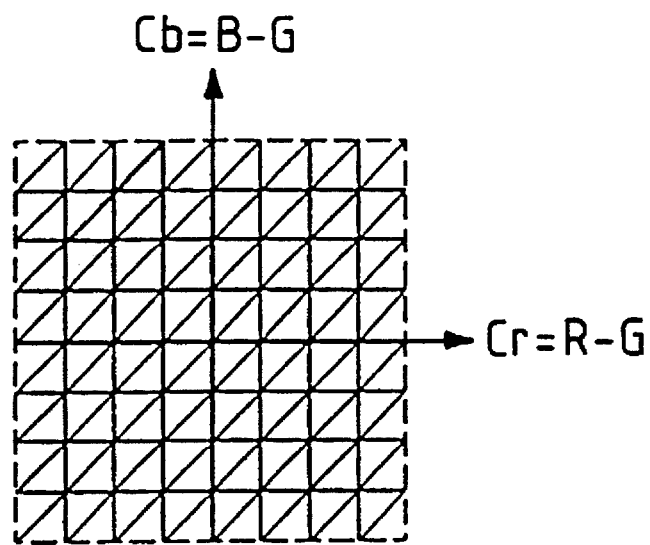
FIG. 28A conceptually shows a Cb—Cr (R-G & B-G) color difference plane partitioned into a plurality of triangular prisms at a Cr axis equal to a (R–G) axis, a Cb axis equal to a (B–G) axis and an inclined line defined as Cr1=Cb1.
Figure 28B:
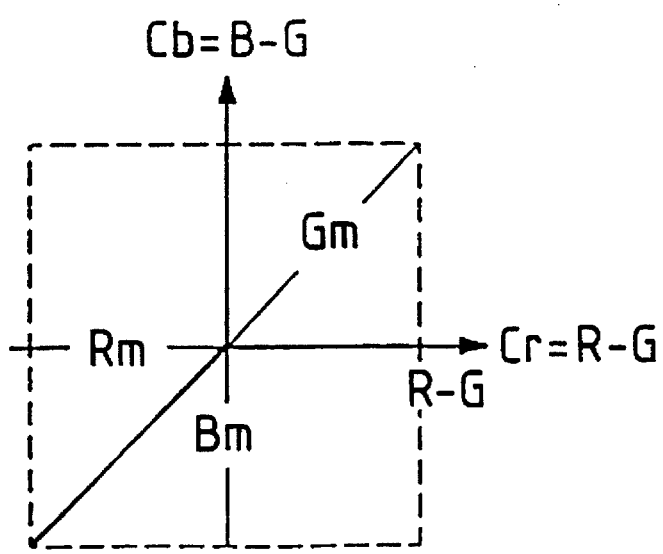
FIG. 28B conceptually shows the boundary planes Pb1, Pb2 and Pb3 shown in FIG. 27C in a Cb—Cr color difference plane.

In this embodiment, as shown in FIG. 28A, a Cb—Cr color difference plane is partitioned at a Cr axis equal to a (R−G) axis, a Cb axis equal to a (B−G) axis, and an inclined line defined as Cr1=Cb1 to form the triangular prisms. In cases where the boundary planes Pb1, Pb2 and Pb3 shown in FIG. 27C are transferred in the Cb—Cr color difference plane, the boundary planes Pb1, Pb2 and Pb3 in the Cb—Cr color difference plane are shown in FIG. 28B. As shown in FIG. 28B, the boundary planes Pb1, Pb2 and Pb3 are included in the Cr axis, the Cb axis and the inclined line shown in FIG. 28A. Accordingly, even though the minimum calculation is performed to produce the color converting data stored in the table memory 15 in advance, the 6-point interpolation can be performed in the calculating section 17 without generating any ripple.

Next, a color converting apparatus according to a third embodiment of the present invention is described.

Figure 29:
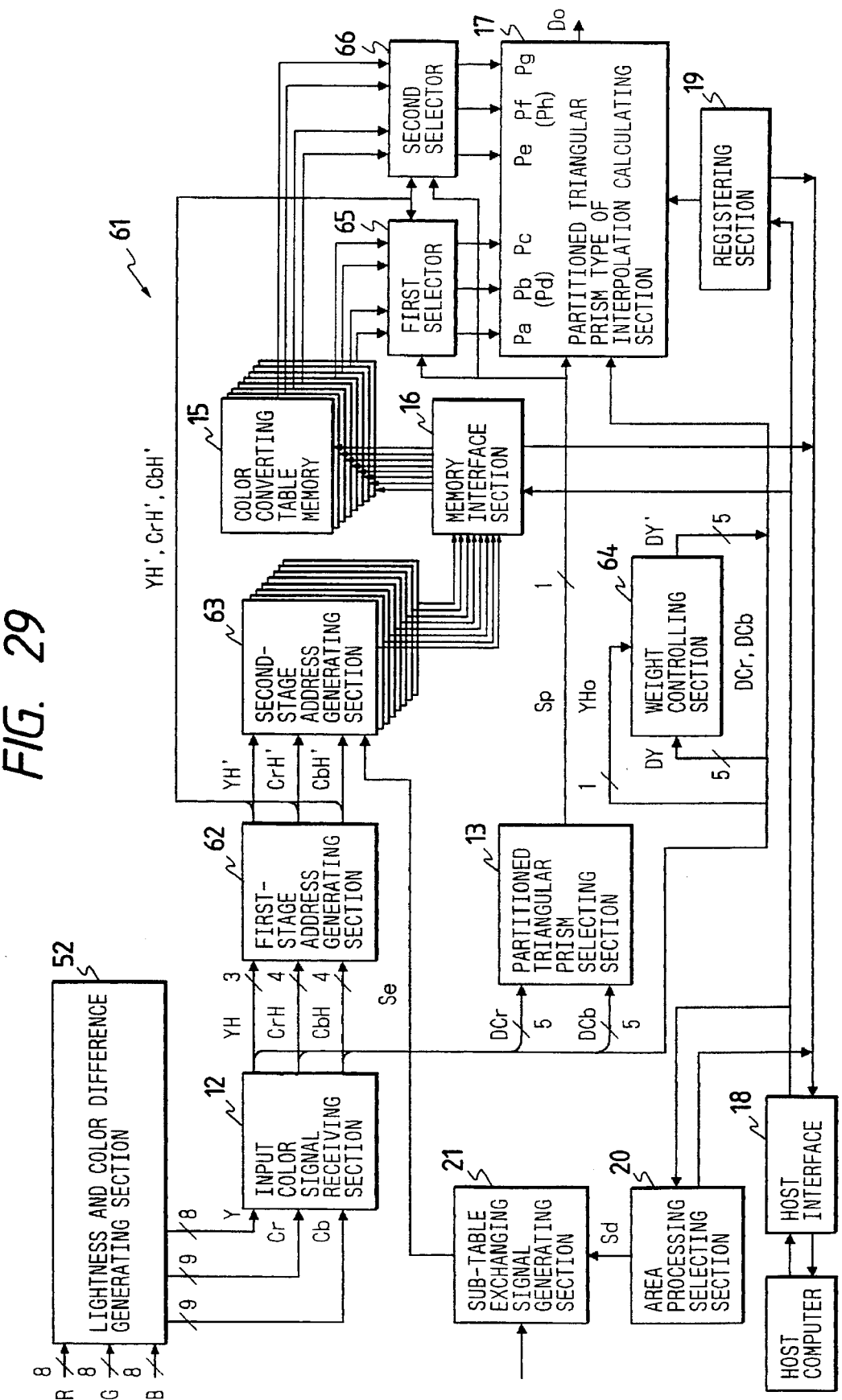
FIG. 29 is a block diagram of a color converting apparatus according to a third embodiment.

FIG. 29 is a block diagram of a color converting apparatus according to a third embodiment.

As shown in FIG. 29, a color converting apparatus 61 comprises the color converting table memory 15 for storing eight pieces of color converting data in eight color converting random access memories CRAM0 to CRAM7 of each of the color converting tables, the lightness and color difference generating section 52 for converting 8-bit primary color signals R, G and B indicating an input color to an 8-bit lightness signal Y, a 9-bit first color difference signal Cr and a 9-bit second color difference signal Cb, the input signal receiving section 12, the partitioned triangular prism selecting section 13, a first-stage address generating section 62 for generating a selected block address (YH1', CrH1', CbH1') of a reference point P1, which corresponds to a lattice point Pa or Pe of a RGB parallelepiped PP including the input color in a RGB oblique coordinate system, as an address of a selected cubic block Bc in a Y—Cr—Cb rectangular coordinate system, a second-stage address generating section 63 for generating eight selected addresses of lattice points Pa to Ph of the RGB parallelepiped PP with the selected block address (YH1', CrH1', CbH1') of the selected cubic block Bc to read out pieces of color converting data M0 to M7 stored at the selected addresses of the table memory 15, a weight controlling section 64 for controlling a weighting factor indicated by a lower 5-bit lightness signal DY according to a value of the least significant bit YHo of an upper 3-bit lightness signal YH, the memory interface section 16, a first selector 65 for selecting three pieces of color converting data from among the color converting data M0 to M3 as pieces color converting data Da, Db (or Dd) and Dc according to the selected block address (YH1', CrH1', CbH1') of the selected cubic block Bc and the selecting signal Se transferred from the partitioned triangular prism selecting section 13, a second selector 66 for selecting three pieces of color converting data from among the color converting data M4 to M7 as pieces color converting data De, Df (or Dh) and Dg according to the selected block address (YH1', CrH1', CbH1') of the selected cubic block Bc and the selecting signal Se transferred from the partitioned triangular prism selecting section 13, the partitioned triangular prism type of interpolation calculating section 17 for performing the 6-point interpolation with the color converting data Da, Db (or Dd), Dc, De, Df (or Dh) and Dg to produce an interpolated output value Do corresponding to the input color included in the RGB parallelepiped PP, the host interface section 18, the registering section 19, the area processing section 20, and the signal generating section 21.

In the above configuration, an 8-bit lightness signal Y, a 9-bit first color difference signal Cr and a 9-bit second color difference signal Cb are produced from 8-bit primary color signals R, G and B in the lightness and color difference generating section 52 according to the equations (19), (20) and (23). In cases where the 8-bit primary color signals R, G and B are formed of upper 3-bit primary color signals RH, GH and BH and lower 5-bit primary color signals DR, DG and DB, a value YH1 of an upper 3-bit lightness signal YH produced from the upper 3-bit primary color signal GH in the lightness generating element 57 varies in a first range expressed according to an equation (33).

$$YH1=\{0,1,2,3,4,5,6,7\} \quad (33)$$

A value (R−G)H1 of an upper 3-bit first color difference signal (R−G)H (Cr=(R−G) is satisfied) produced from the upper 3-bit primary color signals RH, GH in the first subtracting element 53 varies in a second range expressed according to an equation (34).

$$(R-G)H1=\{-8, -7, -6, \text{- - -}, 5, 6, 7\} \quad (34)$$

A value (B−G)H1 of an upper 3-bit second color difference signal (B−G)H (Cb=(B−G) is satisfied) produced from the upper 3-bit primary color signals BH, GH in the second subtracting element 54 varies in a third range expressed according to an equation (35).

$$(B-G)H1=\{-8, -7, -6, \text{- - -}, 5, 6, 7\} \quad (35)$$

Thereafter, negative values of the upper 3-bit first and second color difference signals are compensated to produce upper first and second color difference signals CrH, CbH in the first and second negative value compensating elements 55, 56, and values CrH1, CbH1 of the upper first and second color difference signals CrH, CbH respectively vary in a fourth range expressed according to equations (36), (37).

$$CrH1=\{0, 1, 2, ---, 13, 14, 15\} \quad (36)$$

$$CbH1=\{0, 1, 2, ---, 13, 14, 15\} \quad (37)$$

Therefore, because the upper first and second color difference signals CrH, CbH are formed in a 4-bit length, a dynamic range in a color difference is doubled, so that an unused memory capacity is undesirably increased. To avoid the increase of the unused memory capacity, the first-stage address generating section 62 is provided.

Figure 30:
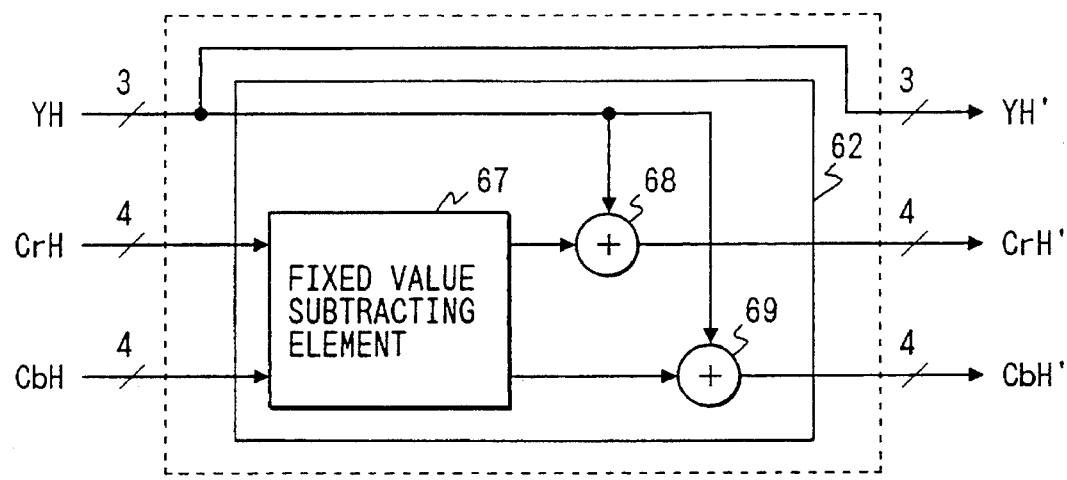
FIG. 30 is a block diagram of a first-stage address generating section of the color converting apparatus 61 shown in FIG. 29.

FIG. 30 is a block diagram of the first-stage address generating section 62 of the color converting apparatus 61 shown in FIG. 29.

As shown in FIG. 30, the first-stage address generating section 62 comprises a fixed value subtracting element 67 for subtracting a value of 7 from the values CrH1, CbH1 of the upper first and second color difference signals CrH, CbH, a first adding element 68 for adding the value YH1 of the upper lightness signal YH to the value CrH1 of the upper first color difference signal CrH to form an upper 4-bit first color difference signal CrH', and a second adding element 69 for adding the value YH1 of the upper lightness signal YH to the value CbH1 of the upper second color difference signal CbH to form an upper 4-bit second color difference signal CbH'.

In the above configuration, an upper 4-bit lightness signal YH' having a value YH1' is produced from the upper 4-bit lightness signal YH according to an equation (38), an upper 4-bit first color difference signal CrH' having a value CrH1' is produced from the upper first color difference signal CrH according to an equation (39), and an upper 4-bit second color difference signal CbH' having a value CbH1' is produced from the upper second color difference signal CbH according to an equation (40).

$$YH1'=YH1 \quad (38)$$

$$CrH1'=CrH1-7+YH1 \quad (39)$$

$$CbH1'=CbH1-7+YH1 \quad (40)$$

Because the values R1, G1 and B1 of the primary color signals R, G and B are positive, the values CrH1', CbH1' are not negative. Therefore, the values CrH1', CbH1' of the upper first and second color difference signals CrH, CbH vary in a range expressed according to equations (41), (42).

$$CrH1'=\{0, 1, 2, 3, 4, 5, 6, 7, 8\} \quad (41)$$

$$CbH1'=\{0, 1, 2, 3, 4, 5, 6, 7, 8\} \quad (42)$$

Accordingly, the dynamic rang of the color difference is reduced to half. Therefore, a utilization efficiency of the memory capacity can be greatly increased in the third embodiment.

Next, the meaning and effects of the above calculation is graphically described with reference to FIGS. 31 to 35.

Figure 31:
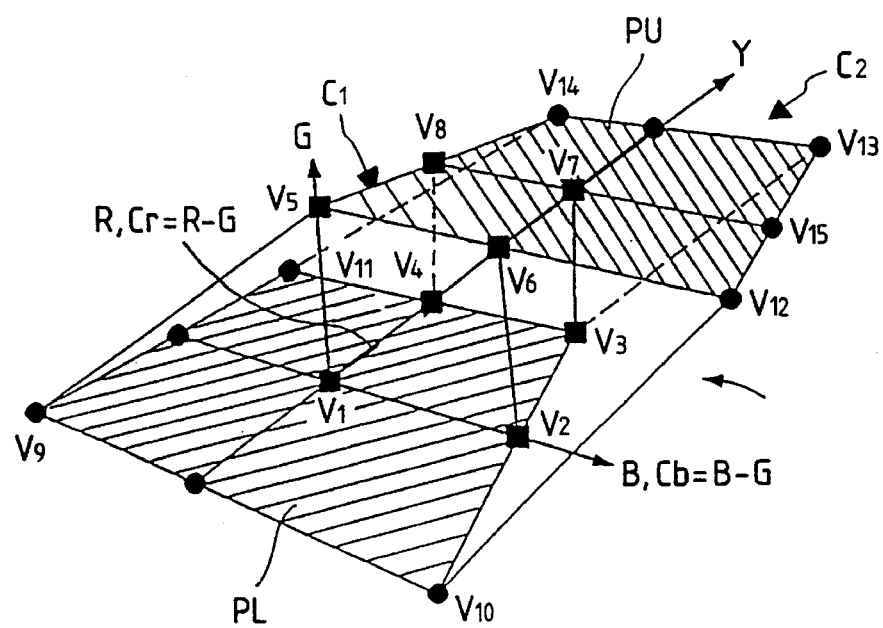
FIG. 31 shows a three-dimensional relationship between a RGB cube in a RGB rectangular coordinate system and a YCrCb parallelepiped in a Y—Cr—Cb oblique coordinate system.

FIG. 31 shows a three-dimensional relationship between a RGB cube in a RGB rectangular coordinate system and a YCrCb parallelepiped in a Y—Cr—Cb oblique coordinate system.

As shown in FIG. 31, a RGB input color space, in which an input color designated by primary color signals R, G and B exists, is defined by R, G and B rectangular coordinate axes. The RGB input color space is expressed by a RGB cube C1(V1V2V3V4-V5V6V7V8), and a YCrCb input color space C2 formed according to the equations (19), (20) and (23) is defined in a Y—Cr—Cb oblique coordinate system. To include the RGB cube C1 in the YCrCb input color space C2, the YCrCb input color space C2 is expressed by a YCrCb parallelepiped C2(V9V10V3V11-V5V12V13V14). A lower plane PL(V9V10V3V11) of the YCrCb parallelepiped C2 is formed by extending a lower plane V1V2V3V4 of the RGB cube C1 by four times, and an upper plane PU(V5V12V13V14) of the YCrCb parallelepiped C2 is formed by extending an upper plane V5V6V7V8 of the RGB cube C1 by four times. That is, a Y-axis of the YCrCb color space accords with a diagonal line V1V7 of the RGB cube C1, a Cr-axis accords with the R-axis of the RGB cube C1, and a Cb-axis accords with the B-axis of the RGB cube C1.

Figure 32:
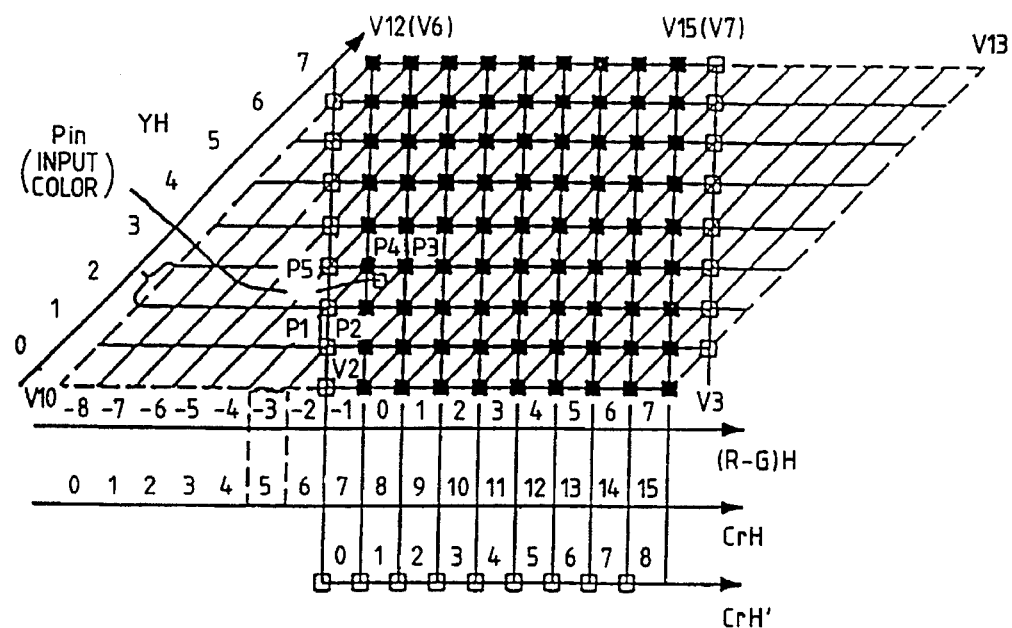
FIG. 32 shows a two-dimensional relationship between a RGB cube C1 in the RGB rectangular coordinate system and a YCrCb parallelepiped C2 in a Y—Cr—Cb oblique coordinate system.

FIG. 32 shows a two-dimensional relationship between the RGB cube C1 in the RGB rectangular coordinate system and the YCrCb parallelepiped C2 in the Y—Cr—Cb oblique coordinate system.

In cases where the YCrCb parallelepiped C2 is observed from the Cb-axis as is shown by an arrow in FIG. 31, the RGB input color space C1 and the YCrCb input color space C2 are shown in a two-dimension as shown in FIG. 32. In this case, the YCrCb input color space C2 is expressed by a parallelogram V10V12V13V3 including positive and negative values of the upper 3-bit first color difference signal (R–G)H to include the RGB input color space C1 expressed by a square V2V3V7V6 in the YCrCb input color space C2. Here black square points denote RGB lattice points of partitioned RGB cubic blocks formed in the RGB input color space C1. The RGB lattice points accord with YCrCb lattice points of partitioned YCrCb parallelepiped formed in the YCrCb input color space C2, and white square points denote a part of the YCrCb lattice points. In this case, the value of the upper 3-bit first color difference signal (R–G)H is required to range from –8 to 7 (or, the value of the upper 3-bit first color difference signal CrH is required to range from 0 to 15) to include the RGB input color space. Therefore, a large number of unused YCrCb lattice points positioned in the YCrCb input color space C2 are positioned outside the RGB input color space C1, so that large pieces of color converting data at the unused YCrCb lattice points are not accessed in the table memory 15. As a result, a utilization efficiency of a memory capacity is considerably reduced to about 25%. To avoid the reduction of the utilization efficiency, main memories for storing pieces of color converting data at the RGB lattice points of the RGB input color space C1 and a slight number of additional memories for storing pieces of color converting data at the YCrCb lattice points (expressed by the white square points) outside the RGB input color space C1 are prepared in this embodiment.

Figure 33:
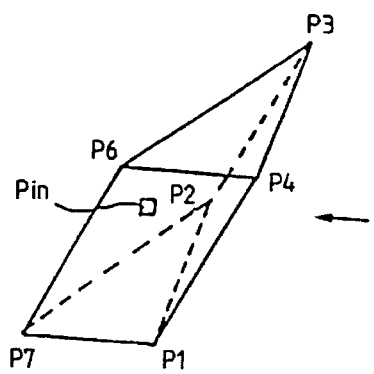
FIG. 33 is a diagonal perspective view of a YCrCb oblique triangular prism shown in FIG. 32.
Figure 34:
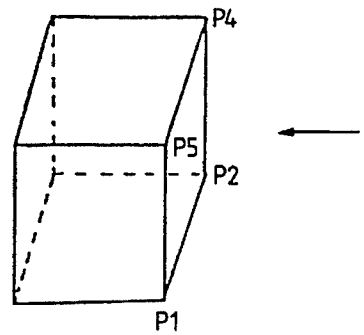
FIG. 34 is a diagonal perspective view of a RGB partitioned cubic block shown in FIG. 32.

A first selecting method for selecting a partitioned cubic block in the RGB input color space is described. As shown in FIGS. 32, 33, vertexes (or lattice points) of a YCrCb oblique triangular prism Pr in which a point Pin of an input color specified in the RGB input color space is included are expressed by lattice points P1, P2, P3, P4, P6 and P7. In this case, Though the lattice point P1 is an imaginary lattice point positioned outside a RGB input color space C1, the lattice point P1 is utilized as a reference point in the YCrCb input color space C2. That is, an address (YH1', CrH1') of the reference point P1 which represents an address of a RGB partitioned cubic block shown in FIG. 34 is calculated. Because the input color point Pin shown in FIG. 32 is included in a parallelogram block (YH1=2, CrH1=5), the address (YH1', CrH1') of the RGB partitioned cubic block is calculated according to the equations (38), (39) as follows.

$$YH1'=2 \quad (43)$$

$$CrH1'=5-7+YH1'=0 \quad (44)$$

Therefore, the address (2, 0) of the RGB partitioned cubic block is specified in the RGB rectangular coordinate system. That is, lattice points P1, P2, P4 and P5 of the RGB partitioned cubic block shown in FIGS. 32, 34 are substantially specified. Accordingly, though additional memories for storing pieces of color converting data at lattice points designated by white square points such as lattice points P1, P5 are required, in cases where an address translation from (YH1, CrH1) to (YH1', CrH1') is performed in the first-stage address generating section 62 according to the equations (38), (39), the utilization efficiency of a memory capacity can be greatly enhanced as compared with that in which the unused memories are required to store the color converting data in the entire YCrCb input color space.

Next, a second selecting method for selecting a partitioned cubic block in the RGB input color space is described in the same manner on condition that the YCrCb input color space is considered as a rectangular coordinate system.

Figure 35:
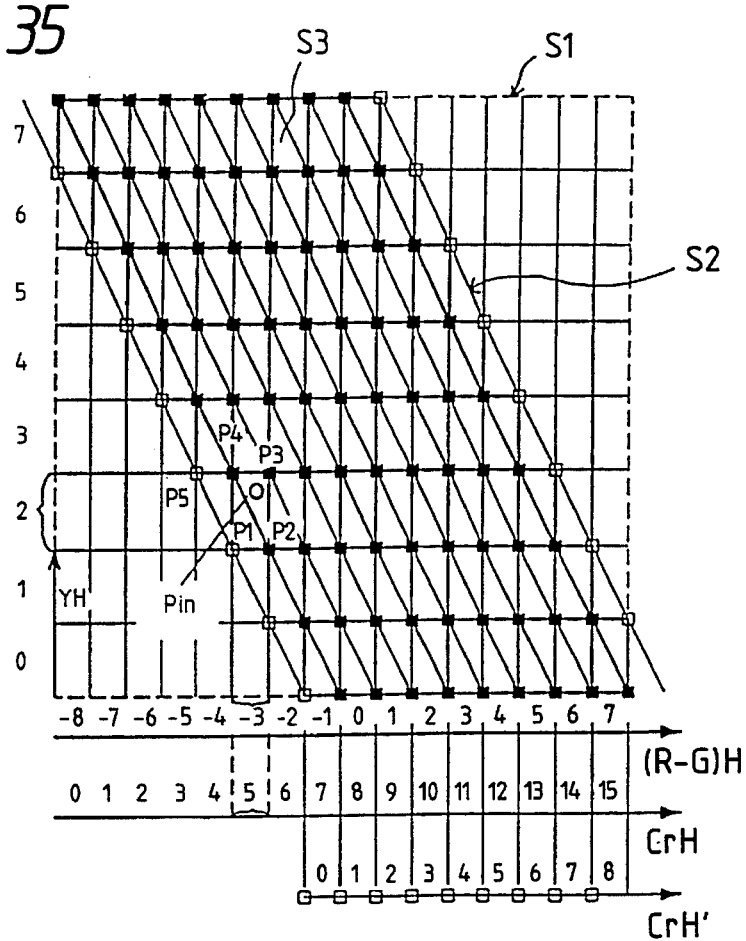
FIG. 35 shows a two-dimensional relationship between a YCrCb cube in a YCrCb rectangular coordinate system and a RGB parallelepiped in a RGB oblique coordinate system.

FIG. 35 shows a two-dimensional relationship between a YCrCb cube in a YCrCb rectangular coordinate system and a RGB parallelepiped in a RGB oblique coordinate system.

As shown in FIG. 35, a Y—Cr projecting plane of a YCrCb input color space is expressed as a YCr square S1 surrounding an entire area, and a R–G projecting plane of a RGB input color space is expressed as a major RG parallelogram S2 in which a large number of partitioned RG parallelograms S3 exist. Each of the partitioned RG parallelograms S3 has four RG lattice points designated by black square points. In the above expression, four points of a partitioned triangular prism Pr required to interpolate an input color in the partitioned triangular prism Pr are lattice points P1, P2, P3 and P4 of a YCr rectanglular prism parallel to the YH axis and the CrH axis in cases where an input color point Pin is included in a square block (YH1=2, CrH1=5). Therefore, the point P1 is an imaginary lattice point required outside the RGB input color space. In cases where the address translation from (YH1, CrH1) to (YH1', CrH1') is performed in the first-stage address generating section 62 according to the equations (38), (39), an address (YH1', CrH1') of the lattice point P1 functioning as a reference point is specified, so that an address (YH1', CrH1') of a partitioned RG parallelogram having lattice points P1, P2, P4 and P5 is substantially specified.

In the second selecting method, though the address translation from (YH1, CrH1) to (YH1', CrH1') is described for convenience, the address translation from (YH1, CrH1, CbH1) to (YH1', CrH1', CbH1') in a YH—CrH'—CbH' rectangular coordinate system is actually performed in the first address generating section 62. That is, a 3-bit lightness signal YH' having a value YH1', a 4-bit first color difference signal CrH' having a value CrH1' and a 4-bit second color difference signal CbH' having a value CbH1' generated in the generating section 62 are output to the second-stage address generating section 63. That is, a selected block address (YH1', CrH1', CbH1') of a YCrCb selected cubic block Bc is generated in the first-stage address generating section 62, and the selected block address (YH1', CrH1', CbH1') is transferred to the second-stage address generating section 63.

Next, the operation in the second-stage address generating section 63 is described.

In the generating section 63, eight selected addresses of eight pieces of color converting data M0 to M7 required to perform the 6-point interpolation with the selected block address (YH1', CrH1', CbH1') generated in the first-stage address generating section 62 are generated.

Figure 36:
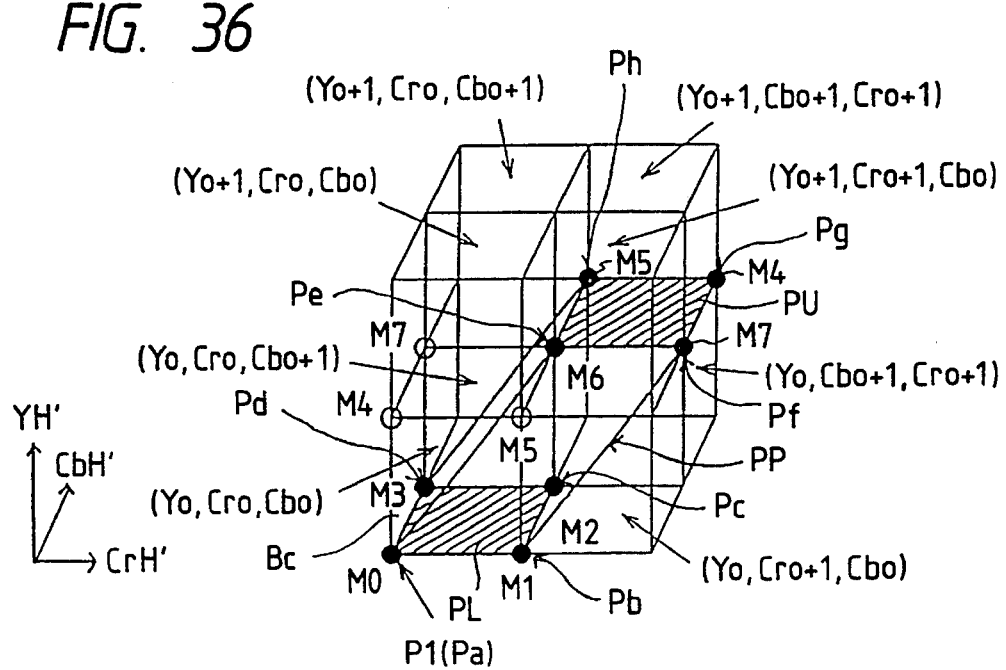
FIG. 36 is a diagonal perspective view of a YH'—CrH'—CbH' address space in which a plurality of partitioned cubic blocks are addressed.

FIG. 36 is a diagonal perspective view of a YH'—CrH'—CbH' address space in which a plurality of partitioned cubic blocks are addressed.

A plurality of partitioned cubic blocks are formed by partitioning a YH'—CrH'—CbH' address space expressed in a YH'—CrH'—CbH' rectangular coordinate system in a YH' direction, a CrH' direction and a CbH' direction. As shown in FIG. 36, a part of the partitioned cubic blocks are addressed at $(Y_o, Cr_o, Cb_o)$, $(Y_o, Cr_o+1, Cb_o)$, $(Y_o, Cr_o+1, Cb_o+1)$, $(Y_o, Cr_o, Cb_o+1)$, $(Y_o+1, Cr_o, Cb_o)$, $(Y_o+1, Cr_o+1, Cb_o)$, $(Y_o+1, Cr_o+1, Cb_o+1)$ and $(Y_o+1, Cr_o, Cb_o+1)$ as an example. The values $Y_o$, $Cr_o$ and $Cb_o$ are respectively an even number. An address of a partitioned cubic block is represented by an address of a lattice point nearest to an original point of the YH'—CrH'—CbH' rectangular coordinate system among eight lattice points of the partitioned cubic block. Each of the partitioned cubic blocks has an upper face and a lower face. Four pieces of color converting data are representatively stored at addresses $(2i, 2j, 2k)$, $(2i, 2j+1, 2k)$, $(2i, 2j+1, 2k+1)$ and $(2i, 2j, 2k+1)$ of four vertexes (or lattice points) of the lower face of each of even-numbered partitioned cubic blocks which each are limitedly allocated at an address $(2i, 2j, 2k)$ expressed by three even numbers, and other four pieces of color converting data are representatively stored at addresses $(2i+1, 2j, 2k)$, $(2i+1, 2j+1, 2k)$, $(2i30\ 1, 2j+1, 2k+1)$ and $(2i+1, 2j, 2k+1)$ of four vertexes (or lattice points) of the upper face of each of the even-numbered partitioned cubic blocks.

In cases where the selected block address (YH1', CrH1', CbH1') agreeing with the address $(Y_o, Cr_o, Cb_o)$ is transferred from the generating section 62 to the generating section 63, the partitioned cubic block addressed at $(Y_o, Cr_o, Cb_o)$ is specified as a selected cubic block Bc. In this case, the input color indicated by the primary color signals R, G and B is included in a RGB parallelepiped PP having a lower plane PL and an upper plane PU. The upper plane PU of the RGB parallelepiped PP agrees with the upper face of the partitioned cubic block addressed at $(Y_o, Cr_o+1, Cb_o+1)$, and the lower plane PL of the RGB parallelepiped PP agrees with the lower face of the partitioned cubic block addressed at $(Y_o, Cr_o, Cb_o)$. That is, the upper plane PU is shifted from the upper face of the partitioned cubic block addressed at (YH1', CrH1', CbH1') in a CrH direction by one and a CbH direction by one. The reason that the upper plane PU is shifted is as follows. In cases where the values CrH1' and CbH1' are obtained from the values CrH1 and CbH1 according to the equations (39), (40), the value YH1 is added to produce the values CrH1' and CbH1'. Therefore, though an address (CrH1, CbH1) of a lattice point at a level determined by a value YH1 corresponds to a translated address (CrH1', CbH1'), an address (CrH1, CbH1) of a lattice point at a level determined by a value YH1+1 corresponds to a translated address (CrH1'+1, CbH1'+1). A positional relation between the upper and lower planes PU, PL is always satisfied.

The lower plane PL has four lattice points Pa, Pb, Pc and Pd addressed at $(Y_o, Cr_o, Cb_o)$, $(Y_o, Cr_o+1, Cb_o)$, $(Y_o, Cr_o+1, Cb_o+1)$ and $(Y_o, Cr_o, Cb_o+1)$ in that order and the upper plane PU has four lattice points Pe, Pf, Pg and Ph addressed at $(Y_o+1, Cr_o+1, Cb_o+1)$, $(Y_o+1, Cr_o+2, Cb_o+1)$, $(Y_o+1, Cr_o+2, Cb_o+2)$ and $(Y_o+1, Cr_o+1, Cb_o+2)$ in that order. Also, pieces of color converting data M0, M1, M2, M3, M4, M5, M6 and M7 required to perform the 6-point interpolation in the calculating section 17 are allocated at the lattice points Pa to Ph of the RGB parallelepiped PP. In this case, because the values $Y_o$, $Cr_o$ and $Cb_o$ are respectively an even number, the color converting data M0, M1, M2 and M3 are allocated at the lattice points Pa to Pd of the lower plane PL agreeing with the partitioned cubic block addressed at $(Y_o, Cr_o, Cb_o)$ in the table memory 15. Also, because the address $(Y_o, Cr_o+1, Cb_o+1)$ is not expressed by three even numbers, no color changing data is allocated at the lattice points of the partitioned cubic block addressed at ($Y_o$, $Cr_o$+1, $Cb_o$+1). Therefore, the color converting data M4, M5, M6 and M7 are allocated at lattice points of upper faces of the partitioned cubic blocks addressed at ($Y_o$, $Cr_o$, $Cb_o$), ($Y_o$, $Cr_o$+2, $Cb_o$) ($Y_o$, $Cr_o$, $Cb_o$+2), ($Y_o$, $Cr_o$+2, $Cb_o$+2) in the table memory 15.

Next, a method for accessing the color converting data M0 to M7 stored in the table memory 15 with the selected block address (YH1', CrH1', CbH1') of the selected cubic block Bc to perform the 6-point interpolation in the calculating section 17 is described in detail with reference to FIGS. 37, 38.

Figure 37:
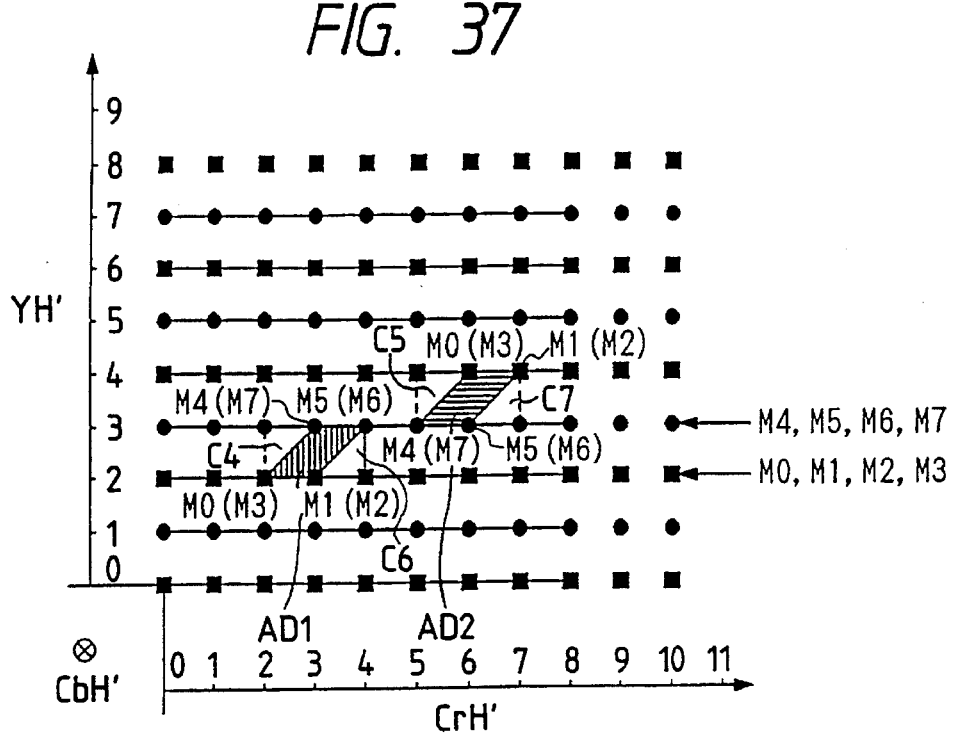
FIG. 37 conceptually shows pieces of color converting data arranged in a YH'—CrH'—CbH' input color space on condition that the YH'—CrH'—CbH' input color space is observed from an observing point positioned on a negative CbH' axis.

FIG. 37 conceptually shows pieces of color converting data arranged in a YH'—CrH'—CbH' input color space on condition that the YH'—CrH'—CbH' input color space is observed from an observing point positioned on a negative CbH' axis. FIG. 38 conceptually shows pieces of color converting data arranged in a YH'—CrH'—CbH' input color space on condition that the YH'—CrH'—CbH' input color space is observed from an observing point positioned on a positive YH' axis.

As shown in FIG. 37, in cases where a value YH1' in an address (YH1', CrH1', CbH1') of a partitioned cubic block C4 transferred from the generating section 62 to the generating section 63 is an even number such as "2", the color converting data M0 to M7 required to perform the 6-point interpolation are stored at first addresses AD1. Also, in cases where a value YH1' in an address (YH1', CrH1', CbH1') of a partitioned cubic block C5 transferred from the generating section 62 to the generating section 63 is an odd number such as "3", the color converting data M0 to M7 required to perform the 6-point interpolation are stored at second addresses AD2. In cases where the value YH1' is the even number, the color converting data M0 to M3 are addressed at lattice points Pa to Pd of a lower face of the partitioned cubic block C4, and the color converting data M4 to M7 are addressed at lattice points Pe to Ph of an upper face of another partitioned cubic block C6. In cases where the value YH1' is the odd number, the color converting data M4 to M7 are addressed at lattice points Pa to Pd of a lower face of the partitioned cubic block C5, and the color converting data M0 to M3 are addressed at lattice points Pe to Ph of an upper face of the partitioned cubic block C7.

Figure 38:
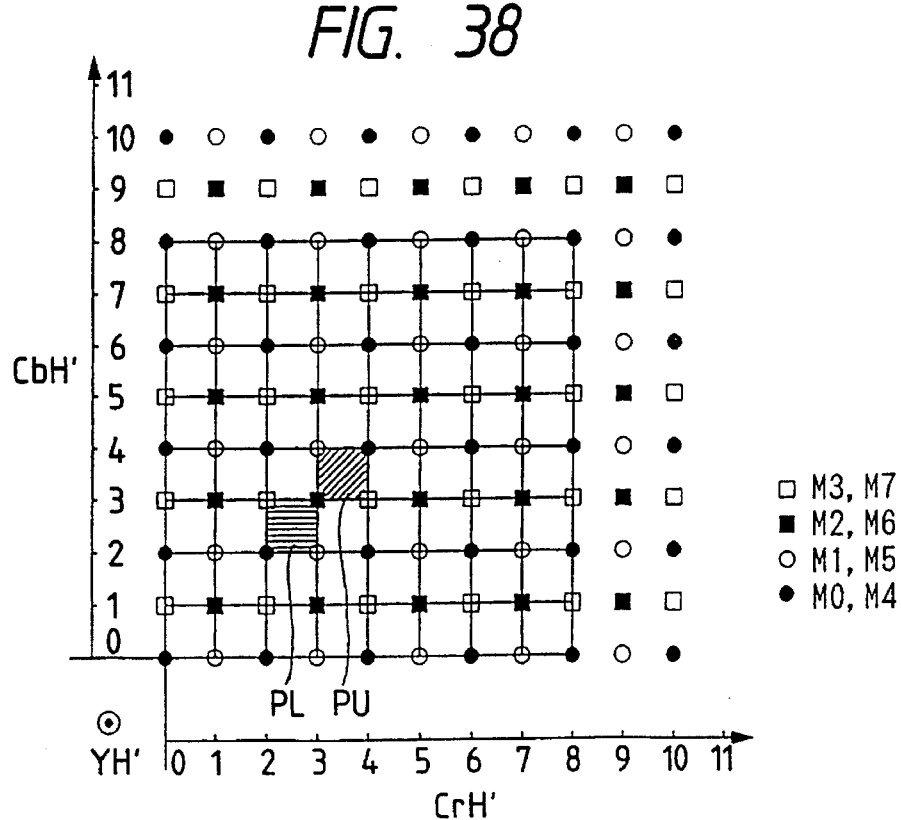
FIG. 38 conceptually shows pieces of color converting data arranged in a YH'—CrH'—CbH' input color space on condition that the YH'—CrH'—CbH' input color space is observed from an observing point positioned on a positive YH' axis.

As shown in FIG. 38, in cases where a position of a lower plane PL of a parallelepiped is specified, an upper plane PU of the parallelepiped is placed at a position shifted in a CrH' direction by one and a CbH' direction by one.

Figure 39:
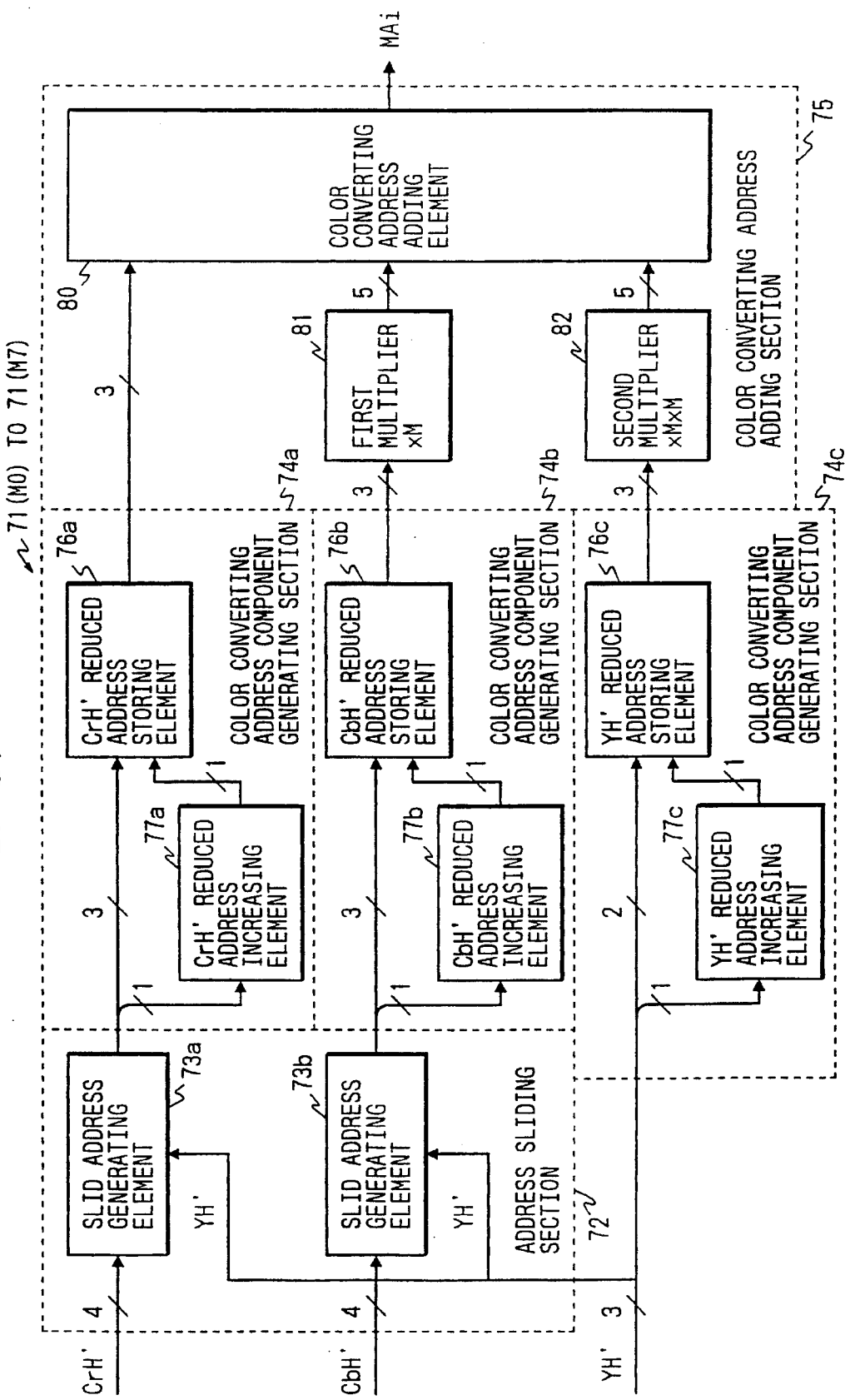
FIG. 39 is a block diagram of one of eight address generating units of a second-stage address generating section shown in FIG. 29.

FIG. 39 is a block diagram of one of eight address generating units provided in the second-stage address generating section 63 shown in FIG. 29.

The second-stage address generating section 63 comprises eight address generating units 71(M0) to 71(M7) for generating eight color converting addresses of the lattice points Pa to Ph of the parallelepiped PP. The accessing method shown in FIGS. 37, 38 is performed in each of the address generating units 71(M0) to 71(M7) shown in FIG. 39.

As shown in FIG. 39, each of the address generating units 71(M0) to 71(M7) comprises an address sliding section 72 for generating a slid address from the value CrH1' or CbH1' in each of slid address generating elements 73a, 73b in dependent on whether the value YH1' of the selected block address (YH1', CrH1', CbH1') transferred from the generating section 62 is an even number or an odd number, three color converting address component generating sections 74a, 74b, 74c arranged in parallel for respectively generating a component of a color converting address by increasing a component of a reduced address produced from the slid address in cases where the slid address is an odd number on a certain condition, and a color converting address adding section 75 for adding the components of the color converting addresses obtained in the color converting address generating sections 74a, 74b, 74c to each other to produce a linear memory address MAi (i=0, 1, - - - , or 7) at which one of the color converting data M0 to M7 is stored.

As is described in FIGS. 37, 38, in cases where the value YH1' is an even number, the color converting data M0 to M3 are addressed at the lattice points Pa to Pd of the lower face of the partitioned cubic block C4, and the color converting data M4 to M7 are addressed at the lattice points Pe to Ph of the upper face of the partitioned cubic block C6. Also, in cases where the value YH1' is an odd number, the color converting data M4 to M7 are addressed at the lattice points Pa to Pd of the lower face of the partitioned cubic block C5, and the color converting data M0 to M3 are addressed at the lattice points Pe to Ph of the upper face of the partitioned cubic block C7.

In the above configuration, the 3-bit lightness signal YH' is sent to the slid address generating elements 73a, 73b to judge whether the value YH1' is an even number or an odd number. Also, the 4-bit first color difference signal CrH' is sent to the slid address generating element 73a, and the 4-bit second color difference signal CbH' is sent to the slid address generating element 73b. In cases where the value YH1' is an even number in the address generating unit 71(M0), 71(M1), 71(M2) or 71(M3) or in cases where the value YH1' is an odd number in the address generating unit 71(M4), 71(M5), 71(M6) or 71(H7), the value CrH1' transferred from the generating section 62 is regarded as a CrH' slid component of a slid address without any address sliding operation in the slid address generating element 73a, and the CrH' slid component having the value CrH1' is sent to the color converting address component generating section 74a. Also, the value CbH1' transferred from the generating section 62 is regarded as a CbH' slid component of the slid address without any address sliding operation in the slide address generating element 73b, and the CbH' slid component having the value CbH1' is sent to the color converting address component generating section 74b. Also, the value YH1' transferred from the generating section 62 is sent to the color converting address component generating section 74c as a YH' slid component of the slid address.

In contrast, the value YH1' is an odd number in the address generating unit 71(M0), 71(M1), 71(M2) or 71(M3) or in cases where the value YH1' is an even number in the address generating unit 71(M4), 71(M5), 71(M6) or 71(M7), a numeral "1" is added to the value CrH1' transferred from the generating section 62 in the slid address generating element 73a to produce a CrH' slid component of a slid address, and the CrH' slid address of a value CrH1'+1 is sent to the address component generating section 74a. Also, a numeral "1" is added to the value CbH1' transferred from the generating section 62 in the slid address generating element 73b to produce a CbH' slid component of the slid address, and the CbH' slid address of a value CbH1'+1 is sent to the address component generating section 74b. Also, the value YH1' transferred from the generating section 62 is sent to the address component generating section 74c as a YH' slid component of the slid address.

In the color converting address component generating section 74a, a 4-bit CrH' slid address signal expressing the CrH' slid component of the slid address is splitted into an upper 3-bit CrH' slid address signal having a reduced CrH' value and a lower 1-bit CrH' signal, the upper 3-bit CrH' slid address signal is sent to a CrH' reduced address storing element 76a to store the reduced CrH' value as a CrH' reduced component of a reduced address, and the lower 1-bit CrH' signal is sent to a CrH' reduced address increasing element 77a. Also, a 4-bit CbH' slid address signal expressing the CbH' slid component of the slid address is splitted into an upper 3-bit CbH' slid address signal having a reduced CbH' value and a lower 1-bit CbH' signal, the upper 3-bit CbH' slid address signal is sent to a CbH' reduced address storing element 76b to store the reduced CbH' value as a CbH' reduced component of the reduced address, and the lower 1-bit CbH' signal is sent to a CbH' reduced address increasing element 77b. Also, the 3-bit lightness signal YH' is splitted into an upper 2-bit YH' slid address signal having a reduced YH' value and a lower 1-bit YH' signal, the upper 2-bit YH' slid address signal is sent to a YH' reduced address storing element 76c to store the reduced YH' value as a YH' reduced component of the reduced address, and the lower 1-bit YH' signal is sent to a YH' reduced address increasing element 77c.

FIGS. 40A, 40B, 40C are respectively a logical circuit embodying each of the color converting address component generating sections 74a, 74b, 74c shown in FIG. 39.

As shown in FIG. 40A, the color converting address component generating section 74a comprises a CrH' inhibit gate 78a for receiving the lower 1-bit CrH' signal and a 1-bit adjusting signal UX to output a 1-bit CrH' increasing signal and a CrH' adder 79a for adding a value of the 1-bit CrH' increasing signal to the reduced CrH' value of the upper 3-bit CrH' slid address signal to produce a CrH' component of a color converting address. In cases where the lower 1-bit CrH' signal set to "1" and the 1-bit adjusting signal UX set to "0" are received in the CrH' inhibit gate 78a, the value of the 1-bit CrH' increasing signal is set to "1", so that the reduced CrH' value of the upper 3-bit CrH' slid address signal stored in the CrH' adder 79a is incremented to produce a CrH' component of a color converting address. In other cases, the value of the 1-bit CrH' increasing signal is set to "0", so that the reduced CrH' value of the upper 3-bit CrH' slid address signal stored in the CrH' adder 79a is not increased to produce a CrH' component of a color converting address.

Also, as shown in FIG. 40B, the color converting address component generating section 74b comprises a CbH' inhibit gate 78b for receiving the lower 1-bit CbH' signal and a 1-bit adjusting signal UY to output a 1-bit CbH' increasing signal and a CbH' adder 79b for adding a value of the 1-bit CbH' increasing signal to the reduced CbH' value of the upper 3-bit CbH' slid address signal to produce a CbH' component of the color converting address. In cases where the lower 1-bit CbH' signal set to "1" and the 1-bit adjusting signal UX set to "0" are received in the CbH' inhibit gate 78b, the value of the 1-bit CbH' increasing signal is set to "1", so that the reduced CbH' value of the upper 3-bit CbH' slid address signal stored in the CbH' adder 79b is incremented to produce a CbH' component of the color converting address. In other cases, the value of the 1-bit CbH' increasing signal is set to "0", so that the reduced CbH' value of the upper 3-bit CbH' slid address signal stored in the CbH' adder 79b is not increased to produce a CbH' component of the color converting address.

Also, as shown in FIG. 40C, the color converting address component generating section 74c comprises a YH' inhibit gate 78c for receiving the lower 1-bit YH' signal and a 1-bit adjusting signal UZ to output a 1-bit YH' increasing signal and a YH' adder 79c for adding a value of the 1-bit YH' increasing signal to the reduced YH' value of the upper 2-bit YH' slid address signal to produce a YH' component of the color converting address. In cases where the lower 1-bit YH' signal set to "1" and the 1-bit adjusting signal UX set to "0" are received in the YH' inhibit gate 78c, the value of the 1-bit YH' increasing signal is set to "1", so that the reduced YH' value of the upper 2-bit YH' slid address signal stored in the YH' adder 79c is incremented to produce a YH' component of the color converting address. In other cases, the value of the 1-bit YH' increasing signal is set to "0", so that the reduced YH' value of the upper 2-bit YH' slid address signal stored in the YH' adder 79c is not increased to produce a YH' component of the color converting address.

Values of the 1-bit adjusting signals UX, UY and UZ depend on the color converting data M0 to M7 of which eight color converting addresses are obtained in the address generating units 71(M0) to 71(M7), and a relationship between the signals UX, UY and UZ and the color converting data M0 to M7 are shown in FIG. 40D.

Figure 41B:
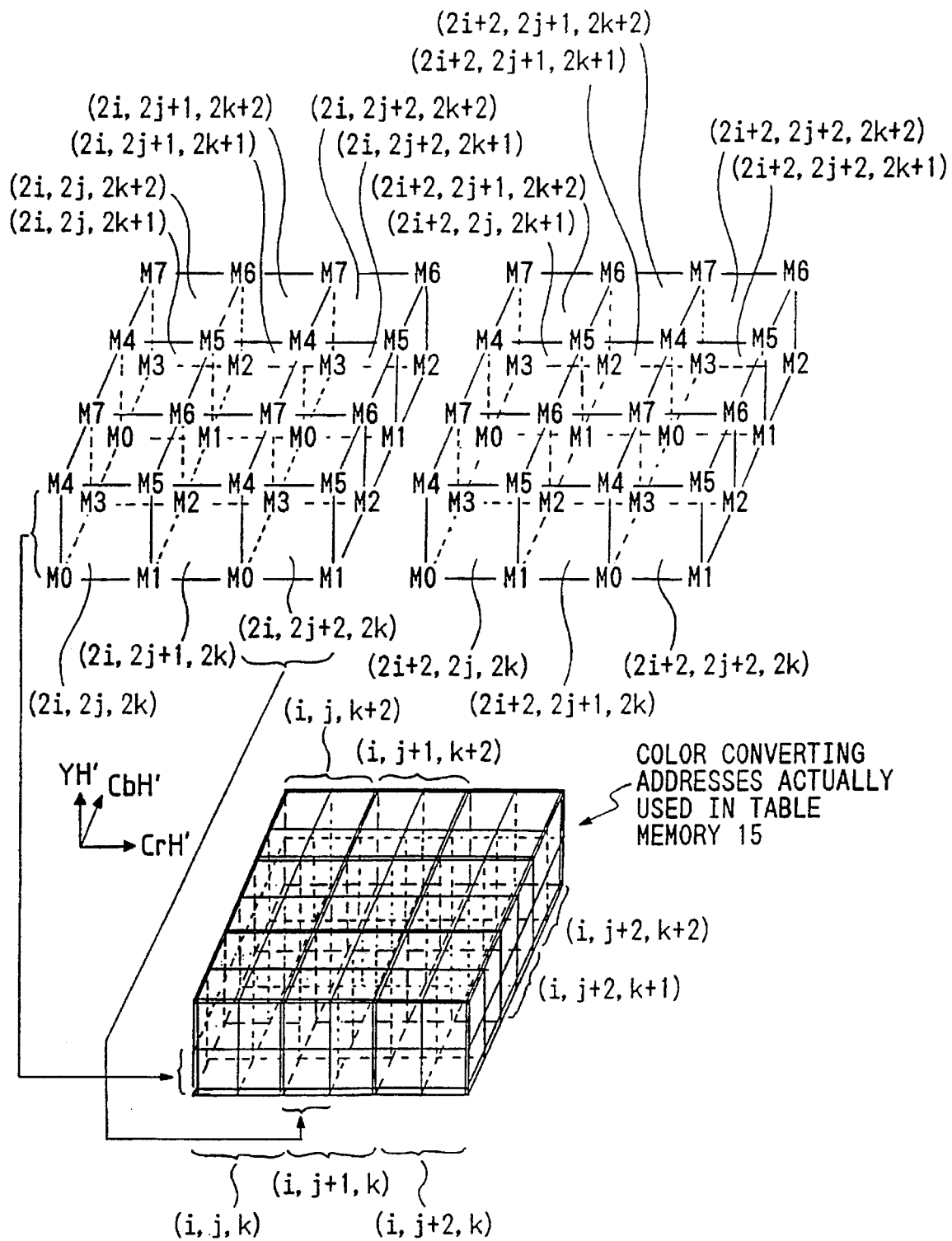
FIG. 41B is a diagonal perspective view of a plurality of partitioned cubic blocks to show pieces of color converting data M0 to M7 in a three-dimensional YH'—CrH'—CbH' color space.

FIG. 41A shows a relationship among the color converting data H0 to H7 of which eight color converting addresses are obtained in the address generating units 71(H0) to 71(H7), the selected block address (YH1', CrH1', CbH1'), the slid address formed of the CrH', CbH' and YH' slid components, the reduced address formed of the CrH', CbH' and YH' reduced components, and the color converting address formed of the CrH', CbH' and YH' components. FIG. 41B is a diagonal perspective view of a plurality of partitioned cubic blocks to show pieces of color converting data M0 to M7 in a three-dimensional YH'-CrH'-CbH' color space.

In FIG. 41A, eight types of representative addresses expressed by $(2i, 2j, 2k)$, $(2i, 2j+1, 2k)$, $(2i, 2j, 2k+1)$, $(2i, 2j+1, 2k+1)$, $(2i+1, 2j, 2k)$, $(2i+1, 2j+1, 2k)$, $(2i+1, 2j, 2k+1)$ and $(2i+1, 2j+1, 2k+1)$ are respectively considered as the selected block address (YH1', CrH1', CbH1'). In cases where one of the representative addresses is sent to the second-stage address generating section 63, eight color converting addresses of pieces of color converting data M0 to M7 shown in FIG. 41B are determined. In this case, each of the color converting data M0 to M7 to be stored at the color converting addresses (2I, 2J, 2K) expressed by three even numbers 2I, 2J and 2K (I=0,1,2, - - -, J=0,1,2, - - -, K=0,1,2, - - -) are actually stored at color converting addresses (I, J, K) in the table memory 15 to efficiently use the color converting addresses. Therefore, the color converting addresses shown in FIG. 41A are not expressed by (2I, 2J, 2K) but expressed by (I, J, K).

Accordingly, because the color converting addresses of the color converting data M0 to M7 are generated in the address sliding section 72 and the color converting address component generating sections 74a, 74b, 74c, the color converting data M0 to M7 addressed at the lattice points Pa to Ph of the partitioned cubic blocks of which the addresses are specified by the even numbers can be read out in the table memory 15.

Thereafter, the CrH' component of the color converting address in the storing element 76a is sent to an color converting address adding element 80 of the address adding section 75. The CbH' component of the color converting address in the storing element 76b is multiplied by a value M in a first multiplier 81, and the multiplied value CbH1'*M is sent to the color converting address adding element 80. The YH' component of the color converting address in the storing element 76C is multiplied by a value $M^2$ in a second multiplier 82, and the multiplied value YH1'*$M^2$ is sent to the color converting address adding element 80. Thereafter, the values CrH1', CbH1'*M and YH1'*M² are added to produce a linear memory address MAi (i=0, 1, - - -, or 7) at which one of the color converting data M0 to M7 is stored, the operation in the adding section 75 is expressed according to equations (45), (46).

$$MAi = YH1'*M^2 + CbH1'*M + CrH1' \quad (45)$$

$$M = (N+1)/2+1 = 6 \text{(in case of } N=9) \quad (46)$$

A value M is determined by utilizing the number N of types of values of CrH1', CbH1' of which the range is determined in the first-stage address generating section 62 according to the equations (41), (42). That is, because the values of CrH1', CbH1' are increased by one in the address sliding section 72 and is reduced to ½ to store the CrH' and CbH' reduced components in the address storing elements 76a, 76b before the CrH' and CbH' reduced components are increased by one by receiving the CrH' and CbH' increasing signals transferred from the address increasing elements 77a, 77b, the value M is determined according to the equation (46).

Accordingly, because the selected block address (YH1', CrH1', CbH1') are changed to the linear memory address MAi in the address adding section 75, useless addresses resulting from the discontinuity of the addresses in the color converting table memory 15 can be avoided.

Thereafter, the eight linear memory addresses MA1 to MA7 are transferred in parallel from the address generating units 71(M0) to 71(M7) of the second-stage address generating section 63 to the color converting table memory 15 through the memory interface section 16. In the table memory 15, the color converting data M0 to M7 stored at the linear memory addresses MA1 to MA7 are read out. That is, the color converting data M0 to M7 are stored in eight color converting random access memories CRAM0 to CRAM7 of a color converting table addressed at the selected block address (YH1', CrH1', CbH1'). Thereafter, in cases where a lattice point addressed at (YH1', CrH1', CbH1')=(0, 0, 0) is, for example, specified as the reference point P1 shown in FIG. 36 in the first-stage address generating section 62, the color converting data M0 to M3 read out are transferred to the first selector 65 to output three pieces of color converting data selected from among the color converting data M0 to M3 as the color converting data Da, Db (or Dd) and Dc addressed at the lattice points Pa, Pb (or Pd) and Pc in that order, and the color converting data M4 to M7 read out are transferred to the second selector 66 to output three pieces of color converting data selected from among the color converting data M4 to M7 as the color converting data De, Df (or Dh) and Dg addressed at the lattice points Pe, Pf (or Ph) and Pg in that order. In cases where the selecting signal Sp set to "0" is transferred from the selecting section 13 to the first and second selectors 65, 66, three pieces of color converting data selected from among the color converting data M0 to M3 (or M4 to M7) are output as the color converting data Da, Db and Dc (or De, Df, Dg) addressed at the lattice points Pa, Pb and Pc (or Pe, Pf and Pg). Also, in cases where the selecting signal Sp set to "1" is transferred from the selecting section 13 to the first and second selectors 65, 66, three pieces of color converting data selected from among the color converting data M0 to M3 (or M4 to M7) are output as the color converting data Da, Dd and Dc (or De, Dh, Dg) addressed at the lattice points Pa, Pd and Pc (or Pe, Ph and Pg).

Figures 42A, 42B:
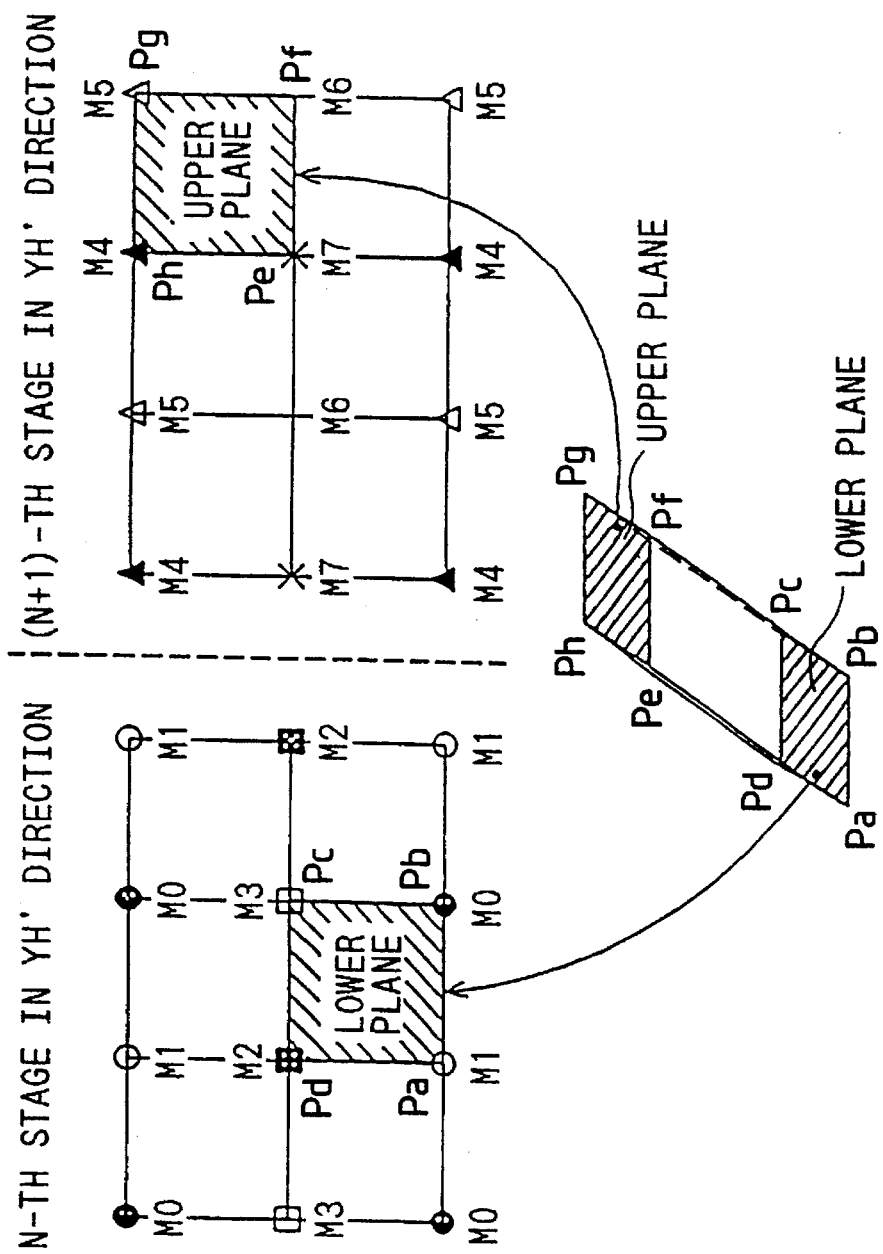
FIG. 42A shows the distribution of pieces of color converting data M0 to M3 addressed at lattice points of lower planes.
FIG. 42B shows the distribution of pieces of color converting data M4 to M7 addressed at lattice points of upper planes.

FIG. 42A shows the distribution of the color converting data M0 to M3 addressed at lattice points of lower planes, and FIG. 42B shows the distribution of the color converting data M4 to M7 addressed at lattice points of upper planes.

In cases where the color converting data M0 to M3 are addressed at four lattice points of a lower plane of each of partitioned cubic blocks addressed by even numbers YH1', CrH1' and CbH1' as an example, the color converting data M0 to M3 are regularly addressed at all of the lattice points as shown in FIG. 42A. Also, in cases where the color converting data M4 to M7 are addressed at four lattice points of an upper plane of each of partitioned cubic blocks addressed by even numbers YH1', CrH1' and CbH1' as an example, the color converting data M4 to M7 are regularly addressed at all of the lattice points as shown in FIG. 42B. For example, in cases where a lattice point addressed at (YH1', CrH1', CbH1')=(2i, 2j+1, 2k) is, for example, specified as the reference point P1, the partitioned cubic block addressed at (YH1', CrH1', CbH1')=(2i, 2j+1, 2k) is specified in the generating section 62, addresses of the lattice points Pa to Pd of a lower plane PL1 are determined as the addresses MA0 to MA3 of the color converting data M0 to M3 in the generating section 63, and addresses of the lattice points Pe to Ph of an upper plane PU1 are determined as the addresses MA4 to MA7 of the color converting data M4 to M7 in the generating section 63. In the first selector 65, the color converting data M1 is output as the color converting data Da addressed at the lattice point Pa, the color converting data M0 (or M2) is output as the color converting data Db (or Dd) addressed at the lattice point Pb (or Pd), and the color converting data M3 is output as the color converting data Dc addressed at the lattice point Pc. In the second selector 66, the color converting data M7 is output as the color converting data De addressed at the lattice point Pe, the color converting data M6 (or M4) is output as the color converting data Df (or Dh) addressed at the lattice point Pf (or Ph), and the color converting data M5 is output as the color converting data Dg addressed at the lattice point Pg. A relationship between the selected block address (YH1', CrH1', CbH1') specified in the generating section 62 and the color converting data M0 to M7 output from the first and second selectors 65, 66 as the color converting data Da to Dh addressed at the lattice points Pa to Ph is shown in FIG. 42C.

Next, the operation in the weight controlling section 64 is described with reference to FIG. 43.

Figures 42C, 43:
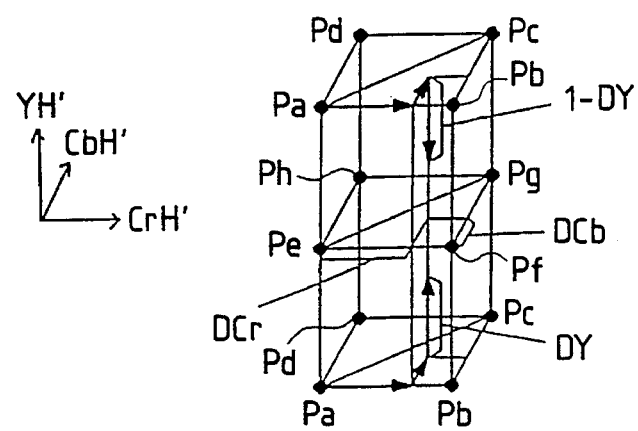
FIG. 42C shows a relationship between a selected block address (YH1', CrH1', CbH1') specified in a first-stage address generating section shown in FIG. 29 and pieces of color converting data M0 to M7 output from first and second selectors shown in FIG. 29 as the color converting data Da to Dh.
FIG. 43 explanatorily shows a 6-point interpolation in a YH' direction which is performed in dependent on whether a value YH1' is an even number or an odd number.

FIG. 43 explanatorily shows a 6-point interpolation in a YH' direction which is performed in dependent on whether a value YH1' is an even number or an odd number.

In cases where the value YH1' of the upper lightness signal YH is an even number, the reference point P1 of which the address is specified in the generating section 62 accords with the lattice point Pa. Therefore, the interpolation in a YH' direction is performed with a value DY1 of the lower lightness signal DY according to the equation (11) in the same manner as in the first embodiment. In contrast, in cases where the value YH1' of the upper lightness signal YH' is an odd number, the reference point P1 of which the address is specified in the generating section 62 accords with the lattice point Pe shown in FIG. 43. In this case, the value DY1 of the lower lightness signal DY is changed to DY1'= 1-DY1, so that the equation (11) is changed to an equation (47).

$$Do = (1-DY1')*Dm + DY1'*Dn = DY1*Dm + (1-DY1)*Dn \quad (47)$$

Therefore, in cases where the interpolation in the YH' direction is performed according to the equation (47), the 6-point interpolation can be performed in the calculating section 17 in the same manner as in the first embodiment.

To perform the 6-point interpolation in the calculating section 17 in the same manner as in the first embodiment, the least significant bit of the upper 3-bit lightness signal YH is transferred to the weight controlling section 64, and it is judged whether the value YH1 of the upper 3-bit lightness signal YH (that is, YH') is an even number or an odd number. In cases where the value YH1 is an even number, the value DY1 received in the section 64 is transferred to the calculating section 17 as a weighting factor of the YH' direction without any change of the value DY1. In contrast, in cases where the value YH1 is an odd number, the value DY1 received in the section 64 is changed to the value DYi'=1−DY1, and the value DY1' is transferred to the calculating section 17 as a weighting factor of the YH' direction. In addition, lower color difference signals DCr, DCb are transferred from the input section 12 to the calculating section 17 to perform the 6-point interpolation in the calculating section 17 with the value DY1 (or DY1') and values DCr1, DCb1 of the signal DCr, DCb.

Accordingly, even though the color converting data M0 to M7 are output from the first and selectors 65, 66 according to the relationship shown in FIG. 42C regardless of whether the value YH1' of the upper lightness signal YH' is an even number or an odd number, the 6-point interpolation can be performed in the calculating section 17 in the same manner as in the first embodiment.

Next, a color converting apparatus according to a fourth embodiment of the present invention is described.

Figure 44:
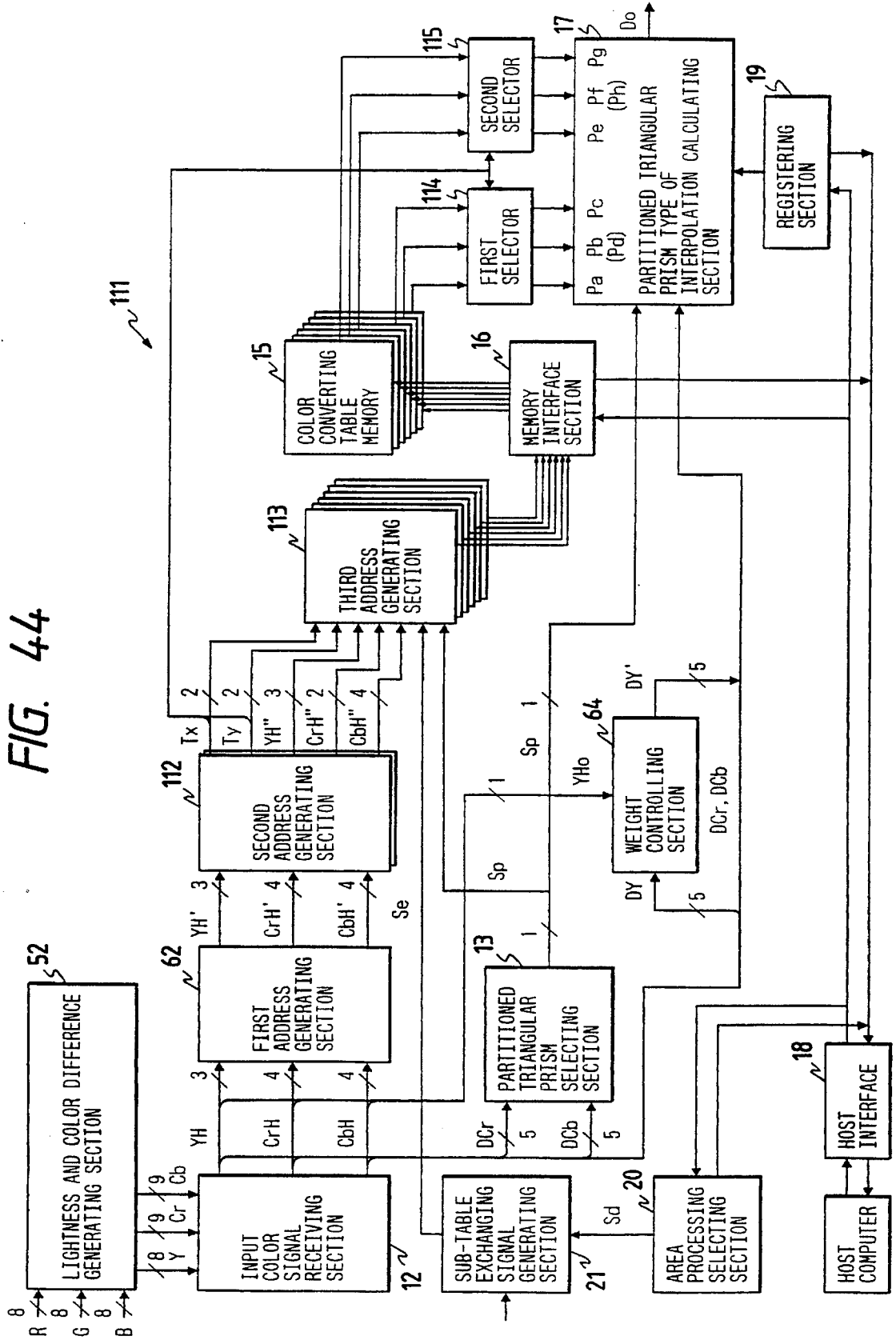
FIG. 44 is a block diagram of a color converting apparatus according to a fourth embodiment.

FIG. 44 is a block diagram of a color converting apparatus according to a fourth embodiment.

As shown in FIG. 44, a color converting apparatus 111 comprises the color converting table memory 15 for storing six pieces of color converting data in the color converting random access memories CRAM0 to CRAM5 of each of the color converting tables, the lightness and color difference generating section 52 for converting 8-bit primary color signals R, G and B indicating an input color to an 8-bit lightness signal Y, a 9-bit first color difference signal Cr and a 9-bit second color difference signal Cb, the input signal receiving section 12, the partitioned triangular prism selecting section 13, the first address generating section 62, a second address generating section 112 for generating memory addresses CrH", CbH" and remainders Tx, Ty with a selected cubic address (YH1', CrH1', CbH1') of a selected cubic block generated in the first address generating section 62, a third address generating section 113 for generating six color converting addresses of lattice points of a triangular prism with the memory addresses CrH", CbH" and the remainders Tx, Ty, the weight controlling section 64, the memory interface section 16, a first selector 114 for selecting three pieces of color converting data Da, Db (or Dd) and Dc from the color converting data M0 to M2 according to the selected block address (YH1", CrH1", CbH1") of a partitioned cubic block Bc and the selecting signal Sp transferred from the partitioned triangular prism selecting section 13, a second selector 115 for selecting three pieces of color converting data De, Df (or Dh) and Dg from among the color converting data M3 to M5 according to the selected block address (YH1', CrH1', CbH1') of the partitioned cubic block Bc and the selecting signal Sp transferred from the partitioned triangular prism selecting section 13, the partitioned triangular prism type of interpolation calculating section 17, the host interface section 18, the registering section 19, the area processing section 20, and the signal generating section 21.

Figure 45:
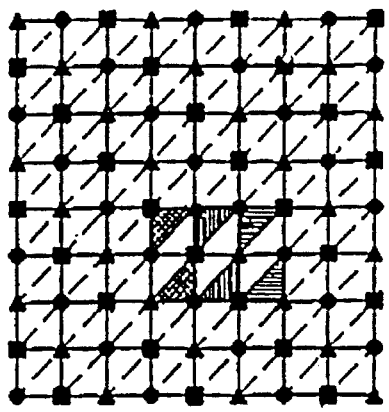
FIG. 45 shows six types of color converting data M0 to M5 stored in a table memory shown in FIG. 44.
Figure 45:
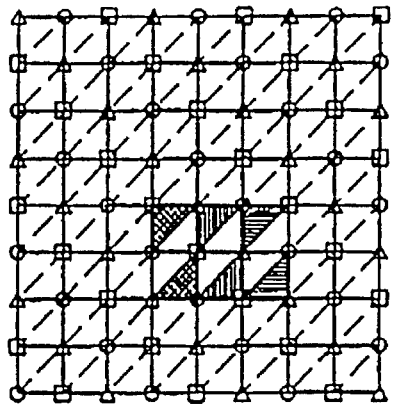

FIG. 45 shows six types of color converting data M0 to M5 stored in the table memory 15.

As shown in FIG. 45, the lightness-color difference space is partitioned into a plurality of cubic blocks (or rectangular prisms). Three types of color converting data M0 to M2 are stored at lower planes of the cubic blocks, and the color converting data M0 to M2 are repeatedly arranged. Also, three types of color converting data M3 to M5 are stored at upper planes of the cubic blocks, and the color converting data M3 to M5 are repeatedly arranged. Therefore, a group of color converting data M0 to M5 can be simultaneously read out from the table memory 15 by specifying a selected block address of a cubic block.

Figure 46:
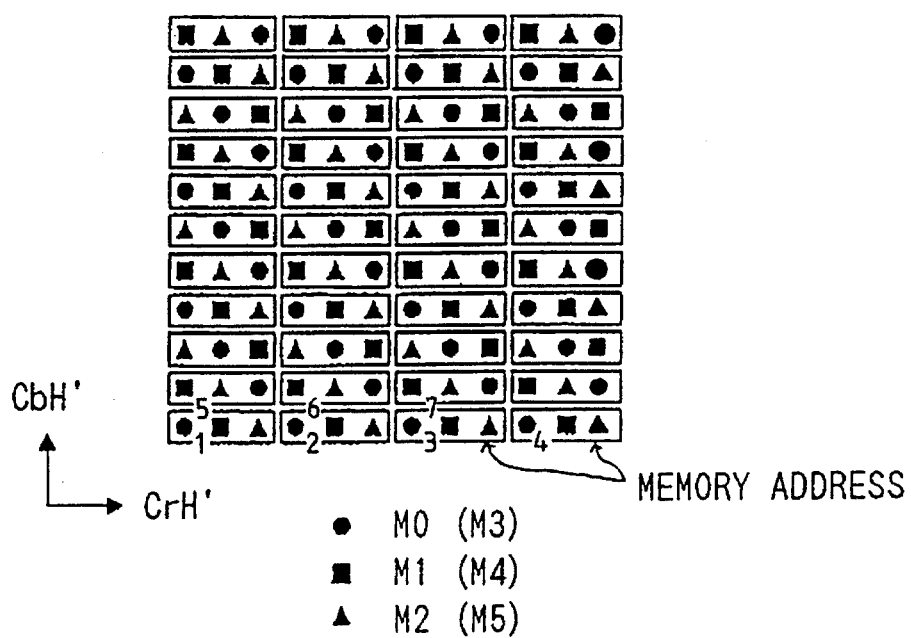
FIG. 46 shows a group of three types of color converting data M0 to M2 (or M3 to M5) addressed at the same memory address in a table memory shown in FIG. 44.

FIG. 46 shows a group of three types of color converting data M0 to M2 (or M3 to M5) addressed at the same memory address in the table memory 15.

As shown in FIG. 46, a group of three types of color converting data M0 to M2 (or M3 to M5) is repeatedly stored in the CrH' direction and the CbH' direction. The group of three types of color converting data M0 to M2 (or M3 to M5) is addressed at the same memory address in the table memory 15.

The selected block address (YH1', CrH1', CbH1') of the selected cubic block Bc specified in the address generating section 62 is transferred to a first address generating unit 121 and a second address generating unit 122 of the second address generating section 112.

Figure 47:
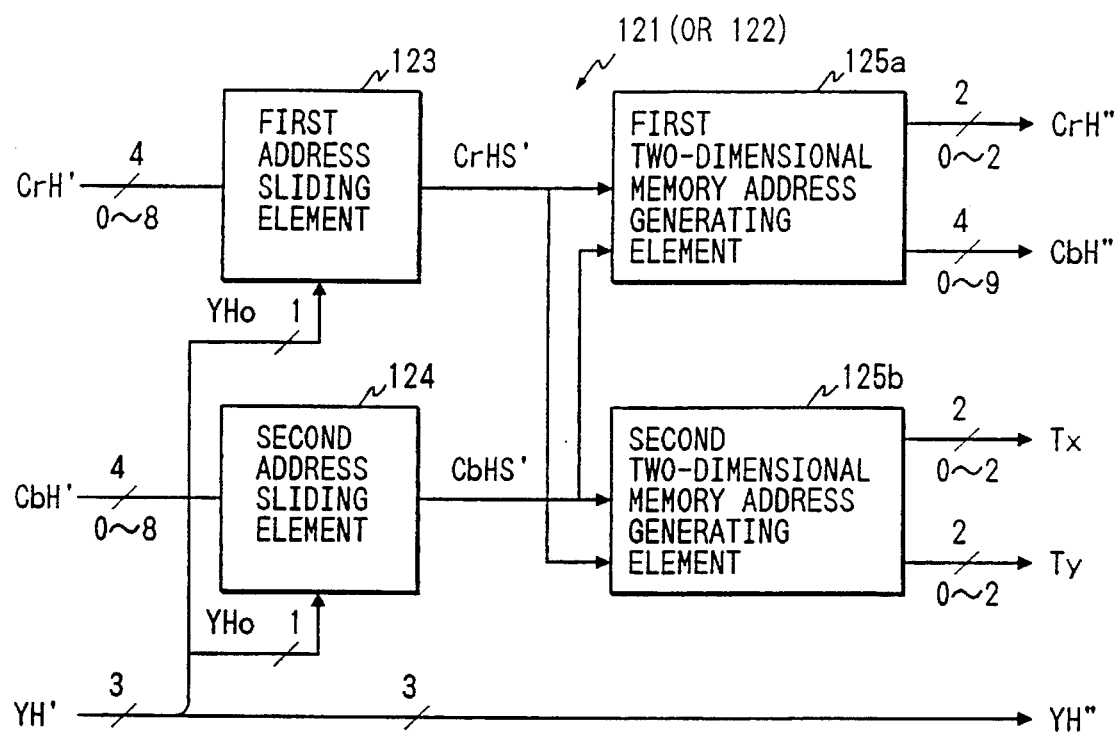
FIG. 47 is a block diagram of first or second address generating unit of a second address generating section shown in FIG. 44.

FIG. 47 is a block diagram of the first or second address generating unit 121 or 122 of the second address generating section 112 shown in FIG. 44.

The first address generating unit 121 is provided to specify a memory address of the table memory 15 in which pieces of color converting data M0 to M2 are stored, and the second address generating unit 122 is provided to specify a memory address of the table memory 15 in which pieces of color converting data M3 to M5 are stored.

As shown in FIG. 47, the upper signal CrH' and a least significant bit $YH_o$ of the upper signal YH' are input to a first address sliding element 123, and the upper signal CbH' and the least significant bit $YH_o$ are input to a second address sliding element 124. In the first address generating unit 121, a numeral "1" is added to the value CrH1' of the upper signal CrH' in the first address sliding element 123 to produce a first slid value CrHS' in cases where the value YH1' is an odd number, and a numeral "1" is added to the value CbH1' of the upper signal CbH' in the second address sliding element 124 to produce a second slid value CbHS' in cases where the value YH1' is an odd number. In other cases, the first slid value CrHS' is equal to the value CrH1', and the second slid value CbHS' is equal to the value CbH1'. In the second address generating unit 122, a numeral "1" is added to the value CrH1' of the upper signal CrH' in the first address sliding element 123 to produce a first slid value CrHS' in cases where the value YH1' is an even number, and a numeral "1" is added to the value CbH1' of the upper signal CbH' in the second address sliding element 124 to produce a second slid value CbHS' in cases where the value YH1' is an even number. In other cases, the first slid value CrHS' is equal to the value CrH1', and the second slid value CbHS' is equal to the value CbH1'. Thereafter, the first and second slid values CrHS', CbHS' are sent to a first two-dimensional memory address generating element 125a and a second two-dimensional memory address generating element 125b. Thereafter, a memory address CrH" in the CrH' direction equal to a quotient obtained by dividing the first slid value CrHS' by 3 and a memory address CbH" in the CbH' direction equal to the second slid value CbHS' are output from the first two-dimensional memory address generating element 125a. Also, a CrH" remainder Tx obtained by dividing the first slid value CrHS' by 3 and a CbH" remainder Ty obtained by dividing the second slid value CbHS' by 3 are output from the second two-dimensional memory address generating element 125b. The addresses and remainders are expressed according to equations (48) to (51).

$$CrH''=CrHS'\div 3 \quad (48)$$

$$Tx=CrHS'\%3 \quad (49)$$

$$Cbn''=CbHS' \quad (50)$$

$$Ty=CbHS'\%3 \quad (51)$$

That is, the symbol %3 denotes a remainder of a division. Therefore, the remainders Tx, Ty respectively indicate a position in the memory address CrH" or CbH". Also, the value YH1' of the upper signal YH' is output as a memory address YH".

Figure 48A:
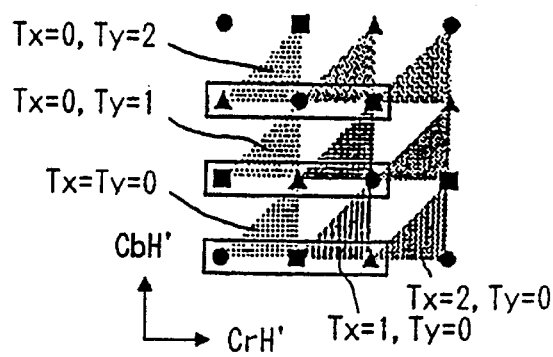
FIGS. 48A, 48B respectively show pieces of color converting data allocated at lattice points of a triangular prism.
Figure 48B:
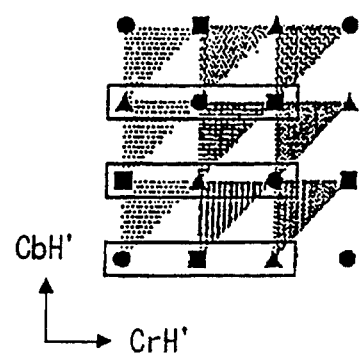

FIGS. 48A, 48B respectively show pieces of color converting data allocated at lattice points of a triangular prism.

As shown in FIG. 48A, a positional relationship between a group of color converting data M0 to M2 (or M3 to M5) and a group of lattice points Pa, Pb and Pc (or Pe, Pf and Pg) of a first triangular prism vary in dependence on the remainders Tx, Ty. That is, there are nine types of positional relationships. Also, as shown in FIG. 48B, a positional relationship between a group of color converting data M0 to M2 (or M3 to M5) and a group of lattice points Pa, Pb and Pc (or Pe, Pf and Pg) of a second triangular prism vary in dependence on the remainders Tx, Ty. That is, there are nine types of positional relationships.

The memory addresses CrH", CbH" are transferred to the third address generating section 113, and the remainders Tx, Ty are transferred to the third address generating section 113 and the selectors 114, 115.

Figure 49A:
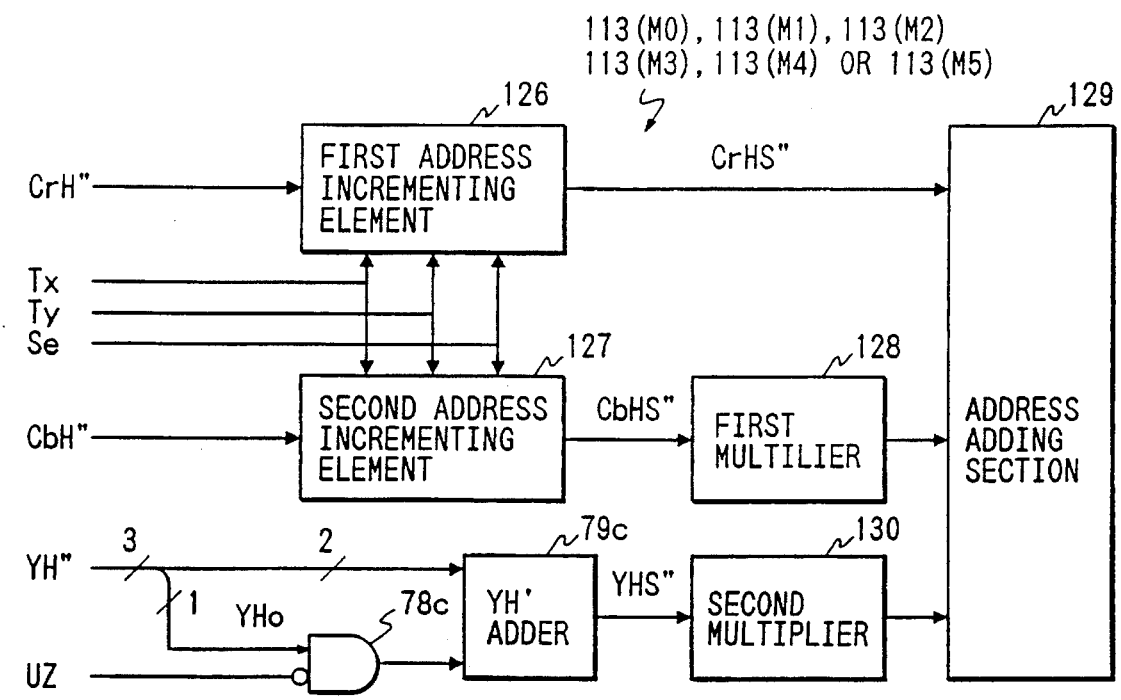
FIG. 49A is a block diagram of one of six address generating units of a third address generating section shown in FIG. 44.

FIG. 49A is a block diagram of one of address generating units 113(M0) to 113(M5) of the third address generating section 113 shown in FIG. 44.

Each of the remainders Tx, Ty ranges from 0 to 2. Therefore, the number of combinations of the remainders Tx, Ty is 9, and the prism selecting signal Se is transferred from the partitioned triangular prism selecting section 13 to the section 113. Therefore, a combination of the memory address (CrH", CbH") is classified to eighteen types of addresses, one of the eighteen types is specified in the section 113.

As shown in FIG. 49A, the memory address CrH" is incremented in a first address incrementing element 126 according to the remainders Tx, Ty and the prism selecting signal Se, and the memory address CbH" is incremented in a second address incrementing element 127 according to the remainders Tx, Ty and the prism selecting signal Se. The logic of the increment in the first and second address incrementing elements 126,127 shown in FIG. 49A is shown in FIG. 49B. In cases where a numeral "1" is given, the memory address CrH" or CbH" is incremented.

Also, the memory address YH" is incremented in the YH' inhibit gate 78c and the YH' adder 79c in the same manner as in the third embodiment. A value of the 1-bit adjusting signal UZ is shown in FIG. 49C. In cases where UZ=0 is satisfied on condition that the value YH" is an odd number, the memory address YH' is incremented. Thereafter, a corrected memory address CbH" stored in the incrementing address 127 is multiplied by a constant M in a first multiplier 128 and is transferred to an address adding section 129. A corrected memory address YH" stored in the YH' adder 79c is multiplied by a constant M*N in a second multiplier 130 and is transferred to the address adding section 129. In the address adding section 129, a corrected memory address CrH" stored in the incrementing address 126, the memory address CbH"*M and the memory address YH"*M*N are added to produce a linear address MAi (i=0 to 5). Here a constant M is equal to 4 because four memory addresses are arranged in the CrH' direction in the table memory 15, and a constant N is equal to 11 because eleven memory addresses are arranged in the CbH' direction in the table memory 15 as shown in FIG. 46.

Thereafter, six linear address MAi are transferred to the table memory 15 through the memory interface section 16 in parallel. Therefore, pieces of color converting data M0 to M5 addressed at the linear address MAi are read out from the table memory 15. The color converting data M0 to M5 agree with pieces of color converting data addressed at color converting addresses of the lattice points Pa, Pb(or Pd), Pc, Pc, Pf (or Ph) and Pg of a triangular prism shown in FIG. 43. Thereafter, the color converting data M0 to M2 are transferred to the first selector 114, and the color converting data M3 to M5 are transferred to the first selector 115.

Figures 49D, 49E, 51:
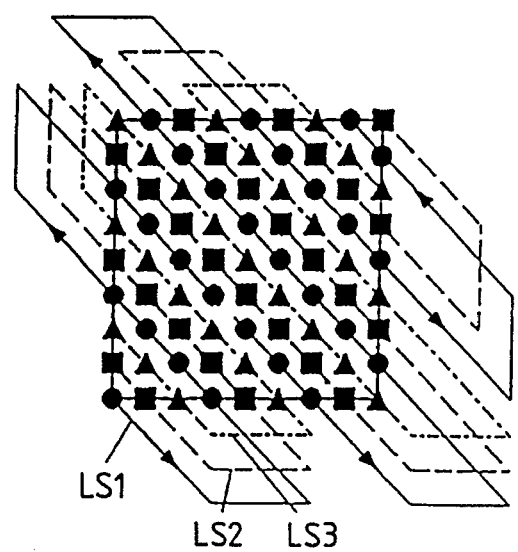
FIG. 49D shows a first relationship between pieces of color converting data M0 to M2 and lattice points Pa, Pb, Pc and a second relationship between pieces of color converting data M3 to M5 and lattice points Pe, Pf and Pg.
FIG. 49E shows a first relationship between pieces of color converting data M0 to M2 and lattice points Pa, Pd, Pc and a second relationship between pieces of color converting data M3 to M5 and lattice points Pe, Ph and Pg.
FIG. 51 shows six types of color converting data M0 to M5 stored in a table memory shown in FIG. 44 according to another modification of the fourth embodiment.

In the first selector 114, a first relationship between the color converting data M0 to M2 and the lattice points Pa, Pb(or Pd), Pc is determined. Also, a second relationship between the color converting data M3 to M5 and the lattice points Pc, Pf (or Ph) and Pg is determined in the second selector 115. In cases where the selecting signal Se denoting the selection of the first triangular prism is sent to the third address generating section 113, the relationships are shown in FIG. 49D. Also, in cases where the selecting signal Sp denoting the selection of the second triangular prism is sent to the third address generating section 113, the relationships are shown in FIG. 49E.

Thereafter, the color converting data M0 to M5 relating to the lattice points Pa, Pb(or Pd), Pc, Pc, Pf (or Ph) and Pg of a triangular prism are transferred to the interpolation calculating section 17 as pieces of color converting data Ma, Mb(or Md), Mc, Me, Mf (or Mh) and Mg, and an interpolated output value Do is interpolated in the same manner as in the first to third embodiments.

Accordingly, because a large number of color converting data are efficiently stored in the table memory 15 without allocating the same color converting data at a plurality of color converting addresses, the scale of the table memory 15 can be reduced, and required color converting data can be read out from the table memory 15 at a high speed.

Figure 50:
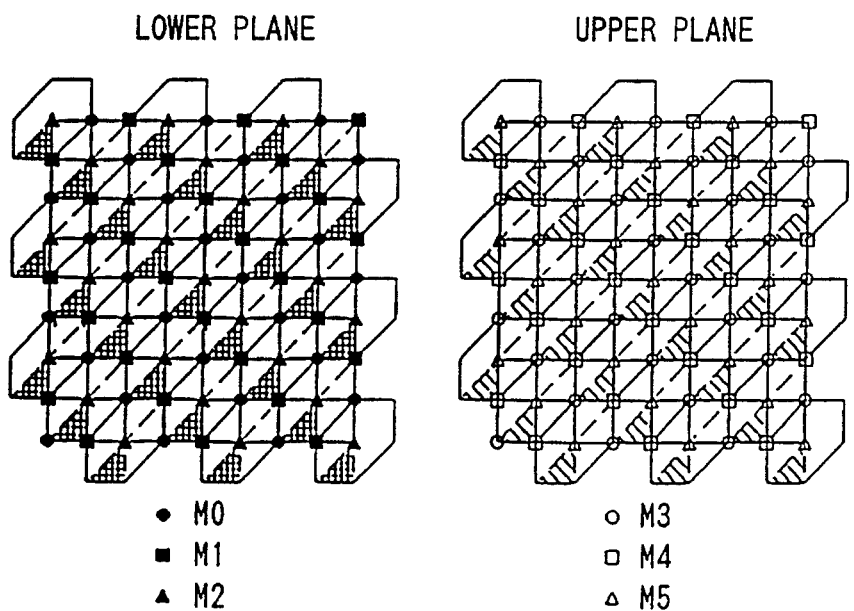
FIG. 50 shows six types of color converting data M0 to M5 stored in a table memory shown in FIG. 44 according to a modification of the fourth embodiment.

FIG. 50 shows six types of color converting data M0 to M5 stored in the table memory 15 according to a modification of the fourth embodiment.

As shown in FIG. 50, all of the color converting addresses in the table memory 15 belong a plurality of meshed triangles. Also, all of the color converting data M0 are placed at left sides of the meshed angles in the lower planes of the cubic blocks, all of the color converting data M1 are placed at right sides of the meshed angles in the lower planes of the cubic blocks, and all of the color converting data M2 are placed at upper sides of the meshed angles in the lower planes of the cubic blocks. Also, all of the color converting data M3 are placed at left sides of the meshed angles in the upper planes of the cubic blocks, all of the color converting data M4 are placed at right sides of the meshed angles in the upper planes of the cubic blocks, and all of the color converting data M5 are placed at upper sides of the meshed angles in the upper planes of the cubic blocks.

Accordingly, because the color converting data M0 to M5 corresponds to the color converting data Da, Db(or Dd), Dc, De, Df (or Dh) and Dg in that order, the output color value Do can be interpolated with the selectors 114, 115.

FIG. 51 shows six types of color converting data M0 to M5 stored in the table memory 15 according to another modification of the fourth embodiment.

As shown in FIG. 51, the arrangement of the color converting addresses M0 to M5 in the table memory 15 is the same as that in the fourth embodiment shown in FIG. 45. However, the order of the color converting addresses differs from that in the fourth embodiment.

For example, all of the color converting data M0 is arranged along a first address scanning line Ls1, all of the color converting data M1 is arranged along a second address scanning line Ls2, and all of the color converting data M3 is arranged along a second address scanning line Ls3.

In the above configuration of the color converting addresses, one of the address scanning lines Ls1, Ls2, Ls3 is selected with the memory addresses YH", CrH" and CbH". Therefore, one of the color converting data M0 to M2 is determined. Thereafter, the number of the color converting address which is specified with the memory addresses YH", CrH" and CbH" and belongs one of the address scanning lines Ls1, Ls2, Ls3 is determined. Therefore, a color converting address of the lattice point Pa of a triangular prism can be specified.

Accordingly, the color converting data M0 to M5 are easily read out from the table memory 15 in the same manner as the fourth embodiment because the arrangement of the color converting addresses M0 to M5 in the table memory 15 is the same as that in the fourth embodiment.

Next, a fifth embodiment according to the present invention is described to achieve the sixth object.

In the fifth embodiment, an output color corresponding to an input color indicated by three primary color signals is interpolated with six pieces of color converting data addressed at six lattice points of an oblique triangular prism defined in a primary color space. That is, a 6-point interpolation utilizing an oblique triangular prism is performed in a color converting apparatus according to the fifth embodiment. A reason that the generation of ripples is prevented in the minimum calculation by performing the 6-point interpolation of the oblique triangular prism according to the fifth embodiment is initially described prior to a color converting apparatus according to the fifth embodiment.

Figure 52:
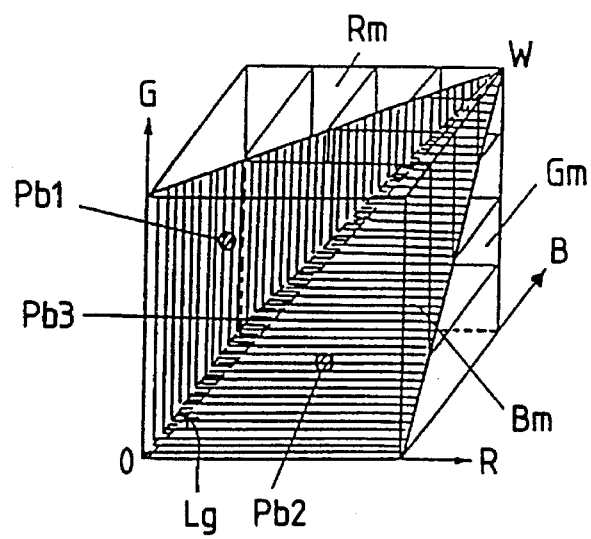
FIG. 52 shows a plurality of constant planes at which output values in the minimum calculation are constant in a RGB rectangular coordinate system.

FIG. 52 shows a plurality of constant planes at which output values in the minimum calculation are constant in a RGB rectangular coordinate system.

As shown in FIG. 52, a RGB cube in a RGB rectangular coordinate system is partitioned into three regions Rm, Gm, Bm by three boundary planes Pb1, Pb2, Pb3 interconnected at a gray line Lg directed from a point O to a point W. In cases where a point PO (RO, GO, BO) placed in the RGB cube is considered, the boundary plane Pb1 is defined as a plane satisfying RO=BO, the boundary plane Pb2 is defined as a plane satisfying BO=GO, and the boundary plane Pb3 is defined as a plane satisfying RO=GO. Therefore, RO=MIN (RO, GO, BO) is satisfied as a result of the minimum calculation in the first region Rm, GO=MIN (RO, GO, BO) is satisfied as a result of the minimum calculation in the second region Gm, and BO=MIN (RO, GO, BO) is satisfied as a result of the minimum calculation in the third region Bm. In other words, a differential value of the result of the minimum calculation in each of the regions Rm, Gm, Bm continuously varies. However, the differential value in each of the boundary planes Pb1, Pb2, Pb3 discontinuously varies. As a result, in cases where an interpolation of an output color is performed in one of the boundary planes Pb1, Pb2, Pb3, an interpolation error considerably occurs.

Figure 53:
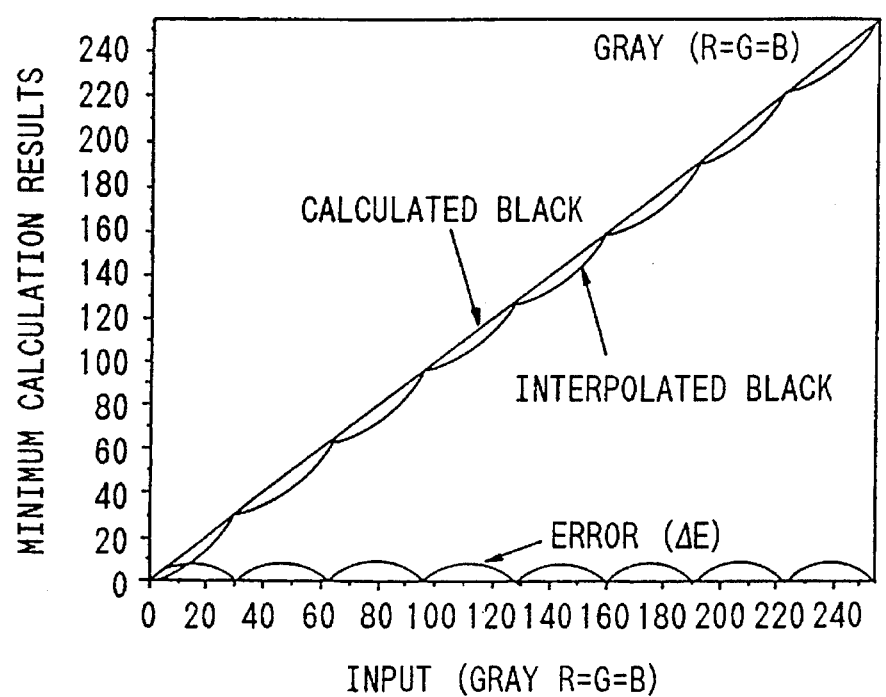
FIG. 53 is a graphic view comparatively showing a 6-point interpolation result and a calculation result at a gray line shown in FIG. 51.

FIG. 53 is a graphic view comparatively showing a 6-point interpolation result and a calculation result at the gray line Lg shown in FIG. 52. Pieces of color converting data are prepared by performing the minimum calculation, and a 6-point interpolation result is obtained according to the fourth conventional method (Published Unexamined Patent Application No. 75848) by utilizing the color converting data.

As shown in FIG. 53, because the boundary planes Pb1, Pb2, Pb3 are intersected at the gray line Lg, a great deal of differential discontinuity occurs in a 6-point interpolation result in cases where the result corresponding to an input along the gray line Lg is interpolated. That is, a large number of ripples are undesirably generated in the interpolation result.

Figure 54A:
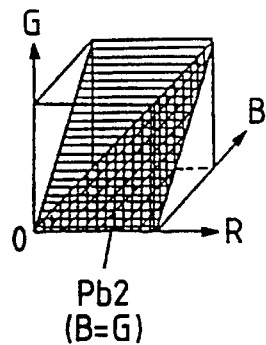
FIGS. 54A, 54B, 54C shows boundary planes Pb1, Pb2, Pb3 shown in FIG. 52 in detail.
Figure 54B:
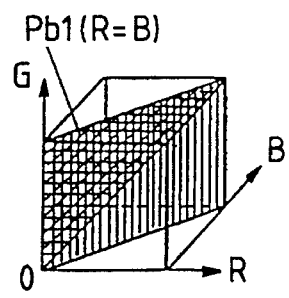
Figure 54C:
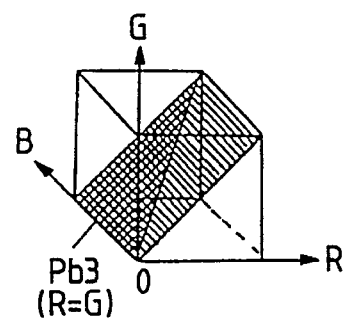

FIGS. 54A, 54B, 54C shows the boundary planes Pb1, Pb2, Pb3 shown in FIG. 52 in detail.

The boundary plane Pb2 is clearly depicted by a cross-hatching portion shown in FIG. 54A, the boundary plane Pb1 is clearly depicted by a cross-hatching portion shown in FIG. 54B, and the boundary plane Pb3 is clearly depicted by a cross-hatching portion shown in FIG. 54C. Therefore, in cases where a RGB input color space is partitioned into a plurality of partitioned blocks in which any of the boundary planes Pb1, Pb2, Pb3 is not included, the generation of the ripples shown in FIG. 53 can be prevented.

Figure 55A:
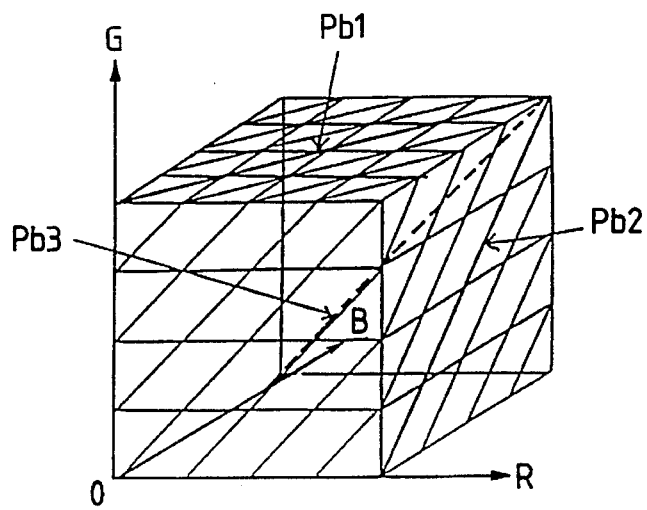
FIG. 55A shows an example of a partitioned RGB input color space in which a plurality of partitioned blocks not including any of the boundary planes Pb1, Pb2, Pb3.
Figure 55B:
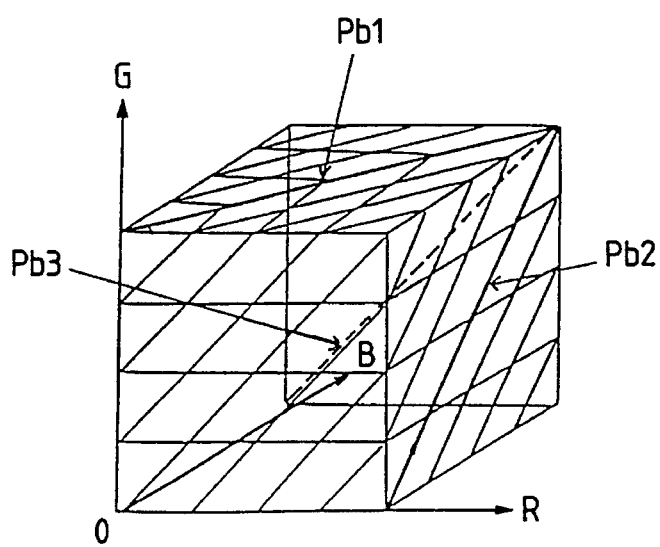
FIG. 55B shows another example of a partitioned RGB input color space in which a plurality of partitioned blocks not including any of the boundary planes Pb1, Pb2, Pb3.

FIG. 55A shows an example of a partitioned RGB input color space in which a plurality of partitioned blocks not including any of the boundary planes Pb1, Pb2, Pb3, and FIG. 55B shows another example of a partitioned RGB input color space in which a plurality of partitioned blocks not including any of the boundary planes Pb1, Pb2, Pb3. As shown in FIGS. 55A, 55B, the partitioned blocks are adjacent to each other through the boundary planes Pb1, Pb2, Pb3. Accordingly, in cases where the partition of the RGB input color space shown in FIG. 55A or 55B is performed, the generation of the ripples shown in FIG. 53 can be prevented.

Figure 56A:
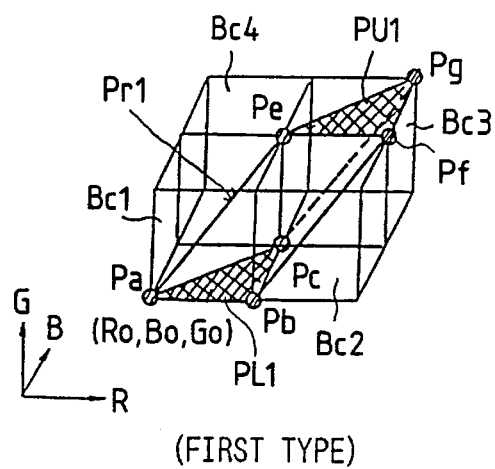
FIG. 56A is an enlarged view of one of the partitioned blocks shown in FIG. 55A.
Figure 56B:
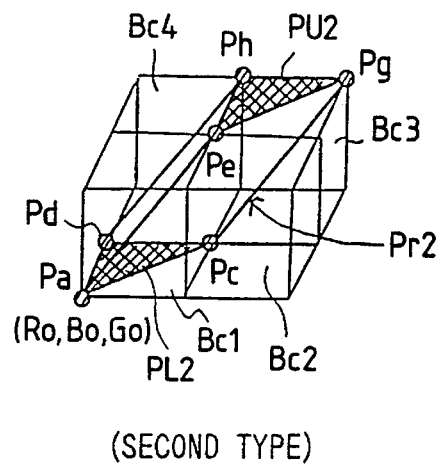
FIG. 56B is an enlarged view of another partitioned block shown in FIG. 55A.

FIG. 56A is an enlarged view of one of the partitioned blocks shown in FIG. 55A, and FIG. 56B is an enlarged view of another partitioned block shown in FIG. 55A.

As shown in FIG. 56A, in cases where the RGB input color space shown in FIG. 55A is conceptually partitioned into a plurality of unit-cubic blocks, a first type of oblique triangular prism Pr1 having a lower triangular plane PL1 and an upper triangular plane PU1 is formed in three unit-cubic blocks Bc1, Bc2 and Bc3 as one of the partitioned blocks shown in FIG. 55A. The upper plane PU1 placed in the unit-cubic block Bc3 is spaced apart from the lower plane PL1 placed in the unit-cubic block Bc1 by a side length of one unit-cubic block in each of R, G and B directions. Also, the unit-cubic block Bc1 have four lattice points Pa, Pb, Pc, Pd at its bottom surface, and the unit-cubic block Bc3 have four lattice points Pe, Pf, Pg, Ph at its upper surface. The lattice points Pa, Pb, Pc, Pd are addressed at $(R_o, B_o, G_o)$, $(R_o+1, B_o, G_o)$, $(R_o+1, B_o+1, G_o)$ and $(R_o, B_o+1, G_o)$ in that order, and the lattice points Pe, Pf, Pg, Ph are addressed at $(R_o+1, B_o+1, G_o+1)$, $(R_o+2, B_o+1, G_o+1)$, $(R_o+2, B_o+2, G_o+1)$ and $(R_o+1, B_o+2, G_o+1)$ in that order. Therefore, the lower plane PL1 of the oblique triangular prism Pr1 has the lattice points Pa, Pb, Pc, and the upper plane PU1 of the oblique triangular prism Pr1 has the lattice points Pe, Pf, Pg. Also, as shown in FIG. 56B, a second type of oblique triangular prism Pr2 having a lower triangular plane PL2 and an upper triangular plane PU2 is formed in the unit-cubic blocks Bc1, Bc3 and Bc4 as one of the partitioned blocks shown in FIG. 55A. The upper plane PU2 is spaced apart from the lower plane PL2 by a side length of one unit-cubic block in each of R, G and B directions. The lower plane PL2 of the oblique triangular prism Pr2 has the lattice points Pa, Pc, Pd, and the upper plane PU2 of the oblique triangular prism Pr2 has the lattice points Pe, Pf, Ph. A side surface PaPcPgPe of the oblique triangular prism Pr1 is adjacent to a side surface PaPcPgPe of the oblique triangular prism Pr2 through the boundary plane Pb1 shown in FIG. 54B.

In the oblique triangular prisms Pr1, Pr2, the lower and upper planes PL1, PL2, PU1, PU2 are placed at a RB plane. However, it is preferred that the lower and upper planes PL1, PL2, PU1, PU2 of the oblique triangular prisms Pr1, Pr2 be placed at a GR plane or a BG plane.

Figure 57A:
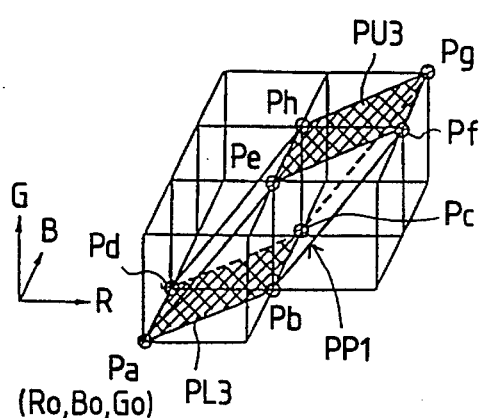
FIG. 57A is an enlarged view of a partitioned block shown in FIG. 55B.
Figure 57B:
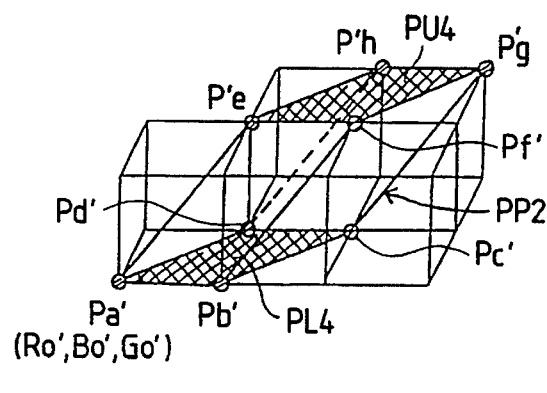
FIG. 57B is an enlarged view of another partitioned block shown in FIG. 55B.

FIG. 57A is an enlarged view of a partitioned block shown in FIG. 55B, and FIG. 57B is an enlarged view of another partitioned block shown in FIG. 55B.

As shown in FIG. 57A, a first type of parallelepiped PP1 having a lower plane PL3 and an upper plane PU3 is formed in a plurality of unit-cubic blocks as one of the partitioned blocks shown in FIG. 55B. The position of the upper plane PU3 in a RB plane is shifted from that of the lower plane PL3 by a side length of one unit-cubic block in each of R and B directions. The lower plane PL3 of the parallelepiped PP1 has lattice points Pa, Pb, Pc, Pd addressed at $(R_o, B_o, G_o)$, $(R_o+1, B_o+1, G_o)$, $(R_o+1, B_o+2, G_o)$ and $(R_o, B_o+1, G_o)$ in that order, and the upper plane PU3 of the parallelepiped PP1 has lattice points Pe, Pf, Pg, Ph addressed at $(R_o+1, B_o+1, G_o+1)$, $(R_o+2, B_o+2, G_o+1)$, $(R_o+2, B_o+3, G_o+1)$ and $(R_o+1, B_o+2, G_o+1)$ in that order. Also, as shown in FIG. 57B, a second type of parallelepiped PP2 having a lower plane PL4 and an upper plane PU4 is formed in a plurality of unit-cubic blocks as one of the partitioned blocks shown in FIG. 55B. The position of the upper plane PU4 in a RB plane is shifted from that of the lower plane PL4 by a side length of one unit-cubic block in each of R and B directions. The lower plane PL4 of the parallelepiped PP2 has lattice points Pa', Pb', Pc', Pd' addressed at $(R_o, B_o, G_o')$, $(R_o'+1, B_o', G_o')$, $(R_o'+2, B_o'+1, G_o')$ and $(R_o'+1, B_o'+1, G_o')$ in that order, and the upper plane PU4 of the parallelepiped PP2 has lattice points Pe', Pf', Pg', Ph' addressed at color converting addresses $(R_o'+1, B_o'+1, G_o'+1)$, $(R_o'+2, B_o'+1, G_o'+1)$, $(R_o'+3, B_o'+2, G_o'+1)$ and $(R_o'+2, B_o'+2, G_o'+1)$ in that order. A side surface PdPcPgPh of the parallelepiped PP1 is adjacent to a side surface Pb'Pc'Pg'Pf' of the oblique triangular prism Pr2 through the boundary plane Pb1 shown in FIG. 54B.

In this embodiment, the RGB input color spaces shown in FIG. 55A is partitioned into a plurality of oblique triangular prisms Pr1, Pr2, and an output color is interpolated in one of the oblique triangular prisms Pr1, Pr2. In this case, a plurality of oblique triangular prisms Pr1, Pr2 placed outside the RGB input color space are required to interpolate an output color corresponding to an input color placed at a point near to a peripheral region of the RGB input color space.

Figure 58B:
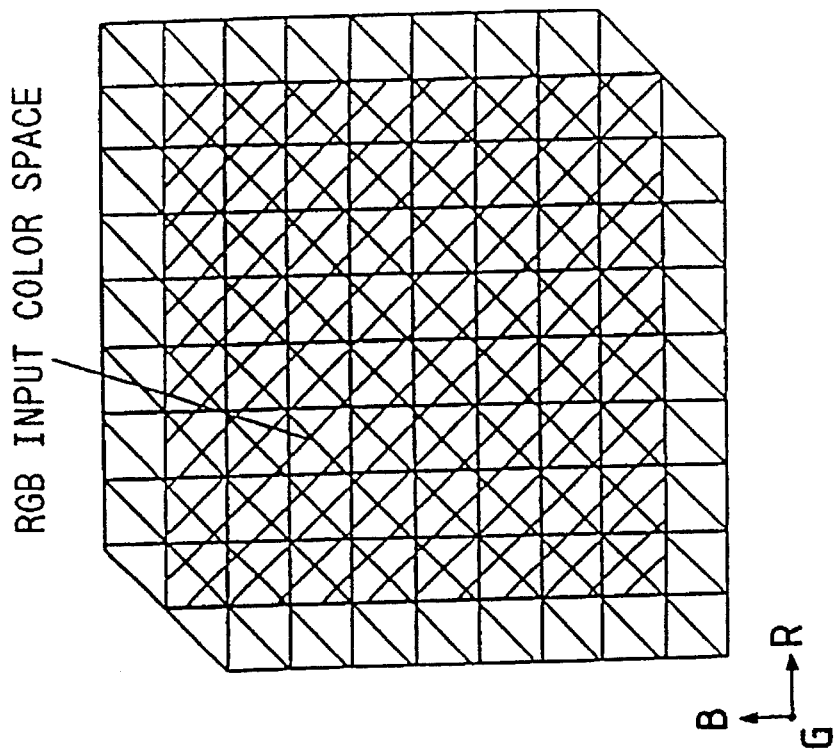
FIG. 58B shows an oblique triangular prism region in a RB or GB plane formed of a plurality of oblique triangular prisms Pr1, Pr2 required to occupy the RGB input color space.
Figure 58A:
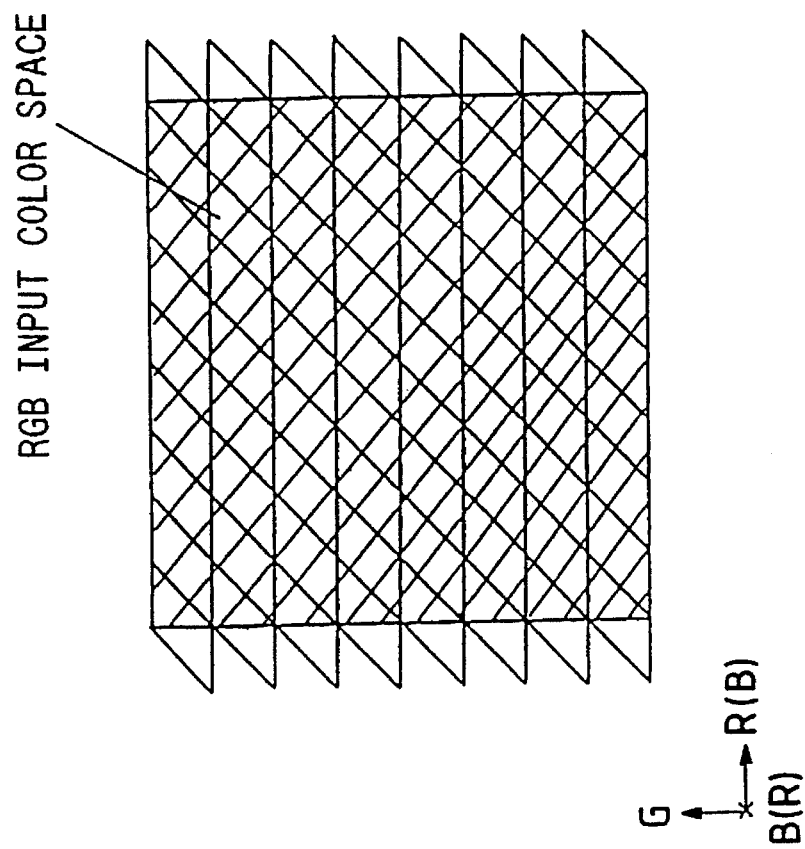
FIG. 58A shows an oblique triangular prism region in a RG or GB plane formed of a plurality of oblique triangular prisms Pr1, Pr2 required to occupy the RGB input color space.

FIG. 58A shows an oblique triangular prism region in a RG or GB plane formed of a plurality of oblique triangular prisms Pr1, Pr2 required to occupy the RGB input color space, and FIG. 58B shows an oblique triangular prism region in a RB or GB plane formed of a plurality of oblique triangular prisms Pr1, Pr2 required to occupy the RGB input color space.

As shown in FIGS. 58A, 58B, because the oblique triangular prisms Pr1, Pr2 is not in a cubic shape, a plurality of oblique triangular prisms Pr1, Pr2 placed outside the RGB input color space are additionally required.

Next, the determination of the position of the original point Pa is described with reference to FIGS. 56A, 56B, 59, 60 and 61.

The lattice point Pa of each of the oblique triangular prisms Pr1, Pr2 is defined as an original point, and the position of an oblique triangular prism is represented by that of its original point. RGB coordinates (RH1, GH1, BH1) of the original point Pa shown in FIG. 56A or 56B are determined by values RH1, GH1, BH1 of upper color signals RH, GH, BH of three primary color signals R, G, B. Also, an XYZ oblique coordinate system is utilized to specify XYZ coordinates of the lattice points Pa, Pb (or Pd), Pc, Pe, Pf (or Ph) and Pg of the oblique triangular prism.

Figure 59:
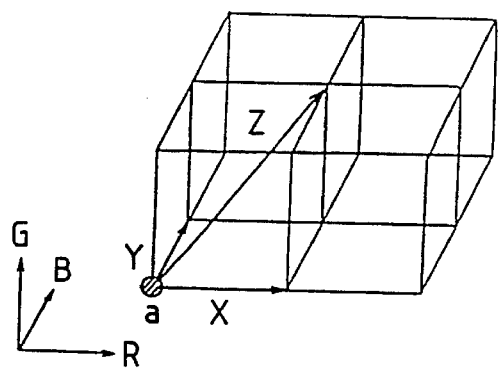
FIG. 59 shows a relationship between a RGB rectangular coordinate system and an XYZ oblique coordinate system.

FIG. 59 shows a relationship between the RGB rectangular coordinate system and the XYZ oblique coordinate system.

As shown in FIG. 59, a vector relationship between the RGB rectangular coordinate system and the XYZ oblique coordinate system is expressed according to an equation (52).

$$X=R$$
$$Y=B$$
$$Z=R+B+G \qquad (52)$$

In cases where an input color vector Vc(r, b, g) having a starting point at the original point Pa and an ending point in the oblique triangular prism is defined, the input color vector Vc is expressed in the RGB rectangular coordinate system according to an equation (53).

$$Vc=r*R+g*G+b*B \qquad (53)$$

Also, the input color vector Vc is expressed in the XYZ oblique coordinate system according to an equation (54).

$$Vc=(r-g)*X+(b-g)*Y+g*Z \qquad (54)$$

In cases where the input color vector Vc(r, b, g) is specified in the RGB rectangular coordinate system by lower color signals RL, GL, BL of the primary color signals R, G, B, the input color vector Vc(r, b, g) is expressed by values RL1, GL1 and BL1 ($\geq 0$) of the lower color signals RL, GL, BL according to an equation (55).

$$Vc=(RL1-GL1)*X+(BL1-GL1)*Y+GL1*Z \qquad (55)$$

Therefore, the position of the input color in the XYZ oblique coordinate system is determined by moving the original point Pa by a value (RL1–GL1) in an X direction, a value (BL1–GL1) in a Y direction and a value GL1 in a Z direction. That is, the interpolating calculation is performed by utilizing the values (RL1–GL1), (BL1–GL1) and GL1 as weighting factors in the same manner as in the first embodiment. However, in cases where the value (RL1–GL1) or the (BL1–GL1) is set to a negative value, the interpolating calculation cannot be performed. Therefore, because the negative value of (RL1–GL1) or (BL1–GL1) denotes the movement of the input color from the original point Pa in a –R direction (or –X direction) or a –B direction (or –Y direction), the original point Pa moved back in the –R direction or the –B direction is specified to avoid the negative value of (RL1–GL1) or (BL1–GL1).

FIGS. 60A, 60B, 60C and 60D respectively show a positional relationship between the original point Pa and a part of a unit-cubic block occupied by the oblique triangular prism Pr1 or Pr2.

Figure 60A:
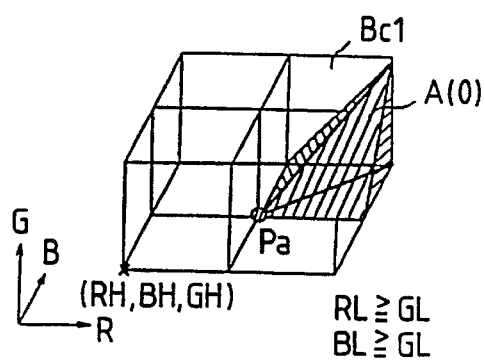
FIGS. 60A, 60B, 60C and 60D respectively show a positional relationship between the original point Pa and a part of a unit-cubic block occupied by oblique triangular prism Pr1 or Pr2.
Figure 60B:
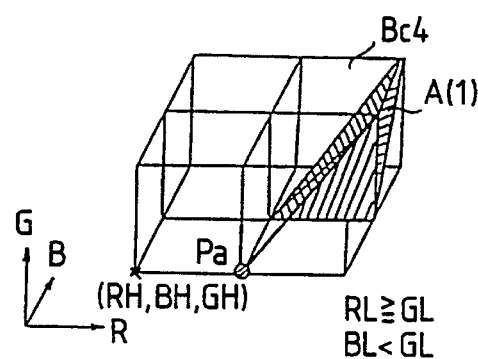
Figure 60C:
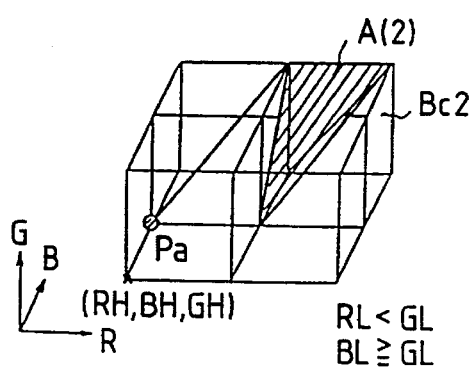
Figure 60D:
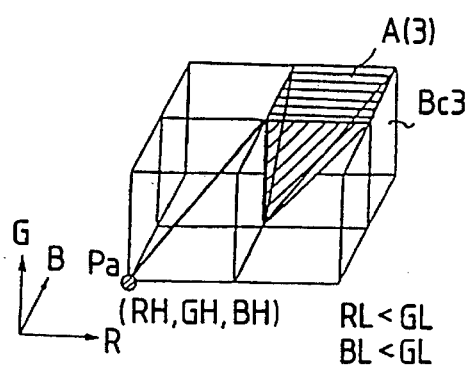

As shown in FIG. 60A, in cases where RL1$\geq$GL1 and BL1$\geq$GL1 are satisfied, a partial area A(0) of the unit-cubic block Bc1 belongs the first or second type of oblique triangular prism Pr1 or Pr2 of which the original point Pa is placed at a vertex of the unit-cubic block Bc1. As shown in FIG. 60B, in cases where RL1$\geq$GL1 and BL1<GL1 are satisfied, a partial area A(1) of the unit-cubic block Bc4 belongs the second type of oblique triangular prism Pr2 of which the original point Pa is spaced at one block in the −B direction from the lattice point Pd of the unit-cubic block Bc4. As shown in FIG. 60C, in cases where RL1<GL1 and BL1≧GL1 are satisfied, a partial area A(2) of the partitioned unit-cubic block Bc2 belongs the first type of partitioned oblique triangular prism Pr1 of which the original point Pa is spaced at one block in the −R direction from the lattice point Pb of the unit-cubic block Bc2. As shown in FIG. 60D, in cases where RL1<GL1 and BL1<GL1 are satisfied, a partial area A(3) of the partitioned unit-cubic block Bc3 belongs the first or second type of partitioned oblique triangular prism Pr1 or Pr2 of which the original point Pa is spaced at one block in the −R and −B directions from the lattice point Pc of the unit-cubic block Bc3.

Accordingly, in cases where the original point Pa is shifted in the −R or −B direction according to a large and small relationship among RL1, GL1, BL1, the position of the original point Pa can be correctly determined.

In this embodiment, a temporary original point Pt (RH1, GH1, BH1) is initially specified by the upper color signals RH, GH, BH, and the original point Pa (RH1', BH1', GH1') is calculated by considering a large and small relationship among the values RL1, GL1 and BL1.

Next, the interpolating calculation performed with one of the oblique triangular prisms Pr1, Pr2 is described with reference to FIG. 61.

Figure 61:
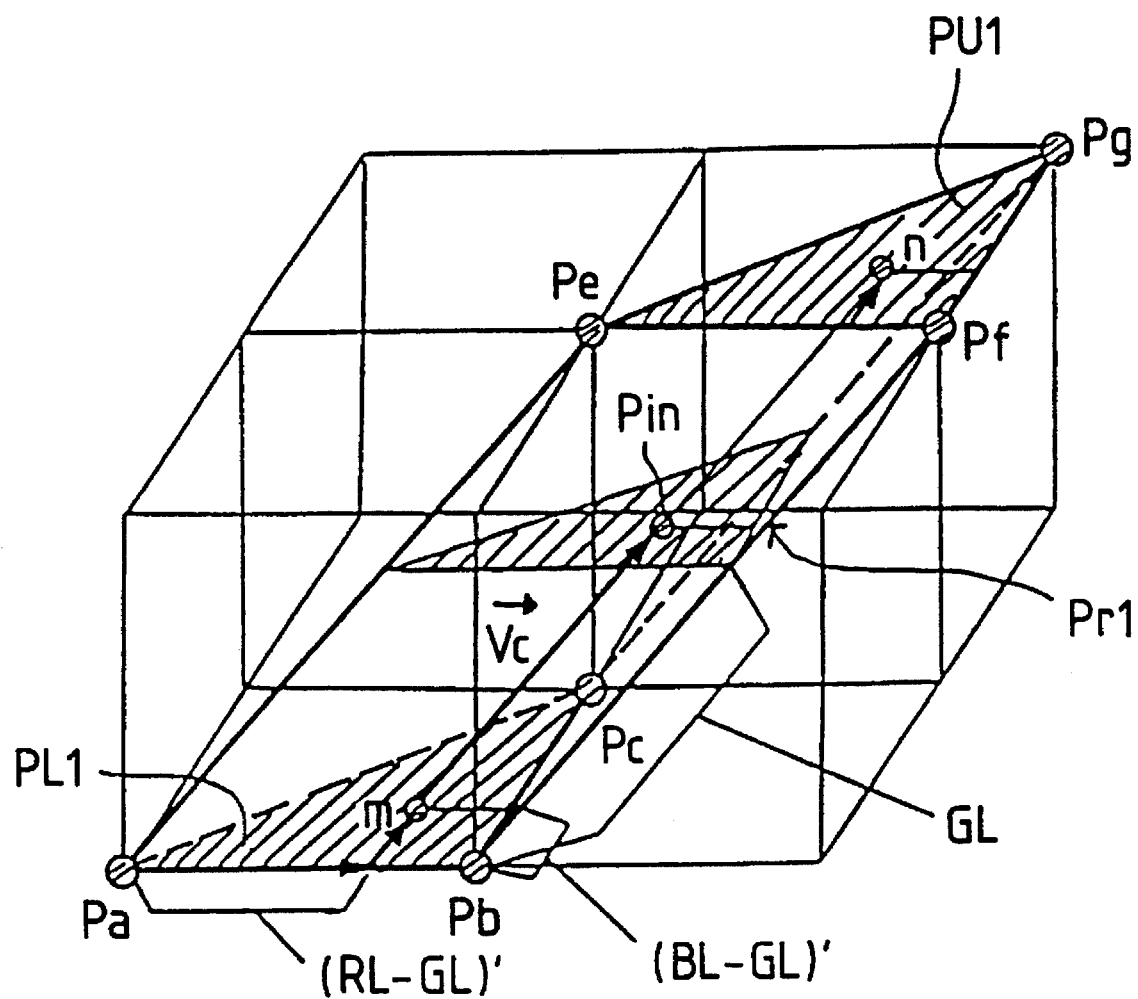
FIG. 61 conceptually shows a 6-point interpolating calculation performed with an oblique triangular prism.

FIG. 61 conceptually shows the 6-point interpolating calculation performed with an oblique triangular prism.

As shown in FIG. 61, in cases where an input point Pin of an input color is designated by the input color vector Vc ((RL1−GL1)', (BL1−GL1)', GL) in the first type of oblique triangular prism Pr1, a straight line Ls through the input point Pin is drawn in parallel to a side PaPe. The straight line Ls intersects the lower plane PL1 at a lower point Pm and intersects the upper plane PU1 at an upper point Pn. In cases where output color values at the lattice points Pa, Pb, Pc, Pe, Pf and PK are expressed by pieces of color converting data Da, Db, Dc, De, Df and Dg, an output color value Dm at the lower point Pm and an output color value Dn at the upper point Pn are expressed according to equations (56), (57).

$$Dm = Da + (RL1-GL1)'*(Db-Da) + (BL1-GL1)'*(Dc-Db) \quad (56)$$

$$Dn = De + (RL1-GL1)'*(Df-De) + (BL1-GL1)'*(Dg-Df) \quad (57)$$

Therefore, an output value Do at the input point Pin is expressed according to an equation (58).

$$Do = Dm + GL*(Dn-Dm) \quad (58)$$

Also, in cases where an input point Pin of an input color is designated by the input color vector Vc ((RL1−GL1)', (BL1−GL1)', GL) in the second type of oblique triangular prism Pr2, a straight line through the input point Pin drawn in parallel to a side PaPe intersects the lower plane PL2 at a lower point Pm and intersects the upper plane PU2 at an upper point Pn. In this case, an output color value Dm at the lower point Pm and an output color value Dn at the upper point Pn are expressed according to equations (59), (60).

$$Dm = Da + (RL1-GL1)'*(Dc-Dd) + (BL1-GL1)'*(Dd-Da) \quad (59)$$

$$Dn = De + (RL1-GL1)'*(Dg-Dh) + (BL1-GL1)'*(Dh-De) \quad (60)$$

Therefore, an output value Do at the input point Pin is expressed according to an equation (61).

$$Do = Dm + GL*(Dn-Dm) \quad (61)$$

FIG. 62 is a block diagram of an output color converting apparatus according to a fifth embodiment of the present invention.

As shown in FIG. 62, an output color converting apparatus 91 comprises a primary color signal receiving section 92 for receiving three 8-bit primary color signals R, G, B and dividing the primary color signals R, G, B into three upper 3-bit color signals RH, BH, GH having values RH1, BH1, GH1 and three lower 5-bit color signals RL, BL, GL having values RL1, BL1, GL1, a lower signal comparing section 93 for comparing the values RL1, GL1 of the lower color signals RL, GL to output a first compared result C1 and comparing the values GL1, BL1 of the lower color signals GL, BL to output a second compared result C2, a weighting factor generating section 94 for generating three weighting factors (RL1−GL1)', (BL1−GL1)' and GL with the lower color signals RL, BL, GL, an adding section 95 for adding the first compared result C1 to the upper color signal RH in a first adder 96 to form an upper 4-bit color signal RH' having a value RH1', adding the second compared result C2 to the upper color signal BH in a second adder 97 to form an upper 4-bit color signal BH' having a value BH1', and forming an upper 3-bit color signal GH' which is the same as the upper color signal GH, an oblique triangular prism selecting section 98 for selecting either the first or second type of oblique triangular prism Pr1 or Pr2 by comparing the weighting factor (RL1−GL1)' and the weighting factor (BL1−GL1)', an address generating section 99 for generating eight addresses of the lattice points Pa, Pb, Pc, Pd, Pe, Pf, Pg and Ph of the oblique triangular prism Pr1 or Pr2 with a selected block address (RH1', BH1', GH1') generated in the adding section 95, the color converting table memory 15 for storing eight pieces of color converting data in eight color converting random access memories CRAM0 to CRAM7 of each of the color converting tables, the memory interface section 16, a color converting data selector 100 for selecting six pieces of color converting data from among the color converting data M0 to M7 read out from the table memory 15 under control of the address generating section 99, an oblique triangular prism type of interpolation calculating section 101 for performing the 6-point interpolating calculation according to the equations (56) to (58) or the equations (59) to (61) with the color converting data selected in the selector 100 and the weighting factors (RL1−GL1)', (BL1−GL1)' and GL1 generated in the weighting factor generating section 94 to produce the interpolated output value Do, the host interface 18, the registering section 19, the area processing selecting section 20, and the sub-table exchanging signal generating section 21.

In the above configuration, three 8-bit primary color signals R, G, B are received in the primary color signal receiving section 92. The primary color signals R, G, B indicate an input color of a pixel in the RGB input color space. That is, a value R1 of the signal R indicates a density of a red, a value G1 of the signal G indicates a density of a green, and a value B1 of the signal B indicates a density of a blue. In the section 92, the color signal R is divided into an upper 3-bit color signal RH having a value RH1 and a lower 5-bit color signal RL having a value RL1, the color signal G is divided into an upper 3-bit color signal GH having a value GH1 and a lower 5-bit color signal GL having a value GL1, and the color signal B is divided into an upper 3-bit color signal BH having a value BH1 and a lower 5-bit color signal BL having a value BL1. Thereafter, the lower signals RL, GL and BL are transferred to the lower signal comparing section 93 and the weighting factor generating section 94.

Figures 63A, 63B:
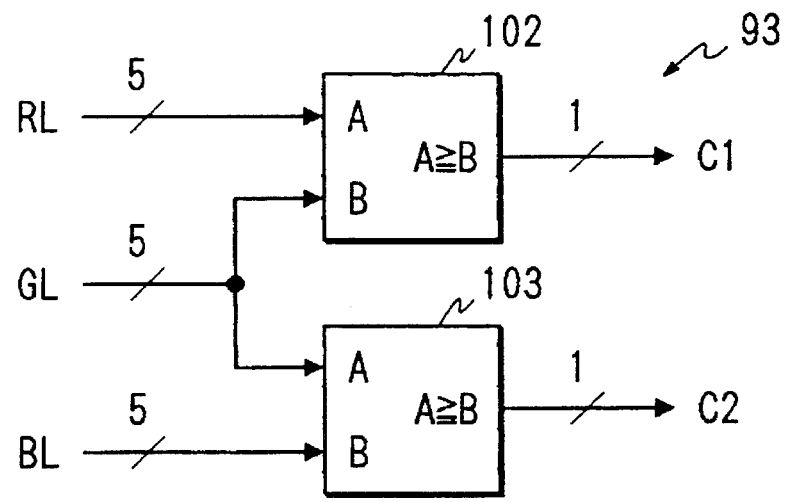
FIG. 63A is a block diagram of a comparing section shown in FIG. 62.
FIG. 63B shows values of first and second compared results C1, C2.

FIG. 63A is a block diagram of the comparing section 93 shown in FIG. 62.

As shown in FIG. 63A, the values RL1, GL1 of the lower signals RL, GL are compared with each other in a first comparing element 102 of the comparing section 93, and the first compared result C1 set to "1' or "0" is output, and the values GL1, BL1 of the lower signals GL, BL are compared with each other in a second comparing element 103 of the comparing section 93, and the second compared result C2 set to "1' or "0" is output. The values of the results C1, C2 are shown in FIG. 63B.

FIG. 64 is a block diagram of the weighting factor generating section 94 shown in FIG. 62.

As shown in FIG. 64, the value GL1 of the lower signal GL is subtracted from the value RL1 of the lower signal RL in a first subtracting element 104 of the generating section 94. In cases where the value RL1–GL1 is negative, a numeral "$2^5=32$" is added to the value RL1 to form a positive value (RL1–GL1)'. The addition of the numeral "32" is performed by disregarding a signed bit of a subtracted signal having the value RL1–GL1. The disregard of the signed bit is equivalent to a borrow from the upper color signal RH, and a bit length of an output signal having the value (RL1–GL1)' becomes the same as those of the lower color signals RL, GL. Accordingly, the addition of the numeral "32" to the value RL1–GL1 can be easily performed. In cases where the value RL1–GL1 is not negative, a value (RL1–GL1)' which is the same as the value RL1–GL1 is formed. Thereafter, the value (RL1–GL1)' is output as a first weighting factor. Also, the value GL1 of the lower signal GL is subtracted from the value BL1 of the lower signal BL in a second subtracting element 105 of the generating section 94. In cases where the value BL1–GL1 is negative, a numeral "$2^8=32$" is added to the value BL1 to form a positive value (BL1–GL1)'. In cases where the value BL1–GL1 is not negative, a value (BL1–GL1)' which is the same as the value BL1–GL1 is formed. Thereafter, the value (BL1–GL1)' is output as a second weighting factor. The weighting factors (RL1–GL1)', (BL1–GL1)' are shown in FIG. 64.

The weighting factors (RL1–GL1)', (BL1–GL1)' are transferred to the triangular prism selecting section 98 and the interpolation calculating section 101.

FIG. 65A is a block diagram of the triangular prism selecting section 98.

As shown in FIG. 65A, the weighting factors (RL1–GL1)', (BL1–GL1)' are compared with each other in the selecting section 98. In cases where the factor (RL1–GL1)' is equal to or larger than the factor (BL1–GL1)', the first type of oblique triangular prism Pr1 is selected, and a prism selecting signal Sp denoting the selection of the oblique triangular prism Pr1 is transferred to the selector 100 and the interpolation calculating section 101. In cases where the factor (RL1–GL1)' is smaller than the factor (BL1–GL1)', the second type of oblique triangular prism Pr2 is selected, and another prism selecting signal Sp denoting the selection of the oblique triangular prism Pr2 is transferred to the selector 100 and the interpolation calculating section 101.

In the first adder 96 of the adding section 95, the first compared result C1 obtained in the comparing section 93 is added to the value RH1 of the upper color signal RH, and an upper 4-bit color signal RH' having a value RH1+C1 is formed. Also, the second compared result C2 obtained in the comparing section 93 is added to the value BH1 of the upper color signal BH in the second adder 97 of the adding section 95, and an upper 4-bit color signal BH' having a value BH1+C2 is formed. Also, the upper color signal GH is received in the adding section 95 and is output as a 3-bit upper color signal GH' having a value GH1' which is the same as the value GH1. Therefore, a selected block address (RH1', BH1', GH1') of the original point Pa can be correctly specified with the upper color signals RH', GH', BH'.

Figure 65B:
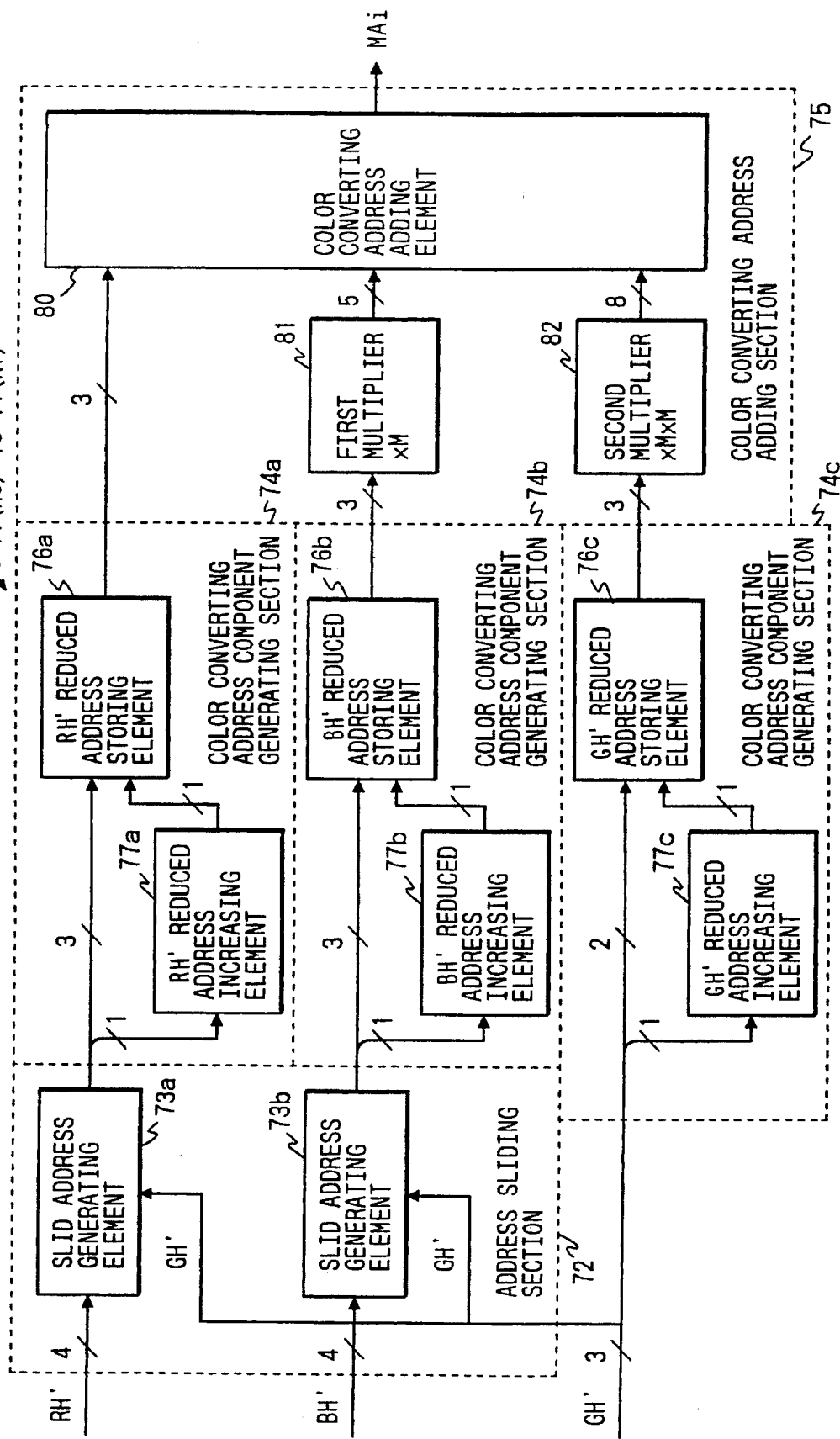
FIG. 65B is a block diagram of one of eight address generating units provided in an address generating section shown in FIG. 62.

FIG. 65B is a block diagram of one of eight address generating units provided in the address generating section 99 shown in FIG. 62.

The address generating section 99 comprises the address generating units 71(M0) to 71(M7) for generating eight color converting addresses of the lattice points Pa to Ph of the oblique triangular prism Pr1 or Pr2 with a selected block address (RH1', BH1', GH1') generated in the adding section 95. As shown in FIG. 65B, the address generating units 71(M0) to 71(M7) have the same configuration as those in the second-stage address generating section 63 shown in FIG. 39.

In the address generating section 99, addresses of the lattice points Pa to Ph of the oblique triangular prisms Pr1, Pr2 are generated with the selected block address (RH1', BH1', GH1'). In this case, an address of each of the unit-cubic blocks is represented by the address of the lattice point Pa in the same manner as in the first to third embodiments. Also, the color converting data stored in the table memory 15 are imitedly allocated at the lattice points Pa to Ph of the unit-cubic block of which addresses are specified by three even numbers in the same manner as in the third embodiment. Therefore, the address generating section 99 comprises the address generating units 71 shown in FIG. 39 in the same manner as the second-stage address generating section 63 in the third embodiment.

Thereafter, the color converting data M0 to M7 stored at the addresses of the lattice points Pa to Ph of the oblique triangular prisms Pr1, Pr2 are read out from the table memory 15.

Figure 66A:
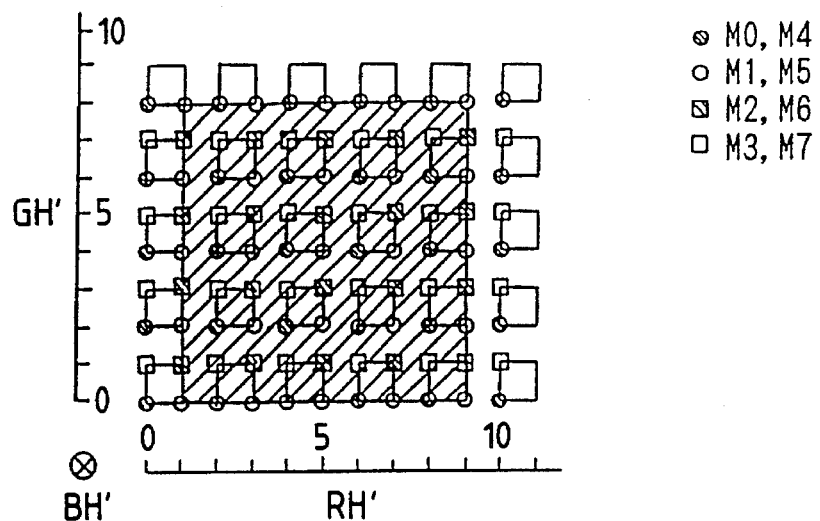
FIG. 66A shows pieces of color converting data addressed in a RH'–GH' color plane of a RH'–GH'–BH' input color space.
Figure 66B:
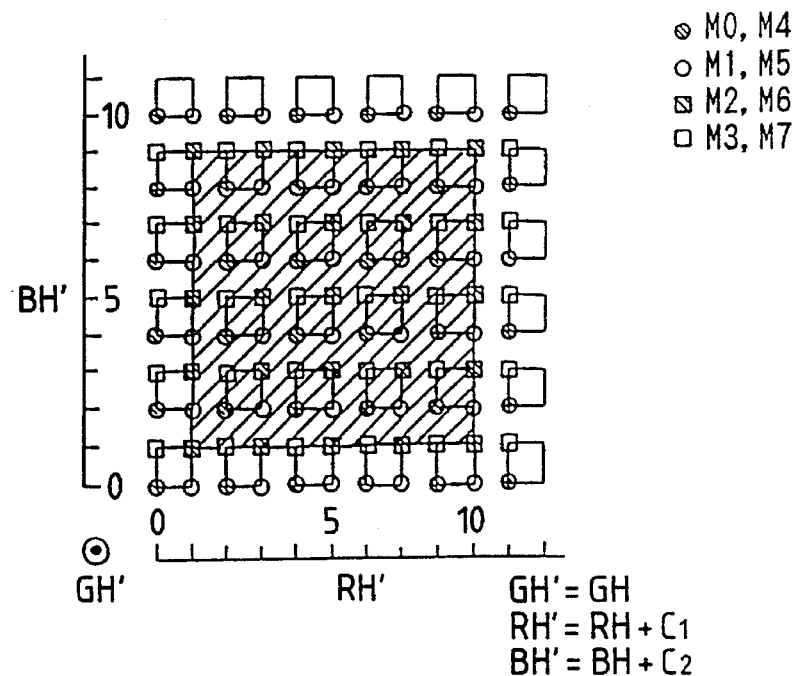
FIG. 66B shows pieces of color converting data addressed in a RH'–BH' color plane of a RH'–GH'–BH' input color space.

FIG. 66A shows the color converting data M0 to M7 addressed in a RH'–GH' color plane of a RH'–GH'–BH' input color space, and FIG. 66B shows the color converting data Mo to M7 addressed in a RH'–BH' color plane of the RH'–GH'–BH' input color space.

As shown in FIGS. 66A, 66B, a RH'–GH'–BH' input color space is depicted by slanting line areas, and each of the areas is surrounded by additional unit-cubic blocks. Each of the unit-cubic blocks is depicted by a squared closed line. Four pieces of color converting data Mo to M3 or M4 to M7 which are specified by each of the squared closed lines are stored in four divided memories and have the same address.

Figure 67:
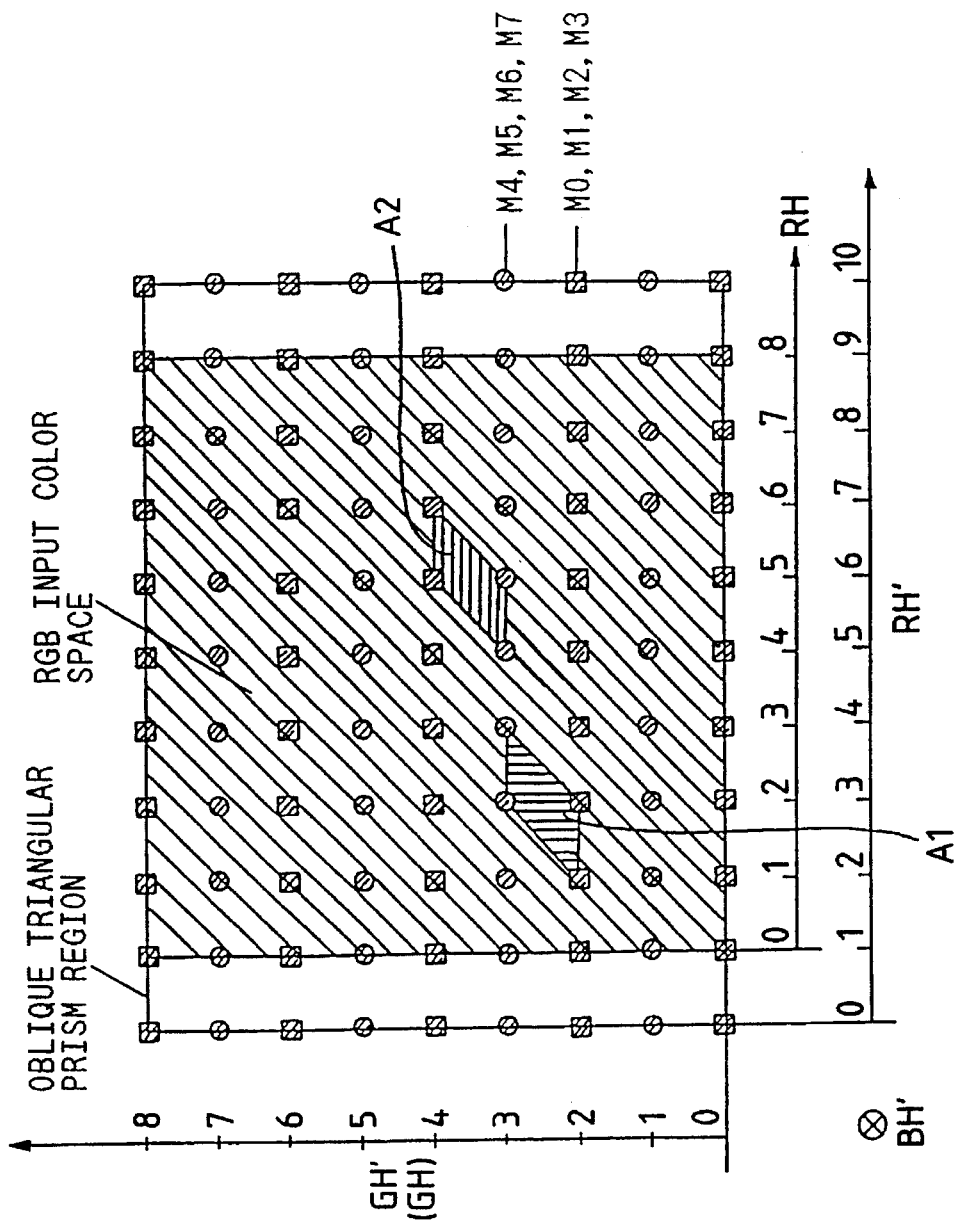
FIG. 67 shows pieces of color converting data of oblique triangular prisms Pr1, Pr2 in cases where a RH'–GH' color plane of a RH'–GH'–BH' input color space is observed from a –BH' direction.

FIG. 67 shows the color converting data of the oblique triangular prisms Pr1, Pr2 in cases where the RH'–GH' color plane of the RH'–GH'–BH' input color space is observed from a –BH' direction.

In cases where the value GH1' is an even number, the color converting data M0 to M3 are addressed at the lattice points Pa to Pd of the lower planes PL1, PL2, and the color converting data M4 to M7 are addressed at the lattice points Pe to Ph of the lower planes PU1, PU2. For example, the color converting data M0 to M7 are addressed in a first area A1 shown in FIG. 67. In contrast, in cases where the value GH1' is an odd number, the color converting data M0 to M3 are addressed at the lattice points Pe to Ph of the upper planes PU1, PU2, and the color converting data M4 to M7 are addressed at the lattice points Pa to Pd of the lower planes PL1, PL2. For example, the color converting data M0 to M7 are addressed in a second area A2 shown in FIG. 67.

Figure 68:
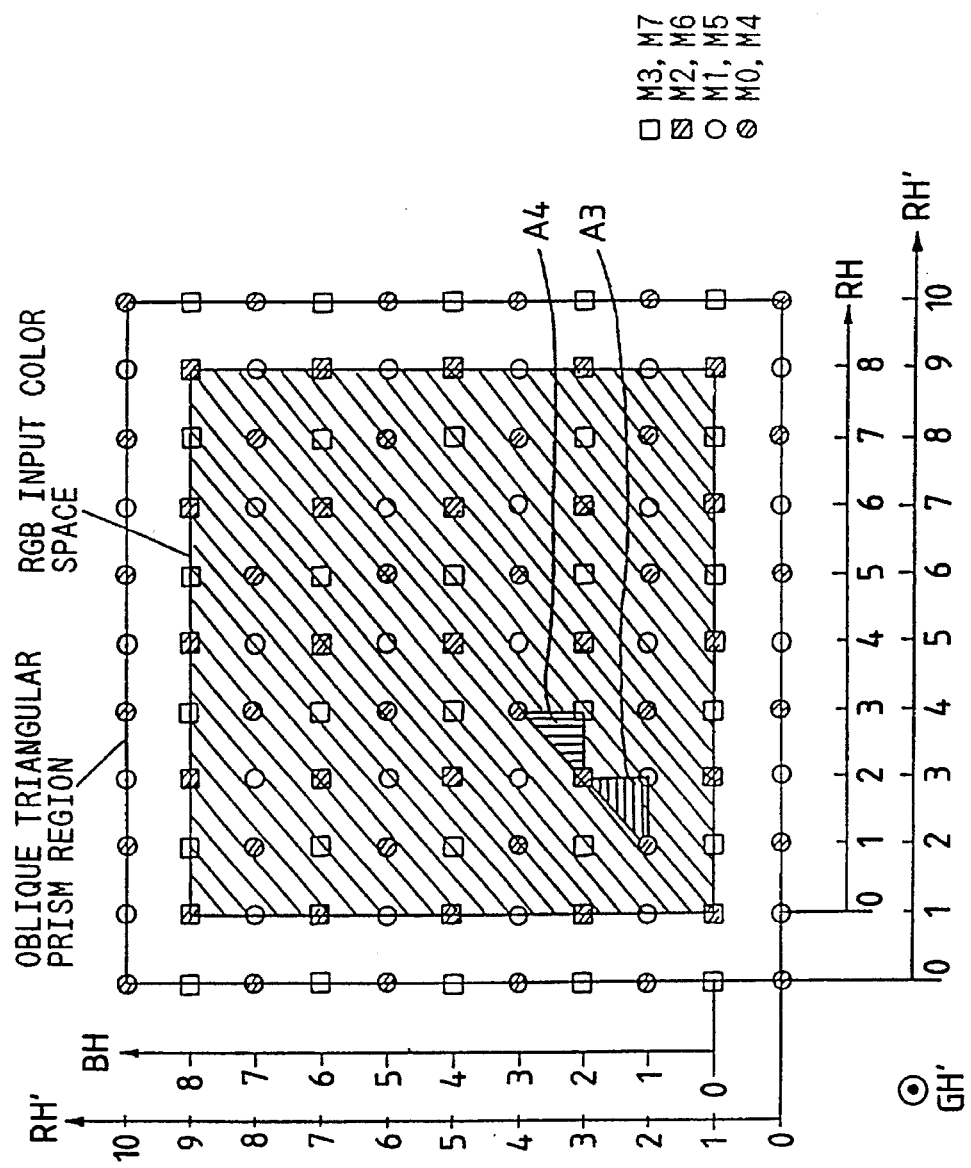
FIG. 68 shows pieces of color converting data of oblique triangular prisms Pr1, Pr2 in cases where a RH'–BH' color plane of a RH'–GH'–BH' input color space is observed from a GH' direction.

FIG. 68 shows the color converting data of the oblique triangular prisms Pr1, Pr2 in cases where the RH'–BH' color plane of the RH'–GH'–BH' input color space is observed from a GH' direction.

As shown in FIG. 68, in cases where the selected block address (RH1', BH1', GH1') is specified in the adding section 95, the lower plane PL1 is depicted by a third area A3, and the upper plane PU1 is depicted by a fourth area A4.

The color converting data M0 to M7 read out from the table memory 15 are transferred to the color converting data selector 100. In the selector 100, in cases where the prism selecting signal Sp denotes the selection of the first type of oblique triangular prism Pr1, the color converting data addressed at the lattice points Pa, Pb, Pc, Pc, Pf, and Pg as pieces of color converting data Da, Db, De, De, Df and Dg in that order. In contrast, in cases where the prism selecting signal Sp denotes the selection of the second type of oblique triangular prism Pr2, the color converting data addressed at the lattice points Pa, Pd, Pc, Pe, Ph, and Pg as pieces of color converting data Da, Dd, Dc, De, Dh and Dg in that order.

Figure 69A:
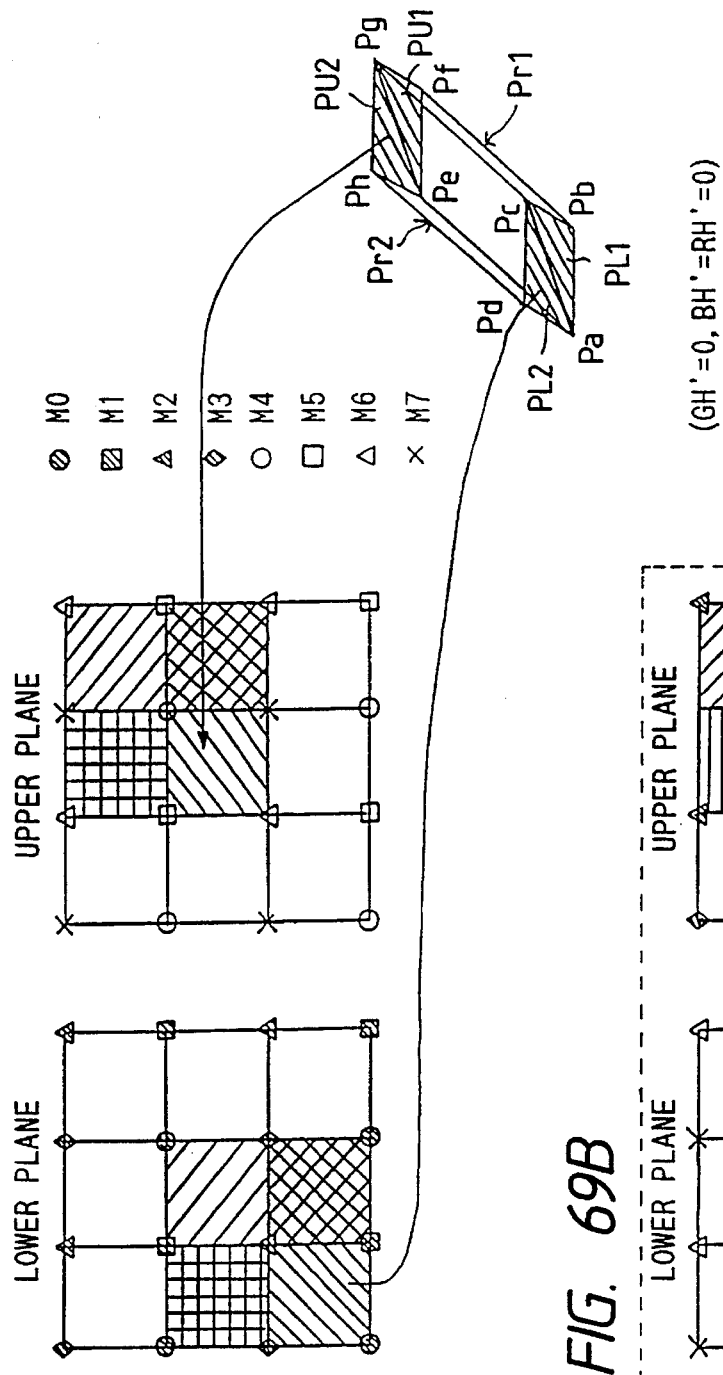
FIG. 69A, 69B respectively show pieces of color converting data M0 to M7 output from a selector shown in FIG.
Figure 69B:
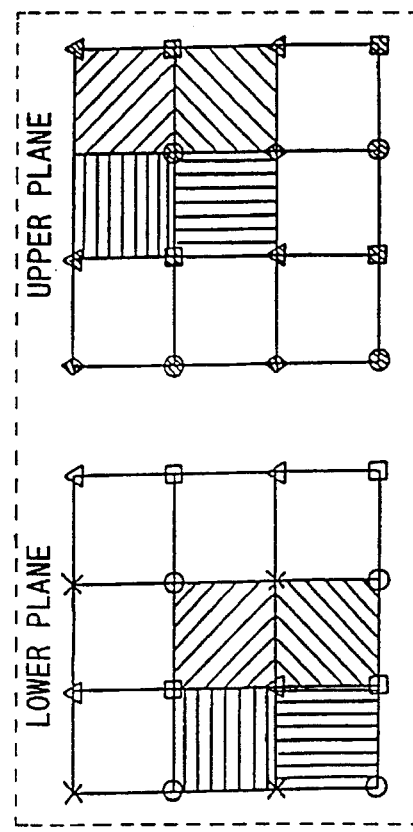

FIG. 69A, 69B respectively show the color converting data M0 to M7 output from the selector 100 as the color converting data Da to Dh addressed at the lattice points Pa to Ph.

As shown in FIG. 69A, in cases where the value GH1' is an even number, the color converting data M0 to M3 are addressed at the lattice points Pa to Pd of the lower planes PL1, PL2 of the oblique triangular prisms Pr1, Pr2, and there are four types of classification between the color converting data M0 to M3 and the lattice points Pa to Pd. Also, the color converting data M4 to M7 are addressed at the lattice points Pe to Ph of the upper planes PU1, PU2 of the oblique triangular prisms Pr1, Pr2, and there are four types of classification between the color converting data M4 to M7 and the lattice points Pe to Ph. In contrast, as shown in FIG. 9B, in cases where the value GH1' is an odd number, the color converting data M0 to M3 are addressed at the lattice points Pe to Ph of the upper planes PU1, PU2 of the oblique triangular prisms Pr1, Pr2, and there are four types of classification between the color converting data M0 to M3 and the lattice points Pe to Ph. Also, the color converting data M4 to M7 are addressed at the lattice points Pa to Pd of the lower planes PL1, PL2 of the oblique triangular prisms Pr1, Pr2, and there are four types of classification between the color converting data M4 to M7 and the lattice points Pa to Pd. A relationship between the selected block address (RH1', GH1', BH1') and the color converting data M0 to M7 output from the selector 100 as the color converting data Da to Dh addressed at the lattice points Pa to Ph is shown in FIG. 69C.

Thereafter, six pieces of color converting data output from the selector 100 as the color converting data Da, Db (or Dd), Dc, De, Df (or Dh) and DK are transferred to the interpolation calculating section 101. The configuration of the interpolation calculating section 101 is the same as that of the interpolation calculating section 17 shown in FIG. 17. Therefore, in cases where the prism selecting signal Sp denoting the selection of the first type of oblique triangular prism Pr1 is transferred, the 6-point interpolating calculation is performed with the color converting data Da, Db, Dc, De, Df and Dg and the weighting factors (RL1–GL1)', (BL1–GL1)' and GL1 generated in the weighting factor generating section 94 according to the equations (56) to (58) to produce the interpolated output value Do. In contrast, in cases where the prism selecting signal Sp denoting the selection of the second type of oblique triangular prism Pr2 is transferred, the 6-point interpolating calculation is performed with the color converting data Da, Dd, Dc, De, Dh and Dg and the weighting factors (RL1–GL1)', (BL1–GL1)' and GL1 according to the equations (59) to (61) to produce the interpolated output value Do.

Accordingly, because the RGB input color space is partitioned into a plurality of oblique triangular prisms Pr1, Pr2 on condition that any of the boundary planes Pb1, Pb2, Pb3 is not included in the oblique triangular prisms Pr1, Pr2, the generation of the ripples can be prevented.

In the fifth embodiment, eight color converting random access memories are provided in each of the color converting tables in the table memory 15. However, because the interpolating calculation is performed with six pieces of color converting data Da to Dh in the interpolation calculating section 101, it is preferred that the number of color converting random access memories provided in each of the color converting tables be reduced to six. In this case, the selector 100 having 8 inputs and 6 outputs is divided into two selectors respectively having 4 inputs and 3 outputs, and the configuration of the selector can be simplified.

Next, a sixth embodiment of the present invention is described.

FIG. 70 is a block diagram of a color converting apparatus according to a six embodiment of the present invention.

As shown in FIG. 70, a color converting apparatus 102 comprises the primary color signal receiving section 92, the lower signal comparing section 93, the weighting factor generating section 94, the weight controlling section 64, the adding section 95, the address generating section 99, the table memory 15, the memory interface section 16, the first selector 65, the second selector 66, the triangular prism selecting section 98, the oblique triangular prism type of interpolation calculating section 101, the host interface 18, the registering section 19, the area processing selecting section 20, and the sub-table exchanging signal generating section 21.

In the weight controlling section 64, it is judged whether the value GH1' of the upper color signal GH' is an even number or an odd number with a least significant bit $GH_o'$ of the upper color signal GH'. In cases where the value GH1' is an odd number, a value GL1'=(1–'GL1) is provided to the interpolation calculating section 101 as a weighting factor in place of the value GL1. In contrast, in cases where the value GH1' is an even number, the value GL1'=GL1 is provided to the interpolation calculating section 101 as a weighting factor. Therefore, as shown in FIG. 71, the interpolating calculation in the section 101 can be performed regardless of whether the lattice points Pa to Pd of the oblique triangular prisms Pr1, Pr2 are placed at those upper planes PU1, PU2 or those lower planes PL1, PL2. In addition, because the interpolating calculation can be performed regardless of whether the lattice points Pa to Pd are placed at the upper planes PU1, PU2 or the lower planes PL1, PL2, the first and second selectors 65, 66 can be provided in place of the color converting selector 100.

Accordingly, because the color converting data M0 to M3 are separated from the color converting data M4 to M7 in the first and second selectors 65, 66, the configuration of the first and second selectors 65 can be simplifies as compared with that of the color converting selector 100. That is, the color converting data M0 to M3 are addressed at the lattice points Pa to Pd of the lower planes PL1, PL2 of the oblique triangular prisms Pr1, Pr2 regardless of whether the value GH1' is an even number or an odd number in the same manner as in the third embodiment.

A relationship between the selected block address (RH1', GH1', BH1') and the color converting data M0 to M7 output from the first and second selectors 65, 66 as the color converting data Da to Dh addressed at the lattice points Pa to Ph is shown in FIG. 72.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A color converting apparatus, comprising:

color converting data storing means for storing pieces of color converting data defined in an output color space, each of the color converting data having a value limited to an even number or an odd number in a widened range, each of groups of eight pieces of color converting data Da, Db, Dc, Dd, De, Df, Dg and Dh among the color converting data being allocated at color converting addresses of eight lattice points Pa, Pb, Pc, Pd, Pe, Pf, Pg and Ph of one of rectangular parallelepipeds in that order which are formed by partitioning a lightness-color difference space in a lightness direction, a first color difference direction and a second color difference direction, each of the rectangular parallelepipeds being partitioned into a first triangular prism and a second triangular prism of which lateral edges are directed in the lightness direction, the first triangular prism having the lattice points Pa, Pb, Pc placed at the same lightness in the lightness direction and the lattice points Pe, Pf and Pg placed at the same lightness in the lightness direction, the second triangular prism having the lattice points Pa, Pd, Pc placed at the same lightness in the lightness direction and the lattice points Pe, Ph and Pg placed at the same lightness in the lightness direction, and a block address of each of the rectangular parallelepipeds being represented by a color converting address of the lattice point Pa;

input signal receiving means for receiving an input lightness signal Y, an input first color difference signal Cr and an input second color difference signal Cb, an input color defined in the lightness-color difference space being designated by the input signals Y, Cr and Cb, the input lightness signal Y being composed of an upper lightness signal UY and a lower lightness signal DY, the input first color difference signal Cr being composed of an upper first color difference signal UCr and a lower first color difference signal DCr, and the input second color difference signal Cb being composed of an upper second color difference signal UCb and a lower second color difference signal DCb;

triangular prism selecting means for selecting either the first triangular prism or the second triangular prism with the lower first color difference signal DCr and the lower second color difference signal DCb received in the input signal receiving means and generating a triangular prism selecting signal indicating a triangular prism selected;

address generating means for generating a selected block address with the upper lightness signal UY, the upper first color difference signal UCr and the upper second color difference signal UCb received in the input signal receiving means, a selected rectangular parallelepiped allocated at the selected block address being selected from among the rectangular parallelepipeds in the color converting data storing means, the input color being included in the selected rectangular parallelepiped defined in lightness-color difference space, a selected triangular prism of the selected rectangular parallelepiped being specified with the triangular prism selecting signal generated in the triangular prism selecting means, the input color being included in the selected triangular prism, and six color converting data Da, Db (or Dd), Dc, De, Df (or Dh) and Dg allocated at the color converting addresses of the lattice points Pa, Pb (or Pd), Pc, Pe, Pf (or Ph) and Pg of the selected triangular prism being read out from the color converting data storing means; and interpolation calculating means for interpolating output color coordinates defined in the output color space corresponding to input color coordinates designated by the input color in the lightness-color difference space as an output color value Do with the six color converting data Da, Db (or Dd), Dc, De, Df (or Dh) and Dg read out from the color converting data storing means under control of the address generating means while weighting the six color converting data Da, Db (or Dd), Dc, De, Dr (or Dh) and Dg with the lower lightness signal DY and the lower first and second color difference signals DCr, DCb received in the input signal receiving means, a value DY1 of the lower lightness signal DY denoting a lightness component in the lightness direction of an input color vector directed from the lattice point Pa to the input color coordinates, a value DCr1 of the lower first color difference signal DCr denoting a first color difference component in the first color difference direction of the input color vector, a value DCb1 of the lower second color difference signal DCb denoting a second color difference component in the second color difference direction of the input color vector, and the interpolation calculating means comprising a displacement register for registering a positive or negative displacement value, a displacement adder for adding the displacement value registered in the displacement register to the output color value Do to set the widened range of the output color value Do interpolated with the color converting data Da, Db (or Dd), Dc, De, Df (or Dh) and Dg in a displace range which equally occupies an area of positive numbers and another area of negative numbers, and an output data limiter for limiting the output color value Do set in the displace range by the displacement adder within an area of positive numbers and zero.

2. A color converting apparatus according to claim 1 in which the color converting data storing means comprises a plurality of color converting tables which each correspond to one of the rectangular parallelepipeds, each of the color converting tables comprising a first color converting memory for storing the color converting data Da, a second color converting memory for storing the color converting data Db at a first bank and the color converting data Dd at a second bank, a third color converting memory for storing the color converting data Dc, a fourth color converting memory for storing the color converting data De, a fifth color converting memory for storing the color converting data Df at a first bank and the color converting data Dh at a second bank, and a sixth color converting memory for storing the color converting data Dg.

3. A color converting apparatus according to claim 1 in which the color converting data storing means comprises a plurality of color converting tables which each correspond to one of the rectangular parallelepipeds, each of the color converting tables comprising a first color converting memory for storing the color converting data Da at a first color converting sub-table and another piece of color converting data Da' at a second color converting sub-table, a first bank of second color converting memory for storing the color converting data Db at a first color converting sub-table and another piece of color converting data Db' at a second color converting sub-table, a second bank of second color converting memory for storing the color converting data Dd at a first color converting sub-table and another piece of color converting data Dd' at a second color converting sub-table, a third color converting memory for storing the color converting data Dc at a first color converting sub-table and another piece of color converting data Dc' at a second color converting sub-table, a fourth color converting memory for storing the color converting data De at a first color converting sub-table and another piece of color converting data De' at a second color converting sub-table, a first bank of fifth color converting memory for storing the color converting data Df at a first color converting sub-table and another piece of color converting data Df' at a second color converting sub-table, a second bank of fifth color converting memory for storing the color converting data Dh at a first color converting sub-table and another piece of color converting data Dh' at a second color converting sub-table, and a sixth color converting memory for storing the color converting data Dg at a first color converting sub-table and another piece of color converting data Dg' at a second color converting sub-table, either the color converting data Da, Db (or Dd), Dc, De, Df (or Dh) and Dg stored at the first color converting sub-tables or the color converting data Da', Db' (or Dd'), Dc', De', Df' (or Dh') and Dg' stored at the second color converting sub-tables being read out from the color converting data storing means as the color converting data Da, Db (or Dd), Dc, De, Df (or Dh) and Dg.

4. A color converting apparatus according to claim 3, further including:

area processing selecting means for selecting either a first type of area processing in which a first type of color conversion is performed for a first area of a colored picture or a second type of area processing in which a second type of color conversion is performed for a second area of the colored picture; and sub-table signal generating means for generating a first sub-table signal in cases where the first type of area processing is selected in the area processing selecting means and generating a second sub-table signal in cases where the second type of area processing is selected in the area processing selecting means, the first or second sub-table signal being transferred to the address generating means, the color converting data Da, Db (or Dd), Dc, De, Df (or Dh) and Dg stored at the first color converting sub-tables being read out from the color converting data storing means in cases where the first sub-table signal is transferred to the address generating means, and the color converting data Da', Db' (or Dd'), Dc', De', Df' (or Dh') and Dg' stored at the second color converting sub-tables being read out from the color converting data storing means as the color converting data Da, Db (or Dd), Dc, De, Df (or Dh) and Dg in cases where the second sub-table signal is transferred to the address generating means.

5. A color converting apparatus according to claim 1 in which a lightness Y of a colored picture indicated by the input lightness signal Y, a first color difference Cr of the colored picture indicated by the input first color difference signal Cr and a second color difference Cb of the colored picture indicated by the input second color difference signal Cb are expressed with three primary colors such as a red R, a green G and a blue B according to equations:

$$Y=0.2990*R+0.5864*G+0.1146*B,$$

$$Cr=R-Y,$$

and $$Cb=B-Y.$$

6. A color converting apparatus according to claim 1 in which a value Y1 of the input lightness signal Y, a value Cr1 of the input first color difference signal Cr and a value Cb1 of the input second color difference signal Cb are respectively expressed by a piece of 10-bit input data.

7. A color converting apparatus according to claim 1 in which the input lightness signal Y, the input first color difference signal Cr and the input second color difference signal Cb are respectively composed of a sequence of bits, the upper signals UY, UCr and UCb are respectively composed of 3 bits according to a normal mode to form the 8×8×8 rectangular parallelepipeds by partitioning the lightness-color difference space into 8 pieces in each of the lightness direction, the first color difference direction and the second color difference direction, and the upper signals UY, UCr and UCb are respectively composed of 3 bits according to a normal mode to form the 8×8×8 rectangular parallelepipeds by partitioning the lightness-color difference space into 8 pieces in each of the lightness direction, the first color difference direction and the second color difference direction, and the upper lightness signal UY composed of 4 bits and the upper color difference signals UCr and UCb respectively composed of 3 bits are received in the address generating means according to an address extending mode to form the 16×8×8 rectangular parallelepipeds by partitioning the lightness-color difference space into 16 pieces in the lightness direction and partitioning the lightness-color difference space into 8 pieces in each of the first color difference direction and the second color difference direction.

8. A color converting apparatus according to claim 1 in which the selection of either the first triangular prism or the second triangular prism in the triangular prism selecting means is performed by comparing the value DCr1 of the lower first color difference signal DCr and the value DCb1 of the lower second color difference signal DCb.

9. A color converting apparatus according to claim 1 in which the color converting data are respectively composed of 10 bits, the widened range of the output color value Do added in the displacement adder is from −1024 to 1022, and the output color value Do limited in the output data limiter ranges from 0 to 1023.

10. A color converting apparatus according to claim 1 in which the color converting data are respectively composed of 8 bits, the widened range of the output color value Do added in the displacement adder is from −256 to 254, and the output color value Do limited in the output data limiter ranges from 0 to 255.

11. A color converting apparatus according to claim 4 in which the area processing selecting means comprises:

an area RAM table for storing a starting address of a starting pixel placed at a starting point of the first area of the colored picture and an ending address of an ending pixel placed at an ending point of the first area of the colored picture, the starting address and the ending address being numbered an area number;

a pixel counter for counting pixels along a main scanning line to specify addresses of the pixels;

a pixel address comparator for comparing the addresses of the pixels counted in the pixel counter with the starting address or the ending address stored in the area RAM table to judge whether or not each of the addresses of the pixels scanned along the main scanning line accords with the starting address or the ending address and generating an area counting signal each time an address of a pixel scanned along the main scanning line accords with the starting address or the ending address; and an area counter for counting the area counting signal generated in the pixel address comparator to increase an area number one by one and sending an increased area number to the area RAM table, a selecting signal instructing the performance of the first type of color conversion being transferred to the sub-table signal generating means in cases where the increased area number accords with the area number given to the starting address, another selecting signal instructing the performance of the second type of color conversion being transferred to the sub-table signal generating means in cases where the increased area number accords with the area number given to the ending address, and the starting address and the ending address stored in the area RAM table being rewritten with other starting and ending addresses transferred from a host computer each time all of the pixels placed in one of the main scanning line are counted in the pixel counter.

12. A color converting apparatus according to claim 1, further including:

host interface means for transferring other pieces of color converting data from a host computer to the color converting data storing means to renew the color converting data stored in the color converting data storing means during a blanking period in which the color converting data Da, Db (or Dd), Dc, De, Df (or Dh) and Dg are not read out from the color converting data storing means.

13. A color converting apparatus according to claim 1, further including:

lightness and color difference generating means for generating the input lightness signal Y, the input first color difference signal Cr and the input second color difference signal Cb from a first primary color signal, a second primary signal and a third primary signal defined in a primary color space.

14. A color converting apparatus according to claim 13 in which the lightness and color difference generating means comprises:

a first subtracting element for subtracting a second value G1 of the second primary color signal from a first value R1 of the first primary color signal to generate the input first color difference signal Cr; and a second subtracting element for subtracting the second value G1 of the second primary color signal from a third value B1 of the third primary color signal to generate the input second color difference signal Cb.

15. A color converting apparatus according to claim 13 in which the lightness and color difference generating means comprises:

a lightness generating element for generating the input lightness signal Y linearly independent of both the input first color difference signal Cr and the input second color difference signal Cb by combining the first primary color signal, the second primary color signal and the third primary color signal.

16. A color converting apparatus according to claim 15 in which a value Y1 of the input lightness signal Y is expressed with the values R1, G1 and B1 according to an equation selected from three equations:

$$Y1=(R1+G1+B1)/3, \quad Y1=(R1+2*G1+B1)/4,$$

and $$Y1=G1.$$

17. A color converting apparatus according to claim 14, further including:

a first negative value compensating element for compensating the input first color difference signal Cr generated in the first subtracting element for a negative value generated in the first subtracting element to form the input first color difference signal Cr having a value of zero or a positive number, the value of the input first color difference signal Cr denoting a density of a first color difference in the input color; and a second negative value compensating element for compensating the input second color difference signal Cb generated in the second subtracting element for a negative value generated in the second subtracting element to form the input second color difference signal Cb having a value of zero or a positive number, the value of the input second color difference signal Cr denoting a density of a second color difference in the input color.

18. A color converting apparatus comprising:

color converting data storing means for storing pieces of color converting data defined in an output color space, each of groups of eight pieces of color converting data Da, Db, Dc, Dd, De, Df, Dg and Dh among the color converting data being allocated at color converting addresses of eight lattice points Pa, Pb, Pc, Pd, Pe, Pf, Pg and Ph of one of rectangular parallelepipeds in that order which are formed by partitioning a lightness-color difference space in a lightness direction, a first color difference direction and a second color difference direction, each of the rectangular parallelepipeds being partitioned into a first triangular prism and a second triangular prism of which lateral edges are directed in the lightness direction, the first triangular Drism having the lattice points Pa, Pb, Pc placed at the same lightness in the lightness direction and the lattice points Pe, Pf and Pg placed at the same lightness in the lightness direction, the second triangular prism having the lattice points Pa, Pd, Pc placed at the same lightness in the lightness direction and the lattice points Pe, Ph and Pg placed at the same lightness in the lightness direction, and a block address of each of the rectangular parallelepipeds being represented by a color converting address of the lattice point Pa;

input signal receiving means for receiving an input lightness signal Y, an input first color difference signal Cr and an input second color difference signal Cb, an input color defined in the lightness-color difference space being designated by the input signals Y, Cr and Cb, the input lightness signal Y being composed of an upper lightness signal UY and a lower lightness signal DY, the input first color difference signal Cr being composed of an upper first color difference signal UCr and a lower first color difference signal DCr, and the input second color difference signal Cb being composed of an upper second color difference signal UCb and a lower second color difference signal DCb;

triangular prism selecting means for selecting either the first triangular prism or the second triangular prism with the lower first color difference signal DCr and the lower second color difference signal DCb received in the input signal receiving means and generating a triangular prism selecting signal indicating a triangular prism selected;

address generating means for generating a selected block address with the upper lightness signal UY, the upper first color difference signal UCr and the upper second color difference signal UCb received in the input signal receiving means, a selected rectangular parallelepiped allocated at the selected block address being selected from among the rectangular parallelepipeds in the color converting data storing means, the input color being included in the selected rectangular parallelepiped defined in lightness-color difference space, a selected triangular prism of the selected rectangular parallelepiped being specified with the triangular prism selecting signal generated in the triangular prism selecting means, the input color being included in the selected triangular prism, and six color converting data Da, Db (or Dd), Dc, De, Df (or Dh) and Dg allocated at the color converting addresses of the lattice points Pa, Pb (or Pd), Pc, Pe, Pf (or Ph) and Pg of the selected triangular prism being read out from the color converting data storing means; and interpolation calculating means for interpolating output color coordinates defined in the output color space corresponding to input color coordinates designated by the input color in the lightness-color difference space as an output color value Do with the six color converting data Da, Db (or Dd), Dc, De, Df (or Dh) and Dg read out from the color converting data storing means under control of the address generating means while weighting the six color converting data Da, Db (or Dd), Dc, De, F, (or Dh) and Dg with the lower lightness signal DY and the lower first and second color difference signals DCr, DCb received in the input signal receiving means, a value DY1 of the lower lightness signal DY denoting a lightness component in the lightness direction of an input color vector directed from the lattice point Pa to the input color coordinates, a value DCr1 of the lower first color difference signal DCr denoting a first color difference component in the first color difference direction of the input color vector, a value DCb1 of the lower second color difference signal DCb denoting a second color difference component in the second color difference direction of the input color vector, and the interpolation calculating means comprising: difference generating means for calculating a first difference Db–Da, a second difference Dc–Db, a third difference De–Da, a fourth difference Df–De and a fifth difference Dg–Df between two of the color converting data Da to Dh in cases where the triangular prism selecting signal indicating the selection of the first triangular prism is received in the address generating means and calculating a sixth difference Dd–Da, a seventh difference Dc–Dd, an eighth difference De–Da, a ninth difference Dh–De and a tenth difference Dg–Dh between two of the color converting data Da to Dh in cases where the triangular prism selecting signal indicating the selection of the second triangular prism is received in the address generating means;

first multiplying means for multiplying the first difference Db–Da, the second difference Dc–Db, the fourth difference Df–De and the fifth difference Dg–Df calculated in the difference generating means by the value DCr1 of the lower first color difference signal DCr or the value DCb1 of the lower second color difference signal DCb transferred from the input signal receiving means to obtain a first product DCr1*(Db–Da), a second product DCb1*(Dc–Db), a third product DCr1*(Df–De) and a fourth product DCb1*(Dg–Df) in cases where the triangular prism selecting signal indicating the selection of the first triangular prism is received in the address generating means and multiplying the seventh difference Dc–Dd, the sixth difference Dd–Da, the tenth difference Dg–Dh and the ninth difference Dh–De calculated in the difference generating means by the value DCr1 of the lower first color difference signal DCr or the value DCb1 of the lower second color difference signal DCb to obtain a fifth product DCr1*(Dc–Dd), a sixth product DCb1*(Dd–Da), a seventh product DCr1*(Dg–Dh) and an eighth product DCb1*(Dh–De) in cases where the triangular prism selecting signal indicating the selection of the second triangular prism is received in the address generating means;

first adding means for adding the first product DCr1*(Db–Da) and the second product DCb1*(Dc–Db) produced in the first multiplying means to obtain a first added product DCr1*(Db–Da)+DCb1*(Dc–Db), adding the third product DCr1*(Df–De) and the fourth product DCb1*(Dg–Df) produced in the first multiplying means to obtain a second added product DCr1*(Df–De)+DCb1*(Dg–Df), adding the fifth product DCr1*(Dc–Dd) and the sixth product DCb1*(Dd–Da) produced in the first multiplying means to obtain a third added product DCr1*(Dc–Dd)+DCb1*(Dd–Da), and adding the seventh product DCr1*(Dg–Dh) and the eighth product DCb1*(Dh–De) produced in the first multiplying means to obtain a fourth added product DCr1*(Dg–Dh)+DCb1*(Dh–De);

second adding means for adding the first added product DCr1*(Db–Da)+DCb1*(Dc–Db) produced in the first adding means and the color converting data Da transferred from the input signal receiving means to produce a first term product Da+DCr1*(Db–Da)+DCb1*(Dc–Db) in cases where the triangular prism selecting signal indicating the selection of the first triangular prism is received in the address generating means and adding the third added product DCr1*(Dc–Dd)+DCb1*(Dd–Da) produced in the first adding means and the color converting data Da to produce another first term product Da+DCr1*(Dc–Dd)+DCb1*(Dd–Da) in cases where the triangular prism selecting signal indicating the selection of the second triangular prism is received in the address generating means;

subtracting means for subtracting the first added product DCr1*(Db–Da)+DCb1*(Dc–Db) from the second added product DCr1*(Df–De)+DCb1*(Dg–Df) produced in the first adding means to obtain first subtracted product DCr1*(Df–De)+DCb1*(Dg–Df)–DCr1*(Db–Da)–DCb1*(Dc–Db) and subtracting the third added product DCr1*(Dc–Dd)+DCb1*(Dd–Da) from the fourth added product DCr1*(Dg–Dh)+DCb1*(Dh–De) produced in the first adding means to obtain a second subtracted product DCr1*(Dg–Dh)+DCb1*(Dh–De)–DCr1*(Dc–Dd)–DCb1*(Dd–Da);

third adding means for adding the first subtracted product DCr1*(Df–De)+DCb1*(Dg–Df)–DCr1*(Dd–Da)–DCb1*(Dc–Db) produced in the subtracting means and the third difference De–Da calculated in the difference generating means to produce a fifth added product De–Da+DCr1*(Df–De)+DCb1*(Dg–Df)–DCr1*(Db–Da)–DCb1*(Dc–Db) and adding the second subtracted product DCr1*(Dg–Dh)+DCb1*(Dh–De)–DCr1*(Dc–Dd)–DCb1*(Dd–Da) produced in the subtracting means and the third difference De–Da to produce a sixth added product De–Da+DCr1*(Dg–Dh)+DCb1*(Dh–De)–DCr1*(Dc–Dd)–DCb1*(Dd–Da);

second multiplying means for multiplying the fifth added product De−Da+DCr1*(Df−De)+DCb1*(Dg−Df)−DCr1*(Db−Da)− DCb1*(Dc−Db) and the sixth added product De−Da+DCr1*(Dg−Dh)+DCb1*(Dh−De)−DCr1*(Dc−Dd)−DCb1*(Dd−Da) produced in the third adding means by the value DY1 of the lower lightness signal DY to obtain a second term product DY1*{De−Da+DCr1*(Df−De)+DCb1*(Dg−Df)−DCr1*(Db−Da)−DCb1*(Dc−Db)} in cases where the triangular prism selecting signal indicating the selection of the first triangular prism is received in the address generating means and another second term product DY1*{De−Da+DCr1*(Dg−Dh)+DCb1*(Dh−De)−DCr1*(Dc−Dd)−DCb1*(Dd−Da)} in cases where the triangular prism selecting signal indicating the selection of the second triangular prism is received in the address generating means; and fourth adding means for adding the first term product Da+DCr1*(Db−Da)+DCb1*(Dc−Db) produced in the second adding means and the second term product DY1*{De−Da+DCr1*(Df−De)+DCb1*(Dg−Df)−DCr1*(Db−Da)−DCb1*(Dc−Db)} produced in the second multiplying means to obtain the output color value Do=Da+DCr1*(Db−Da)+DCb1*(Dc−Db)+DY1*{De−Da+DCr1*(Df−De)+DCb1*(Dg−Df)−DCr1*(Db−Da)−DCb1*(Dc−Db)} in cases where the triangular prism selecting signal indicating the selection of the first triangular prism is received in the address generating means and adding the first term product Da+DCr1*(Dc−Dd)+DCb1*(Dd−Da) produced in the second adding means and the second term product DY1*{De−Da+DCr1*(Dg−Dh)+DCb1*(Dh−De)− DCr1*(Dc−Dd)−DCb1*(Dd−Da)} to obtain the output color value Do=Da+DCr1*(Dc−Dd)+DCb1*(Dd−Da)+DY1*{De−Da+DCr1*(Dg−Dh)+DCb1*(Dh−De)−DCr1*(Dc−Dd)−DCb1*(Dd−Da)} in cases where the triangular prism selecting signal indicating the selection of the second triangular prism is received in the address generating means produced in the second multiplying means.

19. A color converting apparatus comprising:

color converting data storing means for storing pieces of color converting data defined in an output color space, a plurality of rectangular parallelepipeds being formed in a lightness-color difference space by partitioning the lightness-color difference space in a lightness direction, a first color difference direction and a second color difference direction, each of the rectangular parallelepipeds having four lattice points P1, P2, P3 and P4 placed at a first lightness in the lightness direction and other four lattice points P5, P6, P7 and P8 placed at a second lightness in the lightness direction, a block address (i,j,k) of each of the rectangular parallelepipeds being represented by a color converting address of the lattice point P1, and the color converting data being limitedly allocated at color converting addresses of the lattice points P1 to P8 of the rectangular parallelepipeds, of which the block addresses are respectively expressed by coordinates $(2i, 2j, 2k)$ composed of three even numbers $2i, 2j$ and $2k$, to store the color converting data without any overlapping storage of the color converting data;

lightness and color difference generating means for generating a lightness signal Y, a first color difference signal Cr and a second color difference signal Cb defined in a lightness-color difference space from a first primary color signal, a second primary signal and a third primary signal defined in a primary color space, an input color defined in the primary color space being designated by the first, second and third primary color signals, the input color defined in the lightness-color difference space being designated by the signals Y, Cr and Cb, the lightness signal Y being composed of an upper lightness signal YH having a value YH1 and a lower lightness signal DY having a value DY1, the first color difference signal Cr being composed of an upper first color difference signal CrH having a value CrH1 and a lower first color difference signal DCr having a value DCr1, and the second color difference signal Cb being composed of an upper second color difference signal CbH having a value CbH1 and a lower second color difference signal DCb having a value DCb1;

first address generating means for generating a selected block address (YH1', CrH1', CbH1') of a selected rectangular parallelepiped represented by a color converting address (YH1', CrH1', CbH1') of a lattice point P1 of the selected rectangular parallelepiped with the upper lightness signal YH, the upper first color difference signal CrH and the upper second color difference signal CbH generated in the lightness and color difference generating means to specify the selected rectangular parallelepiped, a value YH1' of the selected block address (YH1', CrH1', CbH1') of the selected rectangular parallelepiped being equal to the value YH1 of the upper lightness signal YH, a value CrH1' of the selected block address (YH1', CrH1', CbH1') being equal to a sum of the value YH1, the value CrH1 of the upper first color difference signal CrH and a constant, a value CbH1' of the selected block address (YH1', CrH1', CbH1' being equal to a sum of the value YH1, the value CbH1 of the upper second color difference signal CbH and the constant, second address generating means having four first slid address generating elements and four second slid address generating elements for generating eight block addresses of eight particular rectangular parallelepipeds, which each have one of eight selected lattice points agreeing with eight lattice points Pa, Pb, Pc, Pd, Pe, Pf, Pg and Ph of a parallelepiped PP, with the selected block address (YH1', CrH1', CbH1') generated in the first address generating means, four block addresses of the eight block addresses being generated by incrementing the values CrH1' and CbH1' of the selected block address (YH1', CrH1', CbH1') in the first slid address generating elements in case where the value YH1' is an odd number, other four block addresses of the eight block addresses being generated by incrementing the values CrH1' and CbH1' of the selected block address (YH1', CrH1', CbH1') in the second slid address generating elements in case where the value YH1' is an even number, the input color being included in the parallelepiped PP having a first plane placed at a lightness in the lightness direction and a second plane parallel to the first plane, the first plane of the parallelepiped PP having the four lattice points Pa, Pb, Pc and Pd addressed at color converting addresses $(Y_o, Cr_o, Cb_o)$, $(Y_o, Cr_o+1, Cb_o)$, $(Y_o, Cr_o+1, Cb_o+1)$ and $(Y_o, Cr_o, Cb_o+1)$ in that order in a (YH', CrH', CbH') space, the second plane of the parallelepiped PP having the four lattice points Pe, Pf, Pg and Ph addressed at color converting addresses $(Y_o, +1, Cr_o+1, Cb_o+1)$, $(Y_o,+1, Cr_o+2, Cb_o+1)$, $(Y_o+1, Cr_o+2, Cb_o+2)$ and $(Y_o+1, Cr_o+1, Cb_o+2)$ in that order in the (YH', CrH', CbH') space, the color converting address (YH1', CrH1', CbH1') of the lattice point P1 of the selected rectangular parallelepiped agreeing with the color converting address ($Y_o$, $Cr_o$, $Cb_o$) of the lattice point Pa or the color converting address ($Y_o+1$, $Cr_o+1$, $Cb_o+1$) of the lattice point Pe in dependence on whether the value YH1' is an even number or an odd number, and the parallelepiped PP being formed of a first triangular prism with the lattice points Pa, Pb, Pc, Pe, Pf and Pg and a second triangular prism with the lattice points Pa, Pd, Pc, Pe, Ph and Pg, four pieces of color converting data M0, M1, M2 and M3 allocated at the color converting addresses of the selected lattice points agreeing with the lattice points Pa to Pd of the parallelepiped PP and other four pieces of color converting data M4, M5, M6 and M7 allocated at the color converting addresses of the selected lattice points agreeing with the lattice points Pe to Ph of the parallelepiped PP being read out from the color converting data storing means;

triangular prism selecting means for selecting either the first triangular prism or the second triangular prism of the parallelepiped PP, of which the lattice point Pa agrees with the lattice point P1 of the selected rectangular parallelepiped specified in the first address generating means, with the lower first color difference signal DCr and the lower second color difference signal DCb generated in the lightness and color difference generating means and generating a triangular prism selecting signal indicating a triangular prism selected;

first selecting means for selecting three pieces of color converting data from among the color converting data M0 to M3 as three pieces of color converting data Da, Db (or Dd) and Dc allocated at the color converting addresses of the lattice points Pa, Pb (or Pd) and Pc of the first or second triangular prism of the parallelepiped PP in that order according to the triangular prism selecting signal generated in the triangular prism selecting means and the selected block address (YH1', CrH1', CbH1') generated in the first address generating means;

second selecting means for selecting three pieces of color converting data from among the color converting data M4 to M7 as three pieces of color converting data De, Df (or Dh) and Dg allocated at the color converting addresses of the lattice points Pe, Pf (or Ph) and Pg of the first or second triangular prism of the parallelepiped PP in that order according to the triangular prism selecting signal generated in the triangular prism selecting means and the selected block address (YH1', CrH1', CbH1') generated in the first address generating means;

weight controlling means for controlling the value DY1 of the lower lightness signal DY generated in the lightness and color difference generating means to convert the value DY1 to a controlled value 1-DY1 in cases where the value YH1 of the upper lightness signal YH generated in the lightness and color difference generating means is an odd number, the value DY1 being expressed by a symbol DY1' in cases where the value YH1 is an even number, and the controlled value 1-DY1 being expressed by the same symbol DY1' in cases where the value YH1 is an odd number; and interpolation calculating means for interpolating coordinates of an output color defined in the output color space corresponding to input color coordinates of the input color as an output color value Do in the first or second triangular prism of the parallelepiped PP with the six color converting data Da, Db (or Dd), Dc, De, Df (or Dh) and Dg selected in the first selecting means and the second selecting means while weighting the six color converting data with the values DCR1 and DCb1 of the lower signals DCr and DCb generated in the lightness and color difference generating means and the value DY1' of the lower lightness signal DY defined by the weight controlling means, the value DY1' of the lower lightness signal DY denoting a lightness component in the lightness direction of an input color vector directed from the lattice point Pa to the input color coordinates, the value DCr1 of the lower first color difference signal DCr denoting a first color difference component in the first color difference direction of the input color vector, and the value DCb1 of the lower second color difference signal DCb denoting a second color difference component in the second color difference direction of the input color vector.

20. A color converting apparatus according to claim 19 in which the first address generating means comprises:

a fixed value subtracting element for subtracting a value of 7 from the values CrH1, CbH1 of the upper color difference signals CrH, CbH to produce subtracted values CrH1–7, CbH1–7;

a first adding element for adding the value YH1 of the upper lightness signal YH generated in the lightness and color difference generating means to the subtracted value CrH1–7 to produce an upper first color difference signal CrH' having a value CrH1'=CrH1–7+YH1; and a second adding element for adding the value YH1 of the upper lightness signal YH generated in the lightness and color difference generating means to the subtracted value CbH1–7 to produce an upper second color difference signal CbH' having a value CbH1'=CbH1–7+YH1, the selected block address (YH1', CrH1', CbH1') being determined with the values CrH1', CbH1' and a value YH1' equal to the value YH1 of the upper lightness signal YH.

21. A color converting apparatus according to claim 19 in which the second address generating means comprises eight address generating units U(M0), U(M1), U(M2), U(M3), U(M4), U(M5), U(M6), U(M7) for respectively generating one of the color converting addresses, each of the address generating units comprising:

a CrH' slid value generating element for generating a CrH' slid value of CrH1' in cases where the value YH1' is an even number and generating another CrH' slid value of CrH1'+1 in cases where the value YH1' is an odd number;

a CrH' reduced value storing element for storing a CrH' reduced value of a CrH' upper signal which is formed by removing a least significant bit of a CrH' signal having the CrH' slid value generated in the CrH' slid value generating element;

a CrH' reduced value increasing element for increasing the CrH' reduced value stored in the CrH' reduced value storing element to produce a CrH' component of a color converting address in cases where the value CrH1' is an odd number on condition that an adjusting value UX shown in a following adjusting table is set to zero and maintaining the CrH' reduced value stored in the CrH' reduced value storing element to produce another CrH' component of the color converting address in cases where the value CrH1' is an even number;

a CbH' slid value generating element for generating a CbH' slid value of CbH1' in cases where the value YH1' is an even number and generating another CbH' slid value of CbH1'+1 in cases where the value YH1' is an odd number;

a CbH' reduced value storing element for storing a CbH' reduced value of a CbH' upper signal which is formed by removing a least significant bit of a CbH' signal having the CbH' slid value generated in the CbH' slid value generating element;

a CbH' reduced value increasing element for increasing the CbH' reduced value stored in the CbH' reduced value storing element to produce a CbH' component of the color converting address in cases where the value CbH1' is an odd number on condition that an adjusting value UY shown in the following adjusting table is set to zero and maintaining the CbH' reduced value stored in the CbH' reduced value storing element to produce another CbH' component of the color converting address in cases where the value CbH1' is an even number;

a YH' reduced value storing element for storing a YH' reduced value of a YH' upper signal which is formed by removing a least significant bit of a YH' signal having the value YH1'; and a YH' reduced value increasing element for increasing the YH' reduced value stored in the YH' reduced value storing element to produce a YH' component of the color converting address in cases where the value YH1' is an odd number on condition that an adjusting value UZ shown in the following adjusting table is set to zero and maintaining the YH' reduced value stored in the YH' reduced value storing element to produce another YH' component of the color converting address in cases where the value YH1' is an even number, the color converting address of each of the lattice points Pa to Ph being determined by the CrH' component of the color converting address produced in the CrH' reduced value increasing element, the CbH' component of the color converting address produced in the CbH' reduced value increasing element and the YH' component of the color converting address produced in the YH' reduced value increasing element, and the adjusting table being expressed as follows:

| address generating units | adjusting values | | |
|---|---|---|---|
| | UX | UY | UZ |
| U(M0) | 0 | 0 | 0 |
| U(M1) | 1 | 0 | 0 |
| U(M2) | 1 | 1 | 0 |
| U(M3) | 0 | 1 | 0 |
| U(M4) | 0 | 0 | 1 |
| U(M5) | 1 | 0 | 1 |
| U(M6) | 1 | 1 | 1 |
| U(M7) | 0 | 1 | 1. |

22. A color converting apparatus according to claim 19 in which the three color converting data selected from among the color converting data M0 to M3 in the first selecting means are allocated at the color converting addresses of the lattice points Pa, Pb and Pc in cases where the first triangular prism is selected in the triangular prism selecting means, and the three color converting data are changed according to the selected block address (YH1', CrH1', CbH1') as follows:

| selected block addresses | color converting data | | |
|---|---|---|---|
| (YH1', CrH1', CbH1') | Pa | Pb | Pc |
| (2i, 2j, 2k) | M0 | M1 | M2 |
| (2i, 2j + 1, 2k) | M1 | M0 | M3 |
| (2i, 2j + 1, 2k + 1) | M2 | M3 | M0 |
| (2i, 2j, 2k + 1) | M3 | M2 | M1 |
| (2i + 1, 2j, 2k) | M2 | M3 | M0 |
| (2i + 1, 2j + 1, 2k) | M3 | M2 | M1 |
| (2i + 1, 2j + 1, 2k + 1) | M0 | M1 | M2 |
| (2i + 1, 2j, 2k + 1) | M1 | M0 | M3 | where the symbols i, j and k are respectively an integral number, and the three color converting data selected from among the color converting data M0 to M3 in the first selecting means are allocated at the color converting addresses of the lattice points Pa, Pd and Pc in cases where the second triangular prism is selected in the triangular prism selecting means, and the three color converting data are changed according to the selected block address (YH1', CrH1', CbH1') as follows:

| selected block addresses | color converting data | | |
|---|---|---|---|
| (YH1', CrH1', CbH1') | Pa | Pb | Pc |
| (2i, 2j, 2k) | M0 | M3 | M2 |
| (2i, 2j + 1, 2k) | M1 | M2 | M3 |
| (2i, 2j + 1, 2k + 1) | M2 | M1 | M0 |
| (2i, 2j, 2k + 1) | M3 | M0 | M1 |
| (2i + 1, 2j, 2k) | M2 | M1 | M0 |
| (2i + 1, 2j + 1, 2k) | M3 | M0 | M1 |
| (2i + 1, 2j + 1, 2k + 1) | M0 | M3 | M2 |
| (2i + 1, 2j, 2k + 1) | M1 | M2 | M3. |

23. A color converting apparatus according to claim 19 in which the three color converting data selected from among the color converting data M4 to M7 in the second selecting means are allocated at the color converting addresses of the lattice points Pe, Pf and Pg in cases where the first triangular prism is selected in the triangular prism selecting means, and the three color converting data are changed according to the selected block address (YH1', CrH1', CbH1') as follows:

| selected block addresses | color converting data | | |
|---|---|---|---|
| (YH1', CrH1', CbH1') | Pe | Pf | Pg |
| (2i, 2j, 2k) | M6 | M7 | M4 |
| (2i, 2j + 1, 2k) | M7 | M6 | M5 |
| (2i, 2j + 1, 2k + 1) | M4 | M5 | M6 |
| (2i, 2j, 2k + 1) | M5 | M4 | M7 |
| (2i + 1, 2j, 2k) | M4 | M5 | M6 |
| (2i + 1, 2j + 1, 2k) | M5 | M4 | M7 |
| (2i + 1, 2j + 1, 2k + 1) | M6 | M7 | M4 |
| (2i + 1, 2j, 2k + 1) | M7 | M6 | M5 | where the symbols i, j and k are respectively an integral number, and the three color converting data selected from among the color converting data M4 to M7 in the second selecting means are allocated at the color converting addresses of the lattice points Pe, Ph and Pg in cases where the second triangular prism is selected in the triangular prism selecting means, and the three color converting data are changed according to the selected block address (YH1', CrH1', CbH1') as follows:

| selected block addresses | color converting data | | |
| --- | --- | --- | --- |
| (YH1', CrH1', CbH1') | Pe | Ph | Pg |
| (2i, 2j, 2k) | M6 | M5 | M4 |
| (2i, 2j + 1, 2k) | M7 | M4 | M5 |
| (2i, 2j + 1, 2k + 1) | M4 | M7 | M6 |
| (2i, 2j, 2k + 1) | M5 | M6 | M7 |
| (2i + 1, 2j, 2k) | M4 | M7 | M6 |
| (2i + 1, 2j + 1, 2k) | M5 | M6 | M7 |
| (2i + 1, 2j + 1, 2k + 1) | M6 | M5 | M4 |
| (2i + 1, 2j, 2k + 1) | M7 | M4 | M5. |

24. A color converting apparatus according to claim 19 in which the lightness and color difference generating means comprises:

a first subtracting element for subtracting a second value X2 of the second primary color signal from a first value X1 of the first primary color signal to generate the first color difference signal Cr;

a second subtracting element for subtracting the second value X2 of the second primary color signal from a third value X3 of the third primary color signal to generate the second color difference signal Cb; and a lightness generating element for generating the lightness signal Y linearly independent of both the first color difference signal Cr and the second color difference signal Cb by combining the first primary color signal, the second primary color signal and the third primary color signal.

25. A color converting apparatus according to claim 24 in which the value Y1 of the input lightness signal Y is expressed with the values X1, X2 and X3 according to an equation $$Y1=X2.$$

26. A color converting apparatus according to claim 24, further including:

a first negative value compensating element for compensating the first color difference signal Cr generated in the first subtracting element for a negative value generated in the first subtracting element to form the first color difference signal Cr having a value of zero or a positive number, the value of the first color difference signal Cr denoting a density of a first color difference in the input color; and a second negative value compensating element for compensating the second color difference signal Cb generated in the second subtracting element for a negative value generated in the second subtracting element to form the second color difference signal Cb having a value of zero or a positive number, the value of the second color difference signal Cr denoting a density of a second color difference in the input color.

27. A color converting apparatus according to claim 19 in which the color converting data storing means comprises a plurality of color converting tables which each correspond to one of the rectangular parallelepipeds, each of the color converting tables comprising eight color converting memories for storing the color converting data M0 to M7.

28. A color converting apparatus according to claim 19 in which the color converting data storing means comprises a plurality of color converting tables which each correspond to one of the rectangular parallelepipeds, each of the color converting tables comprising eight color converting memories for storing the color converting data M0 to M7 at first color converting sub-tables and other pieces of color converting data M0' to M7' at second color converting sub-tables.

29. A color converting apparatus according to claim 28, further including:

area processing selecting means for selecting either a first type of area processing in which a first type of color conversion is performed for a first area of a colored picture or a second type of area processing in which a second type of color conversion is performed for a second area of the colored picture; and sub-table signal generating means for generating a first sub-table signal in cases where the first type of area processing is selected in the area processing selecting means and generating a second sub-table signal in cases where the second type of area processing is selected in the area processing selecting means, the first or second sub-table signal being transferred to the second address generating means, the color converting data M0, M1, M2, M3, M4, M5, M6 and M7 stored at the first color converting sub-tables being read out from the color converting data storing means in cases where the first sub-table signal is transferred to the second address generating means, and the color converting data M0', M1', M2', M3', M4', M5', M6' and M7' stored at the second color converting sub-tables being read out from the color converting data storing means as the color converting data M0, M1, M2, M3, M4, M5, M6 and M7 in cases where the second sub-table signal is transferred to the second address generating means.

30. A color converting apparatus according to claim 19 in which each of the color converting data stored in the color converting data storing means has a value limited to an even number or an odd number in a widened range, and the interpolation calculating means comprises:

a displacement register for registering a positive or negative displacement value;

a displacement adder for adding the displacement value registered in the displacement register to the output color value Do to set the widened range of the output color value Do interpolated with the color converting data M0, M1 (or M3), M2, M4, M5 (or M7) and M6 in a displaced range which occupies an area of positive numbers and another area of negative numbers; and an output data limiter for limiting the output color value Do set in the displaced range by the displacement adder within an area of positive numbers and zero.

31. A color converting apparatus according to claim 30 in which the color converting data are respectively composed of 10 bits, the widened range of the output color value Do added in the displacement adder is from −1024 to 1022, and the output color value Do limited in the output data limiter ranges from 0 to 1023.

32. A color converting apparatus according to claim 30 in which the color converting data are respectively composed of 8 bits, the widened range of the output color value Do added in the displacement adder is from −256 to 254, and the output color value Do reduced in the output data limiter ranges from 0 to 255.

33. A color converting apparatus according to claim 19 in which the interpolation calculating means comprises:

difference generating means for calculating a first difference Db−Da between pieces of data Da, Db allocated at the color converting addresses of the lattice points Pa, Pb, a second difference Dc–Db between pieces of data Db, Dc allocated at the color converting addresses of the lattice points Pb, Pc, a third difference De–Da between pieces of data Da, De allocated at the color converting addresses of the lattice points Pa, Pe, a fourth difference Df–De between pieces of data De, Df allocated at the color converting addresses of the lattice points Pa, Pe and a fifth difference Dg–Df between pieces of data Dg, Df allocated at the color converting addresses of the lattice points Pg, Pf in cases where the triangular prism selecting signal indicating the selection of the first triangular prism is received and calculating a sixth difference Dd–Da between pieces of data Da, Dd allocated at the color converting addresses of the lattice points Pa, Pd, a seventh difference Dc–Dd, an eighth difference De–Da, a ninth difference Dh–De between pieces of data De, Dh allocated at the color converting addresses of the lattice points Pe, Ph and a tenth difference Dg–Dh in cases where the triangular prism selecting signal indicating the selection of the second triangular prism is received;

first multiplying means for multiplying the first difference Db–Da, the second difference Dc–Db, the fourth difference Df–De and the fifth difference Dg–Df calculated in the difference generating means by the value DCr1 of the lower first color difference signal DCr or the value DCb1 of the lower second color difference signal DCb transferred from the input signal receiving means to obtain a first product DCr1*(Db–Da), a second product DCb1*(Dc–Db), a third product DCr1*(Df–De) and a fourth product DCb1*(Dg–Df) in cases where the triangular prism selecting signal indicating the selection of the first triangular prism is received and multiplying the seventh difference Dc–Dd, the sixth difference Dd–Da, the tenth difference Dg–Dh and the ninth difference Dh–De calculated in the difference generating means by the value DCr1 of the lower first color difference signal DCr or the value DCb1 of the lower second color difference signal DCb to obtain a fifth product DCr1*(Dc–Dd), a sixth product DCb1*(Dd–Da), a seventh product DCr1*(Dg–Dh) and an eighth product DCb1*(Dh–De) in cases where the triangular prism selecting signal indicating the selection of the second triangular prism is received;

first adding means for adding the first product DCr1*(Db–Da) and the second product DCb1*(Dc–Db) produced in the first multiplying means to obtain a first added product DCr1*(Db–Da)+DCb1*(Dc–Db), adding the third product DCr1*(Df–De) and the fourth product DCb1*(Dg–Df) produced in the first multiplying means to obtain a second added product DCr1*(Df–De)+DCb1*(Dg–Df), adding the fifth product DCr1*(Dc–Dd) and the sixth product DCb1*(Dd–Da) produced in the first multiplying means to obtain a third added product DCr1*(Dc–Dd)+DCb1*(Dd–Da), and adding the seventh product DCr1*(Dg–Dh) and the eighth product DCb1*(Dh–De) produced in the first multiplying means to obtain a fourth added product DCr1*(Dg–Dh)+DCb1*(Dh–De);

second adding means for adding the first added product DCr1*(Db–Da)+DCb1*(Dc–Db) produced in the first adding means and the color converting data Da transferred from the input signal receiving means to produce a first term product Da+DCr1*(Db–Da)+DCb1*(Dc–Db) in cases where the triangular prism selecting signal indicating the selection of the first triangular prism is received and adding the third added product DCr1*(Dc–Dd)+DCb1*(Dd–Da) produced in the first adding means and the color converting data Da to produce another first term product Da+DCr1*(Dc–Dd)+DCb1*(Dd– Da) in cases where the triangular prism selecting signal indicating the selection of the second triangular prism is received;

subtracting means for subtracting the first added product DCr1*(Db–Da)+DCb1*(Dc–Db) from the second added product DCr1*(Df–De)+DCb1*(Dg–Df) produced in the first adding means to obtain a first subtracted product DCr1*(Df–De)+DCb1*(Dg–Df)–DCr1*(Db–Da)–DCb1*(Dc–Db) and subtracting the third added product DCr1*(Dc–Dd)+DCb1*(Dd–Da) from the fourth added product DCr1*(Dg–Dh)+DCb1*(Dh–De) produced in the first adding means to obtain a second subtracted product DCr1*(Dg–Dh)+DCb1*(Dh–De)–DCr1*(Dc–Dd)–DCb1*(Dd–Da);

third adding means for adding the first subtracted product DCr1*(Df–De)+DCb1*(Dg–Df)–DCr1*(Db–Da)–DCb1*(Dc–Db) produced in the subtracting means and the third difference De–Da calculated in the difference generating means to produce a fifth added product De–Da+DCr1*(Df–De)+DCb1*(Dg–Df)–DCr1*(Db–Da)–DCb1*(Dc–Db) and adding the second subtracted product DCr1*(Dg–Dh)+DCb1*(Dh–De)–DCr1*(Dc–Dd)–DCb1*(Dd–Da) produced in the subtracting means and the third difference De–Da to produce a sixth added product De–Da+DCr1*(Dg–Dh)+DCb1*(Dh–De)–DCr1*(Dc–Dd)–DCb1*(Dd–Da);

second multiplying means for multiplying the fifth added product De–Da+DCr1*(Df–De)+DCb1*(Dg–Df)–DCr1*(Db–Da)–DCb1*(Dc–Db) and the sixth added product De–Da+DCr1*(Dg–Dh)+DCb1*(Dh–De)–DCr1*(Dc–Dd)–DCb1*(Dd–Da) produced in the third adding means by the value DY1 of the lower lightness signal DY to obtain a second term product DY1*{De–Da+DCr1*(Df–De)+DCb1*(Dg–Df)–DCr1*(Db–Da)–DCb1*(Dc–Db)} in cases where the triangular prism selecting signal indicating the selection of the first triangular prism is received and another second term product DY1*{De–Da+DCr1*(Dg–Dh)+DCb1*(Dh–De)–DCr1*(Dc–Dd)–DCb1*(Dd–Da)} in cases where the triangular prism selecting signal indicating the selection of the second triangular prism is received; and fourth adding means for adding the first term product Da+DCr1*(Db–Da)+DCb1*(Dc–Db) produced in the second adding means and the second term product DY1*{De–Da+DCr1*(Df–De)+DCb1*(Dg–Df)–DCr1,(Db–Da)–DCb1*(Dc–Db)} produced in the second multiplying means to obtain the output color value Do=Da+DCr1*(Db–Da)+DCb1*(Dc–Db)+DY1*{De–Da+DCr1*(Df–De)+DCb1*(Dg–Df)–DCr1*(Db–Da)–DCb1*(Dc–Db)} in cases where the triangular prism selecting signal indicating the selection of the first triangular prism is received and adding the first term product Da+DCr1*(Dc–Dd)+DCb1*(Dd–Da) produced in the second adding means and the second term product DY1*{De–Da+DCr1*(Dg–Dh)+DCb1*(Dh–De)–DCr1*(Dc–Dd)–DCb1*(Dd–Da)} to obtain the output color value Do=Da+DCr1*(Dc–Dd)+DCb1*(Dd–Da)+DY1*{De–Da+DCr1*(Dg–Dh)+DCb1*(Dh–De)–DCr1*(Dc–Dd)–DCb1*(Dd–Da)} in cases where the triangular prism selecting signal indicating the selection of the second triangular prism is received.

34. A color converting apparatus according to claim 29 in which the area processing selecting means comprises:

an area RAM table for storing a starting address of a starting pixel placed at a starting point of the first area of the colored picture and an ending address of an ending pixel placed at an ending point of the first area of the colored picture, the starting address and the ending address being numbered an area number;

a pixel counter for counting pixels along a main scanning line to specify addresses of the pixels;

a pixel address comparator for comparing the addresses of the pixels counted in the pixel counter with the starting address or the ending address stored in the area RAM table to judge whether or not each of the addresses of the pixels scanned along the main scanning line accords with the starting address or the ending address and generating an area counting signal each time an address of a pixel scanned along the main scanning line accords with the starting address or the ending address; and an area counter for counting the area counting signal generated in the pixel address comparator to increase an area number one by one and sending an increased area number to the area RAM table, a selecting signal instructing the performance of the first type of color conversion being transferred to the sub-table signal generating means in cases where the increased area number accords with the area number given to the starting address, another selecting signal instructing the performance of the second type of color conversion being transferred to the sub-table signal generating means in cases where the increased area number accords with the area number given to the ending address, and the starting address and the ending address stored in the area RAM table being rewritten with other starting and ending addresses transferred from a host computer each time all of the pixels placed in one of the main scanning line are counted in the pixel counter.

35. A color converting apparatus according to claim 19, further including:

host interface means for transferring other pieces of color converting data from a host computer to the color converting data storing means to renew the color converting data stored in the color converting data storing means during a blanking period in which the color converting data M0, M1, M2, M3, M4, M5, M6 and M7 are not read out from the color converting data storing means.

36. A color converting apparatus comprising:

color converting data storing means for storing six types of pieces of color converting data M0 to M5 defined in an output color space, a plurality of rectangular parallelepipeds being formed in a lightness-color difference space by partitioning the lightness-color difference space in a lightness direction, a first color difference direction and a second color difference direction, each of the rectangular parallelepipeds having four lattice points P1, P2, P3 and P4 at a first block plane placed at a color difference plane of the lightness-color difference space and other four lattice points P5, P6, P7 and P8 at a second block plane placed at another color difference plane of the lightness-color difference space, a block address of each of the rectangular parallelepipeds being represented by a color converting address of the lattice point P1, the color converting data M0 to M2 being allocated at color converting addresses of the lattice points P1 to P4 of the rectangular parallelepipeds to repeatedly arrange the color converting data M0 to M2 in the first color difference direction and the second color difference direction in that order, and the color converting data M3 to M5 being allocated at color converting addresses of the lattice points P5 to P8 of the rectangular parallelepipeds to repeatedly arrange the color converting data M3 to M5 in the first color difference direction and the second color difference direction in that order;

lightness and color difference generating means for generating a lightness signal Y, a first color difference signal Cr and a second color difference signal Cb defined in a lightness-color difference space from a first primary color signal, a second primary signal and a third primary signal defined in a primary color space, an input color defined in the primary color space being designated by the first, second and third primary color signals, the input color defined in the lightness-color difference space being designated by the signals Y, Cr and Cb, the lightness signal Y being composed of an upper lightness signal YH having a value YH1 and a lower lightness signal DY having a value DY1, the first color difference signal Cr being composed of an upper first color difference signal CrH having a value CrH1 and a lower first color difference signal DCr having a value DCr1, and the second color difference signal Cb being composed of an upper second color difference signal CbH having a value CbH1 and a lower second color difference signal DCb having a value DCb1;

first address generating means for generating a selected block address (YH1', CrH1', CbH1') of a selected rectangular parallelepiped represented by a color converting address (YH1', CrH1', CbH1') of a lattice point P1 of the selected rectangular parallelepiped with the upper lightness signal YH, the upper first color difference signal CrH and the upper second color difference signal CbH generated in the lightness and color difference generating means to specify the selected rectangular parallelepiped, the input color being included in a parallelepiped PP having a first plane placed at a lightness in the lightness direction and a second plane parallel to the first plane, the first plane of the parallelepiped PP having four lattice points Pa, Pb, Pc and Pd addressed at color converting addresses $(Y_o, Cr_o, Cb_o)$, $(Y_o, Cr_o+1, Cb_o)$, $Y_o, Cr_o+1, Cb_o+1)$ and $(Y_o, Cr_o, Cb_o+1)$ in that order, the second plane of the parallelepiped PP having four lattice points Pe, Pf, Pg and Ph addressed at color converting addresses $(Y_o+1, Cr_o+1, Cb_o+1)$, $(Y_o+1, Cr_o+2, Cb_o+1)$, $(Y_o+1, Cr_o+2, Cb_o+2)$ and $(Y_o+1, Cr_o+1, Cb_o+2)$ in that order, the color converting address (YH1', CrH1', CbH1') of the lattice point P1 of the selected rectangular parallelepiped agreeing with the color converting address $(Y_o, Cr_o, Cb_o)$ of the lattice point Pa or the color converting address $((Y_o+1, Cr_o+1, Cb_o+1)$ of the lattice point Pe in dependence on whether the value YH1' is an even number or an odd number, and the parallelepiped PP being formed of a first triangular prism with the lattice points Pa, Pb, Pc, Pe, Pf and Tg and a second triangular prism with the lattice points (Pa, Pd, Pc, Pe, Ph and Pg;

second address generating means for generating a memory address CrH" in the first color difference direction, a memory address CbH" in the second color difference direction, a CrH" remainder Tx and a CbH" remainder Ty with the selected block address (YH1', CrH1', CbH1') of the selected rectangular parallelepiped, the memory address CrH" being a quotient obtained by dividing a first slid value CrH1S' by 3, the memory address CbH" being equal to a second slid value CbH1S', the CrH" remainder Tx being a remainder obtained by dividing the first slid value CrH1S' by 3, the CbH" remainder Ty being a remainder obtained by dividing the second slid value CbH1S' by 3, the first and second slid value CrH1S', CbH1S' being obtained by incrementing the values CrH1', CbH1' to determine color converting addresses of the color converting data M0 to M2 in cases where the value YH1' is an even number, the first and second slid value CrH1S', CbH1S' being obtained by incrementing the values CrH1', CbH1' to determine color converting addresses of the color converting data M3 to M5 in cases where the value YH1' is an odd number, and the first and second slid value CrH1S', CbH1S' being equal to the values CrH1', CbH1' in other cases;

triangular prism selecting means for selecting either the first triangular prism or the second triangular prism of the parallelepiped PP of which the lattice point Pa agrees with) the lattice point P1 of the selected rectangular parallelepiped specified in the first address generating means with the lower first color difference signal DCr and the lower second color difference signal DCb generated in the lightness and color difference generating means;

third address generating means for generating six color converting addresses of the lattice points Pa, Pb (or Pd), Pc, Pe, Pf (or Ph) and Pg of a particular triangular prism selected in the triangular prism selecting means with the memory address CrH''', ChH", YH" an the remainders Tx, Ty generated in the second address generating means, the color converting data M0 to M5 allocated at the color converting addresses of the lattice points Pa, Pb (or Pd), Pc, Pe, Pf (or Ph) and Pg of the particular triangular prism being read out from the color converting data storing means;

first selecting means for selecting three pieces of color converting data Da, Db (or Dd) and Dc allocated at the color converting addresses of the lattice points Pa, Pb (or Pd) and Pc in that order from the color converting data M0 to M2 read out from the color converting data storing means;

second selecting means for selecting three pieces of color converting data De, Df (or Dh) and Dg allocated at the color converting addresses of the lattice points Pe, Pf (or Ph) and Pg in that order from the color converting data M3 to M5 read out from the color converting data storing means;

weight controlling means for controlling the value DY1 of the lower lightness signal DY generated in the lightness and color difference generating means to convert the value DY1 to a controlled value 1-DY1 in cases where the value YH1 of the upper, lightness signal YH generated in the lightness and color difference gengrating means is an odd number, the value DY1 being expressed by a symbol DY1' in cases where the value YH1 is an even number, and the controlled value 1-DY1 being expressed by the same symbol DY1' in cases where the value YH1 is an odd number; and interpolation calculating means for interpolating coordinates of an output color defined in the output color space corresponding to input color coordinates of the input color as an output color value Do in the particular triangular prism with the six color converting data Da, Db (or Dd), Dc, De, Df (or Dh) and Dg selected in the first selecting means and the second selecting means while weighting the six color converting data with the values DCr1 and DCb1 of the lower signals DCr and DCb generated in the lightness and color difference generating means and the value DY1' of the lower lightness signal DY defined by the weight controlling means, the value DY1' of the lower lightness signal DY denoting a lightness component in the lightness direction of an input color vector directed from the lattice point Pa to the input color coordinates, the value DCr1 of the lower first color difference signal DCr denoting a first color difference component in the first color difference direction of the input color vector, and the value DCb1 of the lower second color difference signal DCb denoting a second color difference component in the second color difference direction of the input color vector.

37. A color converting apparatus, comprising:

color converting data storing means for storing pieces of color converting data defined in an output color space, a plurality of rectangular parallelepipeds being formed in a primary color space by partitioning the primary color space in a first primary color direction, a second primary color direction and a third primary color direction, each of the rectangular parallelepipeds having four lattice points P1, P2, P3 and P4 placed at a first-second primary color plane of the primary color space and other four lattice points P5, P6, P7 and P8 placed at another first-second primary color plane of the primary color space, a block address (i, j, k) of each of the rectangular parallelepipeds being represented by a color converting address of the lattice point P1, and the color converting data being limitedly allocated at the color converting addresses of the lattice points P1 to P8 of the rectangular parallelepipeds, of which the block addresses are respectively expressed by coordinates ($2i, 2j, 2k$) composed of three even numbers $2i, 2j$ and $2k$, to store the color converting data without any overlapping storage of the color converting data;

primary color signal dividing means for dividing a first primary color signal into an upper first color signal having a value RH1 and a lower first color signal having a value RL1, a second primary color signal into an upper second color signal having a value BH1 and a lower second color signal having a value BL1, and a third primary color signal into an upper third color signal having a value GH1 and a lower third color signal having a value GL1, the first, second and third primary color signals being defined in the primary color space and designating an input color;

lower color signal comparing means for comparing the values RL1, GLI of the lower first and third color signals divided in the primary color signal dividing means to output a first compared result in dependence on a large and small relationship between the values RL1, GLI and comparing the values BL1, GL1 of the lower second and third color signals divided in the primary color signal dividing means to output a second compared result in dependence on a large and small relationship between the values BL1, GL1;

adding means for adding the first compared result produced in the lower color signal comparing means to the value RH1 of the upper first color signal divided in the primary color signal dividing means to produce a first component having a value RH1', adding the second compared result produced in the lower color signal comparing means to the value BH1 of the upper second color signal divided in the primary color signal dividing means to produce a second component having a value BH1', and producing a third component having a value GH1' which is the same as the value GH of the upper third color signal divided in the primary color signal dividing means, a selected block address (RH1', BH1', GH1') of a selected rectangular parallelepiped being specified, the input color being included in a parallelepiped PP having a first plane placed at a primary color value $G_o$ in the third primary color direction and a second plane parallel to the first plane, the first plane of the parallelepiped PP having four lattice points Pa, Pb, Pc and Pd addressed at color converting address $(R_o, B_o, G_o)$, $((R_o+1, B_o, G_o)$, $(R_o+1, B_o+1, G_o)$ and $(R_o, B_o+1, G_o)$ in that order, the second plane of the parallelepiped PP having four lattice points Pe, Pf, Pg and Ph addressed at color converting addresses $(R_o+1, B_o+1, G_o+1)$, $(R_o+2, B_o+1, G_o+1)$, $(R_o+2, B_o+2, G_o+1)$ and $(R_o+1, B_o+2, G_o+1)$ in that order, the color converting address (RH1', BH1', GH1') of the lattice point P1 of the selected rectangular parallelepiped agreeing with the color converting address $(R_o, B_o, G_o)$ of the lattice point Pa or the color converting address $(R_o+1, B_o+1, G_o+1)$ of the lattice point Pe in dependence on whether the value GH1' is an even number or an odd number, and the parallelepiped PP being formed of a first oblique triangular prism with the lattice points Pa, Pb, Pc, Pe, Pf and Pg and a second oblique triangular prism with the lattice points Pa, Pd, Pc, Pe, Ph and Pg;

weighting factor generating means for generating a first weighting factor having a first value (RL1–GL1)' and a second weighting factor having a second value (BL1–GL1)' with the first, second and third lower color signals divided in the primary color signal dividing means, the value (RL1–GL1)' being equal to a value RL1–GL1 in case of RL1≧GL1, the value (RL1–GL1)' being formed by adding a constant to the value (RL1–GL1) in case of RL1 <GL1, the value (BL1–GL1)' being equal to a value BL1–GL1 in case of BL1≧GL1, and the value (BL1–GL1)' being formed by adding the constant to the value BL1–GL1 in case of BL1<GL1;

oblique triangular prism selecting means for selecting either the first oblique triangular prism or the second oblique triangular prism of the parallelepiped PP of which the lattice point Pa agrees with the lattice point P1 of the selected rectangular parallelepiped specified in the adding means with the first weighting factor and the second weighting factor generated in the weighting factor generating means and generating an oblique triangular prism selecting signal indicating an oblique triangular prism selected;

address generating means for generating eight block addresses of eight particular rectangular parallelepipeds, which each have one of eight selected lattice points agreeing with the lattice points Pa to Ph of the parallelepiped PP, with the selected block address (RH1', BH1', GH1') specified in the adding means, eight pieces of color converting data M0, M1, M2, M3, M4, M5, M6 and M7 allocated at the color converting addresses of the selected lattice points equivalent to the lattice points Pa to Ph of the parallelepiped PP being read out from the color converting data storing means;

selecting means for selecting six pieces of color converting data from among the color converting data M0 to M7 as six pieces of color converting data Da, Db (or Dd), Dc, De, Df (Or Dh) and Dg allocated at the color converting addresses of the lattice points Pa, Pb (or Pd), Pc, Pe, Pf (or Ph) and Pg of the first or second oblique triangular prism of the parallelepiped PP in that order according to the oblique triangular prism selecting signal generated in the oblique triangular prism selecting means and the selected block address (RH1', BH1', GH1') specified in the adding means; and interpolation calculating means for interpolating coordinates of an output color defined in the output color space corresponding to input color coordinates of the input color as an output color value Do in the first or second oblique triangular prism of the parallelepiped PP with the six color converting data Da, Db (or Dd), Dc, De, Df (or Dh) and Dg selected in the selecting means while weighting the six color converting data with the first and second weighting factors generated in the weighting factor generating means and the lower third color signal divided in the primary color signal dividing means, the value (RL1–GL1)' of the first weighting factor denoting a first primary color component in the first primary color direction of an input color vector directed from the lattice point Pa to the input color coordinates, the value (BL1–GL1)' of the second weighting factor denoting a second primary color component in the second primary color direction of the input color vector, and the value GL1 of the lower third color signal denoting a third primary color component in the third primary color direction of the input color vector.

38. A color converting apparatus according to claim 37, further including:

weight controlling means for controlling the value GL1 of the lower third color signal divided in the primary color signal dividing means by converting the value GL1 to a controlled value 1-GL1 in cases where the value GH1 of the upper third color signal divided in the primary color signal dividing means is an odd number, the value GL1 or the controlled value 1-GL1 being transferred to the interpolation calculating means as a value of the lower third color signal.

39. A color converting apparatus according to claim 38 in which the selecting means comprises:

first selecting element for selecting three pieces of color converting data from among the color converting data M0 to M3 as the color converting data Da, Db (or Dd) and Dc allocated at the color converting addresses of the lattice points Pa, Pb (or Pd) and Pc of the first or second oblique triangular prism of the parallelepiped PP according to the oblique triangular prism selecting signal generated in the oblique triangular prism selecting means and the selected block address (RH1', BH1', GH1') generated in the first address generating means; and second selecting element for selecting three pieces of color converting data from among the color converting data M4 to M7 as the color converting data De, Df (or Dh) and Dg allocated at the color converting addresses of the lattice points Pe, Pf (or Ph) and Pg of the first or second oblique triangular prism of the parallelepiped PP according to the oblique triangular prism selecting signal generated in the oblique triangular prism selecting means and the selected block address (RH1', BH1', GH1') generated in the first address generating means.

40. A color converting apparatus according to claim 37 in which the second address generating means comprises eight address generating units U(M0), U(M1), U(M2), U(M3), U(M4), U(M5), U(M6), U(M7) for respectively generating one of the color converting addresses, each of the address generating units comprising:

a RH' slid value generating element for generating a RH' slid value of RH1' in cases where the value YH1' is an even number and generating another RH' slid value of RH1'+1 in cases where the value YH1' is an odd number;

a RH' reduced value storing element for storing a RH' reduced value of a RH' upper signal which is formed by removing a least significant bit of a RH' signal having the RH' slid value generated in the RH' slid value generating element;

a RH' reduced value increasing element for increasing the RH' reduced value stored in the RH' reduced value storing element to produce a RH' component of a color converting address in cases where the value RH1' is an odd number on condition that an adjusting value UR shown in a following adjusting table is set to zero and maintaining the RH' reduced value stored in the RH' reduced value storing element to produce another RH' component of the color converting address in cases where the value RH1' is an even number;

a BH' slid value generating element for generating a BH' slid value of BH1' in cases where the value YH1' is an even number and generating another BH' slid value of BH1'+1 in cases where the value YH1' is an odd number;

a BH' reduced value storing element for storing a BH' reduced value of a BH' upper signal which is formed by removing a least significant bit of a BH' signal having the BH' slid value generated in the BH' slid value generating element;

a BH' reduced value increasing element for increasing the BH' reduced value stored in the BH' reduced value storing element to produce a BH' component of the color converting address in cases where the value BH1' is an odd number on condition that an adjusting value UB shown in the following adjusting table is set to zero and maintaining the BH' reduced value stored in the BH' reduced value storing element to produce another BH' component of the color converting address in cases where the value BH1' is an even number;

a GH' reduced value storing element for storing a GH' reduced value of a GH' upper signal which is formed by removing a least significant bit of a GH' signal having the value GH1'; and a GH' reduced value increasing element for increasing the GH' reduced value stored in the GH' reduced value storing element to produce a GH' component of the color converting address in cases where the value GH1' is an odd number on condition that an adjusting value UG shown in the following adjusting table is set to zero and maintaining the GH' reduced value stored in the GH' reduced value storing element to produce another GH' component of the color converting address in cases where the value GH1' is an even number, the color converting address of each of the lattice points Pa to Ph being determined by the RH' component of the color converting address produced in the RH' reduced value increasing element, the BH' component of the color converting address produced in the BH' reduced value increasing element and the GH' component of the color converting address produced in the GH' reduced value increasing element, and the adjusting table being expressed as follows:

| address generating units | adjusting values | | |
| --- | --- | --- | --- |
| | UR | UB | UG |
| U(M0) | 0 | 0 | 0 |
| U(M1) | 1 | 0 | 0 |
| U(M2) | 1 | 1 | 0 |
| U(M3) | 0 | 1 | 0 |
| U(M4) | 0 | 0 | 1 |
| U(M5) | 1 | 0 | 1 |
| U(M6) | 1 | 1 | 1 |
| U(M7) | 0 | 1 | 1. |

41. A color converting apparatus according to claim 37 in which the six color converting data selected from among the color converting data M0 to M7 in the selecting means are allocated at the color converting addresses of the lattice points Pa, Pb, Pc, Pc, Pf and Pg in cases where the first oblique triangular prism is selected in the oblique triangular prism selecting means, and the six color converting data vary according to the selected block address (RH1', BH1', GH1') as follows:

| selected block addresses | color converting data | | | | | |
| --- | --- | --- | --- | --- | --- | --- |
| (RH1', BH1', GH1') | Pa | Pb | Pc | Pe | Pf | Pg |
| (2i, 2j, 2k) | M0 | M1 | M2 | M6 | M7 | M4 |
| (2i + 1, 2j, 2k) | M1 | M0 | M3 | M7 | M6 | M5 |
| (2i + 1, 2j + 1, 2k) | M2 | M3 | M0 | M4 | M5 | M6 |
| (2i, 2j + 1, 2k) | M3 | M2 | M1 | M5 | M4 | M7 |
| (2i, 2j, 2k + 1) | M4 | M5 | M6 | M2 | M3 | M0 |
| (2i + 1, 2j, 2k + 1) | M5 | M4 | M7 | M3 | M2 | M1 |
| (2i, 2j + 1, 2k + 1) | M6 | M7 | M4 | M0 | M1 | M2 |
| (2i + 1, 2j, 2k + 1) | M7 | M6 | M5 | M1 | M0 | M3 | where the symbols i, j and k are respectively an integral number, and the six color converting data selected from among the color converting data M0 to M7 in the selecting means are allocated at the color converting addresses of the lattice points Pa, Pd, Pc, Pc, Ph, Pg in cases where the second oblique triangular prism is selected in the oblique triangular prism selecting means, and the six color converting data vary according to the selected block address (RH1', BH1', GH1') as follows:

| selected block addresses | color converting data | | | | | |
| --- | --- | --- | --- | --- | --- | --- |
| (RH1', BH1', GH1') | Pa | Pd | Pc | Pe | Ph | Pg |
| (2i, 2j, 2k) | M0 | M3 | M2 | M6 | M5 | M4 |
| (2i + 1, 2j, 2k) | M1 | M2 | M3 | M7 | M4 | M5 |
| (2i + 1, 2j + 1, 2k) | M2 | M1 | M0 | M4 | M7 | M6 |
| (2i, 2j + 1, 2k) | M3 | M0 | M1 | M5 | M6 | M7 |
| (2i, 2j, 2k + 1) | M4 | M7 | M6 | M2 | M1 | M0 |
| (2i + 1, 2j, 2k + 1) | M5 | M6 | M7 | M3 | M0 | M1 |
| (2i, 2j + 1, 2k + 1) | M6 | M5 | M4 | M0 | M3 | M2 |
| (2i + 1, 2j, 2k + 1) | M7 | M4 | M5 | M1 | M2 | M3. |

42. A color converting apparatus according to claim 37 in which the primary color space designated by the first, second and third primary color signals is formed of a first color group of a red, a green and a blue, or a second color group of a yellow, a magenta and a cyan.

43. A color converting apparatus according to claim 37 in which the color converting data storing means comprises a plurality of color converting tables which each correspond to one of the rectangular parallelepipeds, each of the color converting tables comprising eight color converting memories for storing the color converting data M0 to M7.

44. A color converting apparatus according to claim 37 in which the color converting data storing means comprises a plurality of color converting tables which each correspond to one of the rectangular parallelepipeds, each of the color converting tables comprising eight color converting memories for storing the color converting data M0 to M7 at first color converting sub-tables and other pieces of color converting data M0' to M7' at second color converting sub-tables.

45. A color converting apparatus according to claim 44, further including:

area processing selecting means for selecting either a first type of area processing in which a first type of color conversion is performed for a first area of a colored picture or a second type of area processing in which a second type of color conversion is performed for a second area of the colored picture; and sub-table signal generating means for generating a first sub-table signal in cases where the first type of area processing is selected in the area processing selecting means and generating a second sub-table signal in cases where the second type of area processing is selected in the area processing selecting means, the first or second sub-table signal being transferred to the second address generating means, the color converting data M0, M1, M2, M3, M4, M5, M6 and M7 stored at the first color converting sub-tables being read out from the color converting data storing means in cases where the first sub-table signal is transferred to the second address generating means, and the color converting data M0', M1', M2', M3', M4', M5', M6' and M7' stored at the second color converting sub-tables being read out from the color converting data storing means as the color converting data M0, M1, M2, M3, M4, M5, M6 and M7 in cases where the second sub-table signal is transferred to the second address generating means.

46. A color converting apparatus according to claim 37 in which the selection of either the first oblique triangular prism or the second oblique triangular prism in the oblique triangular prism selecting means is performed according to a large and small relationship between the value (RL1–GL1)' of the first weighting factor and the value (BL1–GL1)' of the second weighting factor.

47. A color converting apparatus according to claim 37 in which each of the color converting data stored in the color converting data storing means has a value limited to an even number or an odd number in a widened range, and the interpolation calculating means comprises:

a displacement register for registering a positive or negative displacement value;

a displacement adder for adding the displacement value registered in the displacement register to the output color value Do to set the widened range of the output color value Do interpolated with the color converting data M0, M1 (or M3), M2, M4, M5 (or M7) and M6 in a displaced range which equally occupies an area of positive numbers and another area of negative numbers; and an output data limiter for limiting the output color value Do set in the displaced range by the displacement adder withing an area of positive numbers and zero.

48. A color converting apparatus according to claim 47 in which the color converting data are respectively composed of 10 bits, the widened range of the output color value Do added in the displacement adder is from −1024 to 1022, and the output color value Do reduced in the output data limiter ranges from 0 to 1023.

49. A color converting apparatus according to claim 47 in which the color converting data are respectively composed of 8 bits, the widened range of the output color value Do added in the displacement adder is from −256 to 254, and the output color value Do reduced in the output data limiter ranges from 0 to 255.

50. A color converting apparatus according to claim 37 in which the interpolation calculating means comprises:

difference generating means for calculating a first difference Db–Da between pieces of data Da, Db allocated at the color converting addresses of the lattice points Pa, Pb, a second difference Dc–Db between pieces of data Db, Dc allocated at the color converting addresses of the lattice points Pb, Pc, a third difference De–Da between pieces of data Da, De allocated at the color converting addresses of the lattice points Pa, Pe, a fourth difference Df–De between pieces of data De, Df allocated at the color converting addresses of the lattice points Pa, Pe and a fifth difference Dg–Df between pieces of data Dg, Df allocated at the color converting addresses of the lattice points Pg, Pf in cases where the oblique triangular prism selecting signal indicating the selection of the first oblique triangular prism is received and calculating a sixth difference Dd–Da between pieces of data Da, Dd allocated at the color converting addresses of the lattice points Pa, Pd, a seventh difference Dc–Dd, an eighth difference De–Da, a ninth difference Dh–De between pieces of data De, Dh allocated at the color converting addresses of the lattice points Pe, Ph and a tenth difference Dg–Dh in cases where the oblique triangular prism selecting signal indicating the selection of the second oblique triangular prism is received;

first multiplying means for multiplying the first difference Db–Da, the second difference Dc–Db, the fourth difference Df–De and the fifth difference Dg–Df calculated in the difference generating means by the value (RL1–GL1)' of the first weighting factor or the value (BL1–GL1)' of the second weighting factor transferred from the weighting factor generating means to obtain a first product (RL1–GL1)'*(Db–Da), a second product (BL1–GL1)'*(Dc–Dd), a third product (RL1–GL1)'*(Df–De) and a fourth product (BL1–GL1)'*(Dg–Df) in cases where the oblique triangular prism selecting signal indicating the selection of the first oblique triangular prism is received and multiplying the seventh difference Dc–Dd, the sixth difference Dd–Da, the tenth difference Dg–Dh and the ninth difference Dh–De calculated in the difference generating means by the value (RL1–GL1' of the first weighting factor or the value (BL1–GL1)' of the second weighting factor to obtain a fifth product (RL1–GL1)'*(Dc–Dd), a sixth product (BL1–GL1)'*(Dd–Da), a seventh product (RL1–GL1)'*(Dg–Dh) and an eighth product (BL1–GL1)'*(Dh–De) in cases where the oblique triangular prism selecting signal indicating the selection of the second oblique triangular prism is received;

first adding means for adding the first product (RL1–GL1)'*(Db–Da) and the second product (BL1–GL1)'*(Dc–Db) produced in the first multiplying means to obtain a first added product (RL1–GL1)'*(Db–Da)+(BL1–GL1'*(Dc–Db), adding the third product (RL1–GL1)'*(Df–De) and the fourth product (BL1–GL1'*(Dg–Df) produced in the first multiplying means to obtain a second added product (RL1–GL1)'*(Df–De)+(BL1–GL1)'*(Dg–Df), adding the fifth product (RL1–GL1)'*(Dc–Dd) and the sixth product (BL1–GL1)'*(Dd–Da) produced in the first multiplying means to obtain a third added product (RL1–GL1)'*(Dc–Dd)+ (BL1–GL1'*(Dd–Da), and adding the seventh product (RL1–GL1)'*(Dg–Dh) and the eighth product (BL1–GL1)'*(Dh–De) produced in the first multiplying means to obtain a fourth added product (RL1–GL1)'*(Dg–Dh)+(BL1–GL1)'*(Dh–De);

second adding means for adding the first added product (RL1–GL1)'*(Db–Da)+(BL1–GL1)'*(Dc–Db) produced in the first adding means and the color converting data Da transferred from the input signal receiving means to produce a first term product Da+(RL1–GL1'*(Db–Da)+(BL1–GL1)'*(Dc–Db) in cases where the oblique triangular prism selecting signal indicating the selection of the first oblique triangular prism is received and adding the third added product (RL1–GL1)'*(Dc–Dd)+(BL1–GL1)'*(Dd–Da) produced in the first adding means and the color converting data Da to produce another first term product Da+(RL1–GL1)'*(Dc–Dd)+(BL1–GL1)'*(Dd–Da) in cases where the oblique triangular prism selecting signal indicating the selection of the second oblique triangular prism is received;

subtracting means for subtracting the first added product (RL1–GL1)'*(Db–Da)+(BL1–GL1)'*(Dc–Db) from the second added product (RL1–GL1)'*(Df–De)+ (BL1–GL1)'*(Dg–Df) produced in the first adding means to obtain a first subtracted product (RL1–GL1)'*(Df–De)+ (BL1–GL1)'*(Dg–Df)–(RL1–GL1)'*(Db–Da)– (BL1–GL1)'*(Dc–Db) and subtracting the third added product (RL1–GL1)'*(Dc–Dd)+ (BL1–GL1)'*(Dd–Da) from the fourth added product (RL1–GL1)'*(Dg–Dh)+ (BL1–GL1)'*(Dh–De) produced in the first adding means to obtain a second subtracted product (RL1–GL1)'*(Dg–Dh)+ (BL1–GL1)'*(Dh–De)–(RL1–GL1'*(Dc–Dd)– (BL1–GL1)'*(Dd–Da);

third adding means for adding the first subtracted product (RL1–GL1)'*(Df-De)+(BL1–GL1)'*(Dg–Df)–(RL1–GL1)'*(Db–Da)–(BL1–GL1)'*(Dc–Db) produced in the subtracting means and the third difference De–Da calculated in the difference generating means to produce a fifth added product De–Da+(RL1–GL1)'*(Df–De)+(BL1–GL1)'*(Dg–Df)–(RL1–GL1'*(Db–Da)– (BL1–GL1)'*(Dc–Db) and adding the second subtracted product (RL1–GL1)'*(Dg–Dh)+(BL1–GL1)'*(Dh–De)– (RL1–GL1)'*(Dc–Dd)–(BL1–GL1)'*(Dd–Da) produced in the subtracting means and the third difference De–Da to produce a sixth added product De–Da+(RL1–GL1)'*(Dg–Dh)+(BL1–GL1)'*(Dh–De)–(RL1–GL1)'*(Dc–Dd)–(BL1–GL1)'*(Dd–Da);

second multiplying means for multiplying the fifth added product De–Da+(RL1–GL1)'*(Df–De)+(BL1–GL1)'*(Dg–Df)–(RL1–GL1)'*(Db–Da)–(BL1–GL1)'*(Dc–Db) and the sixth added product De–Da+ (RL1–GL1)'*(Dg–Dh)+(BL1–GL1)'*(Dh–De)–(RL1–GL1)'*(Dc–Dd)–(BL1–GL1)'*(Dd–Da) produced in the third adding means by the value GL1 of the lower third color signal to obtain a second term product GL1*{De–Da+(RL1–GL1)'*(Df–De)+(BL1–GL1)'*(Dg–Df)–(RL1–GL1)'*(Db–Da)–(BL1–GL1)'*(Dc–Db)} in cases where the oblique triangular prism selecting signal indicating the selection of the first oblique triangular prism is received and another second term product GL1*{De–Da+(RL1–GL1)'*(Dg–Dh)+(BL1–GL1)'*(Dh–De)–(RL1–GL1)'*(Dc–Dd)–(BL1–GL1)'*(Dd–Da)} in cases where the oblique triangular prism selecting signal indicating the selection of the second oblique triangular prism is received; and fourth adding means for adding the first term product Da+(RL1–GL1)'*(Db–Da)+(BL1–GL1)'*(Dc–Db) produced in the second adding means and the second term product GL1*{De–Da+(RL1–GL1)'*(Df–De)+ (BL1–GL1)'*(Dg–Df)–(RL1–GL1)'*(Db–Da)–(BL1–GL1)'*(Dc–Db)} produced in the second multiplying means to obtain the output color value Do=Da+(RL1–GL1)'*(Db–Da)+(BL1–GL1)'*(Dc–Db)+GL1*{De–Da+(RL1–GL1)'*(Df–De)+(BL1–GL1)'*(Dg–Df)–(RL1–GL1)'*(Db–Da)–(BL1–GL1)'*(Dc–Db)} in cases where the oblique triangular prism selecting signal indicating the selection of the first oblique triangular prism is received and adding the first term product Da+(RL1–GL1)'*(Dc–Dd)+(BL1–GL1)'*(Dd–Da) produced in the second adding means and the second term product GL1*{De–Da+(RL1–GL1)'*(Dg–Dh)+(BL1–GL1)'*(Dh–De)–(RL1–GL1)'*(Dc–Dd)–(BL1–GL1)'*(Dd–Da)} to obtain the output color value Do=Da+(RL1–GL1)'*(Dc–Dd)+(BL1–GL1)'*(Dd–Da)+GL1*{De–Da+(RL1–GL1)'*(Dg–Dh)+ (BL1–GL1)'*(Dh–De)–(RL1–GL1)'*(Dc–Dd)– (BL1–GL1)'*(Dd–Da)} in cases where the oblique triangular prism selecting signal indicating the selection of the second oblique triangular prism is received.

51. A color converting apparatus according to claim 37, further including:

host interface means for transferring other pieces of color converting data from a host computer to the color converting data storing means to renew the color converting data stored in the color converting data storing means during a blanking period in which the color converting data M0, M1, M2, M3, M4, M5, M6 and M7 are not read out from the color converting data storing means.

52. A color converting method for performing a three-dimensional color conversion of a colored picture, comprising the steps of:

forming a plurality of rectangular parallelepipeds in a primary color space by partitioning the primary color space in a first primary color direction, a second primary color direction and a third primary color direction, each of the rectangular parallelepipeds having four lattice points P1, P2, P3 and P4 placed at a first-second primary color plane of the primary color space and other four lattice points P5, P6, P7 and P8 placed at another first-second primary color plane of the primary color space, and a block address of each of the rectangular parallelepipeds being represented by a color converting address of the lattice point P1;

allocating pieces of color converting data defined in an output color space at the color converting addresses of the lattice points P1 to P8 of the rectangular parallelepipeds;

receiving a first primary color signal, a second primary color signal and a third primary color signal defined in the primary color space and designating an input color;

generating a color converting address (RH1', BH1', GH1') of a lattice point P1 of a selected rectangular parallelepiped with the first, second and third primary color signals;

conceptually forming a parallelepiped PP in which the input color is included, the parallelepiped PP having a first plane placed at a value $G_o$ in the third primary color direction and a second plane parallel to the first plane, the first plane of the parallelepiped PP having four lattice points Pa, Pb, Pc and Pd addressed at color converting addresses $(R_o, B_o, G_o)$, $(R_o+1, B_o, G_o)$ $(R_o+1, B_o+1, G_o)$ and $(R_o, B_o+1, G_o)$ in that order, the second plane of the parallelepiped PP having four lattice points Pe, Pf, Pg and Ph addressed at color converting addresses $(R_o+1, B_o+1, G_o+1)$, $(R_o+2, B_o+1, G_o+1)$, $(R_o+2, B_o+2, G_o+1)$ and $(R_o+1, B_o+2, G_o+1)$ in that order, and the color converting address (RH1', BH1', GH1') of the lattice point P1 of the selected rectangular parallelepiped agreeing with the color converting address $(R_o, B_o, G_o)$ of the lattice point Pa or the color converting address $(R_o+1, B_o+1, G_o+1)$ of the lattice point Pe in dependence on whether the value GH1' is an even number or an odd number;

conceptually partitioning the parallelepiped PP into a first oblique triangular prism with the lattice points Pa, Pb, Pc, Pe, Pf and Pg and a second oblique triangular prism with the lattice points Pa, Pd, Pc, Pe Ph and Pg;

reading out six pieces of color converting data Da, Db (or Dd), Dc, De, Df (or Dh) and Dg allocated at the color converting addresses of the lattice points Pa, Pb (or Pd), Pc, Pe, Pf (or Ph) and Pg of the first or second oblique triangular prism in which the input color is included; and interpolating an output color defined in the output color space corresponding to the input color in the selected oblique triangular prism of the parallelepiped PP with the six color converting data Da, Db (or Dd), Dc, De, Df (or Dh) and Dg.

53. A color converting method according to claim 52 in which the step of allocating pieces of color converting data includes:

limitedly allocating pieces of color converting data defined in an output color space at the color converting addresses of the lattice points P1 to P8 of the rectangular parallelepipeds of which the block addresses are respectively expressed by three even numbers ($2i$, $2j$, $2k$).

54. A color converting method according to claim 53 in which the step of receiving a first primary color signal additionally includes:

dividing the first primary color signal into an upper first color signal having a value RH1 and a lower first color signal having a value RL1, the second primary color signal into an upper second color signal having a value BH1 and a lower second color signal having a value BL1, and a third primary color signal into an upper third color signal having a value GH1 and a lower third color signal having a value GL1, the step of reading out six pieces of color converting data includes:

generating the selected block address (RH1', BH1', GH1') of the selected rectangular parallelepiped with the upper first color signal, the upper second color signal and the upper third color signal;

generating a first weighting factor denoting a first primary color component in the first primary color direction of an input color vector directed from the lattice point Pa to the input color with the first and third lower color signals;

generating a second weighting factor denoting a second primary color component in the second primary color direction of the input color vector with the second and third lower color signals;

selecting either the first oblique triangular prism or the second oblique triangular prism of the parallelepiped PP by comparing the first weighting factor and the second weighting factor and outputting a selected oblique triangular prism;

generating eight block addresses of eight particular rectangular parallelepipeds which each have one of the lattice points Pa to Ph of the parallelepiped PP with the selected block address (RH1', BH1', GH1');

reading out eight pieces of color converting data M0, M1, M2, M3, M4, M5, M6 and M7 allocated at the color converting addresses of the lattice points Pa to Ph of the parallelepiped PP; and selecting six pieces of color converting data from among the color converting data M0 to M7 as six pieces of color converting data Da, Db (or Dd), Dc, De, Df (or Dh) and Dg allocated at the color converting addresses of the lattice points Pa, Pb (or Pd), Pc, Pe, Pf (or Ph) and Pg of the selected oblique triangular prism of the parallelepiped PP in that order according to the selected block address (RH1', BH1', GH1'), and the step of interpolating an output color includes:

interpolating an output color defined in the output color space corresponding to the input color as an output color value Do in the selected oblique triangular prism of the parallelepiped PP with the six color converting data Da, Db (or Dd), Dc, De, Df (or Dh) and Dg while weighting the six color converting data with the first and second weighting factors and the lower third color signal which denotes a third primary color component in the third primary color direction of the input color vector.

55. A color converting method for performing a three-dimensional color conversion of a colored picture, comprising the steps of:

forming a plurality of rectangular parallelepipeds in a primary color space by partitioning the primary color space in a first primary color direction, a second primary color direction and a third primary color direction, each of the rectangular parallelepipeds having four lattice points P1, P2, P3 and P4 placed at a first-second primary color plane of the primary color space and other four lattice points P5, P6, P7 and P8 placed at another first-second primary color plane of the primary color space, and a block address of each of the rectangular parallelepipeds being represented by a color converting address of the lattice point P1;

allocating pieces of color converting data defined in an output color space at the color converting addresses of the lattice points P1 to P8 of the rectangular parallelepipeds;

receiving a first primary color signal, a second primary color signal and a third primary color signal defined in the primary color space and designating an input color;

generating a color converting address (RH1', BH1', GH1') of a lattice point P1 of a selected rectangular parallelepiped with the first, second and third primary color signals;

conceptually forming a first type of parallelepipeds and a second type of parallelepipeds to occupy all of the primary color space, the first type of parallelepipeds respectively having a first plane placed at a value $G_o$ in the third primary color direction and a second plane parallel to the first plane, the first plane of the first type of parallelepiped having four lattice points Pa, Pb, Pc and Pd addressed at color converting addresses $(R_o, B_o, G_o)$, $(R_o+1, B_o+1, G_o)$, $(R_o+1, B_o+2, G_o)$ and $(R_o, B_o+1, G_o)$ in that order, the second plane of the first type of parallelepiped having four lattice points Pe, Pf, Pg and Ph addressed at color converting addresses $(R_o+1, B_o+1, G_o+1)$, $(R_o+2, B_o+2, G_o+1)$, $(R_o+2, B_o+3, G_o+1)$ and $(R_o+1, B_o+2, G_o+1)$ in that order, the second type of parallelepipeds respectively having a third plane placed at a value $G_o'$ in the third primary color direction and a fourth plane parallel to the third plane, the third plane of the second type of parallelepiped having four lattice points Pa', Pb', Pc' and Pd' addressed at color converting addresses $(R_o', B_o', G_o')$, $(R_o'+1, B_o', G_o')$, $(R_o'+2, B_o'+1, G_o')$ and $(R_o'+1, B_o'+1, G_o')$ in that order, the fourth plane of the second type of parallelepiped having four lattice points Pe', Pf', Pg' and Ph' addressed at color converting addresses $(R_o'+1, B_o'+1, G_o'+1)$, $(R_o'+2, B_o'+1, G_o'+1)$, $(R_o'+3, B_o'+2, G_o'+1)$ $(R_o'+2, B_o'+2, G_o'+1)$ in that order, the color converting address (RH1'BH1' GH1') of the lattice point P1 of the selected rectangular parallelepiped agreeing with the color converting address $(R_o, B_o, G_o)$ of the lattice point Pa, the color converting address $(R_o+1, B_o+1, G_o+1)$ of the lattice point Pe, the color converting address $(R_o', B_o', G_o')$ of the lattice point Pa', or the color converting address $(R_o'+1, B_o'+1, G_o'+1)$ of the lattice point Pe' in a particular parallelepiped in dependence on whether the value GH1' is an even number or an odd number, and the input color designated by the three primary color signals being included in the particular parallelepiped;

reading out eight pieces of color converting data Da, Db, Dc, Dd, De, Df, Dg and Dh allocated at the color converting addresses of the lattice points Pa, Pb, Pc, Pd, Pe, Pf, Pg and Ph or Pa', Pb', Pc', Pd', Pe', Pf', Pg' and Ph' of the particular parallelepiped; and interpolating an output color defined in the output color space corresponding to the input color with the eight color converting data Da, Db, Dc, Dd, De, Df, Dg and Dh.

\* \* \* \* \*